US006043334A

United States Patent [19]

Kanamaru et al.

[11] Patent Number: 6,043,334

[45] Date of Patent: Mar. 28, 2000

[54] POLYCARBONATE RESIN, CROSSLINKED POLYCARBONATE RESIN AND ELECTROPHOTOGRAPHIC PHOTORECEPTOR

[75] Inventors: Masami Kanamaru; Takaaki Hikosaka; Shuji Sakamoto, all of Sodegaura, Japan

[73] Assignee: Idemitsu Kosan Co., Ltd., Tokyo, Japan

[21] Appl. No.: 09/077,605

[22] PCT Filed: Dec. 4, 1996

[86] PCT No.: PCT/JP96/03543

§ 371 Date: Jun. 2, 1998

§ 102(e) Date: Jun. 2, 1998

[87] PCT Pub. No.: WO97/20878

PCT Pub. Date: Dec. 12, 1997

[30] Foreign Application Priority Data

| | | | |
|---|---|---|---|
| Dec. 4, 1995 | [JP] | Japan | 7-315594 |
| Dec. 4, 1995 | [JP] | Japan | 7-315595 |
| Dec. 4, 1995 | [JP] | Japan | 7-315596 |
| May 28, 1996 | [JP] | Japan | 8-133421 |
| Nov. 27, 1996 | [JP] | Japan | 8-316697 |

[51] Int. Cl.[7] C08G 64/00

[52] U.S. Cl. 528/196; 528/198

[58] Field of Search 528/196, 198

[56] References Cited

FOREIGN PATENT DOCUMENTS

| | | |
|---|---|---|
| 0006579 | 1/1980 | European Pat. Off. . |
| 0538070 | 4/1993 | European Pat. Off. . |

(List continued on next page.)

*Primary Examiner*—Terressa Mosley

*Attorney, Agent, or Firm*—Antonelli, Terry, Stout & Kraus, LLP

[57] ABSTRACT

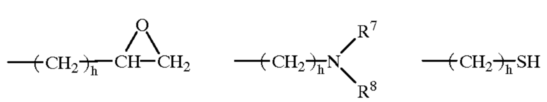

-continued $-(CH_2)_h-CH=CH_2$ $-(CH_2)_h-OH$ $-(CH_2)_h-CO_2H$ $-(CH_2)_h-C\equiv CH$

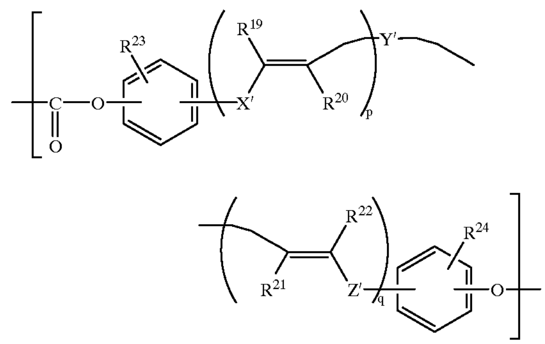

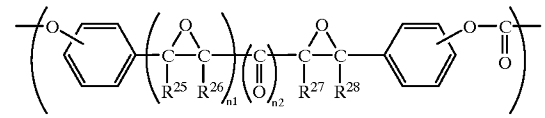

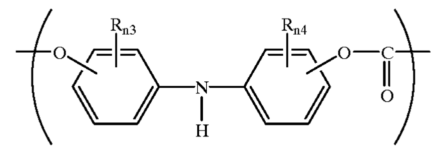

A polycarbonate resin having crosslinking groups selected from among the functional groups mentioned above in the side chains, ends or main chain; a crosslinked polycarbonate resin made from the above resin through crosslinking; and an electrophotographic photoreceptor containing such a resin in its photosensitive layer. In said groups, h is an integer of 0 to 4, $R^7$ and $R^8$ are each hydrogen, alkyl or aryl; X', Y' and Z' are each a single bond, —O—, —CO—, —S—, —SO—, —$SO_2$— or alkylene; $R^{20}$ and $R^{21}$ are each hydrogen, alkyl, cycloalkyl or aryl; $R^{19}$ and $R^{22}$ are each hydrogen, alkyl, cycloalkyl or aryl; $R^{23}$ and $R^{24}$ are each hydrogen, halogeno, alkyl, cycloalkyl, alkoxy or aryl; the sum of p and q is an integer of 1 or above; $R^{25}$, $R^{26}$, $R^{27}$ and $R^{28}$ are each hydrogen, halogeno, alkyl, alkyloxy, alkylthio, cycloalkyl, aryl, aryloxy or arylthio; n1 and n2 are each 0 or 1; R is halogeno, alkyl, alkyloxy, alkylthio, cycloalkyl, aryl, aryloxy or arylthio; and n3 and n4 are each an integer of 0 to 4.

16 Claims, 1 Drawing Sheet

1H-NMR (90MHz, CDCl3)

FOREIGN PATENT DOCUMENTS

| | | |
|---|---|---|
| 0565423 | 10/1993 | European Pat. Off. . |
| 20373394 | 12/1970 | France . |
| 8104745 | 4/1996 | Japan . |
| 8113636 | 5/1996 | Japan . |
| 8248649 | 9/1996 | Japan . |
| 842264 | 1/1957 | United Kingdom . |
| 9419390 | 9/1994 | WIPO . |

POLYCARBONATE RESIN, CROSSLINKED POLYCARBONATE RESIN AND ELECTROPHOTOGRAPHIC PHOTORECEPTOR

TECHNICAL FIELD

An object of the present invention is to provide novel polycarbonates useful for the production of crosslinked polycarbonate resins or graft polymers, and crosslinked polycarbonate resins obtainable by crosslinking the polycarbonate resins. The present invention also relates to electrophotographic photoreceptors, which have a photosensitive layer containing these polycarbonate resins as resin ingredients and maintain high mechanical strength and excellent electrophotographic properties during repeated uses for a long term.

BACKGROUND ART

While electrophotographic photoreceptors using inorganic photoconductive materials, such as selenium or $\alpha$-silicon, have been used, organic electrophotographic photoreceptors (OPC) comprising a conductive substrate bearing a photosensitive layer comprising organic photoconductive materials and binder resins have been improved in performances, and their uses are increasing rapidly. Such organic electrophotographic photoreceptors include those of the laminate-type and the single-layer-type, the former having a photosensitive layer having at least a charge-generating layer (CGL), which generates charge on exposure, and a charge-transfer layer (CTL), which transfers the charge, the later having a single-layer photosensitive layer containing a charge-generating substance and a charge-transfer substance both dispersed in a binder resin.

Electrophotographic photoreceptors require that their sensitivity, electric properties and optical properties be accommodated to the directed electrophotographic processes. Particularly, photoreceptors for repeated uses should withstand the electrical and mechanical, external force applied directly on the surface layer, namely the layer farthest away from the substrate (typically, a conductive substrate), during corona electrification, toner development, transfer onto paper, cleaning and so on, to maintain a uniform image quality for a long time. Specifically, they should resist friction which wears or scores the surface, and should be hardly subject to surface deterioration due to the ozone generated during corona electrification at elevated temperatures. To meet such requirements, polycarbonate resins made from bisphenol A or bisphenol Z have been widely used as the binder resins in the photosensitive layer of organic electrophotographic photoreceptors because of their good compatibility with charge-transfer substances and high mechanical strength. However, even these polycarbonate resins are inferior to the layers of inorganic photoconductive materials in durability.

To solve these problems, in Japanese Patent Application unexamined publication No. 4-179961 are proposed polycarbonates containing rigid units of copolymerized biphenol structure. The mechanical strength of the polycarbonates, however, is insufficient for the required abrasion resistance due to the poor tangling of molecular chains.

Crosslinking polycarbonates are proposed as binder resin materials to further improve the durability of electrophotographic photoreceptors. For example, Japanese Patent Application Unexamined Publication No. 4-291348 (1992) discloses crosslinked-type electrophotographic photoreceptors which contain as binder resins crosslinked polycarbonates made from polycarbonates having unsaturated groups in the side chains through crosslinking. However, the structure of the polycarbonates to be crosslinked lacks rigidity, so the layer containing the crosslinked products is too fragile to improve abrasion resistance adequately.

Japanese Patent Application Unexamined Publication Nos. 5-65320 (1993) and 6-41258 (1994) disclose the synthesis of graft polycarbonates by grafting vinyl monomers on polycarbonates having unsaturated end groups. There, however, is no suggestion to use the polycarbonates having unsaturated end groups for the production of the photosensitive layer of electrophotographic photoreceptors, nor to crosslink the polycarbonates to produce crosslinked-type electrophotographic photoreceptors excellent in electrophotographic properties and durability.

Further, binder resins for electrophotographic photoreceptors are generally dissolved in solvents to prepare coating fluid for forming the photosensitive layer, and should not cause whitening nor gelation of the coating fluid. If the coating fluid whitens or sets to gel, the photosensitive layer may crystallize after coating and drying. In the crystallized areas, photo-decay does not occur and the charge remains as a residual potential, which appears as a picture defect.

DISCLOSURE OF INVENTION

Under such circumstances, the present invention is directed to provide a novel polycarbonate resin which has crosslinking functional groups and is useful for the production of crosslinked polycarbonate resins or graft polymers, and to provide a novel crosslinked polycarbonate resin made from the polycarbonate resin through crosslinking.

Another object of the present invention is to provide an electrophotographic photoreceptor having high plate wear and maintaining excellent electrophotographic properties for a long term, which is produced by using as a binder resin material the novel polycarbonate resin that is well compatible with charge-transfer substances, does not whiten nor set to gel on dissolution in solvents, and forms crosslinked products with high surface hardness and good abrasion resistance.

We have studied to solve these problems and have found that novel polycarbonate resins which are rigid and useful for the production of crosslinked polycarbonate resins or graft polymers are obtainable by both the introduction of crosslinking functional groups and the introduction of a rigid central unit, such as direct bond or a fluorenylidene structure, in place of the common central carbon of bisphenols, and/or the introduction of a substituent restricting free rotation. It has also been found that among such polycarbonate resins, those having a specific range of reduced viscosity are well compatible with charge-transfer substances, cause no whitening nor gelation when dissolved in solvents, and give crosslinked products having high surface hardness and excellent abrasion resistance. These findings have led us to complete the present invention.

That is, the present invention provides a polycarbonate resin having crosslinking functional groups in side chains, which comprises repeating units (1) represented by the following general formula (1) and repeating units (2a) represented by the following general formula (2a) and/or repeating units (2b) represented by the following general formula (2b), in a molar ratio of the repeating units (1) to a total of the repeating units (1), repeating units (2a) and the repeating units (2b), (1)/[(1)+(2a)+(2b)], of 0.001–1;

(1)

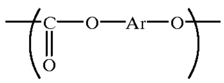

(2a)

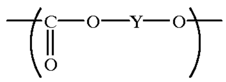

(2b)

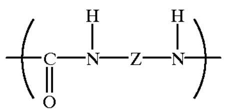

wherein, in the general formula (1), Ar is a divalent aromatic group represented by (1a)

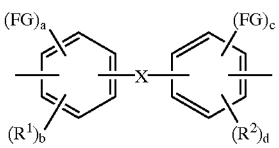

or (1b)

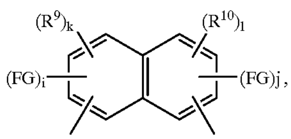

and in the formula (1a), X is a single bond, —CO—, —S—, —SO—, —$SO_2$—, —O—, —$CR^3R^4$- (wherein $R^3$ and $R^4$ are each an alkyl group of 1 to 10 carbon atoms, trifluoromethyl or an aryl group of 6 to 36 carbon atoms), a cycloalkylene group of 5 to 12 carbon atoms, a cycloalkylidene group of 5 to 12 carbon atoms, fluorenylidene, diphenylmethylidene consisting of two phenyl groups linked to each other via 1 to 4 methylene groups, an α,ω-alkylene group of 2 to 12 carbon atoms, —$CR^5R^6$- (wherein $R^5$ and $R^6$ are each hydrogen, an alkyl group of 1 to 10 carbon atoms, an aryl group of 6 to 36 carbon atoms, an aliphatic hydrocarbon group of 2 to 10 carbon atoms having one or more unsaturated bonds (except for a linear alkenyl group of 2 to 6 carbon atoms having one double bond only at an end thereof and a linear alkynyl group of 2 to 6 carbon atoms having one triple bond only at an end thereof) or FG, at least one of $R^5$ and $R^6$ being FG or an aliphatic hydrocarbon group of 2 to 10 carbon atoms having one or more unsaturated bonds, FG being

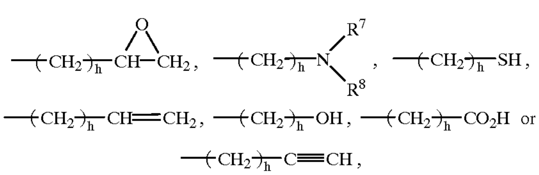

h being an integer of 0 to 4, $R^7$ and $R^8$ being each hydrogen, an alkyl group of 1 to 6 carbon atoms or a substituted or non-substituted aryl group of 6 to 12 carbon atoms), a cycloalkylidene group of 5 to 12 carbon atoms which is substituted by an aliphatic hydrocarbon group of 2 to 12 carbon atoms having one or more unsaturated bonds, a cycloalkylidene group of 5 to 12 carbon atoms which is substituted by an alicyclic hydrocarbon group of 5 to 12 carbon atoms having one or more unsaturated bonds, or a fluorenylidene which is substituted by an aliphatic hydrocarbon group of 2 to 12 carbon atoms having one or more unsaturated bonds, $R^1$ and $R^2$ are each a halogeno, a saturated hydrocarbon group of 1 to 10 carbon atoms, an alkyloxy group of 1 to 10 carbon atoms, an alkylthio group of 1 to 10 carbon atoms, an aryl group of 6 to 18 carbon atoms, an aryloxy group of 6 to 12 carbon atoms, an arylthio group of 6 to 12 carbon atoms, or an aryl group of 6 to 18 carbon atoms which is substituted by an alkoxyl group of 1 to 10 carbon atoms, a, b, c and d are each an integer of 0 to 4, a+b being an integer of 0 to 4, c+d being an integer of 0 to 4; and when X is a single bond, fluorenylidene, a diphenylmethylidene consisting of two phenyl groups linked to each other via 1 to 4 methylene groups, —CO—, —S—, —SO—, —$SO_2$—, —O—, —$CR^3R^4$-, a cycloalkylene group of 5 to 12 carbon atoms, a cycloalkylidene group of 5 to 12 carbon atoms or an α,ω-alkylene group of 2 to 12 carbon atoms, a+c is not 0; and when X is —CO—, —S—, —SO—, —$SO_2$—, —O—, —$CR^3R^4$-, a cycloalkylene group of 5 to 12 carbon atoms, a cycloalkylidene group of 5 to 12 carbon atoms or an α,ω-alkylene group of 2 to 12 carbon atoms, and the FGs bonded to the phenylene groups of (1a) are $$—(CH_2)_h—CH{=}CH_2 \quad \text{and/or} \quad —(CH_2)_h—C{\equiv}CH$$

(wherein h is as defined above), a+c is not 0 and b+d is not 0;

and when X is —$CR^5R^6$-, a cycloalkylidene group of 5 to 12 carbon atoms which is substituted by an aliphatic hydrocarbon group of 2 to 12 carbon atoms having one or more unsaturated bonds or a fluorenylidene which is substituted by an aliphatic hydrocarbon group of 2 to 12 carbon atoms having one or more unsaturated bonds, none of $R^1$ and $R^2$ are a halogeno;

and in the formula (1b), $R^9$ and $R^{10}$ are each a halogeno, an alkyl group of 1 to 6 carbon atoms, an alkyloxy group of 1 to 4 carbon atoms, a substituted or non-substituted aryl group of 6 to 12 carbon atoms or a substituted or non-substituted aryloxy group of 6 to 12 carbon atoms, FG is as defined above, two —COOH present in one repeating unit may form the following structure,

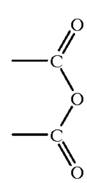

i, j, k and l are each an integer of 0 to 3, i+j=1 to 6, i+k=0 to 3, and j+l=0 to 3;

and in the general formula (2a), Y is a divalent group containing an arylene group and no crosslinking functional group;

and in the general formula (2b), Z is a group represented by the following formula,

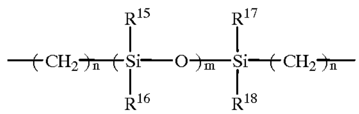

$R^{15}$, $R^{16}$, $R^{17}$ and $R^{18}$ are each an alkyl group of 1 to 4 carbon atoms or an aryl group of 6 to 36 carbon atoms, n is an integer of 1 to 6, and m is a number of 1 to 150.

The present invention further provides a polycarbonate resin having crosslinking functional groups in the main chain, which comprises repeating units (6), (7) or (8) represented by the following general formula (6), (7) or (8), and repeating units (2a) represented by the following general formula (2a) and/or repeating units (2b) represented by the following general formula (2b), in a molar ratio of the repeating units (6), (7) or (8) to a total of the repeating units (6), (7) or (8), the repeating units (2a) and the repeating units (2b), [(6), (7) or (8)]/{[(6), (7) or (8)]+(2a)+(2b)}, of 0.001 to 1;

alkoxyl of 1 to 40 carbon atoms or an aryl group of 6 to 36 carbon atoms, and p+q is an integer of 1 or more;

and in the general formula (7), $R^{25}$, $R^{26}$, $R^{27}$ and $R^{28}$ are each hydrogen, a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, $R^{26}$ and $R^{27}$ may be linked to each other by a methylene chain of 1 to 4 carbon atoms, n1 and n2 are each an integer of 0 or 1;

and in the general formula (8), each R is a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non- (6)

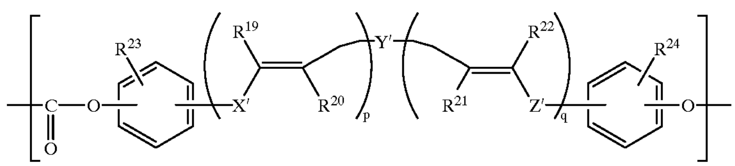

(7)

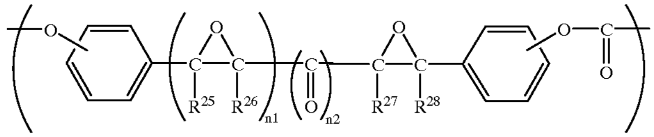

(8)

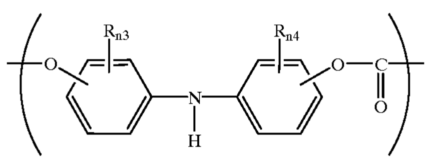

(2a)

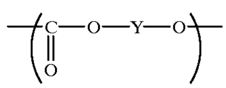

(2b)

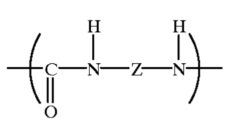

wherein, in the general formula (6), X', Y' and Z' are each a single bond, —O—, —CO—, —S—, —SO—, —$SO_2$— or an alkylene group of 1 to 40 carbon atoms, $R^{20}$ and $R^{21}$ are each hydrogen, an alkyl group of 1 to 40 carbon atoms, a cycloalkyl group of 5 to 40 carbon atoms or an aryl group of 6 to 36 carbon atoms, or $R^{20}$ and $R^{21}$ are linked to each other to form an alkylene group of 1 to 40 carbon atoms, $R^{19}$ and $R^{22}$ are each hydrogen, an alkyl group of 1 to 40 carbon atoms, a cycloalkyl group of 5 to 40 carbon atoms or an aryl group of 6 to 36 carbon atoms, $R^{23}$ and $R^{24}$ are each hydrogen, a halogeno, an alkyl group of 1 to 40 carbon atoms, a cycloalkyl group of 5 to 40 carbon atoms, an substituted aryloxy group or 6 to 12 carbon atoms or an arylthio group of 6 to 12 carbon atoms, n3 and n4 are each an integer of 0 to 4;

and in the general formula (2a), Y is as defined above;

and in the general formula (2b), Z is as defined above.

The present invention further provides a polycarbonate resin having crosslinking functional groups at ends, which comprises repeating units (2a) represented by the following general formula (2a) and/or repeating units (2b) represented by the following general formula (2b), and end groups represented by the following general formula (E1), (E2) or (E3)

(2a)

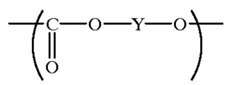

(2b)

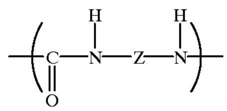

(E1)

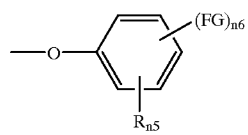

(E2)

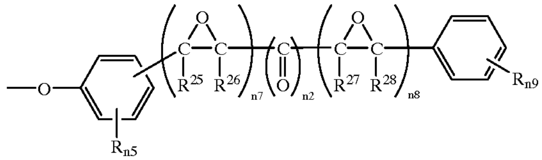

(E3)

—O—FG wherein in the general formula (2a), Y is as defined above;

in the general formula (2b), Z is as defined above;

in the general formulae (E1), (E2) and (E3), each R is a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, n5 is an integer of 0 to 4, n6 is an integer of 1 to 5, n5+n6 is an integer of 1 to 5, n9 is an integer of 0 to 5, $R^{25}$, $R^{26}$, $R^{27}$ and $R^{28}$ are each hydrogen, a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, $R^{26}$ and $R^{27}$ may be linked to each other by a methylene chain of 1 to 4 carbon atoms, n7 and n8 are each 0 or 1, n7+n8 is 1 or 2, n2 is 0 or 1, FG is as defined above, and two —COOH present in one end group may have the following structure.

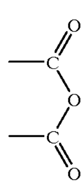

The present invention further provides crosslinked polycarbonate resins produced by crosslinking the above-described polycarbonate resins having crosslinking functional groups.

The present invention further provides an electrophotographic photoreceptor comprising a conductive substrate and a photosensitive layer that is disposed on the conductive substrate, the photosensitive layer containing the above-described polycarbonate resin having crosslinking functional groups.

The present invention further provides an electrophotographic photoreceptor comprising a conductive substrate and a photosensitive layer that is disposed on the conductive substrate, the photosensitive layer containing a crosslinked polycarbonate resin made from the above-described polycarbonate resin having crosslinking functional groups through crosslinking.

BEST MODE FOR CARRYING OUT THE INVENTION

[Polycarbonate Resin]

Figure 1:
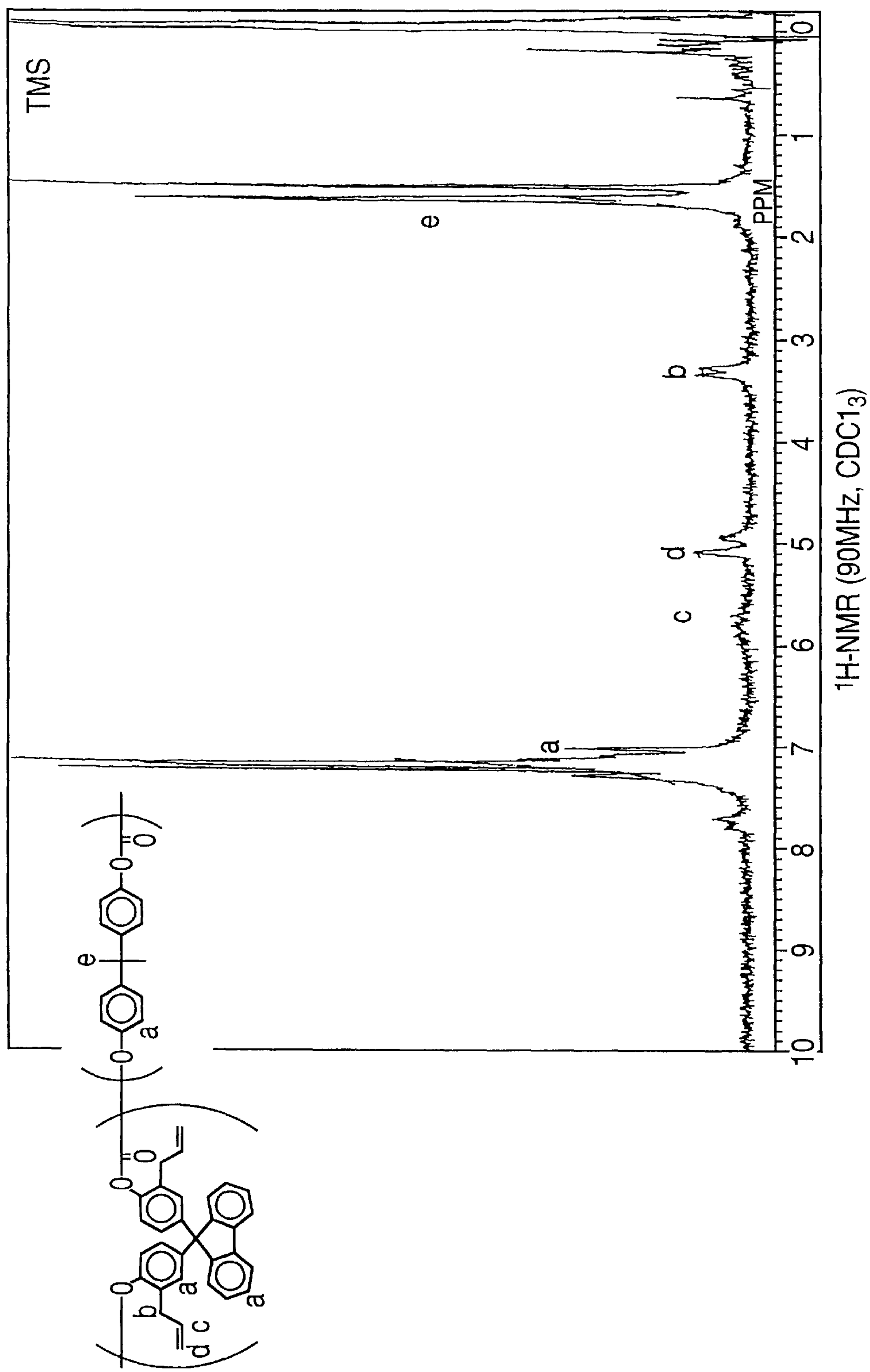
FIG. 1 is a chart of an $^1$H-NMR spectrum of the polycarbonate resin synthesized in Example 1.

The polycarbonate resins of the present invention may be linear or cyclic, and may have specific ends or branching structures introduced by synthesis using endcappers or branching agents.

1. Polycarbonate resins having crosslinking functional groups in the side chains;

The polycarbonate resin of the present invention having crosslinking functional groups in the side chains comprises the repeating units (1) and the repeating units (2a) and/or (2b) in a molar ratio of the repeating units (1) to the total of the repeating units (1), the repeating units (2a) and the repeating units (2b), (1)/[(1)+(2a)+(2b)], of 0.001–1, preferably 0.01–0.4, more preferably 0.1–0.3. The repeating units (2a) and repeating units (2b) have no crosslinking functional groups, and introducing such repeating units can give polycarbonate resins which have various properties in addition to the ability of crosslinking or graft polymerization and are suited for various applications. For example, in the production of electrophotographic photoreceptors, such polycarbonate resins can give electrophotographic photoreceptors applicable for various types of machines.

The polycarbonate resins of the present invention may further contain other repeating units than the repeating units (1), (2a) and (2b), so far as the object of the present invention can be attained.

Examples of $R^1$ and $R^2$ in the general formula (1a) are as follows.

Preferred halogenos represented by $R^1$ and $R^2$ are fluoro and chloro.

Examples of the saturated hydrocarbon groups of 1 to 10 carbon atoms represented by $R^1$ and $R^2$ include alkyl groups, such as methyl, ethyl, propyl, butyl, pentyl, hexyl, isopropyl, isobutyl, sec-butyl, tert-butyl, heptyl, octyl, nonyl and decyl, and cycloalkyl groups, such as cyclopentyl and cyclohexyl.

Examples of the aryl groups of 6 to 18 carbon atoms represented by $R^1$ and $R^2$ include phenyl, tolyl, styryl, biphenylyl, naphthyl, terphenyl, phenanthryl and anthryl.

Examples of the alkyloxy groups of 1 to 10 carbon atoms represented by $R^1$ and $R^2$ include methoxy, ethoxy, n-propyloxy, isopropoxy, n-butoxy, sec-butoxy, tert-butoxy, isobutoxy, pentyloxy, hexyloxy, heptyloxy, octyloxy, nonyloxy and decyloxy, with methoxy, ethoxy, isopropoxy and tert-butoxy preferred.

Examples of the alkylthio groups of 1 to 10 carbon atoms represented by $R^1$ and $R^2$ include methylthio, ethylthio, n-propylthio, isopropylthio, n-butylthio, sec-butylthio, tert-butylthio, isobutylthio, pentylthio, hexylthio, heptylthio, octylthio, nonylthio and decylthio, with methylthio, ethylthio, isopropylthio and tert-butylthio preferred.

Examples of the aryloxy groups of 6 to 12 carbon atoms represented by $R^1$ and $R^2$ include phenyloxy, naphthyloxy and biphenylyloxy, with phenyloxy preferred.

Examples of the arylthio groups of 6 to 12 carbon atoms represented by $R^1$ and $R^2$ include phenylthio, naphthylthio and biphenylylthio, with phenylthio preferred.

Examples of the aryl groups of 6 to 18 carbon atoms substituted by an alkoxyl group of 1 to 10 carbon atoms include methoxyphenyl and dimethoxyphenyl.

Examples of X in the general formula (1a) are as follows.

In —$CR^3R^4$- represented by X, examples of the alkyl groups of 1 to 10 carbon atoms and aryl groups of 6 to 36 carbon atoms represented by $R^3$ and $R^4$ include methyl, ethyl, propyl, butyl, heptyl, octyl, nonyl decyl, phenyl, tolyl, biphenylyl, naphthyl terphenyl, phenanthryl and anthryl.

Examples of the cycloalkylene groups of 5 to 12 carbon atoms represented by X include cyclopentylene and cyclohexylene.

Examples of the cycloalkylidene group of 5 to 12 carbon atoms represented by X include cyclopentylidene and cyclohexylidene.

Examples of the $\alpha,\omega$-alkylene groups of 2 to 12 carbon atoms represented by X include dimethylene, trimethylene, tetramethylene, pentamethylene and hexamethylene.

In —$CR^5R^6$- represented by X, the alkyl groups of 1 to 10 carbon atoms represented by $R^5$ and $R^6$ include methyl, ethyl, propyl, butyl, pentyl, hexyl, isopropyl, isobutyl, sec-butyl, tert-butyl, heptyl, octyl, nonyl and decyl.

The aryl groups of 6 to 36 carbon atoms represented by $R^5$ and $R^6$ include phenyl, tolyl, biphenylyl, naphthyl, terphenyl, phenanthryl and anthryl.

Examples of the aliphatic hydrocarbon groups of 2 to 10 carbon atoms having one or more unsaturated bonds, which are represented by $R^5$ and $R^6$ (with the proviso that the aliphatic hydrocarbon groups represented by $R^5$ and $R^6$ do not include linear alkenyl groups of 2 to 6 carbon atoms having a double bond only at end and linear alkynyl groups having a triple bond only at end), include 1-propenyl, 1-butenyl, 2-butenyl, 1-pentenyl, 2-pentenyl, 3-pentenyl, 1-hexenyl, 2-hexenyl, 3-hexenyl, 4-hexenyl, heptenyl, octenyl, nonenyl and decenyl.

In FG represented by $R^5$ and $R^6$, the alkyl groups of 1 to 6 carbon atoms and aryl groups of 6 to 12 carbon atoms represented by $R^7$ and $R^8$ include methyl, ethyl, propyl, butyl, pentyl, hexyl, isopropyl, isobutyl, sec-butyl, tert-butyl, phenyl, tolyl, biphenylyl and naphthyl, and examples of the substituents on the substituted aryl groups include halogeno, such as fluoro, chloro, bromo and iodo, alkyl groups of 1 to 4 carbon atoms, such as methyl, ethyl, propyl, isopropyl, butyl, sec-butyl, tert-butyl and isobutyl, alkoxyls of 1 to 4 carbon atoms, such as methoxy, ethoxy, propoxy, isopropoxy, butoxy, sec-butoxy, tert-butoxy and isobutoxy, alkylthio groups of 1 to 4 carbon atoms, such as methylthio, arylthio groups of 6 to 12 carbon atoms, such as phenylthio, and one or more substituents may be each bonded to any position where they can bond.

In the cycloalkylidene groups of 5 to 12 carbon atoms which are represented by X and substituted by an aliphatic hydrocarbon group of 2 to 12 carbon atoms having one or more unsaturated groups, examples of the aliphatic hydrocarbon groups of 2 to 12 carbon atoms having one or more unsaturated bonds include vinyl, allyl and 2-propenyl, and examples of the cycloalkylidene groups of 5 to 12 carbon atoms include cyclopentylidene, 3,3,4,4-tetramethylcyclopentylidene, 4,4-dimethylcyclohexylidene and 3,3,5,5-tetramethylcyclohexylidene.

In the cycloalkylidene groups of 5 to 12 carbon atoms which are represented by X and substituted by an alicyclic hydrocarbon group of 5 to 12 carbon atoms having one or more unsaturated groups, examples of the alicyclic hydrocarbon groups of 5 to 12 carbon atoms having one or more unsaturated bonds include 1-cyclohexenyl, and examples of the cycloalkylidene group of 5 to 12 carbon atoms include cyclohexylidene.

Examples of the fluorenylidenes which are represented by X and substituted by an aliphatic hydrocarbon group of 2 to 12 carbon atoms having one or more unsaturated bonds include 9,9-fluorenylidene.

Examples of the groups represented by $R^9$, $R^{10}$, $R^7$ and $R^8$ in the general formula (1b) are as follows. Examples of the alkyl groups of 1 to 6 carbon atoms include methyl, ethyl, n-propyl, isopropyl, n-butyl, sec-butyl, tert-butyl, isobutyl, n-pentyl, neopentyl and n-hexyl, with methyl, ethyl, n-propyl, isopropyl, n-butyl and tert-butyl preferred. Examples of the alkyloxy groups of 1 to 4 carbon atoms include methoxy, ethoxy, n-propyloxy, isopropoxy, n-butoxy, sec-butoxy, tert-butoxy and isobutoxy, with methoxy, ethoxy, isopropoxy and tert-butoxy preferred. Examples of the aryl groups of 6 to 12 carbon atoms include phenyl, naphthyl and biphenylyl, with phenyl preferred. Examples of the aryloxy groups of 6 to 12 carbon atoms include phenoxy, naphthoxy and biphenylyloxy, with phenoxy preferred. Examples of the substituents on the aryl groups and aryloxy groups include halogeno, alkyl groups of 1 to 4 carbon atoms, alkyloxy groups of 1 to 4 carbon atoms, aryl groups of 6 to 12 carbon atoms and aryloxy groups of 6 to 12 carbon atoms, with alkyl or alkoxyl groups of 1 to 4 carbon atoms and aryl groups of 6 to 12 carbon atoms preferred.

Examples of the divalent groups containing an arylene group and having no crosslinking functional groups in the side chains, which are represented by Y in the general formula (2a), include xylylene, phenylene, tolylene, naphthylene, anthracenylene, phenanthrenylene, pyrenylene and the groups represented by the following general formula (4):

(4)

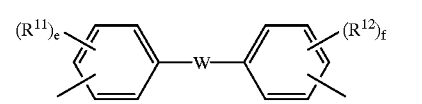

wherein $R^{13}$ and $R^{12}$ are each a halogeno, a saturated hydrocarbon group of 1 to 10 carbon atoms, an aromatic hydrocarbon group of 6 to 12 carbon atoms, an alkyloxy group of 1 to 10 carbon atoms, an alkylthio group of 1 to 10 carbon atoms, an aryloxy group of 6 to 12 carbon atoms or an arylthio group of 6 to 12 carbon atoms, e and f are each an integer of 0 to 4, W is a single bond, —O—, —CO—, —S—, —SO—, —$SO_2$—, —$CR^{13}R^{14}$-, a cycloalkylidene group of 5 to 12 carbon atoms or an $\alpha,\omega$-alkylene group of 2 to 12 carbon atoms ($R^{13}$ and $R^{14}$ being each hydrogen, trifluoromethyl, an alkyl group of 1 to 10 carbon atoms or an aromatic hydrocarbon group of 6 to 36 carbon atoms), or a group represented by the following general formula (5)

(5)

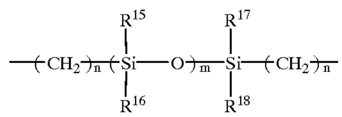

$R^{15}$, $R^{16}$, $R^{17}$ and $R^{18}$ being each an alkyl group of 1 to 4 carbon atoms or an aryl group of 6 to 36 carbon atoms, n being a number of 1 to 6 and m being a number of 1 to 150.

Examples of $R^{11}$, $R^{12}$, $R^{13}$ and $R^{14}$ in the general formula (2a) are as follows.

Preferred examples of the halogenos represented by $R^{11}$ and $R^{12}$ are fluoro, chloro and bromo.

Examples of the saturated hydrocarbon groups of 1 to 10 carbon atoms and aromatic hydrocarbon groups of 6 to 12 carbon atoms include methyl, ethyl, propyl, butyl, sec-butyl, tert-butyl, pentyl, hexyl, heptyl, octyl, nonyl, decyl, cyclopentyl, cyclohexyl, phenyl, tolyl, biphenylyl and naphthyl.

Examples of the alkyloxy groups of 1 to 10 carbon atoms represented by $R^{11}$ and $R^{12}$ include methoxy, ethoxy, n-propyloxy, isopropoxy, n-butoxy, sec-butoxy, tert-butoxy, isobutoxy, pentyloxy, hexyloxy, heptyloxy, octyloxy, nonyloxy and decyloxy, with methoxy, ethoxy, isopropoxy and tert-butoxy preferred.

Examples of the alkylthio group of 1 to 10 carbon atoms represented by $R^{11}$ and $R^{12}$ include methylthio, ethylthio, n-propylthio, isopropylthio, n-butylthio, sec-butylthio, tert-butylthio, isobutylthio, pentylthio, hexylthio, heptylthio, octylthio, nonylthio and decylthio, with methylthio, ethylthio, isopropylthio and tert-butylthio preferred.

Examples of the aryloxy groups of 6 to 12 carbon atoms represented by $R^{11}$ and $R^{12}$ include phenyloxy, naphthyloxy and biphenylyloxy, with phenyloxy preferred.

Examples of the arylthio group of 6 to 12 carbon atoms represented by $R^{11}$ and $R^{12}$ include phenylthio, naphthylthio and biphenylylthio, with phenylthio preferred.

Examples of the alkyl groups of 1 to 10 carbon atoms and the aromatic hydrocarbon groups of 6 to 36 carbon atoms represented by $R^{13}$ and $R^{14}$ include methyl, ethyl, propyl, butyl, sec-butyl, tert-butyl, isobutyl, pentyl, hexyl, heptyl, octyl, nonyl, decyl, phenyl, tolyl, biphenylyl, naphthyl, terphenyl, phenanthryl and anthryl.

Examples of the groups represented by Z in the general formula (2b) are the same as those represented by the above general formula (5). Examples of $R^{15}$, $R^{16}$, $R^{17}$ and $R^{18}$ in the general formula (5) include methyl, ethyl, propyl, butyl and phenyl, and the phenyl may optionally be substituted by, for example, a halogeno or an alkyl group.

Among the above-described polycarbonate resins having crosslinking functional groups in the side chains, those particularly suitable as a binder resin material in crosslinked-type electrophotographic photoreceptors contain the repeating units (2a) represented by the general formula (2a) wherein Y is a divalent group represented by the general formula (3), namely the repeating units (3) represented by the following general formula (3)

(3)

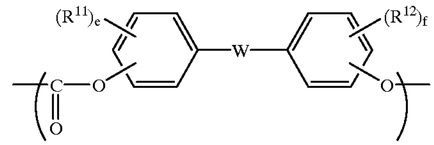

wherein $R^{11}$, $R^{12}$, e, f and W are as defined above.

Typical examples of the polycarbonate resins of the present invention are those containing at least one kind of the following repeating units as the repeating units (1) [(1a) and/or (1b)], particularly those containing at least one kind of these repeating units and at least one kind of the following repeating units as the repeating units (2a) and/or (2b).

EXAMPLES OF REPEATING UNITS (1)

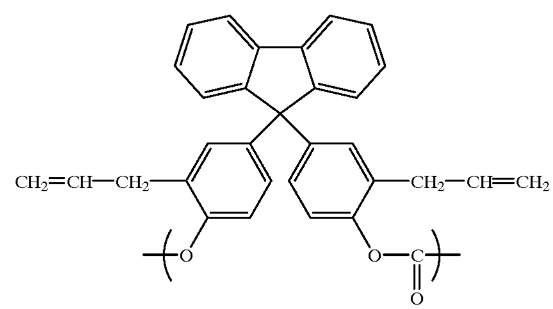

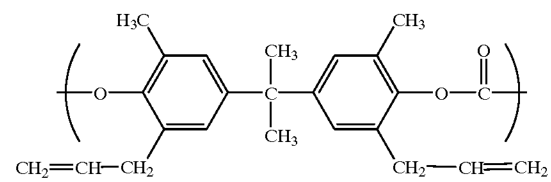

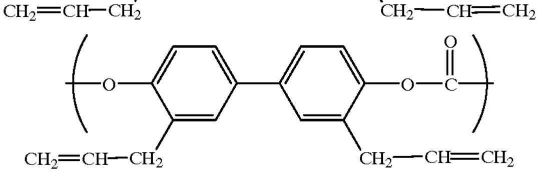

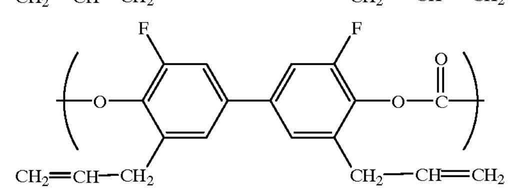

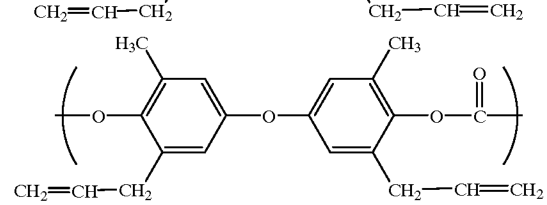

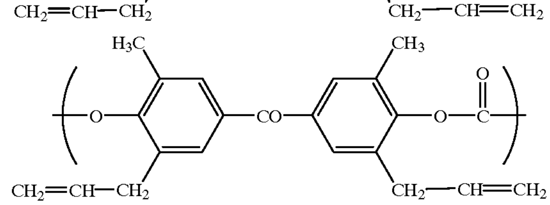

-continued
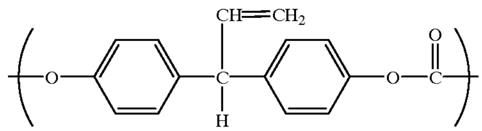
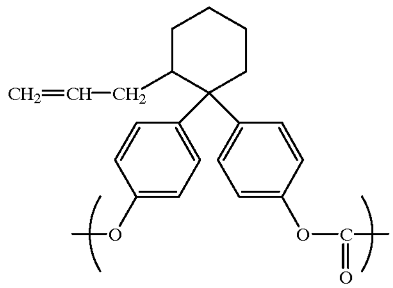
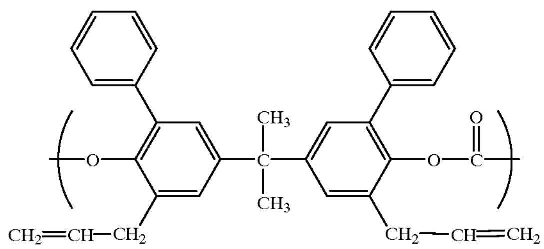
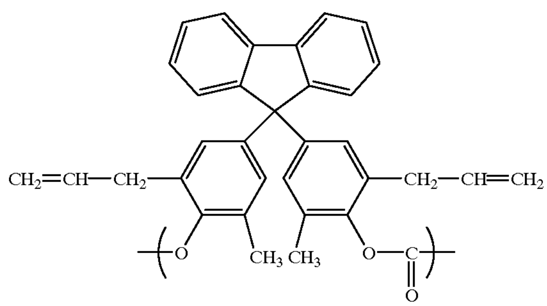
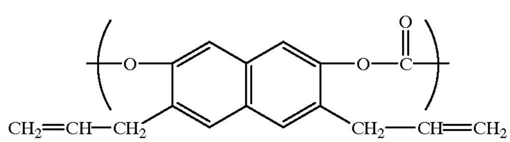
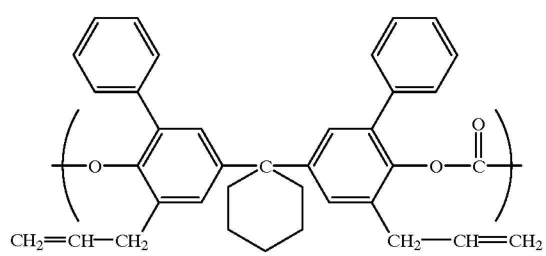
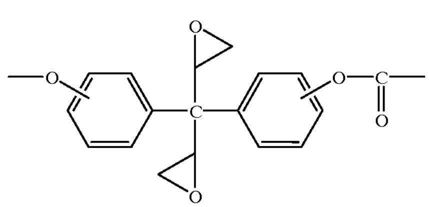
-continued
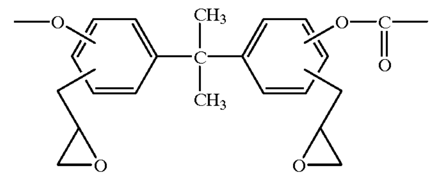
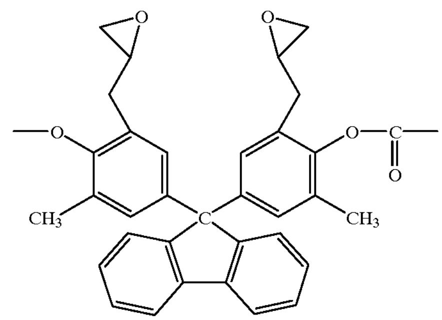
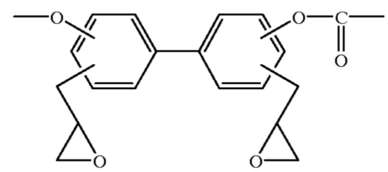
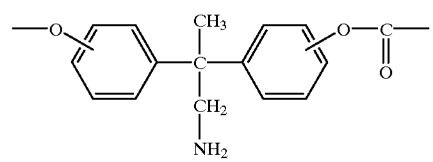
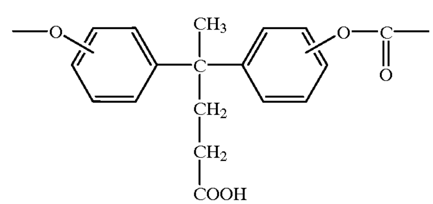
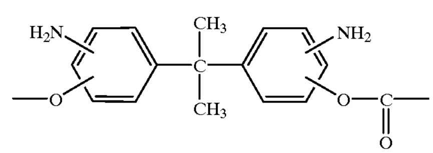
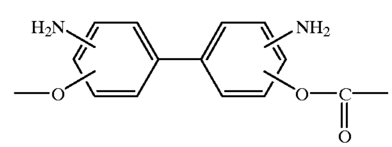
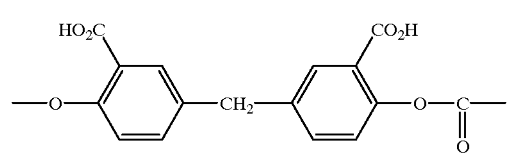

EXAMPLES OF REPEATING UNITS (2a) AND (2b)

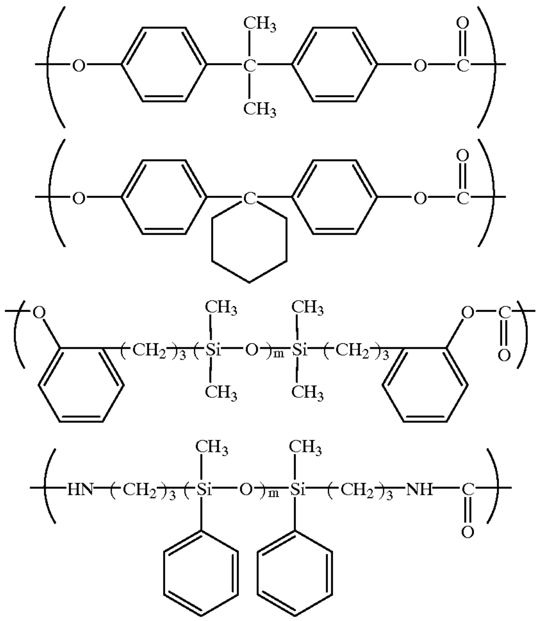

The polycarbonate resin of the present invention having crosslinking functional groups in the side chains may be synthesized, for example, by allowing a dihydric phenol (I) represented by the general formula HO—Ar—OH (I) together with a dihydric phenol (IIa) represented by the general formula HO—Y—OH (IIa) and/or a diamine (IIb) represented by the general formula $NH_2$-Z-$NH_2$ (IIb) to react with a carbonate precursor. The dihydric phenols (I) are specifically represented by the following general formulae (Ia) and (Ib). Preferred examples of the dihydric phenols (IIa) are represented by the following general formula (III).

According to a preferred method of synthesis, a carbonate precursor, such as phosgene, is polycondensed with the above-described dihydric phenols in the presence of an appropriate acid acceptor. An alternative is transesterification using a bisaryl carbonate as the carbonate precursor. These reactions are carried out in the optional presence of endcappers and/or branching agents.

(Ia)

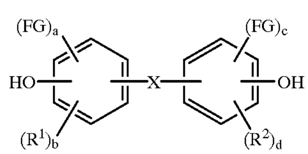

(Ib)

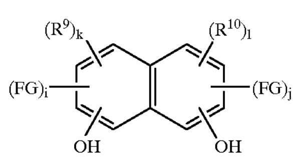

-continued (III)

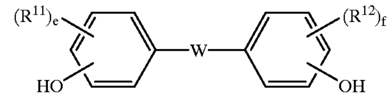

wherein, in the general formula (Ia), X, $R^1$, $R^2$, FG, a, b, c and d are as defined above, and in the general formula (Ib), FG, $R^9$, $R^{10}$, i, j, k and l are as defined above, and in the general formula (IIa), Y is as defined above, and in the general formula (III), W, $R^{11}$, $R^{12}$, e and f are as defined above, and in the general formula (IIb), Z is as defined above.

The above (IIa) and (IIb) may be used individually or in combination of two or more.

Examples of the dihydric phenols (Ia) represented by the general formula (Ia) are as follows.

Examples of the dihydric phenols (Ia) wherein X is single bond, fluorenylidene or a diphenylmethylidene wherein two phenyl groups are bonded by a methylene of 1 to 4 carbon atoms include the following compounds.

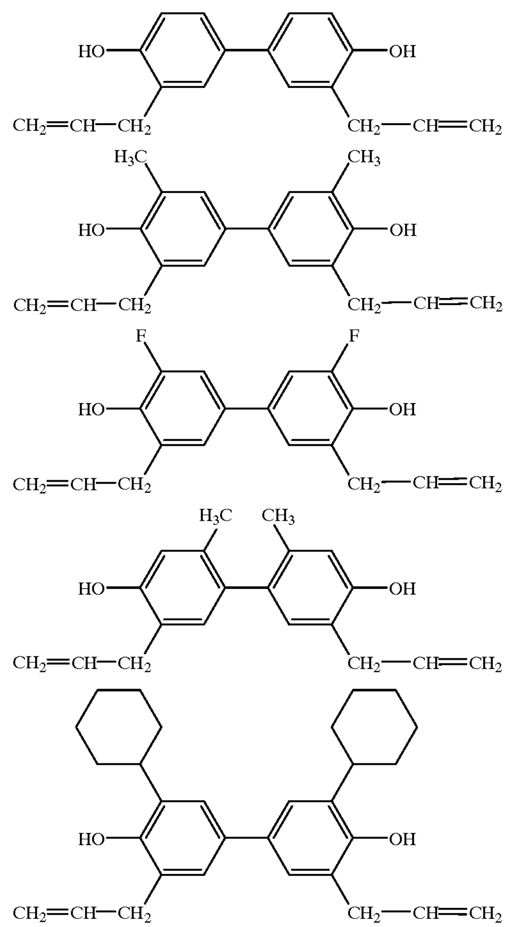

-continued

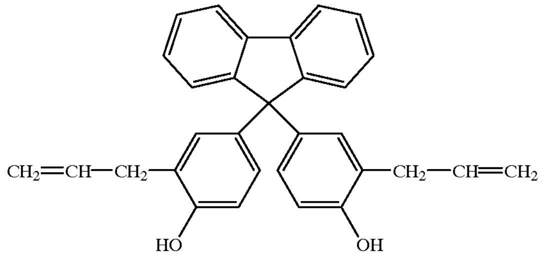

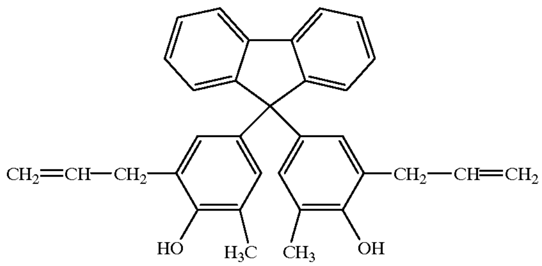

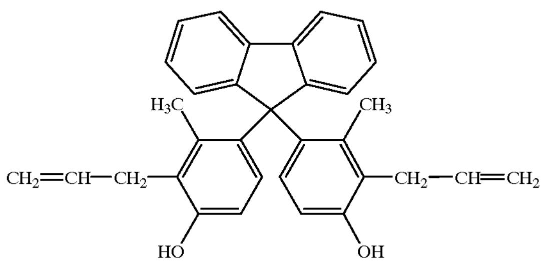

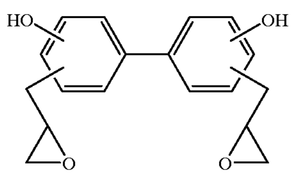

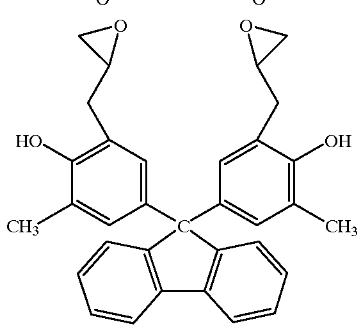

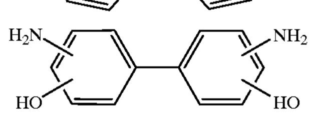

Other examples include 3,3'-divinyl-4,4'-dihydroxy-5,5'-dimethoxybiphenyl, 3,3'-diglycidyl-4,4'-dihydroxy-5,5'-diphenylbiphenyl, 3,3'-diglycidyl-4,4'-dihydroxy-5,5'-dimethylbiphenyl, 3,3'-diglycidyl-4,4'-dihydroxy-5,5'-dimethoxybiphenyl, 3,3'-diglycidyl-4,4'-dihydroxy-5,5'-dichlorobiphenyl, and 3,3'-diepoxy-4,4'-dihydroxybiphenyl.

Examples of the dihydric phenols (Ia) wherein X is —CO—, —S—, —SO—, —$SO_2$—, —O—, —$CR^3R^4$-, a cycloalkylene group of 5 to 12 carbon atoms, a cycloalkylidene group of 5 to 12 carbon atoms or an α,ω-alkylene group of 2 to 12 carbon atoms include the following compounds.

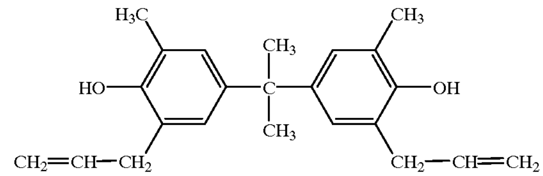

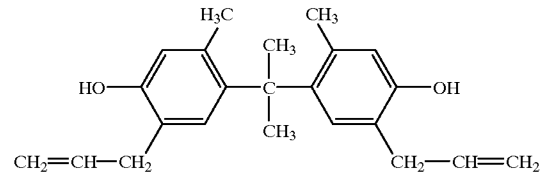

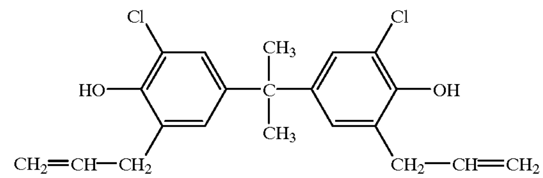

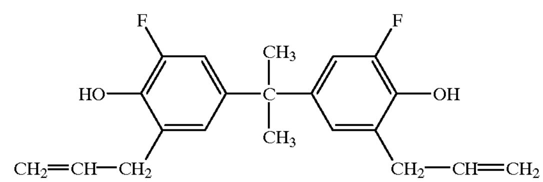

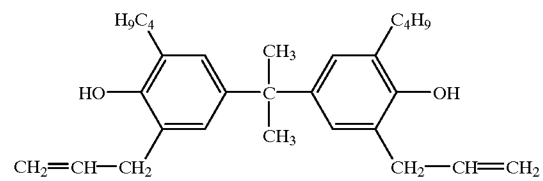

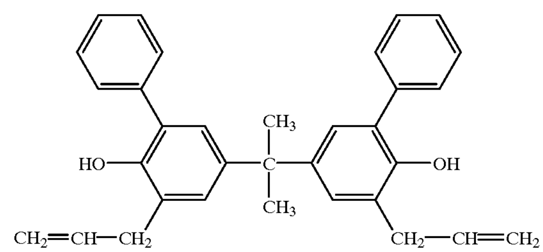

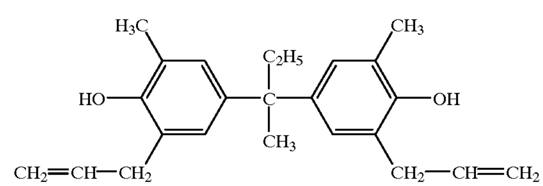

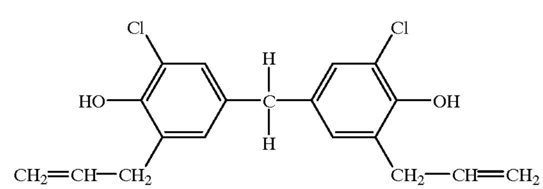

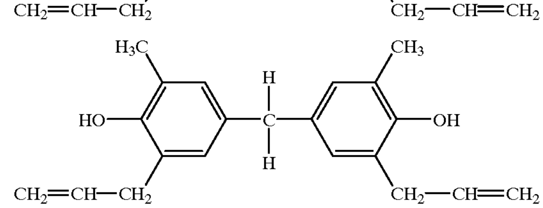

-continued
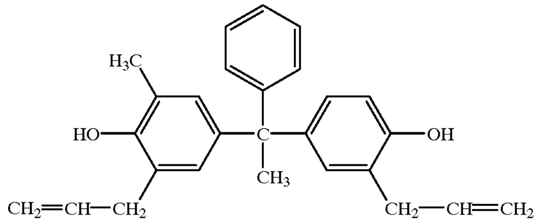
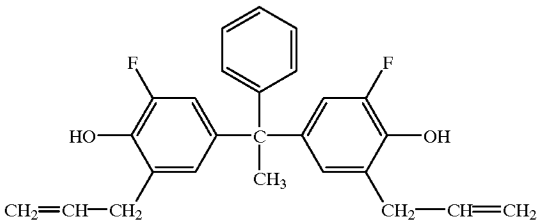
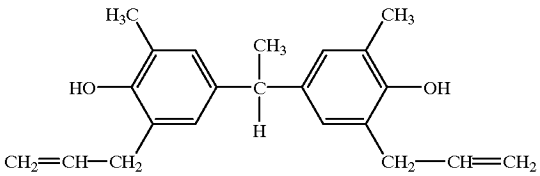
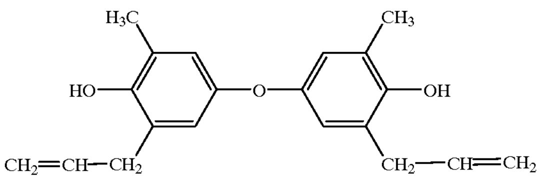
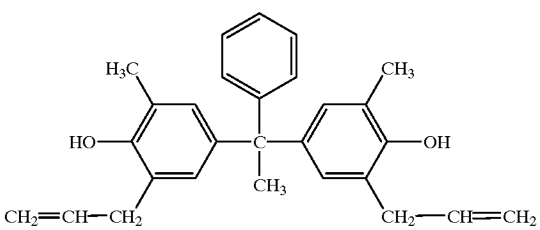
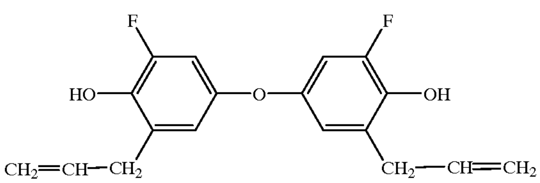
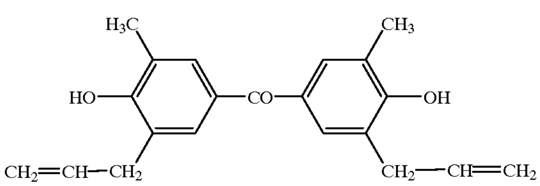
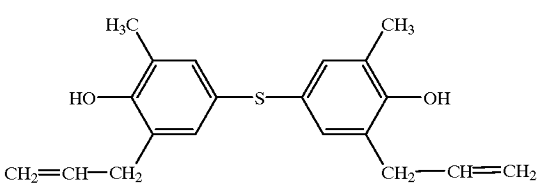
-continued
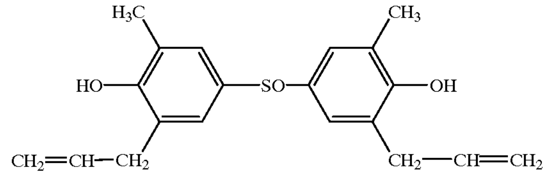
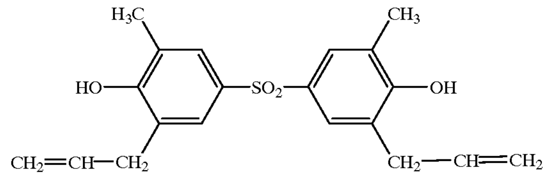
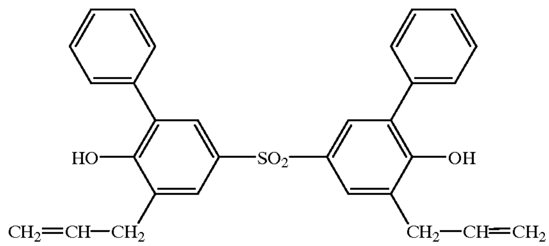
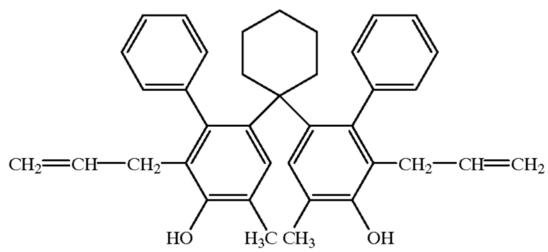
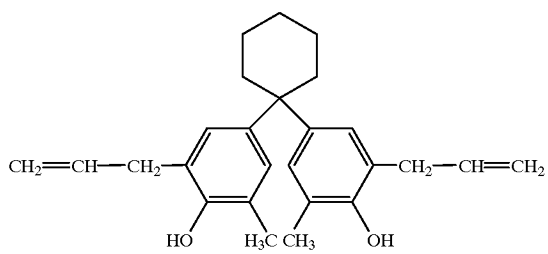
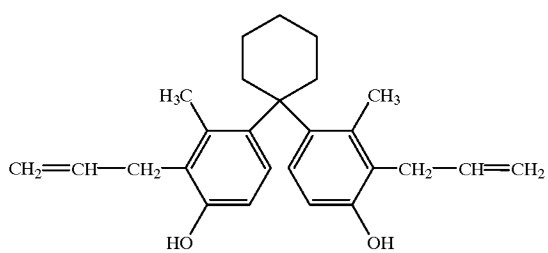
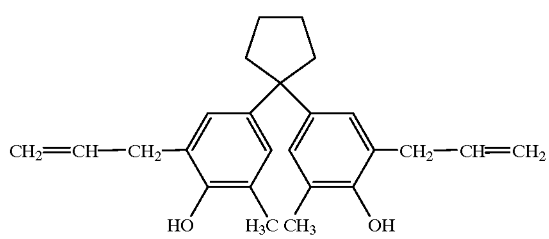

-continued

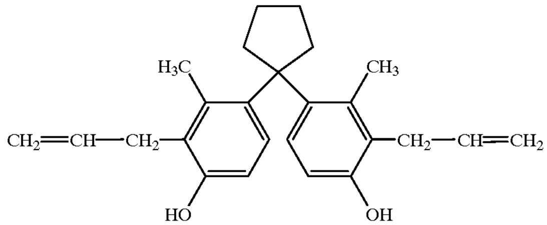

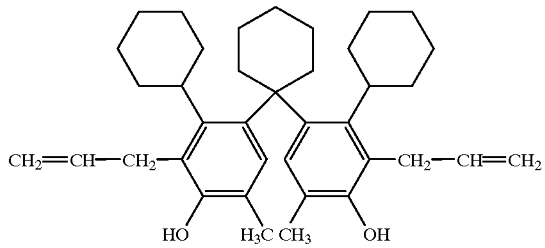

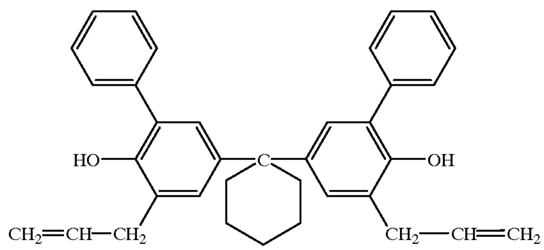

These dihydric phenols having allyl groups may be obtained by the Claisen rearrangement of corresponding allyl ethers.

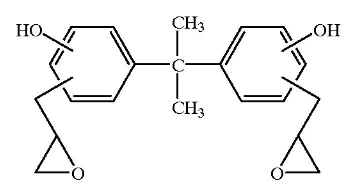

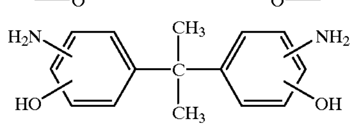

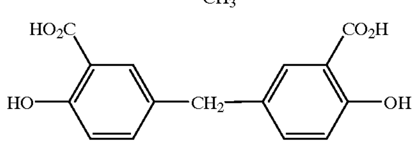

Examples the dihydric phenols (Ia) wherein X is —$CR^5R^6$-, a cycloalkylidene group of 5 to 12 carbon atoms which is substituted by an aliphatic hydrocarbon group of 2 to 12 carbon atoms having one or more unsaturated bonds, or a fluorenylidene which is substituted by an aliphatic hydrocarbon group of 2 to 12 carbon atoms having one or more unsaturated bonds, are as follows.

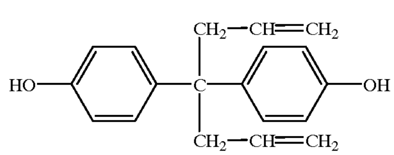

-continued

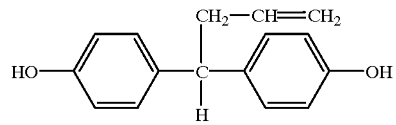

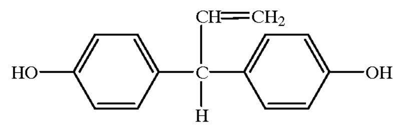

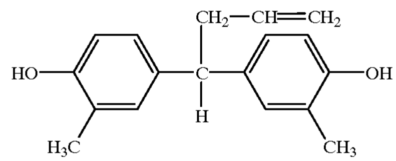

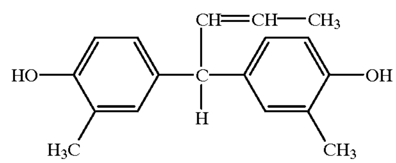

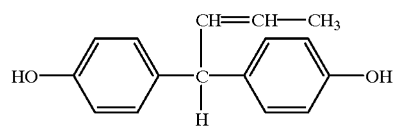

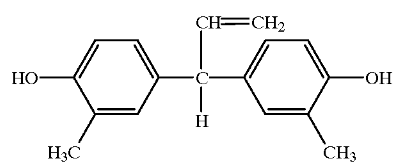

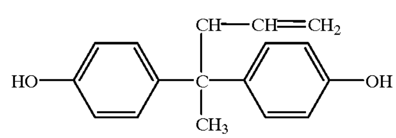

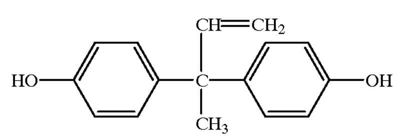

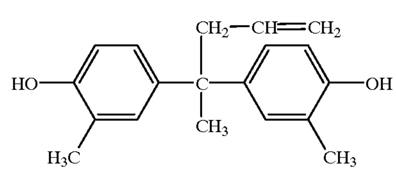

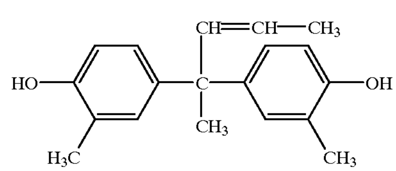

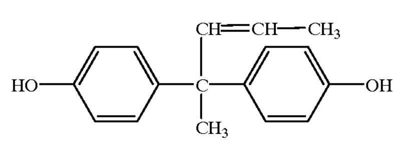

-continued
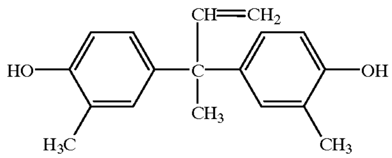
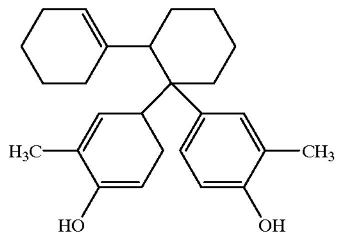
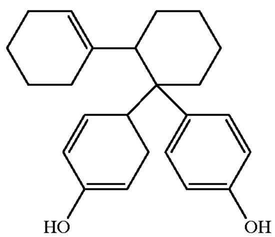
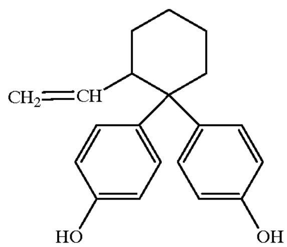
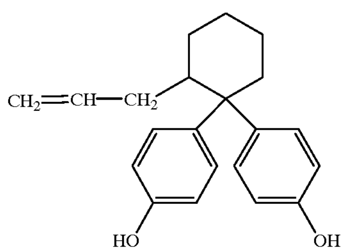
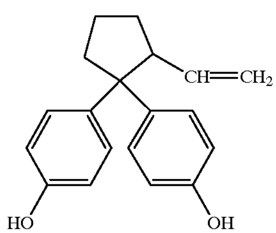
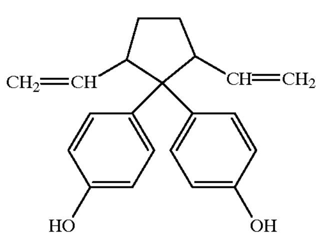
-continued
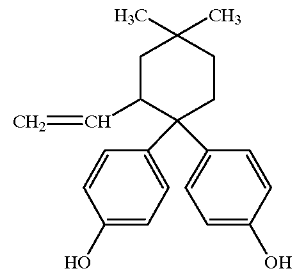
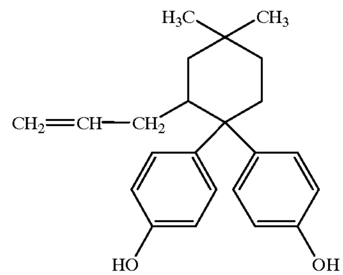
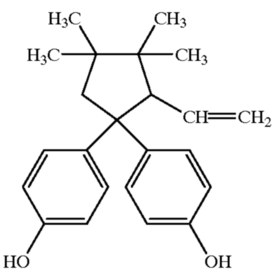
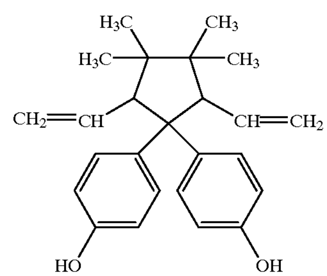
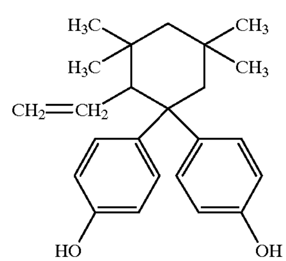
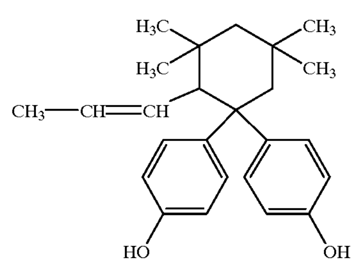

-continued
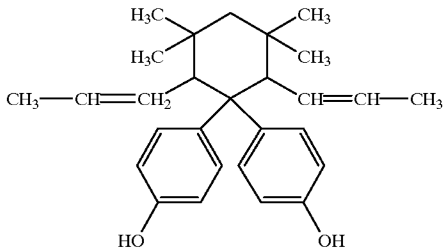
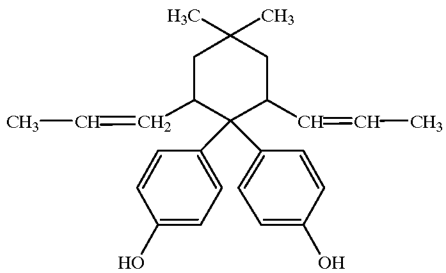
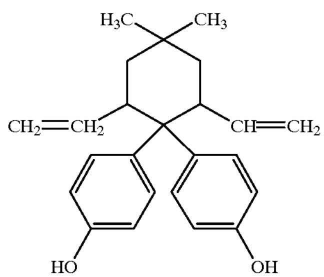
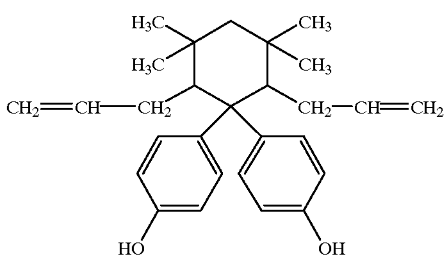
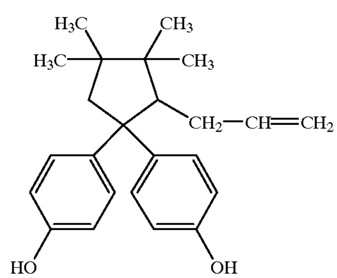
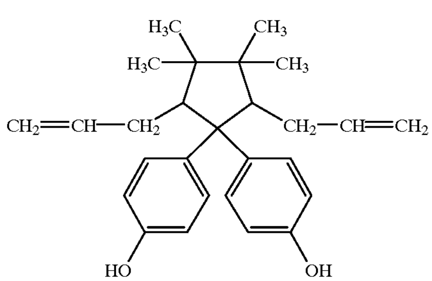
-continued
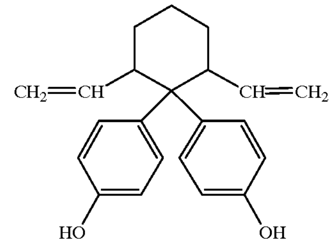
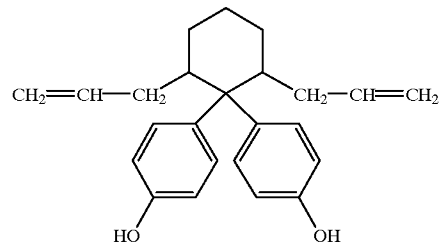
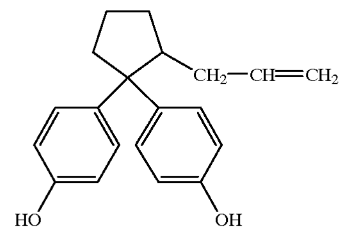
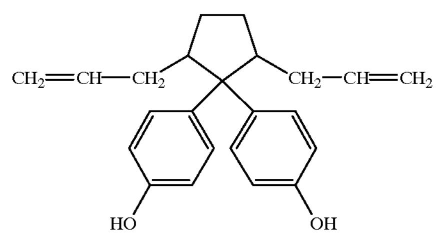
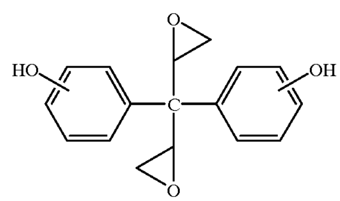
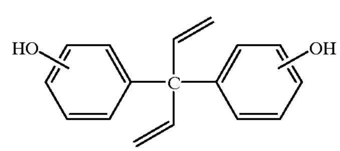
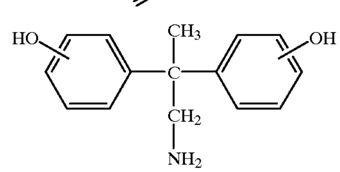
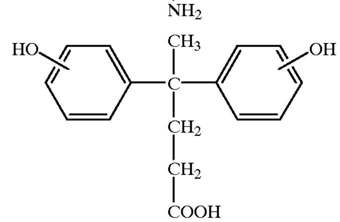

The above-described dihydric phenols (Ia) are obtainable by the condensation of corresponding ketones having reactive unsaturated bonds with phenols, such as phenol or cresol.

Examples of the dihydric phenols (Ib) represented by the general formula (Ib) include 2,7-diallyl-3,6-dihydroxyhaphthalene, 3,6-divinyl-2,7-dihydroxyhaphthalene, 1,8-diallyl-2,7-dihydroxynaphthalene, 2,5-diallyl-3,6-dihydroxynaphthalene, 2,6-diallyl-3,7-dihydroxynaphthalene, 1,6-diallyl-2,7-dihydroxynaphthalene, 3,6-diallyl-2,7-dihydroxynaphthalene, 3,8-diallyl-2,7-dihydroxynaphthalene, 3,6-diglycidyl-2,7-dihydroxynaphthalene, 1,8-diglycidyl-2,7-dihydroxynaphthalene and 3,8-diglycidyl-2,7-dihydroxynaphthalene.

These dihydric phenols (I) may be used individually or in combination of two or more.

Preferred diamines represented by the general formula $NH_2$-Z-$NH_2$ (IIb) are the following diamines having a siloxane skeleton.

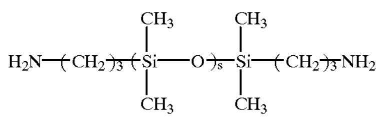

(*s*: a number of 5–100)

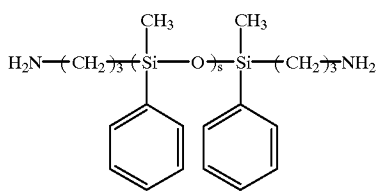

(*s*: a number of 5–100)

Examples of the dihydric phenols (III) represented by the general formula (III) include 4,4'-dihydroxybiphenyls, such as 4,4'-dihydroxybiphenyl, 3,3'-difluoro-4,4'-dihydroxybiphenyl, 4,4'-dihydroxy-3,3'-dimethylbiphenyl, 4,4'-dihydroxy-2,2'-dimethylbiphenyl and 4,4'-dihydroxy-3,3'-dicyclohexylbiphenyl; bis(4-hydroxyphenyl)alkanes, such as bis(4-hydroxyphenyl)methane, 1,1-bis(4-hydroxyphenyl)ethane, 1,2-bis(4-hydroxyphenyl)ethane, 2,2-bis(4-hydroxyphenyl)propane (alias bisphenol A), 2,2-bis(3-methyl-4-hydroxyphenyl)butane, 2,2-bis(4-hydroxyphenyl)butane, 2,2-bis(4-hydroxyphenyl)octane, 4,4-bis(4-hydroxyphenyl)heptane, 1,1-bis(4-hydroxyphenyl)-1,1-diphenylmethane, 1,1-bis(4-hydroxyphenyl)-1-phenylethane, 1,1-bis(4-hydroxyphenyl)-1-phenylmethane, 1,1-bis(4-hydroxyphenyl)cyclopentane, 1,1-bis(4-hydroxyphenyl)cyclohexane, 2,2-bis(3-methyl-4-hydroxyphenyl)propane, 2-(3-methyl-4-hydroxyphenyl)-2-(4-hydroxyphnenyl)-1-phenylethane, bis(3-methyl-4-hydroxyphenyl)methane, 1,1-bis(3-methyl-4-hydroxyphenyl)cyclohexane, 2,2-bis(2-methyl-4-hydroxyphenyl)propane, 1,1-bis(2-butyl-4-hydroxy-5-methylphenyl)butane, 1,1-bis(2-tert-butyl-4-hydroxy-3-methylphenyl)ethane, 1,1-bis(2-tert-butyl-4-hydroxy-5-methylphenyl)propane, 1,1-bis(2-tert-butyl-4-hydroxy-5-methylphenyl)butane, 1,1-bis(2-tert-butyl-4-hydroxy-5-methylphenyl)isobutane, 1,1-bis(2-tert-butyl-4-hydroxy-5-methylphenyl)heptane, 1,1-bis(2-tert-butyl-4-hydroxy-5-methylphenyl)-1-phenylmethane, 1,1-bis(4-hydroxy-2-methyl-5-tert-pentylphenyl)butane, bis(3-chloro-4-hydroxyphenyl)methane, bis(3,5-dibromo-4-hydroxyphenyl)methane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane (alias tetrafluorobisphenol A), 2,2-bis(3,5-dichloro-4-hydroxyphenyl)propane (alias tetrachlorobisphenol A), 2,2-bis(3,5-dibromo-4-hydroxyphenyl)propane (alias tetrabromobisphenol A), 2,2-bis(3-bromo-4-hydroxy-5-chlorophenyl)propane, 2,2-bis(3,5-dichloro-4-hydroxyphenyl)butane, 2,2-bis(3,5-dibromo-4-hydroxyphenyl)butane, 1-phenyl-1,1-bis(3-fluoro-4-hydroxyphenyl)ethane, 1,1-bis(3-cyclohexyl-4-hydroxyphenyl)cyclohexane, 2,2-bis(3-hydroxyphenyl)-1,1,1,3,3,3-hexafluoropropane, 2,2-bis(3-phenyl-4-hydroxyphenyl)propane and 1,1-bis(3-phenyl-4-hydroxyphenyl)cyclohexane; bis(4-hydroxyphenyl)ethers, such as bis(4-hydroxyphenyl)ether and bis(3-fluoro-4-hydroxyphenyl)ether; bis(4-hydroxyphenyl)sulfides, such as bis(4-hydroxyphenyl)sulfide and bis(3-methyl-4-hydroxyphenyl)sulfide; bis(4-hydroxyphenyl)sulfones, such as bis(4-hydroxyphenyl)sulfone, bis(3-methyl-4-hydroxyphenyl)sulfone and bis(3-phenyl-4-hydroxyphenyl) sulfone; ketones, such as bis(4-hydroxyphenyl) ketone;

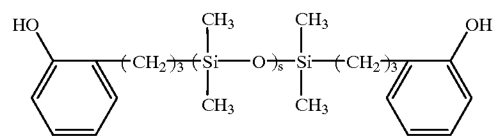

(*s*: a number of 5–100)

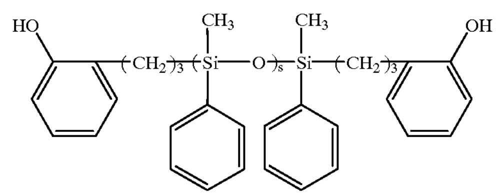

(*s*: a number of 5–100)

Preferred among these are bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl) sulfide, bis(4-hydroxyphenyl) ketone, 1,1-bis(4-hydroxyphenyl)ethane, 2,2-bis(4-hydroxyphenyl)propane, 2,2-bis(4-hydroxyphenyl)butane, 1,1-bis(4-hydroxyphenyl) cyclohexane, 2,2-bis(4-hydroxy-3,5-dibromophenyl) propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane and the bisphenols having the siloxane skeletons.

These dihydric phenols (IIa), such as the dihydric phenols (III) and, the diamines (IIb) may be used individually or in combination of two or more.

Endcappers useful for the production of the polycarbonate resins of the present invention are monocarboxylic acids and derivatives thereof and monohydric phenols. Preferred examples of such endcappers include p-(tert-butyl)phenol, p-phenylphenol, p-(perfluorononylphenyl)phenol, p-(perfluoroxylphenyl)phenol, p-tert-perfluorobutylphenol, 1-(p-hydroxybenzyl)perfluorodecane, p-(2-(1H,1H-perfluorotridecyloxy)-1,1,1,3,3,3-hexafluoropropyl)phenol, 3,5-bis(perfluorohexyloxycarbonyl)phenol, perfluorodecenyl p-hydroxybenzoate, p-(1H,1H-perfluorooctyloxy) phenol and 2H,2H,9H-perfluorononanoic acid.

The copolymerization ratio of the total of the endcappers is preferably 1 to 30 mol %, more preferably 1 to 10 mol %. If it is more than 30 mol %, photosensitive layers may be subject to abrasion due to poor surface hardness and have shorter printing life, and if less than 1 mol %, solution viscosity may become too high to produce photoreceptors by liquid-coating methods.

Useful branching agents are phenols or carboxylic acids of trivalent or more. Examples of such branching agents include phloroglucinol, pyrogallol, 4,6-dimethyl-2,4,6-tris (4-hydroxyphenyl)-2-heptene, 2,4-dimethyl-2,4,6-tris(4-hydroxyphenyl)heptane, 2,6-dimethyl-2,4,6-tris(4-hydroxyphenyl)-3-heptene, 1,3,5-tris(2-hydroxyphenyl) benzene, 1,3,5-tris(4-hydroxyphenyl)benzene, 1,1,1-tris(4-hydroxyphenyl)ethane, tris(4-hydroxyphenyl) phenylmethane, 2,2-bis{4,4-bis(4-hydroxyphenyl) cyclohexyl}propane, 2,4-bis{2-(4-hydroxyphenyl)-2-propyl}phenol, 2,6-bis(2-hydroxy-5-methylbenzyl)-4-methylphenol, 2-(4-hydroxyphenyl)-2-(2,4-dihydroxyphenyl)propane, tetrakis(4-hydroxyphenyl) methane, tetrakis(4-(4-hydroxyphenylisopropyl)phenoxy) methane, 1,4-bis(4',4"-dihydroxytriphenylmethyl)benzene, 2,4-dihydroxybenzoic acid, trimesic acid, cyanuric acid, 3,3-bis(3-methyl-4-hydroxyphenyl)-2-oxo-2,3-dihydroindole, 3,3-bis(4-hydroxyaryl)oxyindoles, 5-chloroisatin, 5,7-dichloroisatin and 5-bromoisatin.

Preferred examples among these are phloroglucinol, 1,3,5-tris(4-hydroxyphenyl)benzene and 1,1,1-tris(4-hydroxyphenyl)ethane.

The copolymerization ratio of the branching agents is preferably 30 mol % or less, more preferably 5 mol % or less. If it is more than 30 mol %, solution viscosity may become too high to produce photoreceptors by liquid-coating methods.

The polycondensation in the presence of an acid acceptor by using a carbonate precursor, for example, a carbonyl dihalide such as phosgene, a haloformate, such as chloroformate, or a carbonate compound, is ordinarily carried out in a solvent. In cases where a gaseous carbonate precursor, such as phosgene, is used, it is preferable to blow it into the reaction system.

The amount of the carbonate precursor may be determined based on the stoichiometric ratio (equivalent) for the reaction.

Examples of usable acid acceptors are alkali metal hydroxides, such as sodium hydroxide and potassium hydroxide, alkali metal carbonates, such as sodium carbonate and potassium carbonate, organic bases, such as pyridine, and mixtures thereof.

The amount of the acid acceptor may be determined based on the stoichiometric ratio (equivalent) for the reaction. That is, it is desirable to use at least two equivalents, preferably 2 to 10 equivalents of the acid acceptor per mole (generally, one mole corresponds to two equivalents) of the total of dihydric phenols and diamines.

Various solvents may be used, including the common solvents for the production of known polycarbonate resins, and may be used individually or as a solvent mixture. Typical solvents are hydrocarbons, such as toluene and xylene, and hydrocarbon halides, such as methylene chloride, chloroform and chlorobenzene. Interfacial polycondensation may also be carried out by using two solvents non-compatible with each other.

To accelerate the polycondensation, it is desirable to add a catalyst, for example a tertiary amine, such as triethylamine, or a quaternary ammonium salt, to the reaction system. A small amount of an antioxidant, such as sodium sulfite or hydrosulfide, may also be added according to demands. The reaction is generally carried out at a temperature of 0 to 150° C., preferably 5 to 40° C. The reaction may be carried out at a reduced pressure, atmospheric pressure or an applied pressure, and generally proceeds sufficiently at atmospheric pressure or at the pressure in the reaction system. The reaction time depends on the reaction temperature or the like, and is generally 0.5 minutes to 10 hours, preferably one minutes to two hours.

The reduced viscosity of the product polycarbonate resin can be adjusted within the above-described range by various methods, for example, by optimizing the above-described reaction conditions or the amounts of the branching agents and endcappers. The product polycarbonate resin may optionally be treated mechanically (mixing, fractionation or the like) and/or chemically (polymer reactions, partial decomposition or the like), to obtain a polycarbonate of a directed reduced viscosity.

2. Polycarbonate resins having crosslinking functional groups in the main chain;

The polycarbonate resin of the present invention having crosslinking functional groups in the main chain comprises the repeating units (6), (7) or (8) represented by the general formula (6), (7) or (8) and the repeating units (2a) represented by the general formula (2a) and/or the repeating units (2b) represented by the general formula (2b), in a molar ratio of the repeating units (6), (7) or (8) to the total of the repeating units (6), (7) or (8), the repeating units (2a) and the repeating units (2b), [(6), (7) or (8)]/{[(6), (7) or (8)]+(2a)+(2b)}, of 0.001–1, preferably 0.01–1. The molar ratio of (6)/[(6)+(2a)+(2b)] is preferably 0.05–0.8. The molar ratio of [(7) or (8)]/{[(7) or (8)]+(2a)+(2b)} is preferably 0.05–0.70, more preferably 0.1–0.5.

The repeating units (6) represented by the general formula (6) have carbon-carbon double bonds in the main chain.

In the general formula (6), the alkylene groups of 1 to 40 carbon atoms represented by X', Y' and Z' and the alkylene groups of 1 to 40 carbon atoms formed by $R^{20}$ and $R^{21}$ linked to each other are preferably alkylene groups of 1 to 12 carbon atoms, for example, methylene, ethylene, propylene, trimethylene, butylene, tetramethylene, pentylene, pentamethylene, hexylene, hexamethylene, heptylene, heptamethylene, octylene, octamethylene, nonylene, nonamethylene, decylene, decamethylene, dodecylene and dodecamethylene.

In the general formula (6), when $R^{20}$ and $R^{21}$ are linked to each other to form an alkylene and, simultaneously, Y' is —CO—, $R^{20}$, $R^{21}$, Y' and the two double bonds linked to Y' form, for example, an oxocycloalkanediylidene of 5 to 40 carbon atoms, preferably 1-oxo-2,6-cyclohexanediylidene, 1-oxo-4,4-dimethyl-2,6-cyclohexanediylidene, 1-oxo-3,3,5,5-tetramethyl-2,6-cyclohexanediylidene and 1-oxo-2,4-cycloheptanediylidene.

The alkyl groups of 1 to 40 carbon atoms represented by $R^{19}$, $R^{20}$, $R^{21}$, $R^{22}$, $R^{23}$ and $R^{24}$ are preferably alkyl groups of 1 to 12 carbon atoms, such as methyl, ethyl, propyl, butyl, pentyl, hexyl, isopropyl, isobutyl, sec-butyl, tert-butyl, heptyl, octyl, nonyl, decyl, undecyl and dodecyl.

Examples of the cycloalkyl groups of 5 to 40 carbon atoms represented by $R^{19}$, $R^{20}$, $R^{21}$, $R^{22}$, $R^{23}$ and $R^{24}$ include cyclopentyl and cyclohexyl.

Examples of the aryl groups of 6 to 36 carbon atoms represented by $R^{19}$, $R^{20}$, $R^{21}$, $R^{22}$, $R^{23}$ and $R^{24}$ include phenyl, biphenylyl, naphthyl, terphenyl, phenanthryl and anthryl.

Preferred halogenos represented by $R^{23}$ and $R^{24}$ include fluoro, chloro and bromo.

The alkoxyls of 1 to 40 carbon atoms represented by $R^{23}$ and $R^{24}$ are preferably alkoxyls of 1 to 12 carbon atoms, such as methoxy, ethoxy, propoxy, butoxy, pentyloxy, hexyloxy, isopropoxy, isobutoxy, sec-butoxy, tert-butoxy, heptyloxy, octyloxy, nonyloxy, decyloxy, undecyloxy and dodecyloxy.

The sum of p+q is an integer of 1 or more, and it is preferable that p and q are each an integer of 0 or 1, and the sum of p+q is 1 or 2.

Preferred examples of the repeating units represented by the general formula (6) are those wherein X' and Z' are each —CO— or a single bond, Y' is a single bond or —CO—, p is 1, q is 0 or 1, and $R^{19}$, $R^{20}$, $R^{21}$ and $R^{22}$ are each hydrogen. Particularly, $R^{23}$ and $R^{24}$ are each preferably hydrogen or methoxy.

The polycarbonate resins containing the repeating units (6) may be produced by using a dihydric phenol represented by the following general formula (VI) as a monomer material.

(VI)

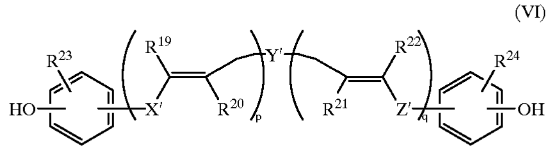

wherein X', Y', Z', $R^{19}$, $R^{20}$, $R^{21}$, $R^{22}$, $R^{23}$, $R^{24}$, p and q are as defined above.

Examples of the dihydric phenols represented by the general formula (VI) are as follows.

1-oxo-1,3-bis(4-hydroxyphenyl)-2-propene of the following structure:

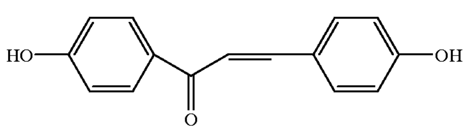

(p=1, q=0, X': —CO—, Y': single bond, $R^{19}$, $R^{20}$, $R^{21}$ and $R^{22}$: H)

3-oxo-1,5-bis(4-hydrosxy-3-methoxyphenyl)-1,4-pentadiene of the following structure:

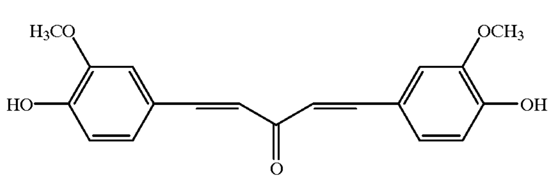

(p=1, q=1, X': single bond, Y': —CO—, Z': single bond, $R^{19}$, $R^{20}$, $R^{21}$ and $R^{22}$: H, $R^{23}$ and $R^{24}$: methoxy)

2,6-bis(4-hydroxyphenylmethylidene)cyclohexanone of the following structure:

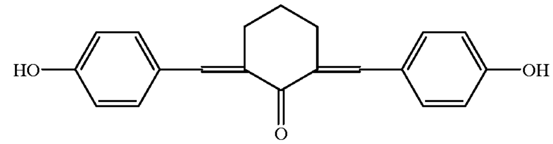

(p=1, q=1, X': single bond, Y': —CO—, Z': single bond, $R^{20}$+$R^{21}$: trimethylene, $R^{19}$, $R^{22}$, $R^{23}$ and $R^{24}$: H)

4,4-dimethyl-2,6-bis(4-hydroxyphenylmethylidene) cyclohexanone of the following structure:

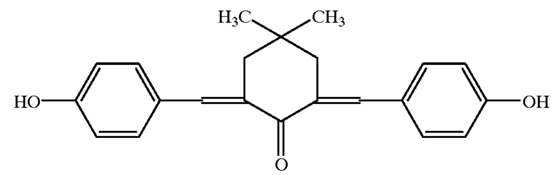

(p=1, q=1, X': single bond, Y': —CO—, Z': single bond, $R^{20}$+$R^{21}$: 2,2-dimethyltrimethylene, $R^{19}$, $R^{22}$, $R^{23}$ and $R^{24}$: H)

3,3,5,5-tetramethyl-2,6-bis(4-hydroxyphenylmethylidene)cyclohexanone of the following structure:

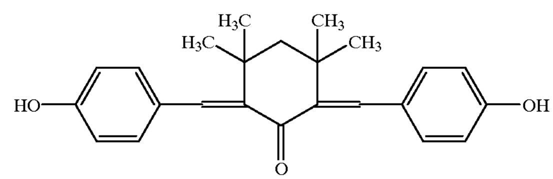

(p=1, q=1, X': single bond, Y': —CO—, Z': single bond, $R^{20}$+$R^{21}$: 1,1,3,3-tetramethyltrimethylene, $R^{19}$, $R^{22}$, $R^{23}$ and $R^{24}$: H)

α,α'-bis(4-hydroxyphenylmethylidene)acetone of the following structure:

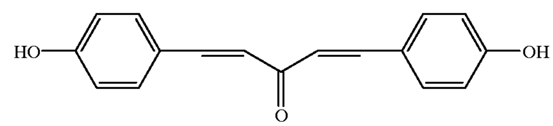

(p=1, q=1, X': single bond, Y': —CO—, Z': single bond, $R^{19}$, $R^{20}$, $R^{21}$, $R^{22}$, $R^{23}$ and $R^{24}$: H)

2,4-bis(4-hydroxyphenylmethylidene)-3-pentanone of the following structure:

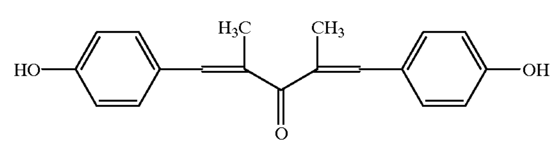

(p=1, q=1, X': single bond, Y': —CO—, Z': single bond, $R^{20}$ and $R^{21}$: methyl, $R^{19}$, $R^{22}$, $R^{23}$ and $R^{24}$: H)

The polycarbonate resins containing the repeating units (6) may be produced by using one or more kinds of the above-described dihydric phenols having carbon-carbon double bonds in the main chain.

The repeating units (7) represented by the general formula (7) have crosslinking epoxy groups in the main chain.

The halogenos represented by $R^{25}$, $R^{26}$, $R^{27}$ and $R^{28}$ in the general formula (7) are fluoro, chloro, bromo and iodo, with chloro preferred.

Examples of the alkyl groups of 1 to 10 carbon atoms represented by $R^{25}$, $R^{26}$, $R^{27}$ and $R^{28}$ in the general formula (7) include methyl, ethyl, n-propyl, isopropyl, n-butyl, sec-butyl, tert-butyl, isobutyl, n-pentyl, neopentyl, n-hexyl, heptyl, octyl, nonyl and decyl, with methyl, ethyl, n-propyl, isopropyl, n-butyl and tert-butyl preferred.

Examples of the cycloalkyl groups of 5 to 11 carbon atoms represented by $R^{25}$, $R^{26}$, $R^{27}$ and $R^{28}$ in the general formula (7) include cyclopentyl, cyclohexyl and cycloheptyl.

Examples of the alkyloxy groups of 1 to 10 carbon atoms represented by $R^{25}$, $R^{26}$, $R^{27}$ and $R^{28}$ in the general formula (7) include methoxy, ethoxy, n-propyloxy, isopropoxy, n-butoxy, sec-butoxy, tert-butoxy, isobutoxy, pentyloxy, hexyloxy, heptyloxy, octyloxy, nonyloxy and decyloxy, with methoxy, ethoxy, isopropoxy and tert-butoxy preferred.

Examples of the alkylthio groups of 1 to 10 carbon atoms represented by $R^{25}$, $R^{26}$, $R^{27}$ and $R^{28}$ in the general formula (7) include methylthio, ethylthio, propylthio, isopropylthio, butylthio, sec-butylthio, tert-butylthio, isobutylthio, pentylthio, hexylthio, heptylthio, octylthio, nonylthio and decylthio, with methylthio, ethylthio, isopropylthio and tert-butylthio preferred.

Examples of the aryl groups of 6 to 24 carbon atoms represented by $R^{25}$, $R^{26}$, $R^{27}$ and $R^{28}$ in the general formula (7) include phenyl, naphthyl, biphenylyl, terphenyl, quaterphenyl, anthracenyl and phenanthrenyl, with phenyl preferred.

Examples of the aryloxy groups of 6 to 12 carbon atoms represented by $R^{25}$, $R^{26}$, $R^{27}$ and $R^{28}$ in the general formula (7) include phenyloxy, naphthyloxy and biphenylyloxy, with phenyloxy preferred.

Examples of the arylthio groups of 6 to 12 carbon atoms represented by $R^{25}$, $R^{26}$, $R^{27}$ and $R^{28}$ in the general formula (7) include phenylthio, naphthylthio and biphenylylthio, with phenylthio preferred.

Examples of the substituents on the alkyl groups and alkyloxy groups represented by $R^{25}$, $R^{26}$, $R^{27}$ and $R^{28}$ include halogenos including fluoro, chloro, bromo and iodo, aromatic hydrocarbons of 6 to 12 carbon atoms, such as phenyl, naphthyl and biphenyl, alkoxyls of 1 to 4 carbon atoms, such as methoxy, ethoxy, propoxy, isopropoxy, butoxy, sec-butoxy, tert-butoxy and isobutoxy, alkylthio groups of 1 to 4 carbon atoms, such as methylthio and arylthio groups of 6 to 12 carbon atoms, such as phenylthio, and one or more of these substituents may optionally be bonded to any replaceable positions.

Examples of the substituents on the aryl groups and aryloxy groups represented by $R^{25}$, $R^{26}$, $R^{27}$ and $R^{28}$ include halogenos including fluoro, chloro, bromo and iodo, alkyl groups of 1 to 4 carbon atoms, such as methyl, ethyl, propyl, isopropyl, butyl, sec-butyl, tert-butyl and isobutyl, aromatic hydrocarbons of 6 to 12 carbon atoms, such as phenyl, naphthyl and biphenylyl, alkoxyls of 1 to 4 carbon atoms, such as methoxy, ethoxy, propoxy, isopropoxy, butoxy, sec-butoxy, tert-butoxy and isobutoxy, alkylthio groups of 1 to 4 carbon atoms, such as methylthio and arylthio groups of 6 to 12 carbon atoms, such as phenylthio, and one or more of these substituents may optionally be bonded to any replaceable positions.

Examples of the repeating units (7) include the following units:

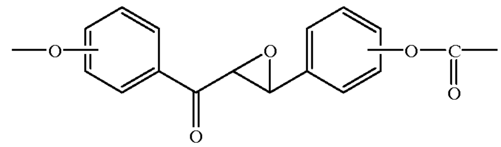

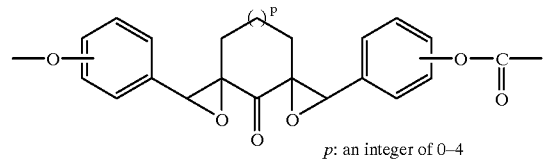

p: an integer of 0–4

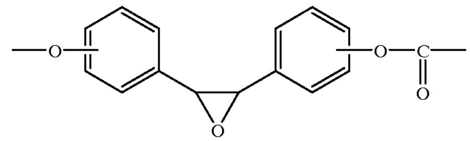

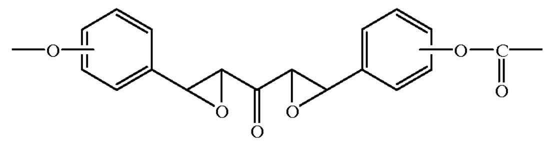

To introduce the repeating units (7) represented by the general formula (7), the dihydric phenols (VII-1) or (VII-2) represented by the following general formula (VII-1) or (VII-2) are used.

(VII-1)

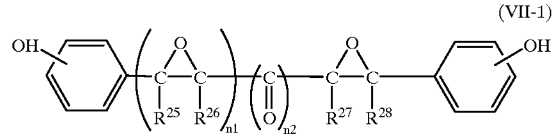

(VII-2)

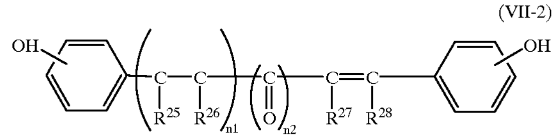

wherein $R^{25}$, $R^{26}$, $R^{27}$, $R^{28}$, n1 and n2 are as defined above.

Examples of the dihydric phenols (VII-1) and (VII-2) include the following compounds.

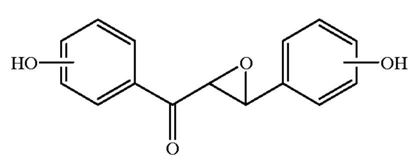

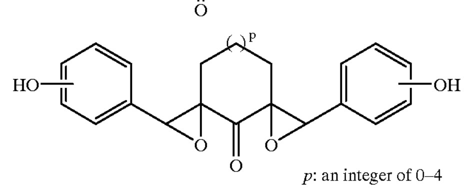

p: an integer of 0–4

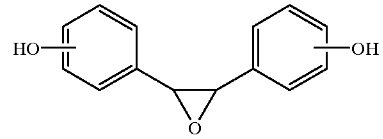

-continued

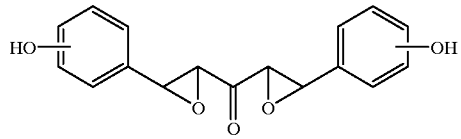

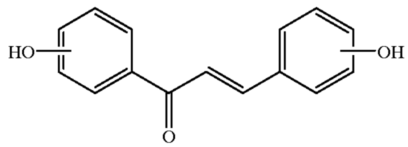

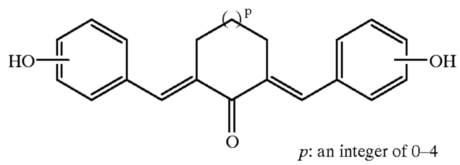

*p*: an integer of 0–4

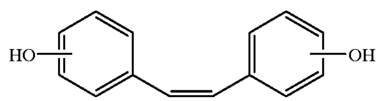

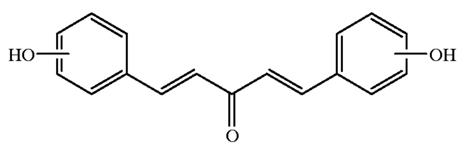

In cases where the repeating units (7) are introduced by using the dihydric phenols (VII-2), polycarbonate resins having epoxy groups in the main chain can be produced by synthesizing a polycarbonate resin by using a dihydric phenols (VII-2), and then reacting the obtained precursor polycarbonate resin in methylene chloride with excess metachloroperbenzoic acid per double bond.

The repeating units (8) represented by the general formula (8) contain crosslinking secondary amino groups in the main chain.

The halogenos represented by R in the general formula (8) are fluoro, chloro, bromo and iodo, with chloro preferred.

Examples of the alkyl groups of 1 to 10 carbon atoms represented by R in the general formula (8) include methyl, ethyl, n-propyl, isopropyl, n-butyl, sec-butyl, tert-butyl, isobutyl, n-pentyl, neopentyl, n-hexyl, heptyl, octyl, nonyl and decyl, with methyl, ethyl, n-propyl, isopropyl, n-butyl and tert-butyl preferred.

Examples of the cycloalkyl groups of 5 to 11 carbon atoms represented by R in the general formula (8) include cyclopentyl, cyclohexyl and cycloheptyl.

Examples of the alkyloxy groups of 1 to 10 carbon atoms represented by R in the general formula (8) include methoxy, ethoxy, n-propyloxy, isopropoxy, n-butoxy, sec-butoxy, tert-butoxy, isobutoxy, pentyloxy, hexyloxy, heptyloxy, octyloxy, nonyloxy and decyloxy, with methoxy, ethoxy, isopropoxy and tert-butoxy preferred.

Examples of the alkylthio groups of 1 to 10 carbon atoms represented by R in the general formula (8) include methylthio, ethylthio, propylthio, isopropylthio, butylthio, sec-butylthio, tert-butylthio, isobutylthio, pentylthio, hexylthio, heptylthio, octylthio, nonylthio and decylthio, with methylthio, ethylthio, isopropylthio and tert-butylthio preferred.

Examples of the aryl groups of 6 to 24 carbon atoms represented by R in the general formula (8) include phenyl, naphthyl, biphenylyl, terphenyl, quaterphenyl, anthracenyl and phenanthrenyl, with phenyl preferred.

Examples of the aryloxy groups of 6 to 12 carbon atoms represented by R in the general formula (8) include phenyloxy, naphthyloxy and biphenylyloxy, with phenyloxy preferred.

Examples of the arylthio groups of 6 to 12 carbon atoms represented by R in the general formula (8) include phenylthio, naphthylthio and biphenylylthio, with phenylthio preferred.

Examples of the substituents on the alkyl groups and alkyloxy groups represented by R include halogenos including fluoro, chloro, bromo and iodo, aromatic hydrocarbons of 6 to 12 carbon atoms, such as phenyl, naphthyl and biphenyl, alkoxyls of 1 to 4 carbon atoms, such as methoxy, ethoxy, propoxy, isopropoxy, butoxy, sec-butoxy, tert-butoxy and isobutoxy, alkylthio groups of 1 to 4 carbon atoms, such as methylthio, and arylthio groups of 6 to 12 carbon atoms, such as phenylthio, and one or more of these substituents may optionally be bonded to any replaceable positions.

Examples of the substituents on the aryl groups, cycloalkyl groups and aryloxy groups represented by R include halogenos including fluoro, chloro, bromo and iodo, alkyl groups of 1 to 4 carbon atoms, such as methyl, ethyl, propyl, isopropyl, butyl, sec-butyl, tert-butyl and isobutyl, aromatic hydrocarbons of 6 to 12 carbon atoms, such as phenyl, naphthyl and biphenylyl, alkoxyls of 1 to 4 carbon atoms, such as methoxy, ethoxy, propoxy, isopropoxy, butoxy, sec-butoxy, tert-butoxy and isobutoxy, alkylthio groups of 1 to 4 carbon atoms, such as methylthio, and arylthio groups of 6 to 12 carbon atoms, such as phenylthio, and one or more of these substituents may optionally be bonded to any replaceable positions.

An example of the repeating units (8) is shown below:

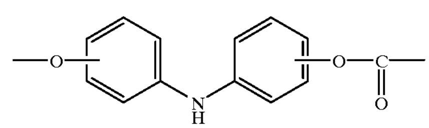

To introduce the repeating units (8) represented by the general formula (8), the dihydric phenols (VIII) represented by the following general formula (VIII) are used:

(VIII)

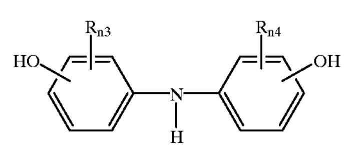

wherein R, n3 and n4 are as defined above.

An example of the dihydric phenols (VIII) is shown below.

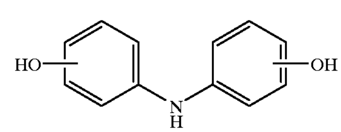

The method of producing the polycarbonate resins having crosslinking functional groups in the main chain is similar to those described above, and the dihydric phenols and the preferred examples thereof to be used for the introduction of the repeating units (2a) and/or (2b) are the same as those described above.

3. Polycarbonate resins having crosslinking functional groups in the ends

The present invention further provides polycarbonate resins which have not only the above-described crosslinking functional groups in the side chains or main chain but also the crosslinking functional groups represented by the following general formula (E1), (E2) or (E3) at the ends.

(E1)

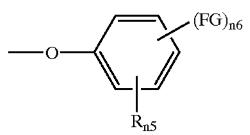

(E2)

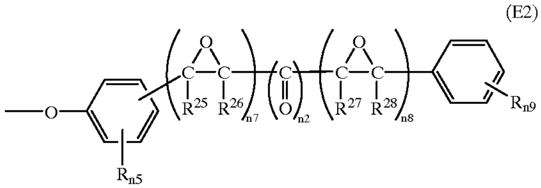

(E3)

—O—FG wherein, in the general formulae (E1), (E2) and (E3), R is as defined above, n5 is an integer of 0 to 4, n6 is an integer of 1 to 5, n5+n6 is an integer of 1 to 5, n9 is an integer of 0 to 5, $R^{25}$, $R^{26}$, $R^{27}$ and $R^{28}$ are as defined above, n7 and n8 are each 0 or 1, n7+n8 is 1 or 2, n2 is 0 or 1, FG is as defined above, and two —COOH in one end group may form the following structure.

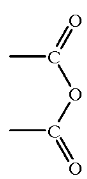

Examples of the end groups (E1) include the followings:

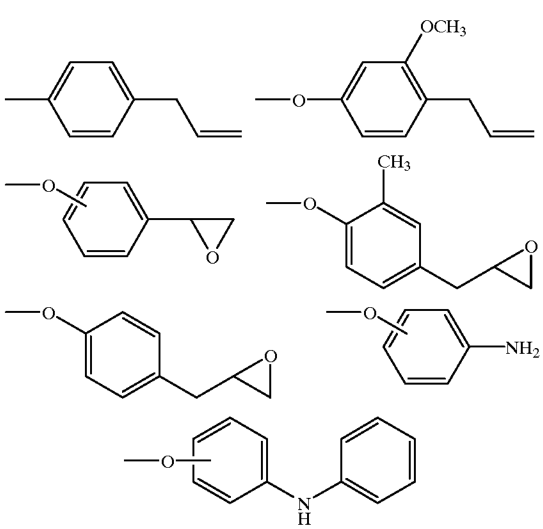

-continued

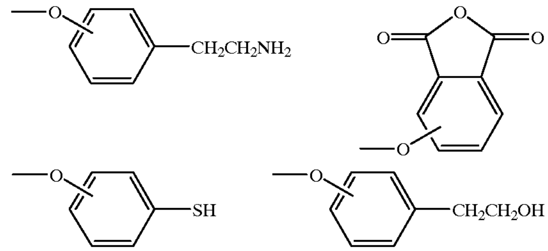

An example of the end groups (E2) is shown below:

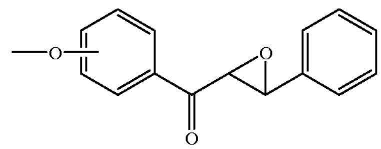

Examples of the end groups (E3) include the following groups:

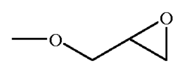

—$OCH_2CH_2NH_2$

To introduce the end groups (E1), the monohydric phenols (EI-1) represented by the following general formula (EI-1) is used. (E1) having FG containing an epoxy group can also be introduced by introducing a reactive carbon-carbon double bond into the ends of a polycarbonate resin by using the monohydric phenols (EI-2) represented by the following general formula (EI-2), and then epoxidizing the carbon-carbon double bonds as described above.

(EI-1)

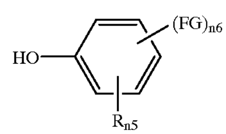

(EI-2)

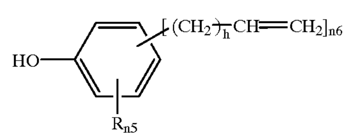

(wherein R, FG, h, n5 and n6 are as defined above)

Examples of the monohydric phenols (EI-1) and (EI-2) include the following compounds:

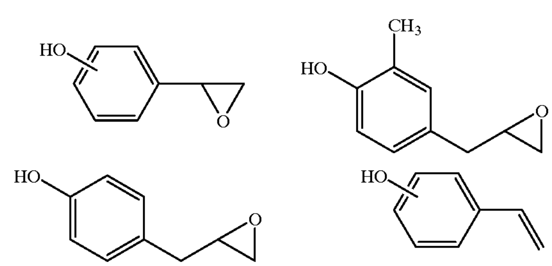

-continued

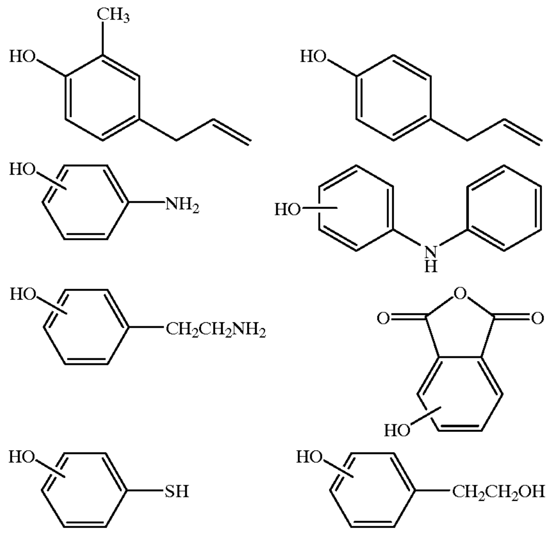

To introduce the end groups (E2), the monohydric phenols (EII-1) represented by the following general formula (EII-1) are used. (E2) having FG containing an epoxy group can also be introduced by introducing a reactive carbon-carbon double bond into the ends of a polycarbonate resin by using a monohydric phenol (EII-2) represented by the following general formula (EII-2), and then epoxidizing the carbon-carbon double bonds as described above.

(EII-1)

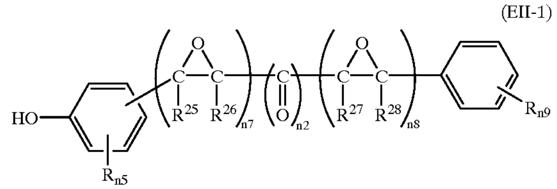

(EII-2)

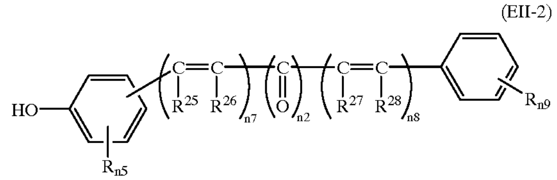

(wherein R, $R^{25}$, $R^{26}$, $R^{27}$, $R^{28}$, n2, n5, n7, n8 and n9 are as defined above)

Examples of the monohydric phenols (EII-1) and (EII-2) include the following compounds:

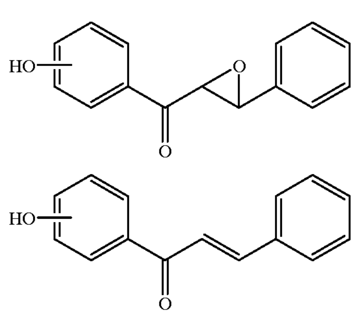

To introduce the end groups (E3), the monohydric phenols (EIII-1) represented by the general formula (EIII-1) are used. (E3) having FG containing an epoxy group can also be introduced by introducing a reactive carbon-carbon double bond into the ends of a polycarbonate resin by using a monohydric phenol (EIII-2) represented by the following general formula (EIII-2), and then epoxidizing the carbon-carbon double bonds as described above.

$$HO-FG \qquad \text{(EIII-1)}$$

$$HO-(CH_2)_h-CH=CH_2 \qquad \text{(EIII-2)}$$

(wherein FG is as defined above)

Examples of the monohydric phenols (EIII-1) and (EIII-2) include the following compounds:

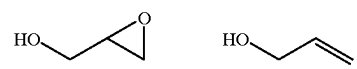

$HOCH_2CH_2NH_2$

The present invention further provides a polycarbonate resin which comprises the following repeating units (2a) and/or (2b), each having no crosslinking functional groups, and the following end groups (E1), (E2) or (E3) each having crosslinking functional groups:

$$-\left(\underset{\underset{O}{\|}}{C}-O-Y-O\right)- \qquad \text{(2a)}$$

$$-\left(\underset{\underset{O}{\|}}{C}-\overset{\overset{H}{|}}{N}-Z-\overset{\overset{H}{|}}{N}\right)- \qquad \text{(2b)}$$

(E1)

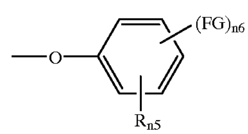

(E2)

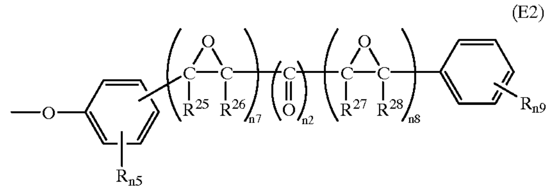

$$-O-FG \qquad \text{(E3)}$$

wherein Y, Z, R, $R^{25}$, $R^{26}$, $R^{27}$, $R^{28}$, FG, n2, n5, n7, n8 and n9 are as defined above.

Examples of the repeating units (2a), (2b), (E1), (E2) and (E3) and examples of dihydric phenols and monohydric phenols to be used for the introduction of these units are the same as those described above.

An alternative for the introduction of reactive carbon-carbon double bonds in the ends of a polycarbonate resin is the use of endcappers having unsaturated groups, for example, unsaturated carboxylic acids, such as acrylic acid, methacrylic acid, vinyl acetate, 2-pentenoic acid, 3-pentenoic acid, 5-hexenoic acid and 9-decenoic acid, acid chlorides or chloroformates thereof, such as acrylic chloride, methacrylic chloride, sorbic chloride, allyl alcohol chloroformate and isopropenylphenol chloroformate, and phenols having unsaturated groups, such as eugenol, isopropenylphenol, N-(4-hydroxyphenyl)maleimide, allyl hydroxybenzoate and allyl (hydroxymethyl)benzoate.

In the production of the polycarbonate resins having crosslinking functional groups in the ends, the amount of the above-described monohydric phenols to be used for the introduction of the end groups having crosslinking functional groups is generally 0.01 to 0.25 mol per mol of dihydric phenols. These endcappers having unsaturated groups may be used together with endcappers having no unsaturated groups.

Crosslinked Polycarbonate Resins

The crosslinked polycarbonate resins of the present invention are produced by crosslinking the above-described polycarbonate resins of the present invention.

All crosslinking functional groups of the polycarbonate resins to be crosslinked for the production of the crosslinked polycarbonate resins, preferably, are the same in kind or are derivatives of a group.

Among the above-described polycarbonates, those with crosslinking functional groups having carbon-carbon unsaturated bonds can be crosslinked by common radical polymerizations with heat or irradiation with UV light, IR light, electron rays or microwave.

Examples of thermal polymerization initiators suitable for the crosslinking with heat (thermal polymerization) include azo compounds, such as 2,2'-azobisisobutyronitrile and 2,2'-azo-di-(2,4-dimethylvaleronitrile), peroxides, such as benzoyl peroxide, di-t-butyl peroxide, acetyl peroxide, t-butyl perbenzoate and methyl ethyl ketone peroxide, and persulfates, such as ammonium persulfate and potassium persulfate. Redox initiators, such as combinations of the above-described peroxides and cobalt naphthenate or aromatic amines, may also be used.

Examples of photo-initiators suitable for the crosslinking with irradiation with UV light include benzoin and derivatives thereof, such as benzoin and benzoin methyl ether, 4,4'-bis(dimethylamino)benzophenone, 2-chloroanthracene, 2-methylanthraquinone, thioxanthone, diphenyl disulfide and dimethyl dithiocarbamate, and the UV light intensity is generally 1 to 100 $mJ/cm^2$.

The crosslinking with ionizing radiation, such as electron rays, generally needs no catalysts, and the radiation intensity is generally 2 to 10 MeV.

These crosslinkings may be carried out in the presence of a monomer having ethylene double bonds. The amount of the monomer is preferably 1 to 50% by weight of the total of the polycarbonate of the present invention and the monomer. Examples of the monomers having ethylene double bonds which are suitable for the present invention include diallyl isophthalate, diallyl carbonate, diallyl ether, divinylbenzene, styrene, acrylonitrile, methacrylonitrile, methyl acrylate, methyl methacrylate and acrylamide.

The amount of the above-described initiator is generally 0.01 to 20% by weight, preferably 0.1 to 10% by weight of the polycarbonate resin of the present invention or of the total of the polycarbonate resin and the monomer having ethylene double bonds. If it is less than 0.01% by weight, crosslinking will proceed but take a long time.

The crosslinking by thermal polymerization is carried out generally at 50 to 160° C., preferably 60 to 140° C., the crosslinking by irradiation of UV light, etc. generally at 0 to 50° C., preferably 20 to 40° C.

The time of the crosslinking of the polycarbonate resin depends on the method of crosslinking, the kind and concentration of the monomer having ethylene double bonds and the kind of the initiator, and is generally 0.1 to 50 hours, preferably 0.1 to 25 hours. Reaction time of more than 50 hours is costly.

The crosslinking can proceed under any pressure ranging from reduced pressure to applied pressure, preferably under reduced pressure or atmospheric pressure.

Crosslinking can be confirmed by the polycarbonate resin's becoming insoluble in solvents, such as methylene chloride or dimethyl sulfoxide.

The polycarbonate resins having functional groups other than carbon-carbon unsaturated bonds can be crosslinked by an ionic crosslinking.

Ionic crosslinkings are classified into the crosslinking of polycarbonate resins having nucleophilic groups with electrophilic crosslinking agents, the crosslinking of polycarbonate resins having electrophilic groups with nucleophilic crosslinking agents, the crosslinking of polycarbonate resins having reactive groups polymerizable in the presence of Lewis acids with Lewis acid crosslinking agents, and the crosslinking of polycarbonate resins having nucleophilic groups with polycarbonate resins having electrophilic groups.

Examples of nucleophilic groups include —OH (including —OH occurring by the ring-opening of epoxy groups), —SH, —COOH, $—NH_2$, —NR'H, $—NR'_2$ (R' being, for example, an alkyl group or an aryl group), and —NH—. Examples of electrophilic groups include epoxy, halogeno, carbonyl, cyano, isocyanato, imino and sulfonic ester. Examples of reactive groups polymerizable in the presence of Lewis acids include epoxy, carbonyl and vinyl.

Examples of nucleophilic crosslinking agents include aliphatic polyamines, such as diethylenetriamine, triethylenetetramine, tetraethylenepentamine, hexamethylenediamine, N-aminoethylpiperazine, bis-aminopropylpiperazine, dicyandiamide, polyoxypropylenediamine, 3,3'-dimethyl-4,4'-diaminodicyclohexylmethane, 4,4'-diaminodicyclohexylmethane and isophoronediamine, aromatic amines, such as 4,4'-diaminodiphenylmethane, 4,4'-diaminodiphenylether, diaminodiphenylsulfone, phenylenediamine, toluylenediamine and xylylenediamine, tertiary amines, such as dimethylaminomethylphenol, and, ketimine, imidazoles, melamine resins, urea resins and phenolic resins.

Examples of electrophilic crosslinking agents include acid anhydrides, such as maleic anhydride, dodecenylsuccinic anhydride, chlorendic anhydride, sebacic anhydride, phthalic anhydride, pyromellitic anhydride, trimellitic anhydride, cyclopentanetetracarboxylic dihydrate, hexahydrophthalic anhydride, methylhexahydrophthalic anhydride, tetramethylenemaleic anhydride, tetrahydrophthalic anhydride, methyl-tetrahydrophthalic anhydride, endomethylenetetrahydrophthalic anhydride, methylendomethylenetetrahydrophthalic anhydride and methylnadic anhydride, isocyanates, blocked isocyanates, epoxy resins, such as bisphenol A epoxy resin (epoxy equivalent: generally 150 to 4000), novolac epoxy resins (epoxy equivalent; generally 150 to 4000), glycidyl-type resins, such as glycidyl esters of polybasic acids, glycidyl ethers of polyhydric alcohols, and glycidyl-addition products of polyamines, and non-glycidyl-type resins, such as dicyclopentadiene dioxide and vinylcyclohexene dioxide.

Examples of Lewis acid crosslinking agents include boron halide complexes, such as boron trifluoride.monomethylamine complex, boron trifluoride.triethanolamine complex, boron trifluoride.piperidine complex, boron trifluoride n-butyl etherate and boron trifluoride.amine complexes.

The crosslinked polycarbonate resins of the present invention can be produced by every combination of a nucleophilic group and an electrophilic crosslinking agent, very combination of an electrophilic group and a nucleophilic crosslinking agent, and every combination of a reactive group polymerizable in the presence of a Lewis acid and a Lewis acid crosslinking agent, each selected from those described above. Preferred combinations are as follows.

(1) a combination of a polycarbonate resin containing, as nucleophilic groups, amino groups, particularly —NH—, —$NH_2$— or —$NHR^7$, and an epoxy resin as an electrophilic crosslinking agent;
(2) a combination of a polycarbonate resin containing, as nucleophilic groups, —$CO_2H$ or —$(CO_2)O$ and an epoxy resin as an electrophilic crosslinking agent;
(3) a combination of a polycarbonate resin containing, as nucleophilic groups, —OH and an epoxy resin as an electrophilic crosslinking agent;
(4) a combination of a polycarbonate resin containing, as nucleophilic groups, —SH and an epoxy resin as an electrophilic crosslinking agent;
(5) a combination of a polycarbonate resin containing, as electrophilic groups, epoxy groups and an aliphatic polyamine as a nucleophilic crosslinking agent; and
(6) a combination of a polycarbonate resin containing, as reactive groups polymerizable in the presence of a Lewis acid, epoxy groups and a boron halide as a Lewis acid crosslinking agent.

The amount of the crosslinking agents is generally 0.01 to 1.0 part by weight, preferably 0.05 to 0.5 parts by weight, per part by weight of the polycarbonate resins. If it is less than 0.01 part by weight, crosslinking may be insufficient, and if more than 1.0 part by weight, unreacted crosslinking agents may deteriorate the abrasion resistance of the crosslinked polycarbonate resins or the electrophotographic properties of electrophotographic photoreceptors.

Cure accelerators, such as phenols, triphenyl phosphates, tertiary amines, imidazoles or polymercaptans may be added according to demands.

The ionic crosslinking of the polycarbonate resins can be performed after a photosensitive layer material containing a polycarbonate resin of the present invention is applied on a conductive substrate, according to any known technique described in known literature relating to crosslinking agents (Taiseisha, "Crosslinking Agent Handbook", p244–257, 1981, etc.) or known literature relating to polycarbonate resins (Nikkan Kogyo Co., Ltd., "Plastic Material Course [5]", Polycarbonate Resin, p39–43, etc.) or known literature relating to epoxy resins ("Techniques of Adhesion", 14, 3, p1–33, 1994, etc.).

For example, the conditions of crosslinking depend on the combinations of the polycarbonate resins and the crosslinking agents or the like, and it is desirable to select combinations which have a crosslinking temperature of 50 to 250° C., preferably 100 to 200° C., and a crosslinking time of 50 hours or less, preferably 1 to 10 hours. If the crosslinking temperature is lower than 50° C., the resin solutions may have poor storage stability, and if higher than 250° C., charge-generating substances, charge-transfer substances, etc. may be deteriorated with heat to adversely affect electrophotographic properties. If the crosslinking time is more than 50 hours, charge-generating substances, charge-transfer substances, etc. will be deteriorated with heat, to lower the productivity of electrophotographic photoreceptors.

Electrophotographic Photoreceptor

The electrophotographic photoreceptor of the present invention has a photosensitive layer on a conductive substrate, and the photosensitive layer contains at least one of the above-described polycarbonate resins or the crosslinked products thereof.

As far as such a photosensitive layer is formed on a conductive substrate, the electrophotographic photoreceptor of the present invention may have any structure, such as a known single-layer-type or lamination-type. The photosensitive layer may have a surface protecting layer on its surface. Generally preferred are lamination-type electrophotographic photoreceptors wherein the photosensitive layer comprises at least one charge-generating layer and at least one charge-transfer layer, or lamination-type electrophotographic photoreceptors having at least one charge-generating layer, at least one charge-transfer layer and one surface protecting layer, and it is preferable that the charge-transfer layer contains the above crosslinked polycarbonate resin as a binder resin, and/or, the surface protecting layer of the photosensitive layer is made of the crosslinked polycarbonate resins.

In the electrophotographic photoreceptor of the present invention, the binder resin may comprise one or more kinds of the crosslinked polycarbonate resins, or may further contain other resins, such as other polycarbonate resins, which do not hinder the effects of the present invention.

The polycarbonate resin (not-crosslinked) of the present invention to be used for the production of the electrophotographic photoreceptor preferably has a reduced viscosity of 0.1 to 2.0 dl/g, more preferably 0.3 to 1.6 dl/g, as measured at 20° C. at a concentration of 0.5 g/dl in methylene chloride. Polycarbonate resins of a reduced viscosity of less than 0.1 dl/g may form, even after crosslinking, a layer having poor surface hardness, and electrophotographic photoreceptors may be subject to surface abrasion. Polycarbonate resins of a reduced viscosity of more than 2.0 dl/g may have an increased solution viscosity, causing difficulties in the production of electrophotographic photoreceptors by the application of coating fluid, and may form crosslinked polycarbonate resins which are too fragile to improve the durability of electrophotographic photoreceptors.

In the electrophotographic photoreceptor of the present invention, the crosslinked polycarbonate resin in photosensitive layer preferably contains 0.1 to 75% by weight, more preferably 20 to 50% by weight of a methylene chloride-insoluble fraction. Crosslinked polycarbonate resins containing 0.1 to 75% by weight of a methylene chloride-insoluble fraction can particularly improve the durability of electrophotographic photoreceptors. The content of the methylene chloride-insoluble fraction is the % by weight of crosslinked polycarbonate resin which remains insoluble when the photosensitive layer containing the crosslinked polycarbonate resin is dissolved in methylene chloride at 25° C., and is based on 100% by weight of the crosslinked polycarbonate resin originally contained in the photosensitive layer.

Ionic crosslinking of the polycarbonate resins can prevent deterioration of charge-generating substances and charge-transfer substances which are sensitive to radicals, and gives electrophotographic photoreceptors which maintain particularly excellent electrophotographic properties during long-term repeated uses.

The conductive substrate to be used in the electrophotographic photoreceptor of the present invention may be of any material, such as a known material, and examples of usable substrates include a plate, drum or sheet of aluminum, nickel, chromium, palladium, titanium, gold, silver, copper, zinc, stainless steel, molybdenum, indium, platinum, brass, lead oxide, tin oxide, indium oxide, ITO or graphite; glass, cloth, paper or a sheet or seamless-belt of plastic film, which are endowed with conductivity by evaporation, spattering or coating of the above-described materials; and a plastic film, sheet or seamless-belt bearing metal foil, such as aluminum foil, and a metal drum oxidized by, for example, electrode oxidation.

The charge-generating layer of lamination-type electrophotographic photoreceptors contains at least a charge-generating substance, and may be produced by, for example, forming a layer of the charge-generating substance on an underlying layer by a vacuum evaporation technique, a spattering technique or a CVD method, or by forming on an underlying layer, a layer wherein the charge-generating substance is fixed by a binder resin. Various methods, including known methods, may be used for the production of the charge-generating layer containing the binder resin, and a suitable method is to apply a coating fluid prepared by dispersing or dissolving both a charge-generating substance and a binder resin in an appropriate solvent, followed by drying.

Usable charge-generating substances are various ones including known ones, for example, various inorganic materials, for example, selenium single substances, such as amorphous selenium and trigonal selenium, tellurium single substances, selenium alloys, such as selenium-tellurium alloy and selenium-arsenic alloy, selenium compounds or selenium-containing compositions, such as $As_2Se_3$, zinc oxide, cadmium sulfide, antimony sulfide, zinc sulfide, and inorganic materials composed of the elements of the Groups 12 and 16, such as CdS—Se alloy; various other inorganic materials, for example, oxide semiconductors, such as titanium oxide, and silicon materials, such as amorphous silicon; metal-free-phthalocyanines pigments, such as τ-metal-free-phthalocyanine and χ-metal-free-phthalocyanine; metallo-phthalocyanine pigments, such as α-copper-phthalocyanine, β-copper-phthalocyanine, γ-copper-phthalocyanine, ε-copper-phthalocyanine, X-copper-phthalocyanine, A-titanyl-phthalocyanine, B-titanyl-phthalocyanine, C-titanyl-phthalocyanine, D-titanyl-phthalocyaine, E-titanyl-phthalocyanine, F-titanyl-phthalocyanine, H-titanyl-phthalocyanine, G-titanyl-phthalocyanine, K-titanyl-phthalocyanine, L-titanyl-phthalocyanine, M-titanyl-phthalocyanine, N-titanyl-phthalocyanine, Y-titanyl-phthalocyanine, oxotitanium phthalocyanine and titanyl-phthalocyanines exhibiting a strong X-ray diffraction peak at a Bragg angle 2θ of 27.3±0.2 degree; cyanine dyes, anthracene pigments, bisazo pigments, pyrene pigments, polycyclic quinone pigments, quinacridone pigments, indigo pigments, perylene pigments, pyrylium dyes, thiapyrylium dyes, polyvinylcarbazole, squalium pigments, anthoanthorone pigments, benzimidazole pigments, azo pigments, thioindigo pigments, bisbenzimidazole pigments, quinoline pigments, lake pigments, oxazine pigments, dioxazine pigments, triphenylmethane pigments, azulenium dyes, squalium dyes, triarylmethane dyes, xanthine dyes and thiazine dyes.

For example, the compounds represented by the following general formulae are suitable.

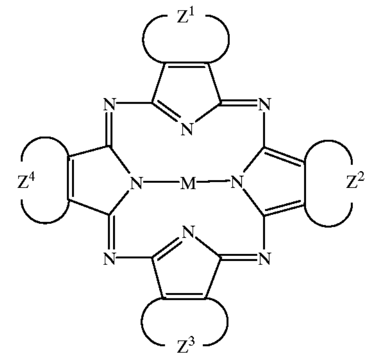

wherein $Z^1$, $Z^2$, $Z^3$ and $Z^4$ are each independently an atomic group which is linked to the two carbon atoms on each pyrrole ring to form an optionally substituted aromatic hydrocarbon ring or heterocyclic ring, and M is a metal atom or a metal compound containing optional two hydrogen atoms or ligands.

$$Ar^6 \text{—}(N{=}N\text{—}Cp)_t$$

wherein $Ar^6$ is a t-valent residue containing a conjugated system and an optional aromatic hydrocarbon ring or heterocyclic ring, t is a positive number of not less than 1, Cp is a coupler residue having an aromatic hydroxyl, and, when t is two or more, Cp's are identical with or different from each other.

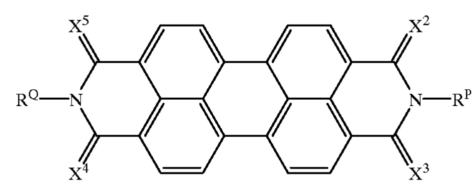

wherein $X^2$, $X^3$, $X^4$ and $X^5$ are each oxygen, sulfur or selenium, $R^P$ and $R^Q$ are each an alkyl group or an aryl group of 1 to 12 carbon atoms, $X^2$ or $X^3$ and $R^P$, or, $X^4$ or $X^5$ and $R^Q$ may optionally be linked to each other to form an optionally substituted heterocyclic ring.

Examples of fluorene disazo pigments are given below.

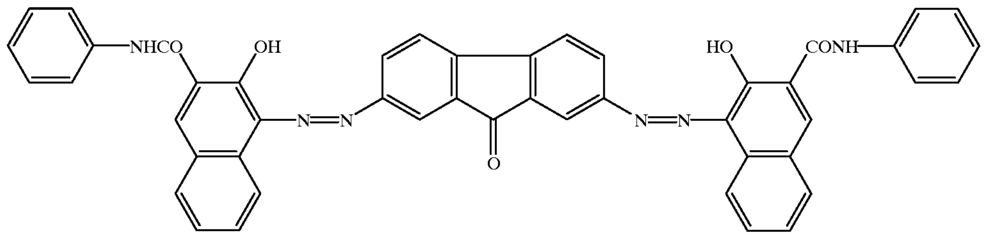
NHCO
OH
N=N
O
HO
CONH
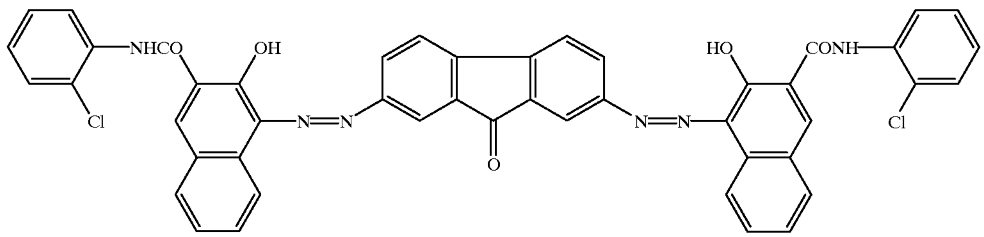
NHCO
OH
Cl
N=N
O
HO
CONH
Cl
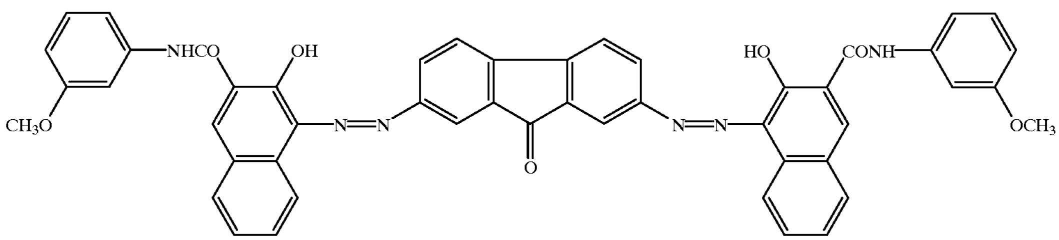
NHCO
OH
CH3O
N=N
O
HO
CONH
OCH3
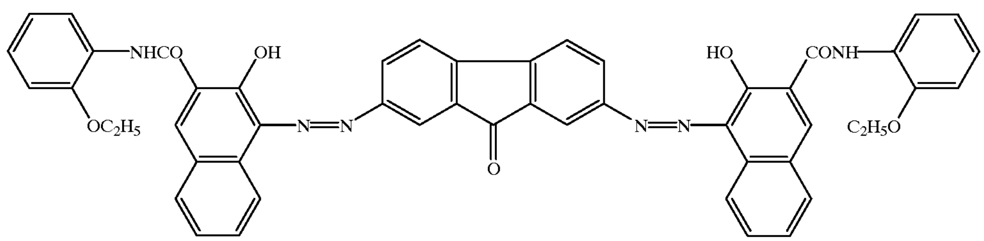
NHCO
OH
OC2H5
N=N
O
HO
CONH
C2H5O
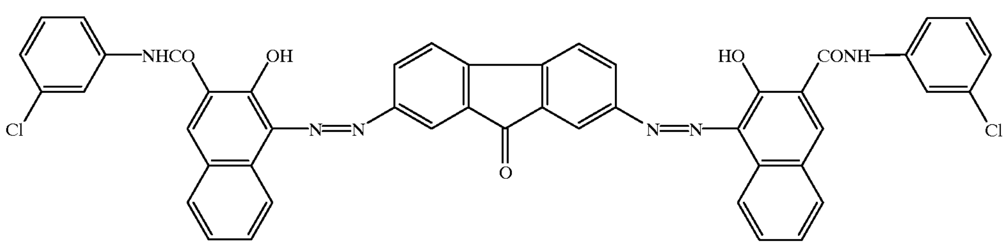
NHCO
OH
Cl
N=N
O
HO
CONH
Cl
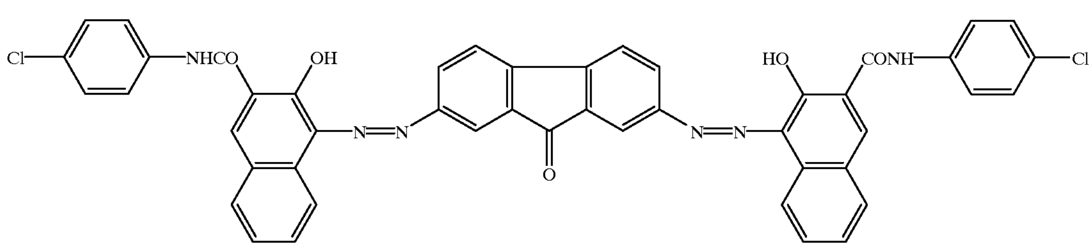
Cl
NHCO
OH
N=N
O
HO
CONH
Cl -continued
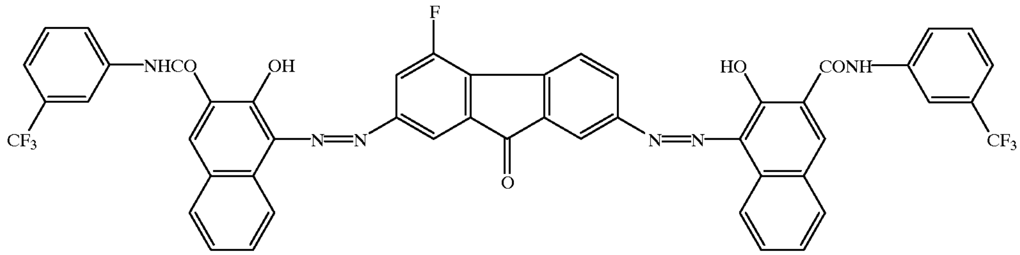
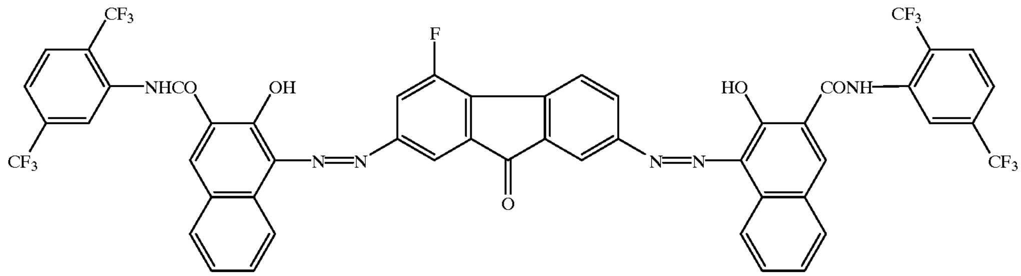
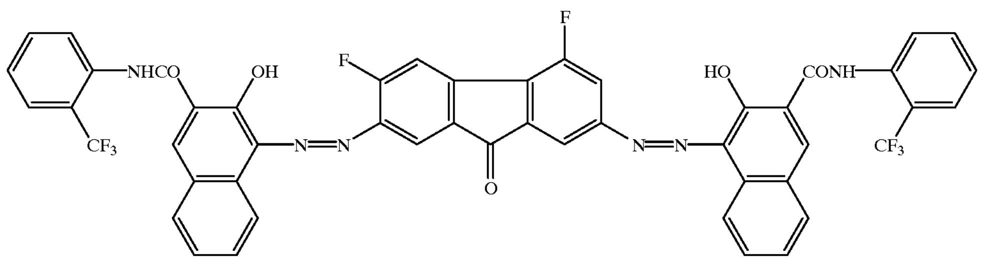
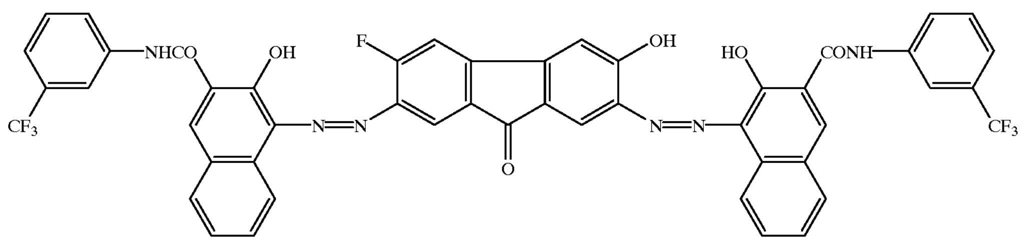
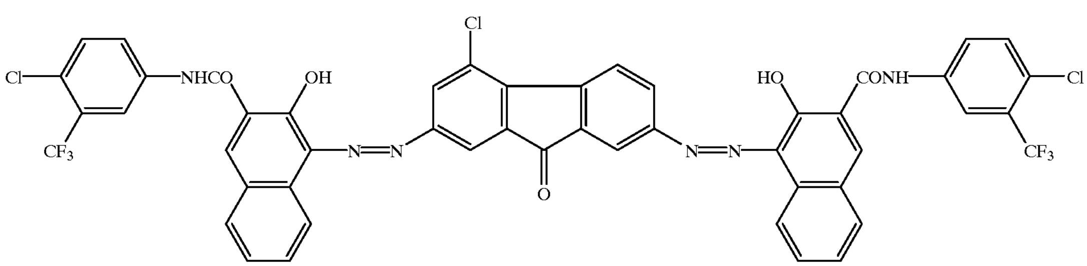
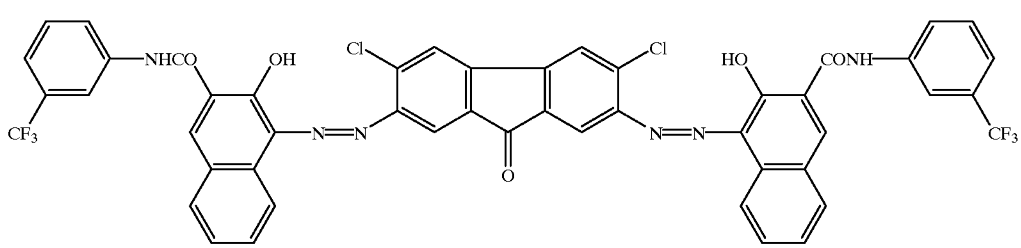

-continued
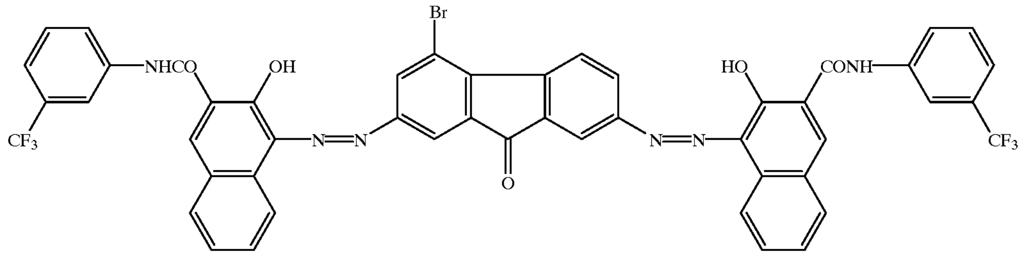
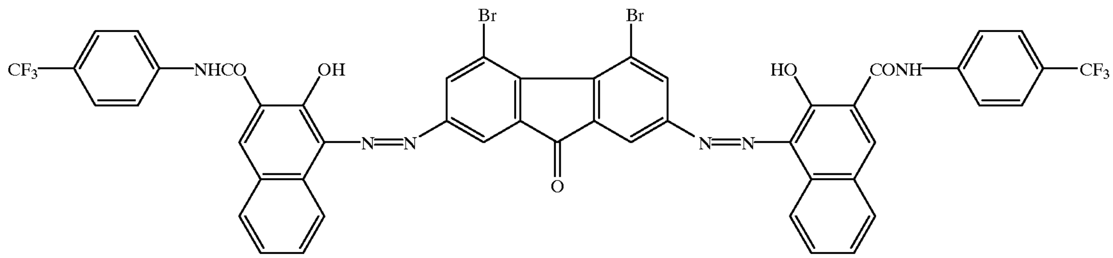
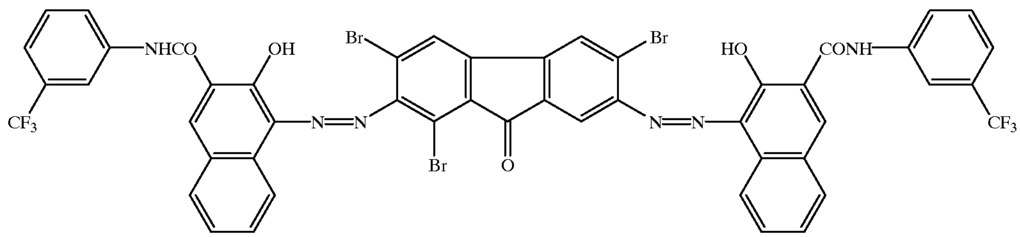
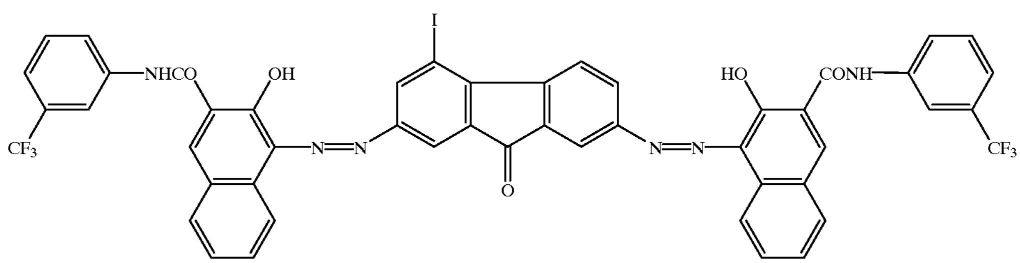
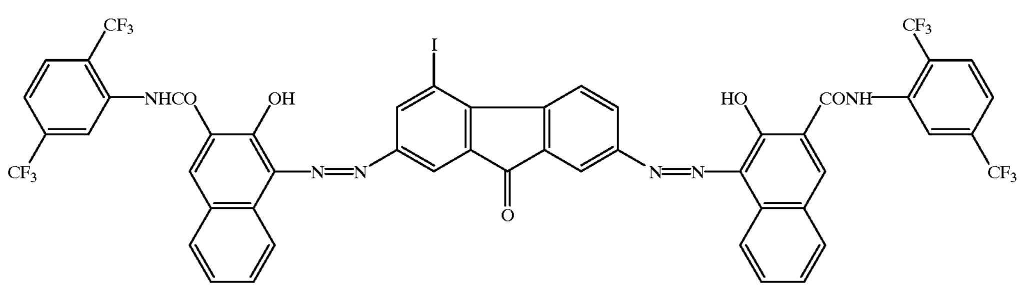
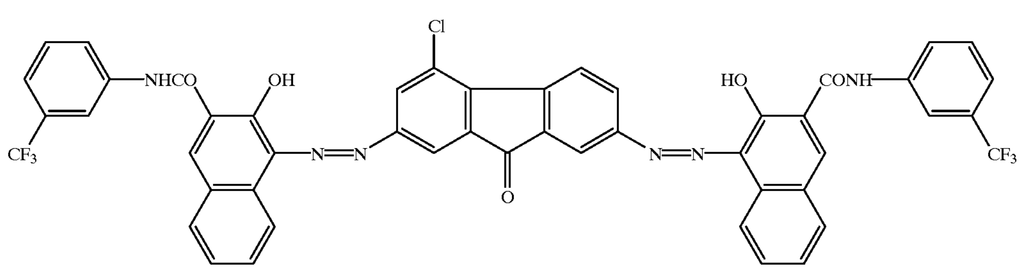

-continued
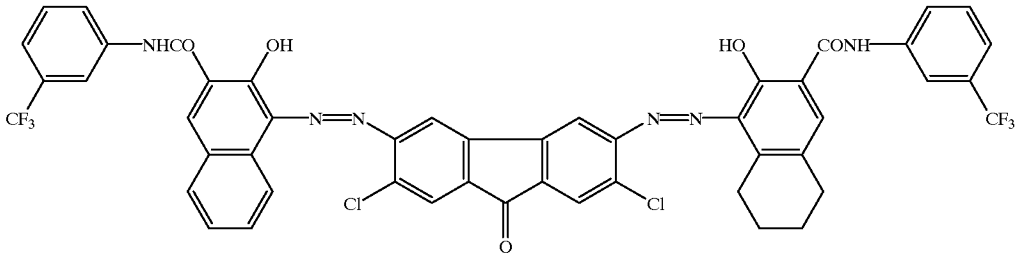
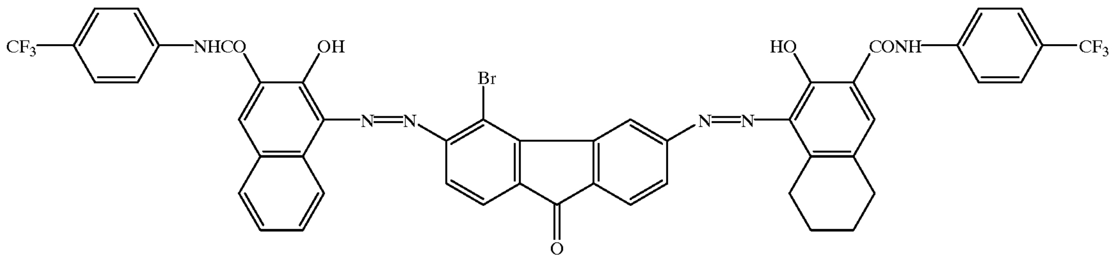
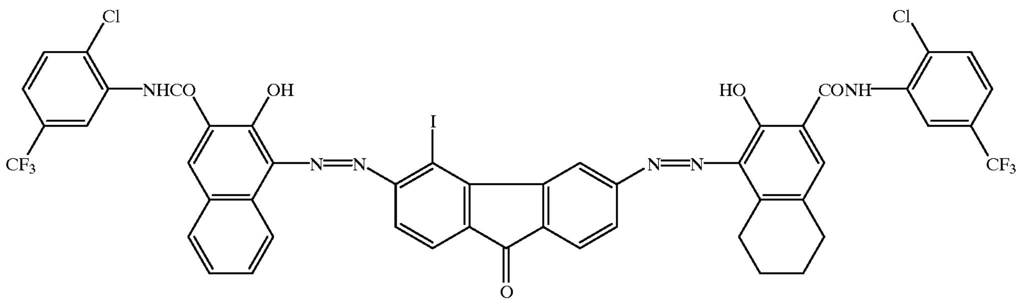
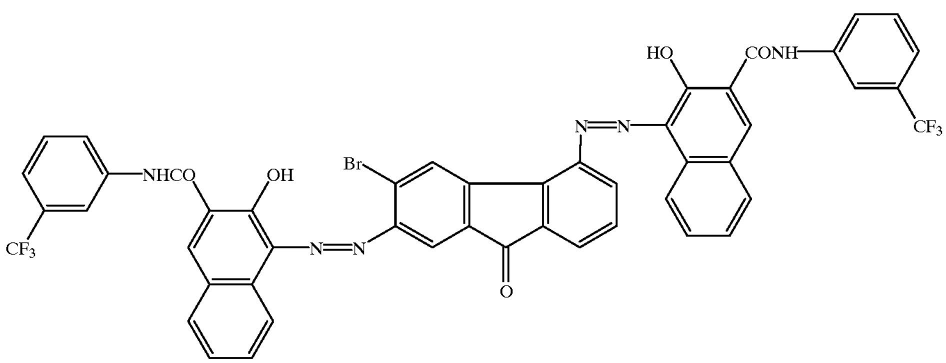
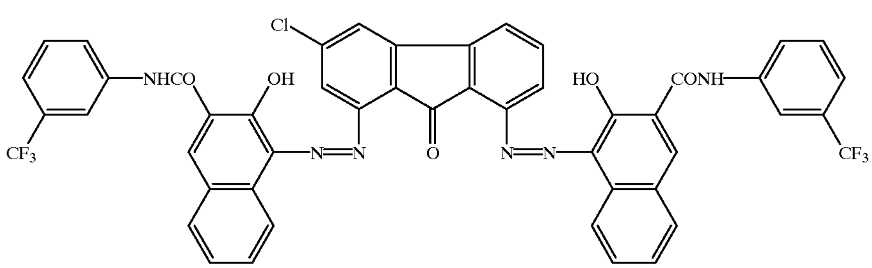

-continued
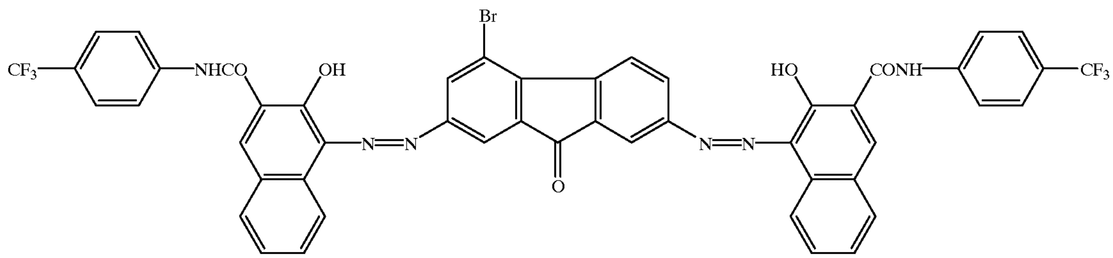
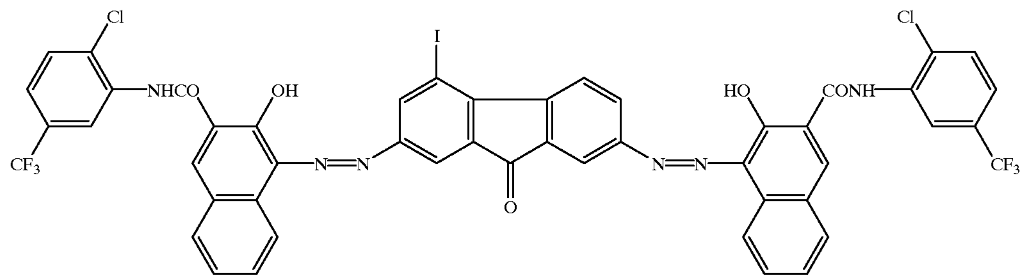
Examples of the perylene pigments are given below.
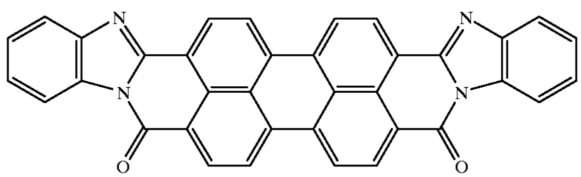
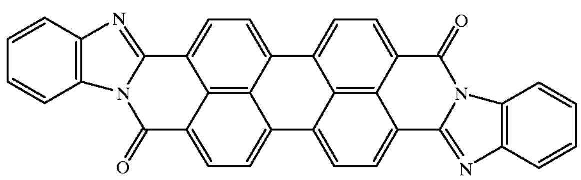
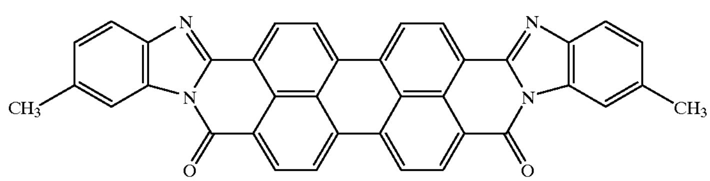
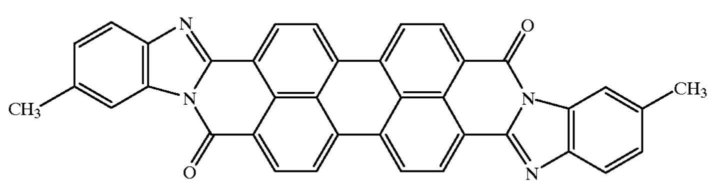
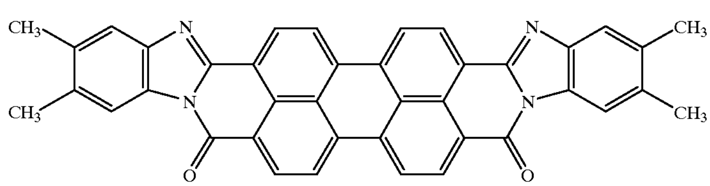

-continued
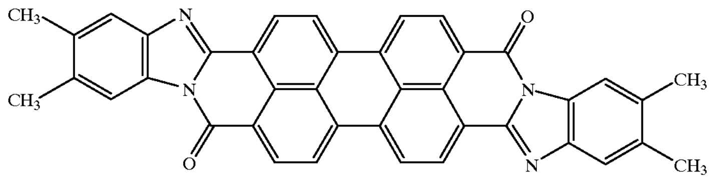
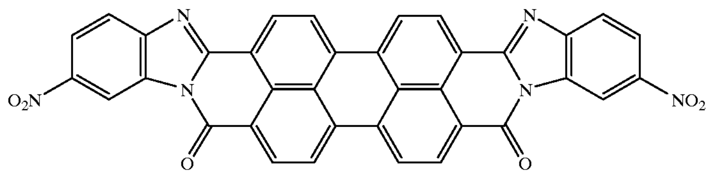
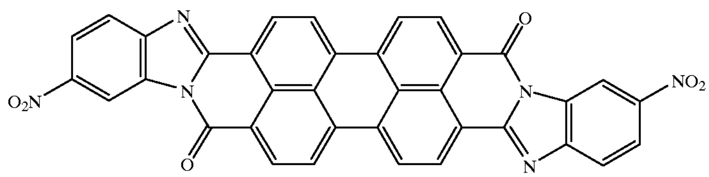
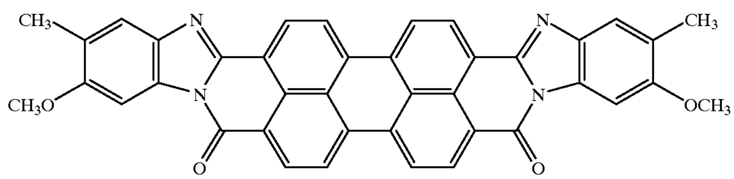
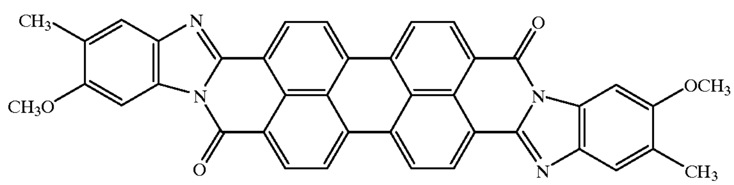
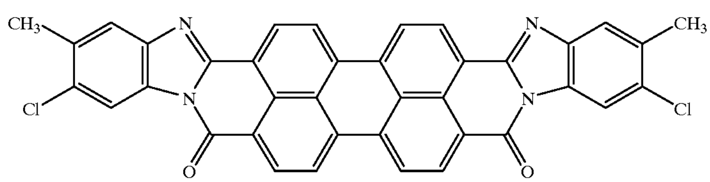
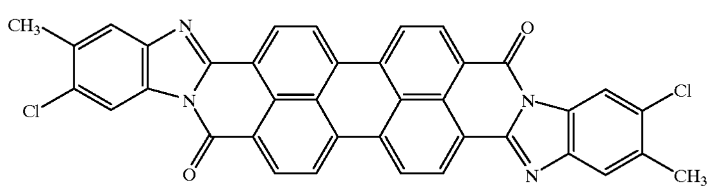
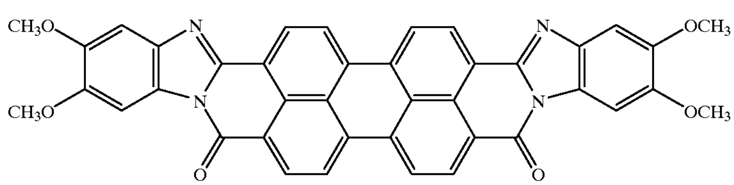
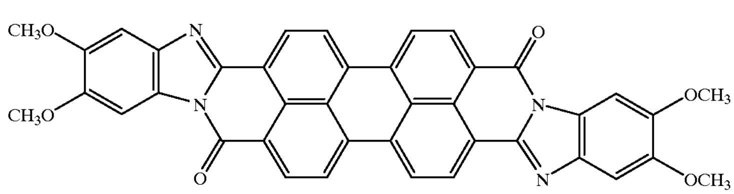

-continued
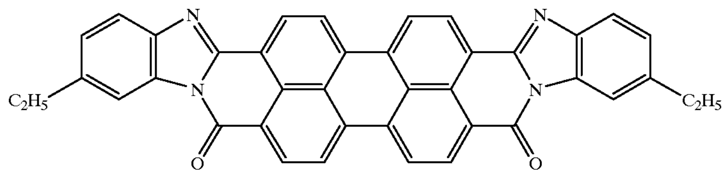
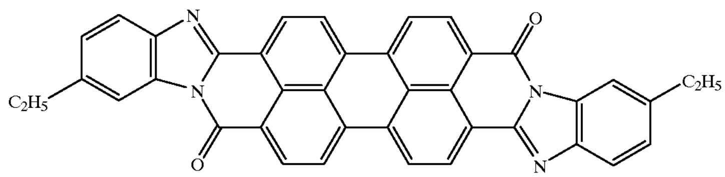
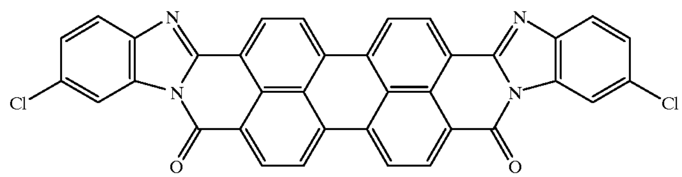
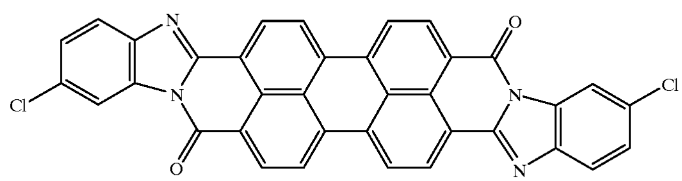
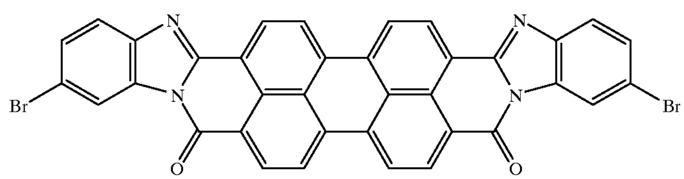
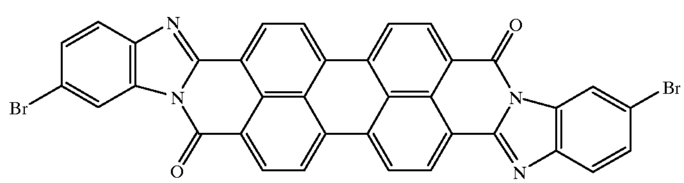
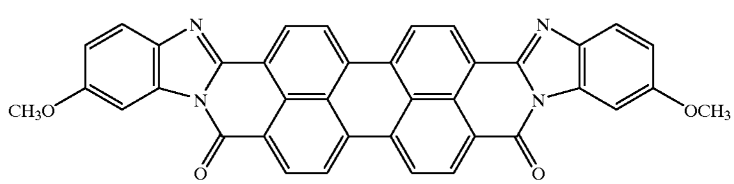
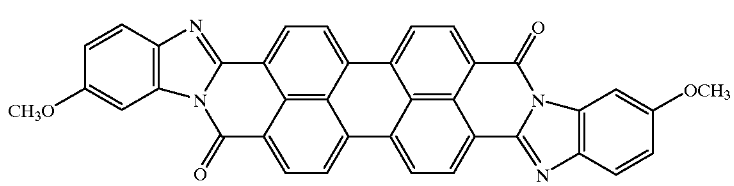
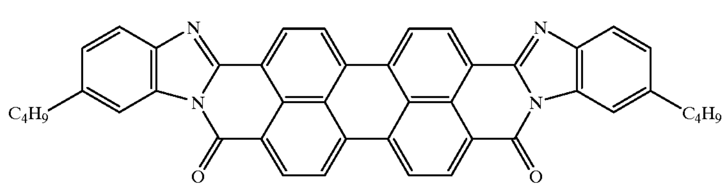

-continued
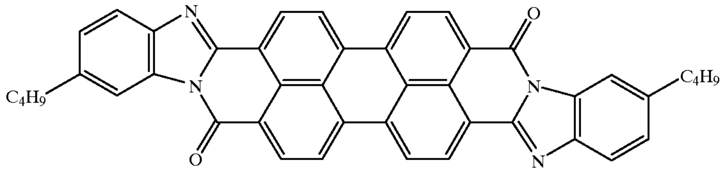
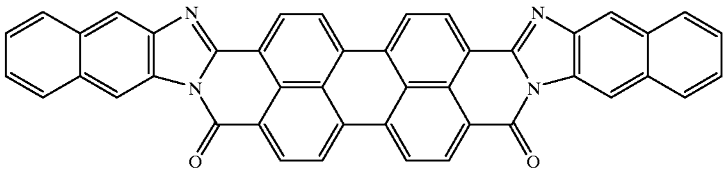
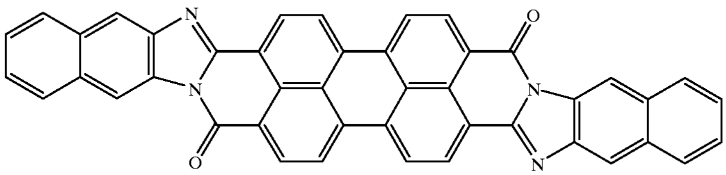
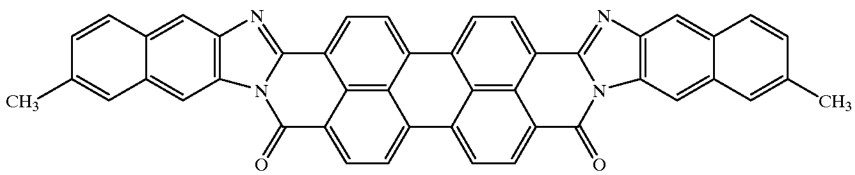
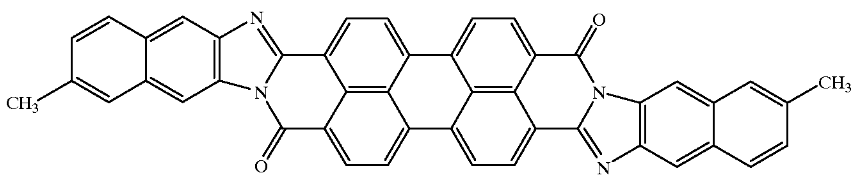
Examples of polycyclic quinone pigments are given below.
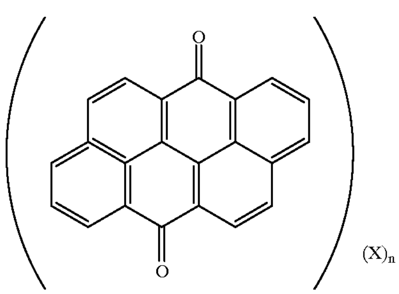
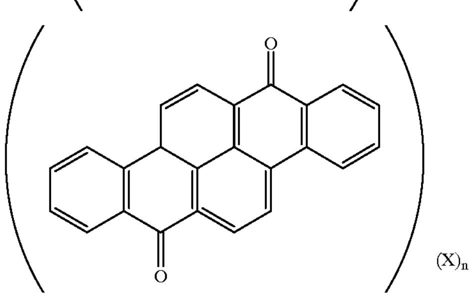
-continued
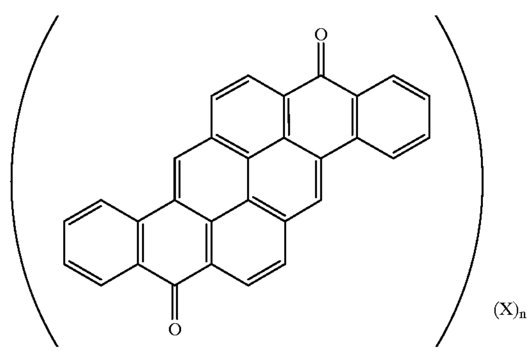
X: harogeno, nitro, cyano, acyl or carboxyl
*n* = an integer of 0 to 6

Examples of anthoanthrone pigments are given below.
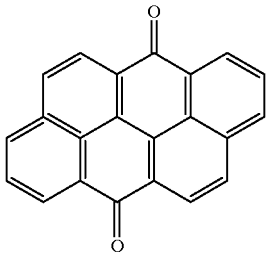
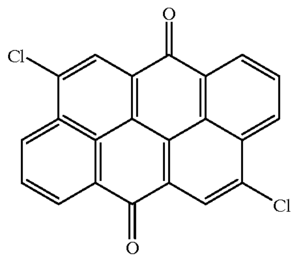
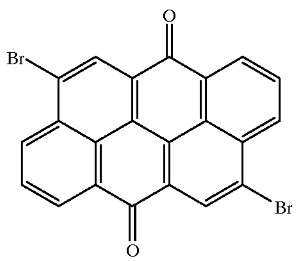
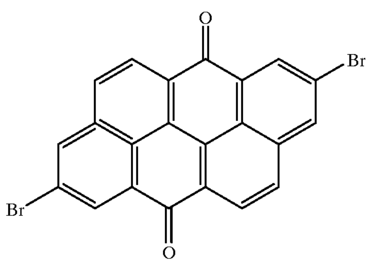
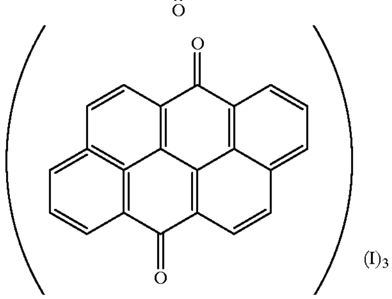
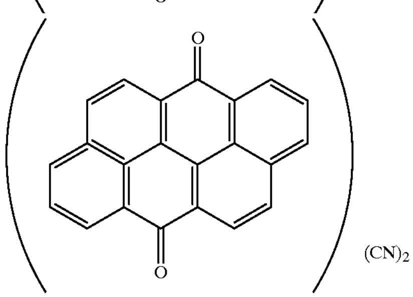
Examples of dibenzpyrenequinone pigments are given below.
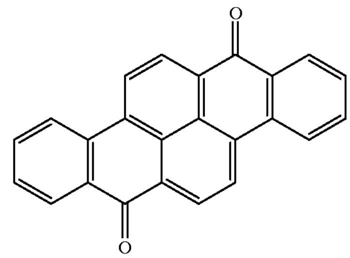
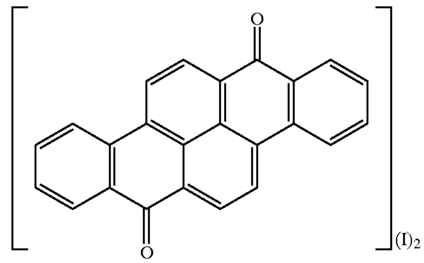
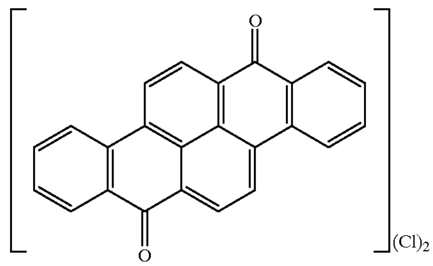
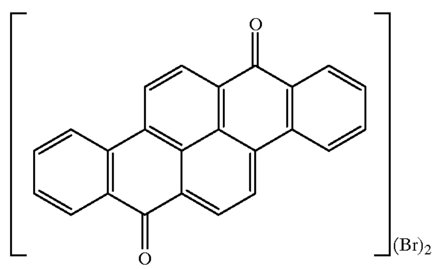
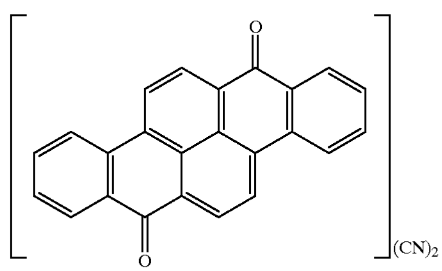

Examples of pyranthrone pigments are given below.

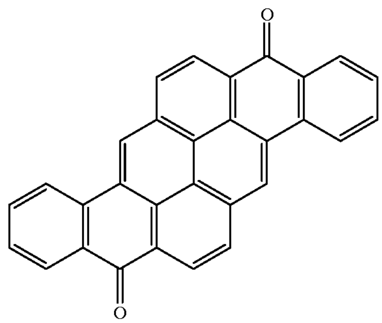

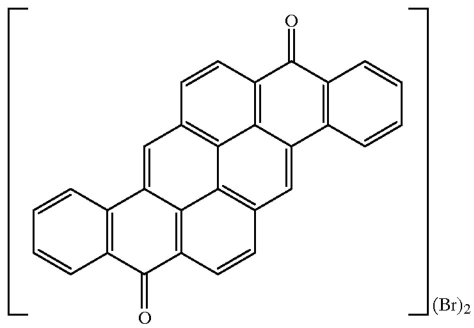

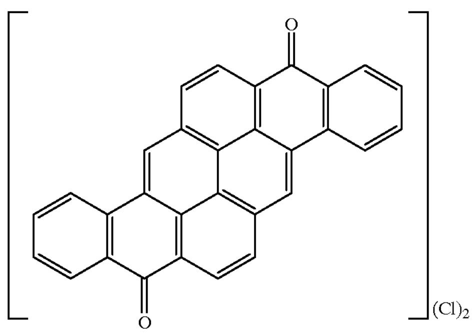

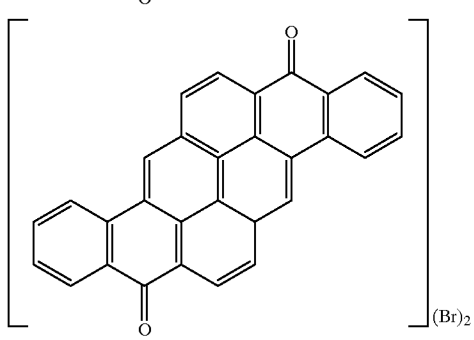

These pigments may be used individually or as a mixture of two or more.

The charge-generating layer is preferably 0.01 to 2.0 μm, more preferably 0.1 to 0.8 μm in thickness. A charge-generating layer of less than 0.01 μm is difficult to form evenly, and that of more than 2.0 μm tends to deteriorate the electrophotographic properties.

The binder resins which may be used in the charge-generating layer are not particularly limited and may be various ones including known ones. Representative binder resins are thermosetting resins, such as polystyrene, polyvinyl chloride, polyvinyl acetate, vinyl chloride-vinyl acetate copolymer, polyvinyl acetal, alkyd resins, acrylic resins, polyacrylonitrile, polycarbonates, polyurethanes, epoxy resins, phenolic resins, polyamides, polyketones, polyacrylamides, butyral resins, polyesters, vinylidene chloride-vinyl chloride copolymer, methacrylic resins, polystyrene, styrene-butadiene copolymer, vinylidene chloride-acrylonitrile copolymer, vinyl chloride-vinyl acetate-maleic anhydride copolymer, silicone resins, silicone-alkyd resins, phenol-formaldehyde resins, styrene-alkyd resins, poly-N-vinylcarbazole, polyvinyl butyral, polyvinylformal, polysulfones, casein, gelatin, polyvinyl alcohol, ethyl cellulose, nitro cellulose, carboxy-methyl cellulose, vinylidene chloride-base polymer latex, acrylonitrile-butadiene copolymer, vinyltoluene-styrene copolymer, soybean oil-modified alkyd resins, nitrated polystyrene, polymethylstyrene, polyisoprene, polythiocarbonates, polyallylates, polyhaloallylates, polyallyl ethers, polyvinyl acrylate, melamine resins, polyether resins, benzoguanamine resin, epoxy acrylate resins, urethane acrylate resins and polyester acrylates.

The polycarbonate resins or crosslinked polycarbonate resins of the present invention may also be used as the binder resins in the charge-generating layer.

The charge-transfer layer may be produced by forming a layer wherein a charge-transfer substance is fixed by a binder resin on an underlying layer, for example, a charge-generating layer. The charge-transfer layer can be produced by various method including known methods, preferably by coating an underlying layer with a coating fluid prepared by dispersing or dissolving a charge-transfer substance and the non-crosslinked polycarbonate resin of the present invention in an appropriate solvent, optionally together with a crosslinking agent necessary for ionic crosslinking or a thermal polymerization initiator necessary for radical crosslinking, a photo-initiator and a monomer having ethylene double bonds, followed by drying and the crosslinking of the polycarbonate resin. In the charge-transfer layer, the weight ratios of the charge-transfer substance to the crosslinking polycarbonate resin of the present invention is preferably from 20:80 to 80:20, more preferably from 30:70 to 70:30.

In the charge-transfer layer, the polycarbonate resins of the present invention may be used individually or as a mixture of two or more. Other resins, such as the above-described binder resins for the charge-generating layer, may also be used along with the polycarbonate resins of the present invention, so far as the attainment of the object of the present invention is not hindered.

The charge-transfer substances which may be used are various ones including known ones. Typical examples are carbazole compounds, indole compounds, imidazole compounds, oxazole compounds, pyrazole compounds, oxadiazole compounds, pyrazoline compounds, thiadiazole compounds, aniline compounds, hydrazone compounds, aromatic amine compounds, aliphatic amine compounds, stilbene compounds, fluorenone compounds, quinone compounds, quinodimethane compounds, thiazole compounds, triazole compounds, imidazolone compounds, imidazolidine compounds, bisimidazolidine compounds, oxazolone compounds, benzothiazole compounds, benzimidazole compounds, quinazoline compounds, benzofuran compounds, acridine compounds, phenazine compounds, poly-N-vinylcarbazole, polyvinylpyrene, polyvinylanthracene, polyvinylacridine, poly-9-vinylphenylanthracene, pyreneformaldehyde resin, ethylcarbazole resins, and polymers containing these structures in the main chain or side chains.

Preferred are those represented by the following general formulae.

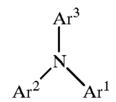

wherein $Ar^1$, $Ar^2$ and $Ar^3$ are each a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, substituted or non-substituted condensed-polycyclic hydrocarbon group, a heterocyclic group, a polycyclic-heterocyclic group or a condensed-polycyclic-heterocyclic group, $Ar^1$ and $Ar^2$, $Ar^2$ and $Ar^3$, and $Ar^3$ and $Ar^1$ may optionally be linked to each other to form a ring, respectively.

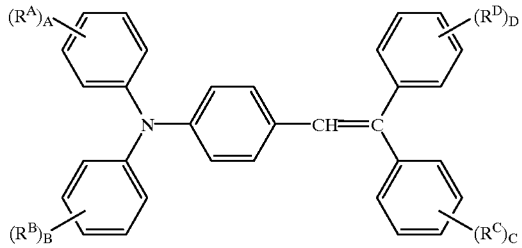

wherein $R^A$, $R^B$, $R^C$ and $R^D$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and A, B, C and D are each an integer of 0 to 5.

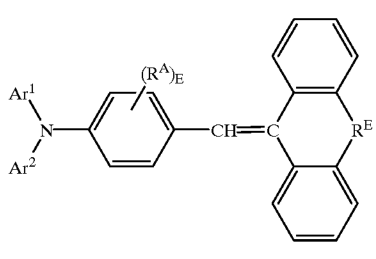

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$ may optionally be linked to form a ring, $R^A$ is cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^E$ is ethylene or ethenylene group, and E is an integer of 0 to 4.

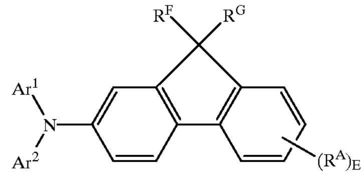

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$ may optionally be linked to form a ring, $R^A$ is cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^F$ and $R^G$ are each hydrogen, an alkyl group of 1 to 6 carbon atoms or a halogeno, and E is an integer of 0 to 4.

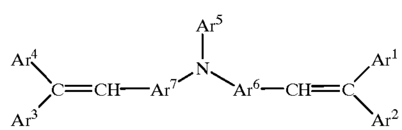

wherein $Ar^1$, $Ar^2$, $Ar^3$, $Ar^4$ and $Ar^5$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^6$ and $Ar^7$ are each a substituted or non-substituted alkylene group of 1 to 6 carbon atoms, or a divalent residue of a substituted or non-substituted aryl compound of 6 to 12 carbon atoms, a polycyclic hydrocarbon, a substituted or non-substituted condensed-polycyclic hydrocarbon compound, a heterocyclic compound, a polycyclic-heterocyclic compound or a condensed-polycyclic-heterocyclic compound, $Ar^1$ and $Ar^2$, and, $Ar^3$ and $Ar^4$ may optionally be linked to form a ring, respectively.

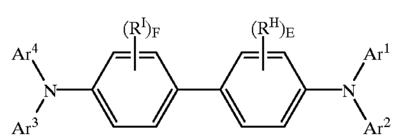

wherein $Ar^1$, $Ar^2$, $Ar^3$ and $Ar^4$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$, and, $Ar^3$ and $Ar^4$ may optionally be linked to form a ring, respectively, $R^H$ and $R^I$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, E and F are each an integer of 0 to 4.

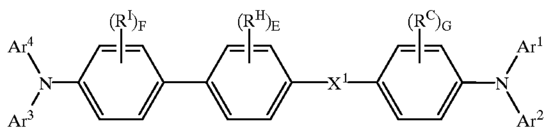

wherein $Ar^1$, $Ar^2$, $Ar^3$ and $Ar^4$ are each hydrogen, a substituted or non-substituted alkyl group of1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$, and, $Ar^3$ and $Ar^4$ may optionally be linked to form a ring, respectively, $R^A$, $R^B$ and $R^C$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, E, F and G are each an integer of 0 to 4, $X^1$ is —O—, —S—, —Se—, —Te—, —$CR^JR^K$—, —$SiR^JR^K$—, —$NR^J$— or —$PR^J$— (wherein $R^J$ and $R^K$ are each hydrogen, a halogeno, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group).

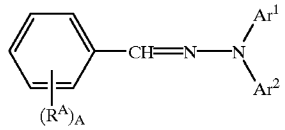

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^1$ and $Ar^2$ may optionally be linked to form a ring, $R^A$ is cyano, a halogeno, carboxyl, an acyl group, hydroxyl, nitro, amino an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and A is an integer of 0 to 5.

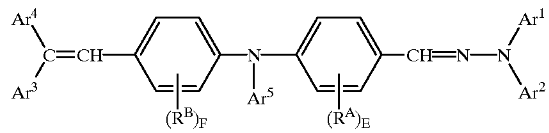

wherein $Ar^1$, $Ar^2$, $Ar^3$, $Ar^4$ and $Ar^5$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^A$ and $R^B$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic .group, $Ar^1$ and $Ar^2$, and, $Ar^3$ and $Ar^4$ may optionally be linked to form a ring, respectively, and F and E are each independently an integer of 0 to 4.

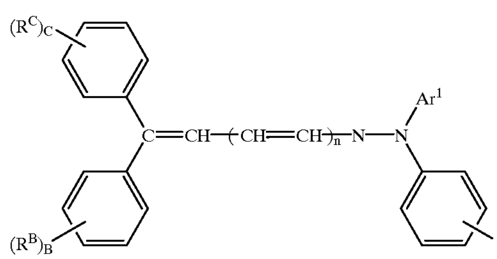

wherein $Ar^1$ is hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^A$, $R^B$ and $R^C$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and n is 0 or 1, A, B and C are each an integer of 0 to 5.

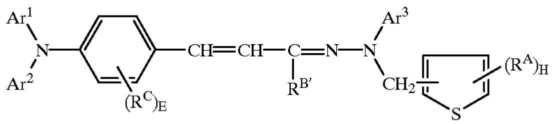

wherein $Ar^1$, $Ar^2$ and $Ar^3$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^A$ and $R^C$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $R^{B'}$ is hydrogen, cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, n is 0 or 1, E is an integer of 0 to 4, and H is an integer of 0 to 3.

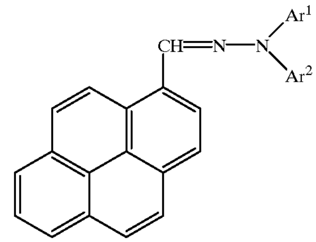

wherein $Ar^1$ and $Ar^2$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and $Ar^1$ and $Ar^2$ may optionally be linked to form a ring.

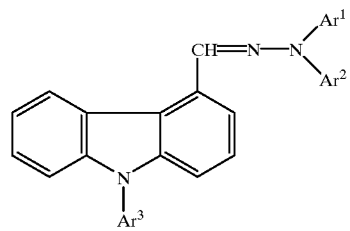

wherein $Ar^1$, $Ar^2$ and $Ar^3$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and $Ar^1$ and $Ar^2$ may optionally be linked to form a ring.

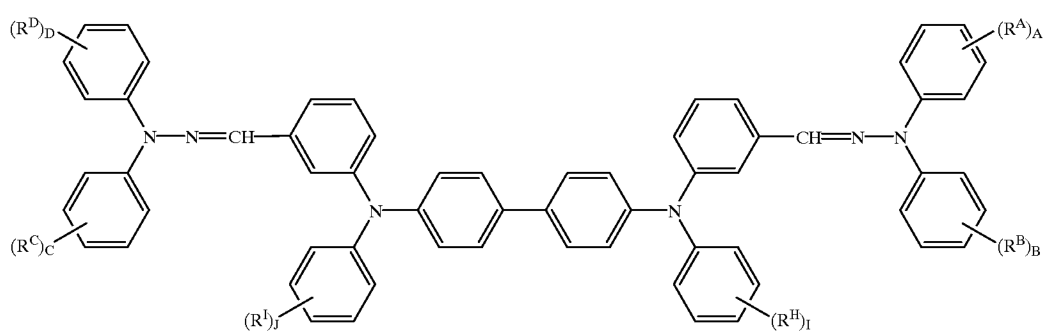

wherein $R^A$, $R^B$, $R^C$, $R^D$, $R^H$ and $R^I$ are each cyano, a halogeno, carboxyl, an acyl group, hydroxyl, nitro, amino, an alkylamino group, an arylamino group, an aralkylamino group, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, and A, B, C, D, I and J are each an integer of 0 to 5.

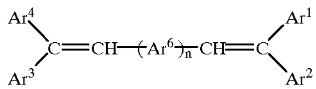

wherein $Ar^1$, $Ar^2$, $Ar^3$ and $Ar^4$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group, $Ar^6$ is a substituted or non-substituted alkylene group of 1 to 6 carbon atoms or a divalent residue of a substituted or non-substituted aryl compounds of 6 to 12 carbon atoms, a polycyclic hydrocarbon, a substituted or non-substituted condensed-polycyclic hydrocarbon, a heterocyclic compound, a polycyclic-heterocyclic compound or a condensed-polycyclic-heterocyclic compound, $Ar^1$ and $Ar^2$, and, $Ar^3$ and $Ar^4$ may optionally be linked to form a ring, respectively, and n is 0 or 1.

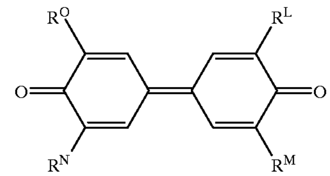

wherein $R^L$, $R^M$, $R^N$ and $R^O$ are each hydrogen, a substituted or non-substituted alkyl group of 1 to 10 carbon atoms, a substituted or non-substituted aralkyl group of 7 to 13 carbon atoms, a substituted or non-substituted aryl group of 6 to 12 carbon atoms, a polycyclic hydrocarbon group, a substituted or non-substituted condensed-polycyclic hydrocarbon group, a heterocyclic group, a polycyclic-heterocyclic group or a condensed-polycyclic-heterocyclic group.

Representative examples are the following compounds.

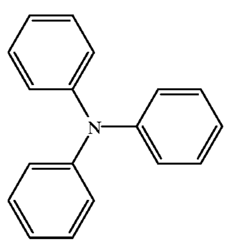

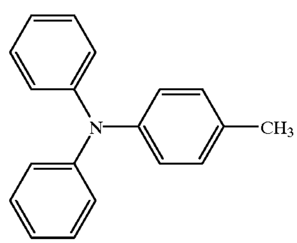

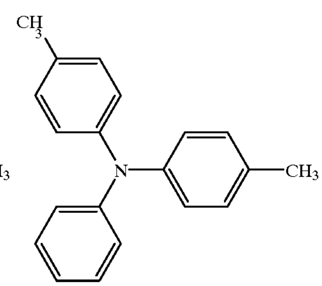

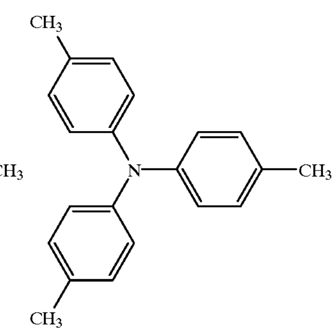

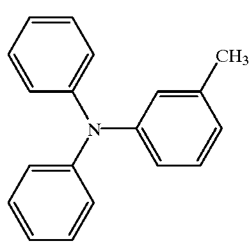

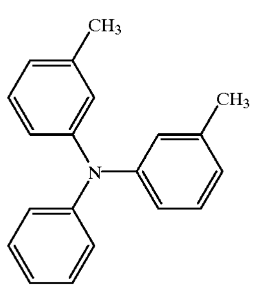

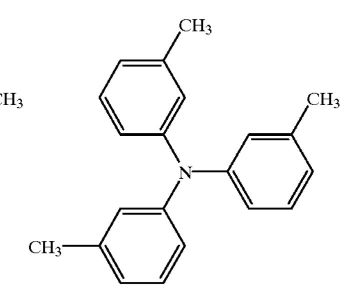

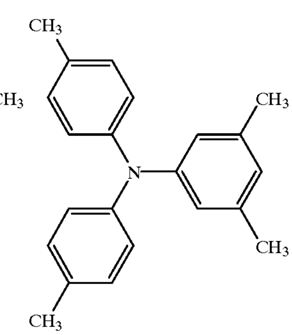

-continued
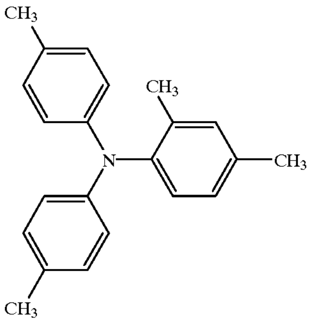
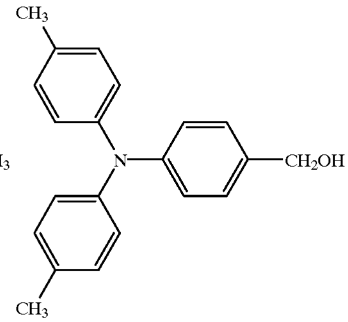
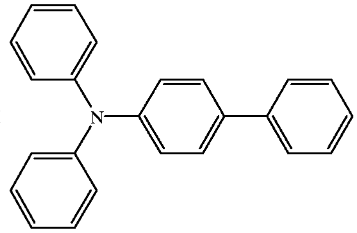
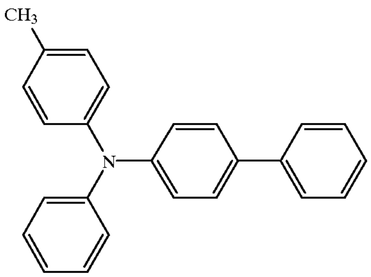
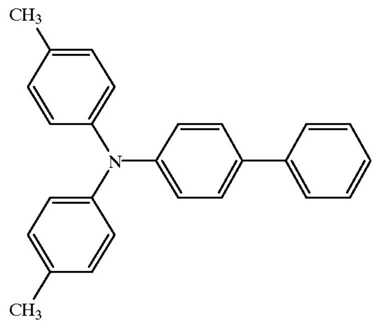
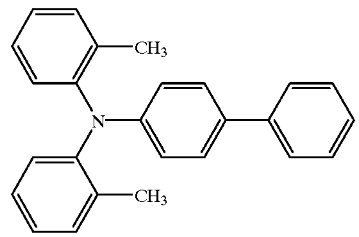
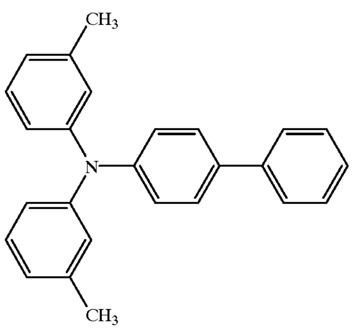
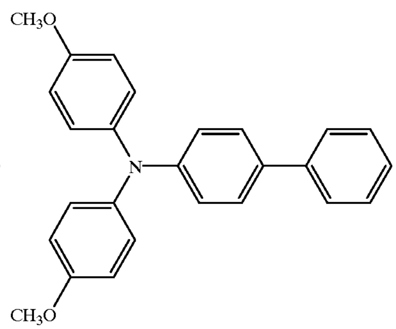
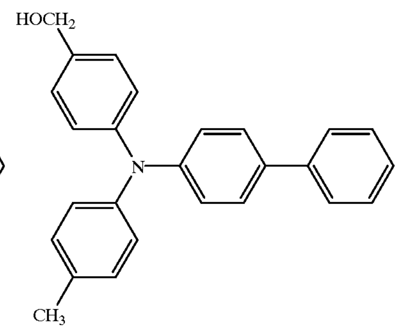
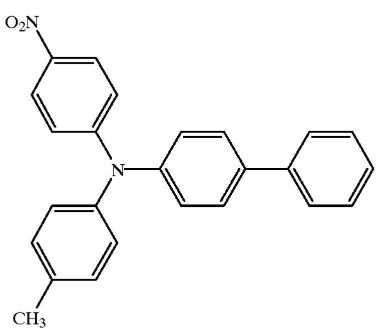
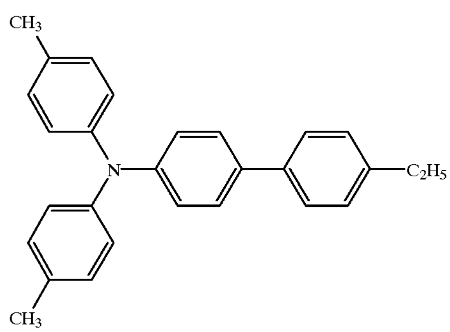
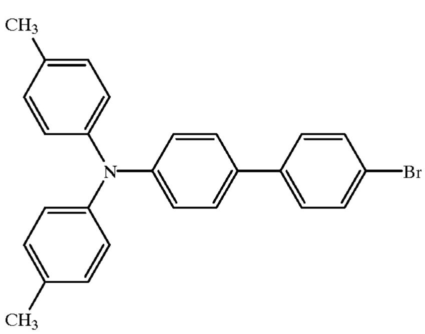
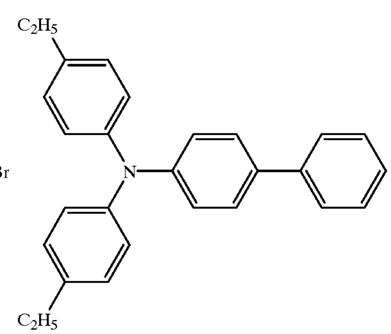
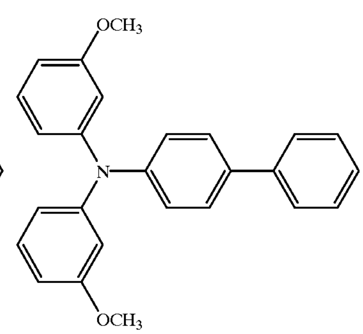

-continued
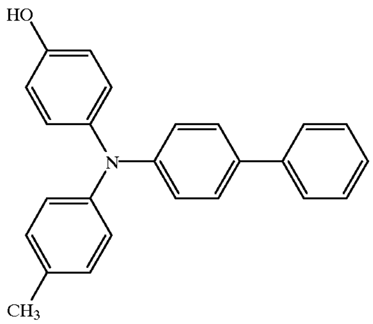
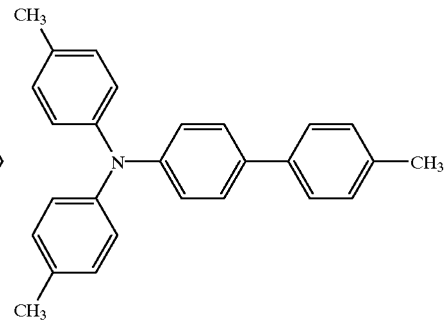
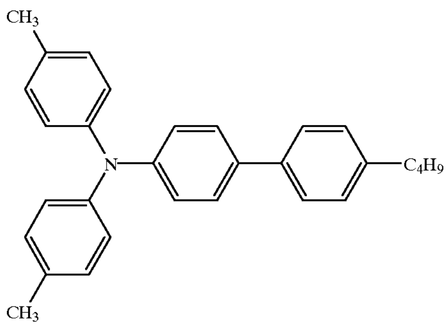
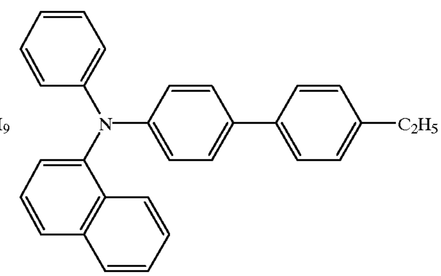
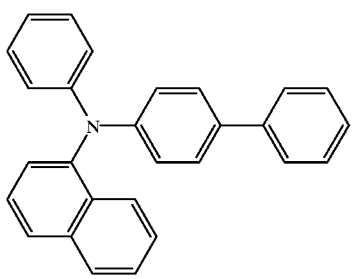
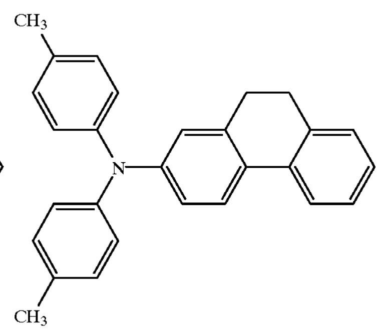
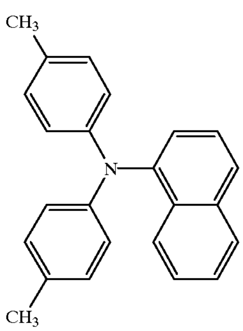
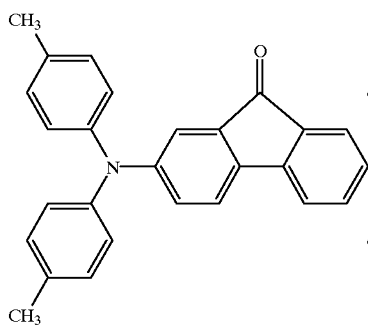
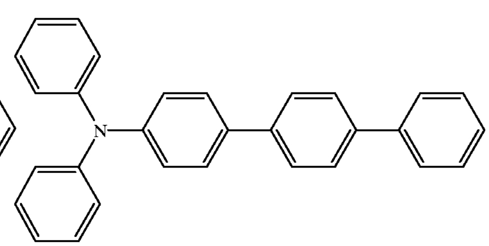
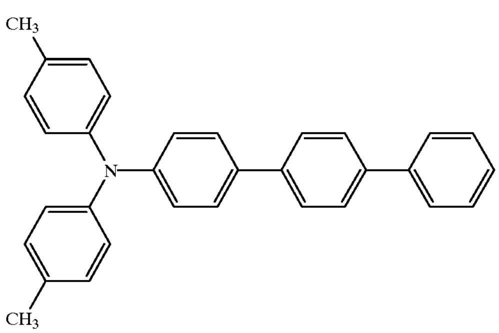
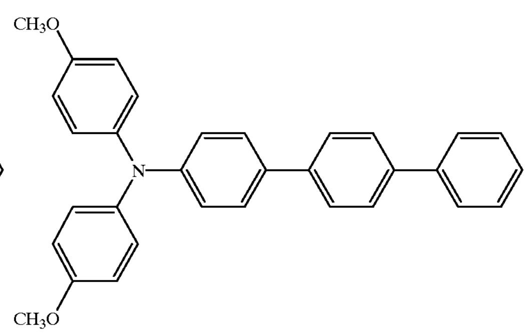

-continued
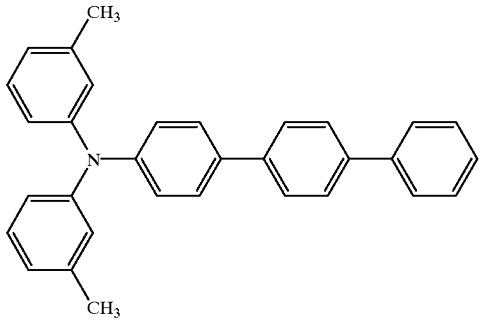
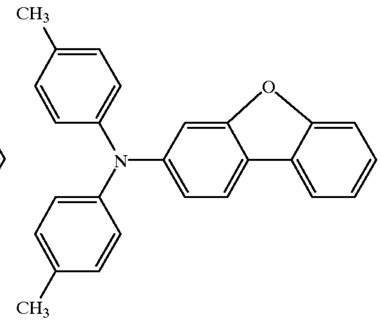
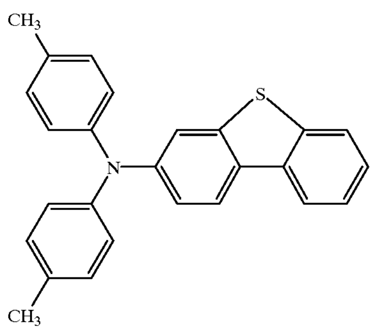
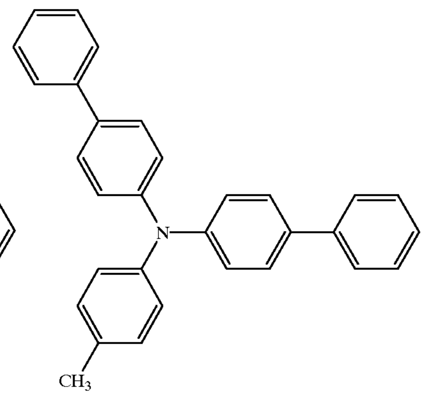
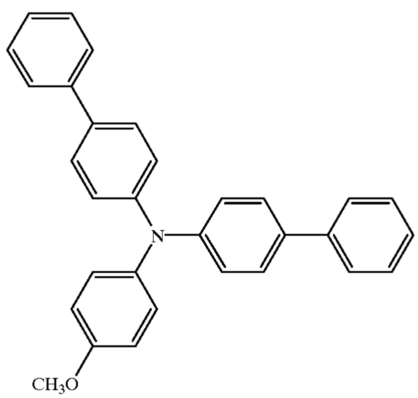
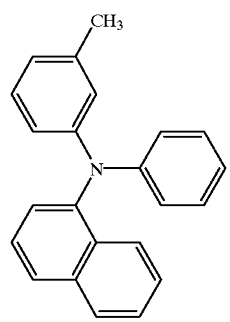
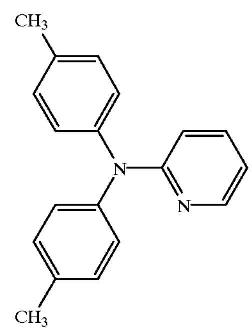
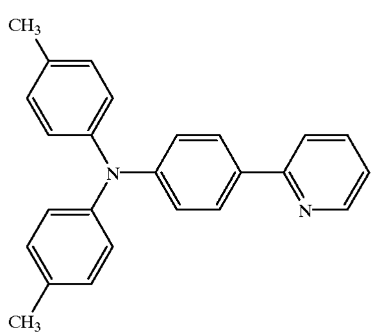
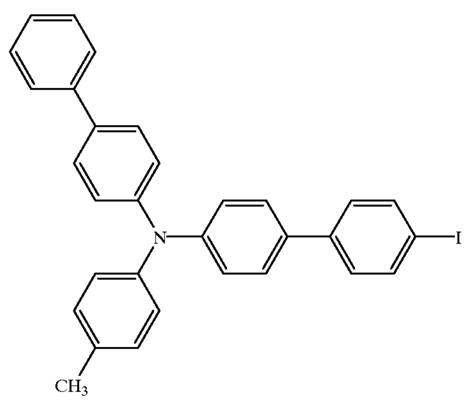

-continued
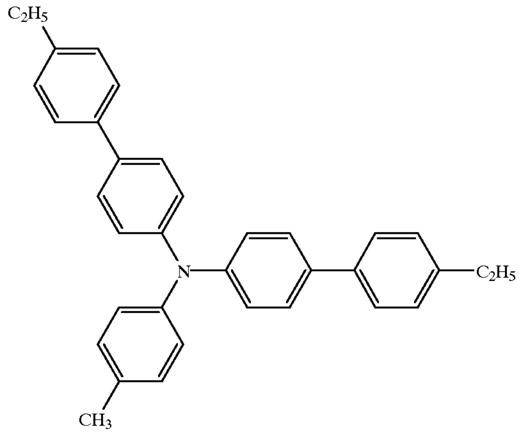
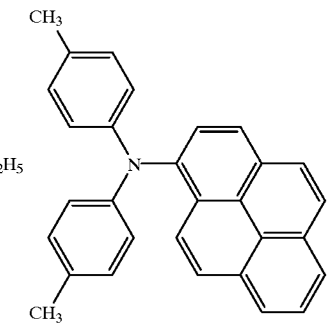
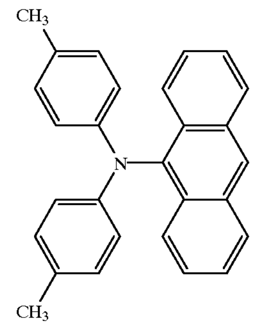
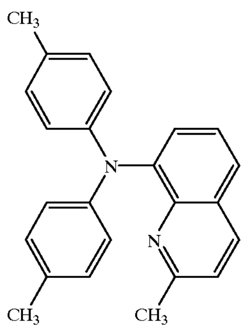
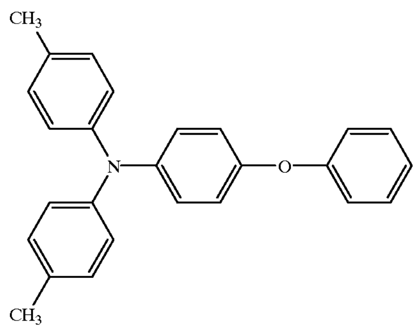
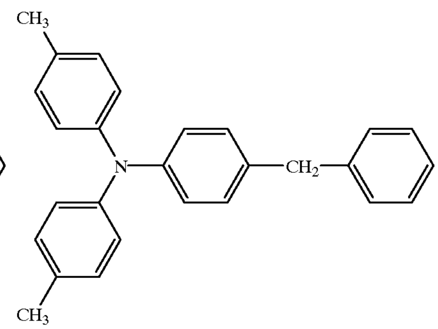
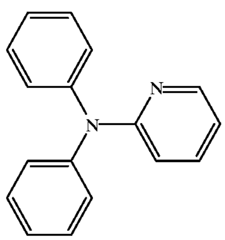
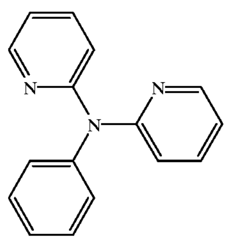
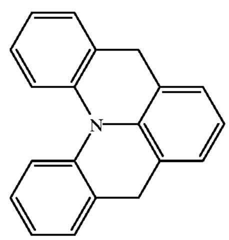
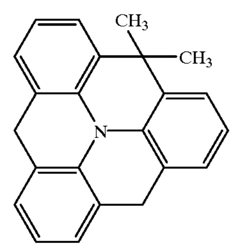
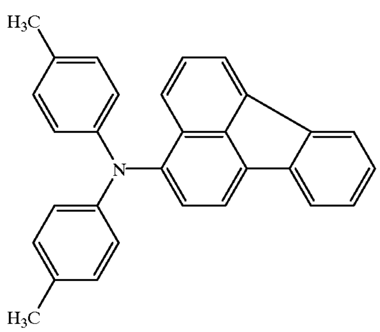
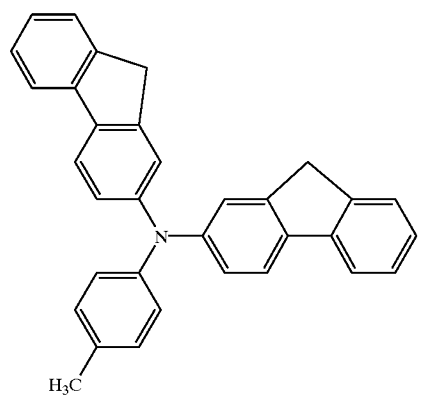
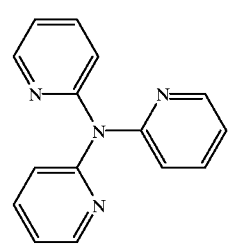
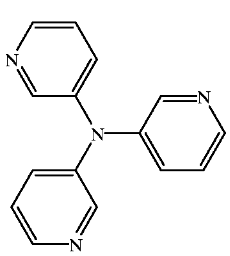
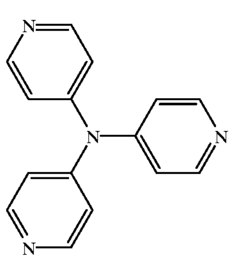
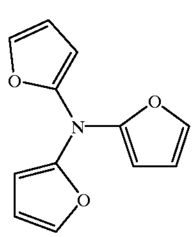
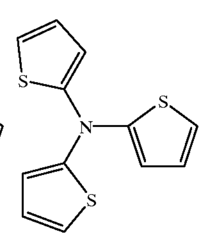

-continued
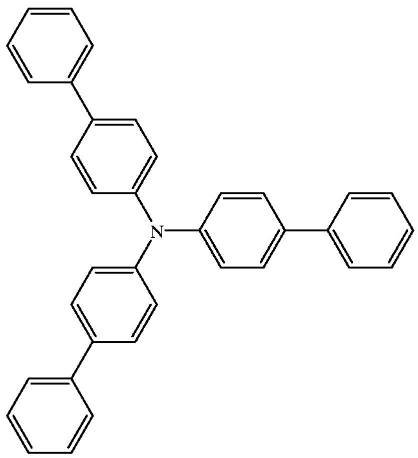
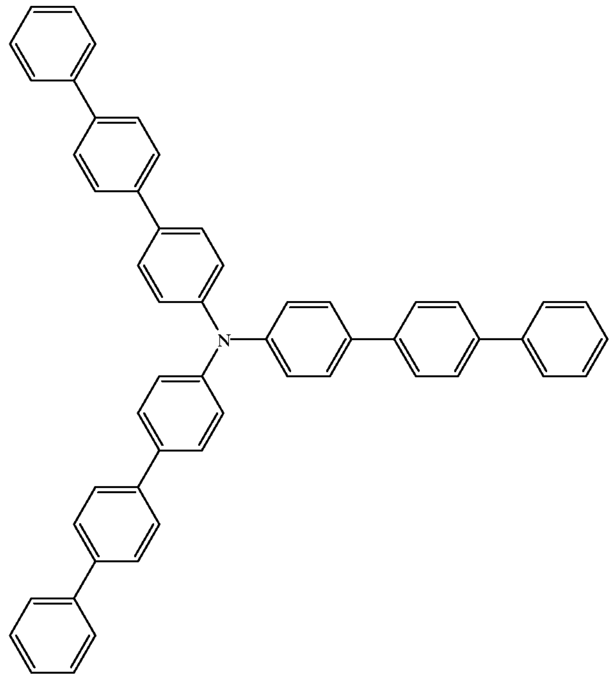
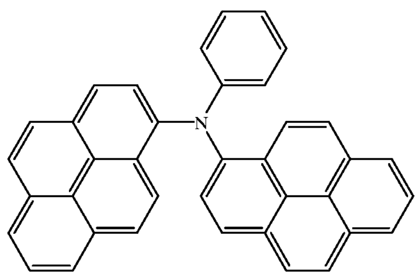
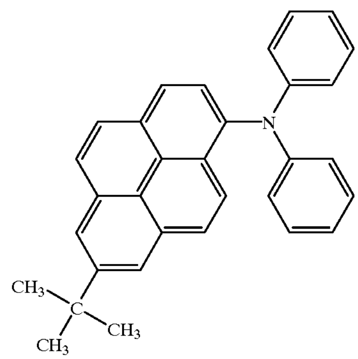
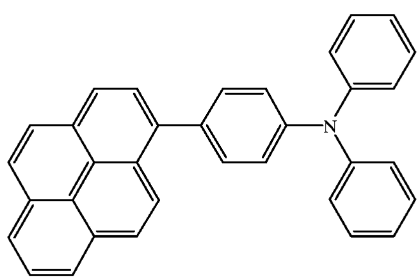
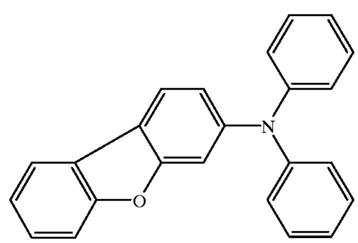
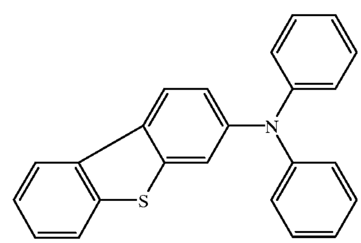
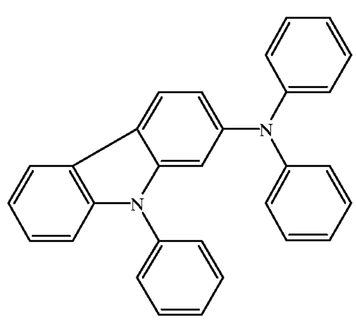
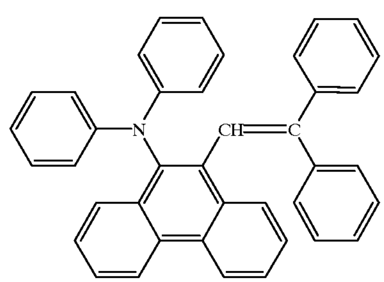

-continued
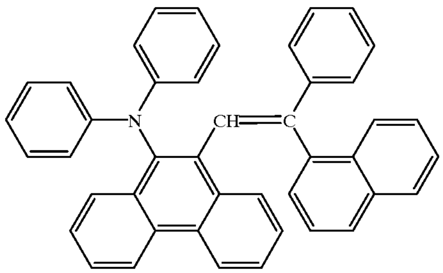
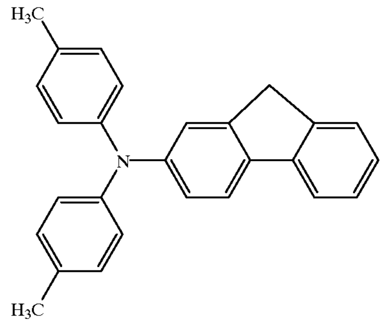
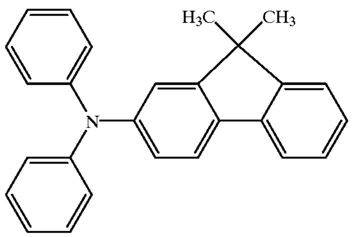
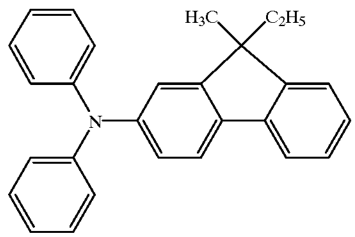
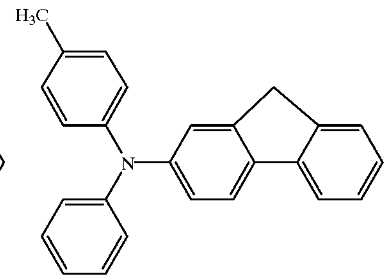
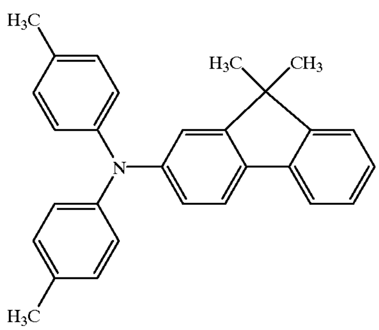
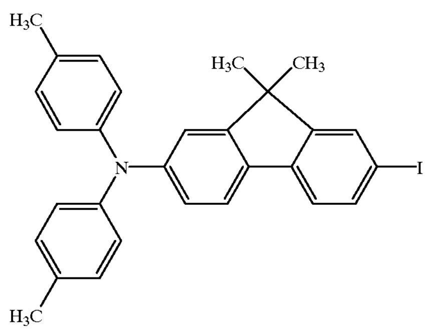
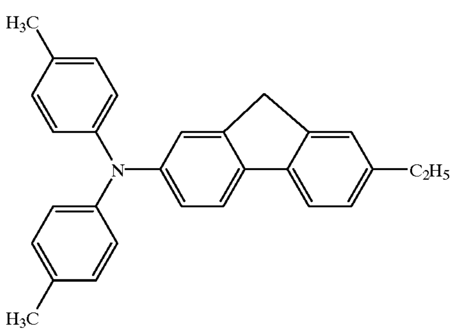
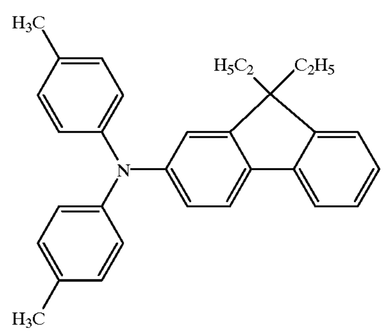
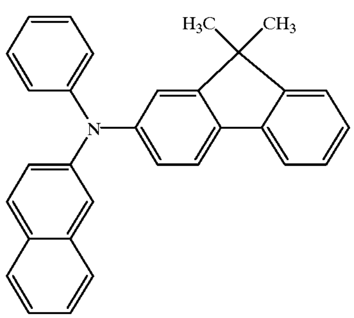
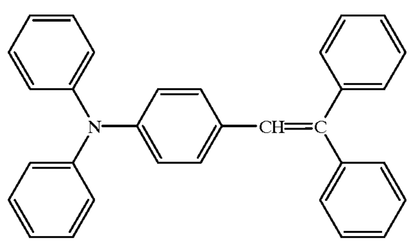

-continued
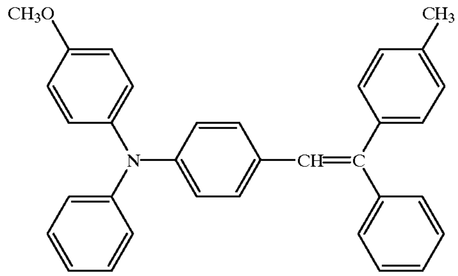
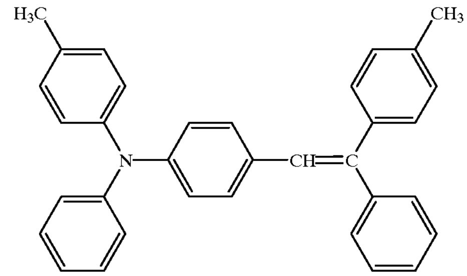
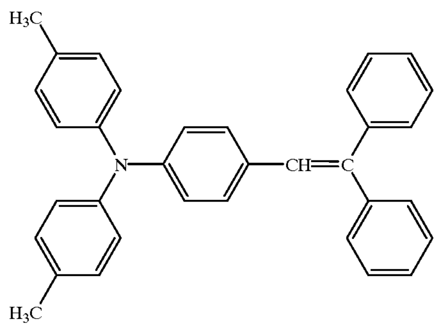
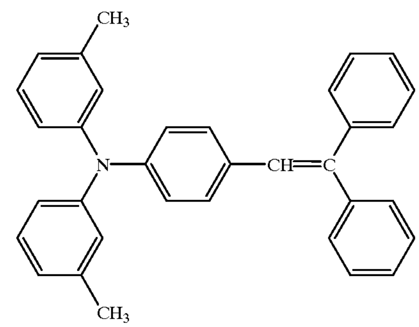
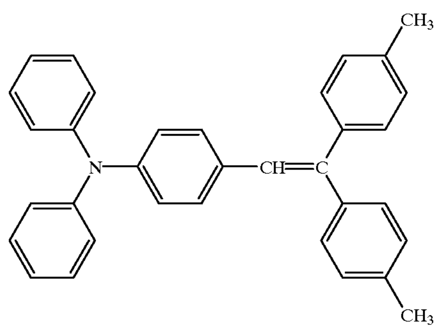
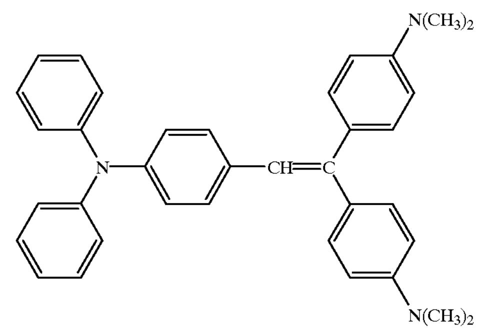
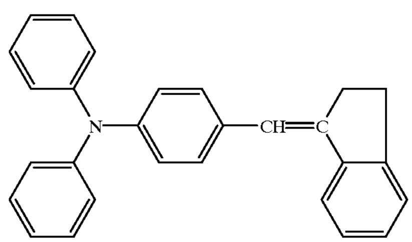
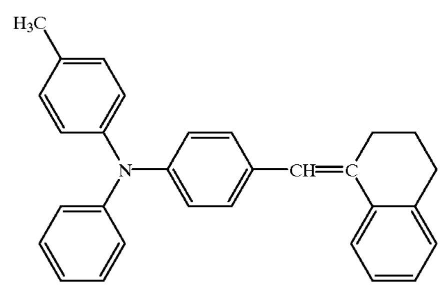
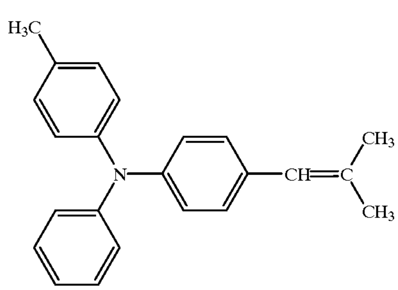
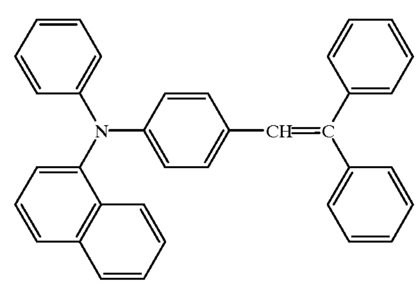

-continued
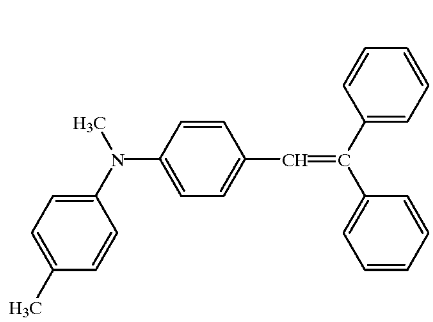
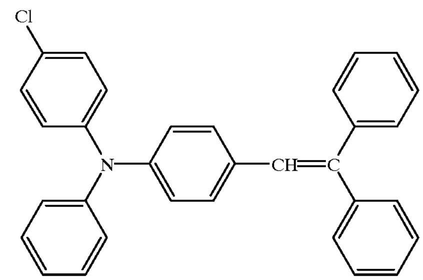
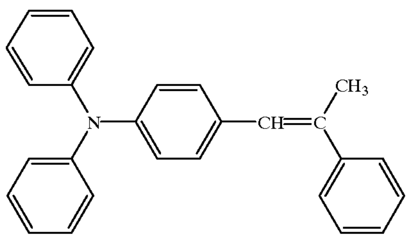
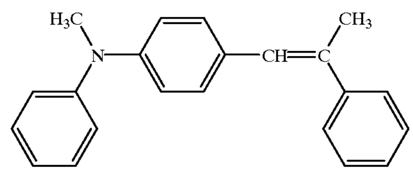
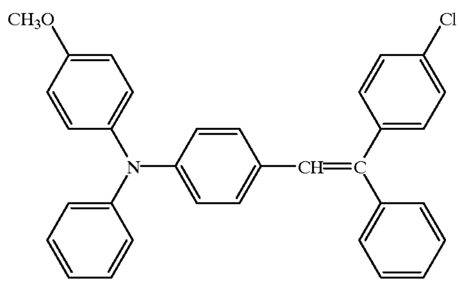
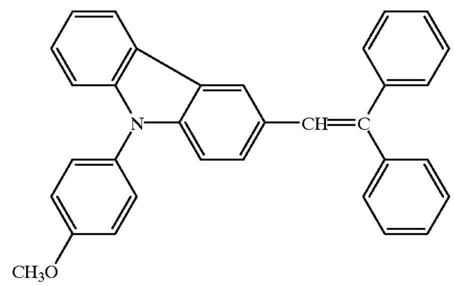
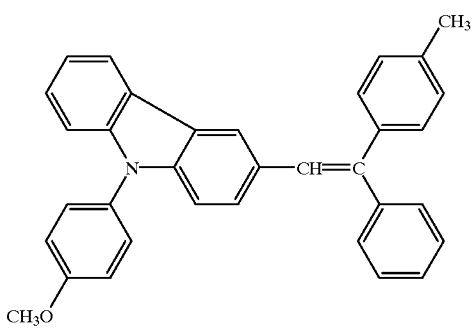
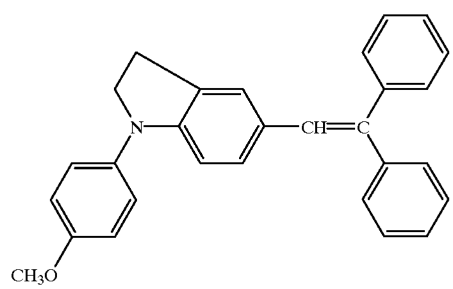
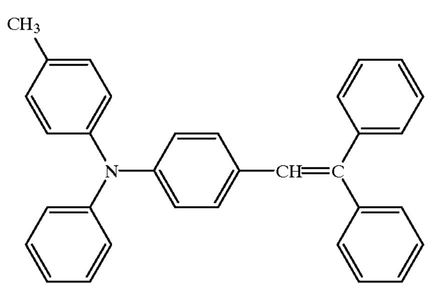
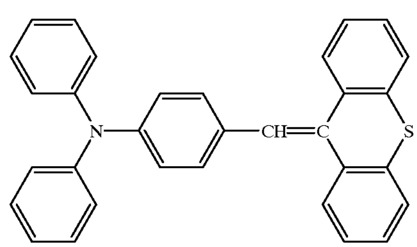

-continued
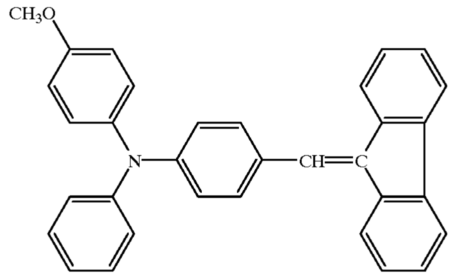
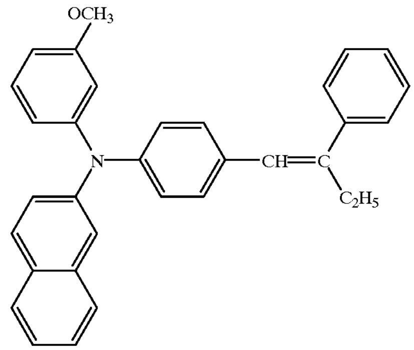
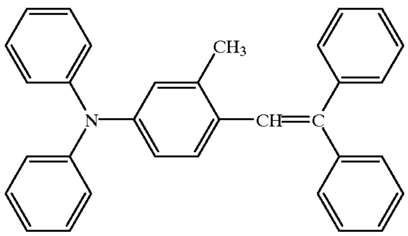
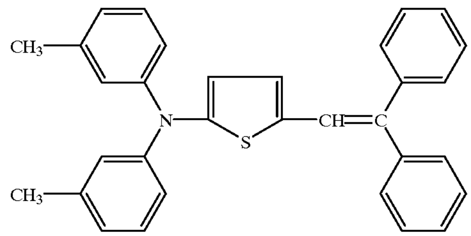
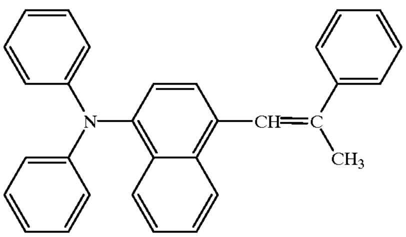
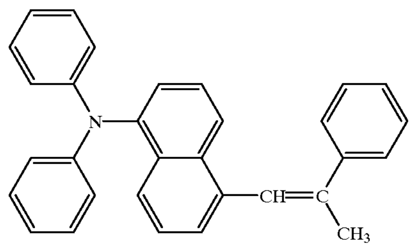
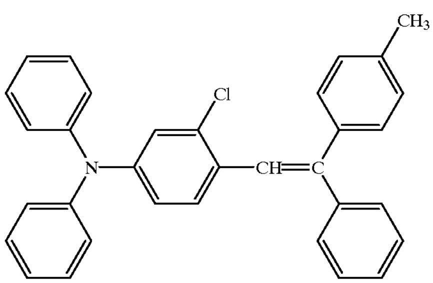
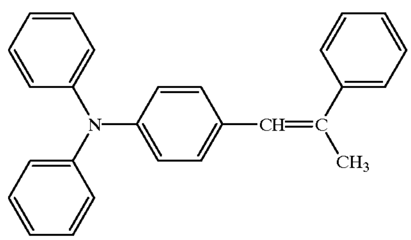
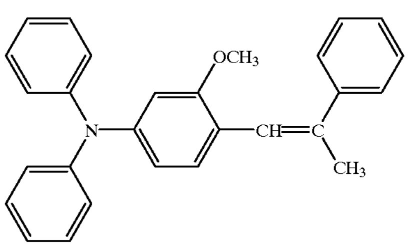
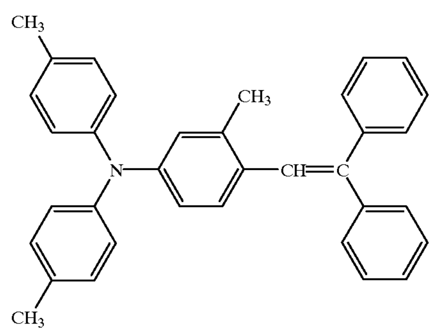
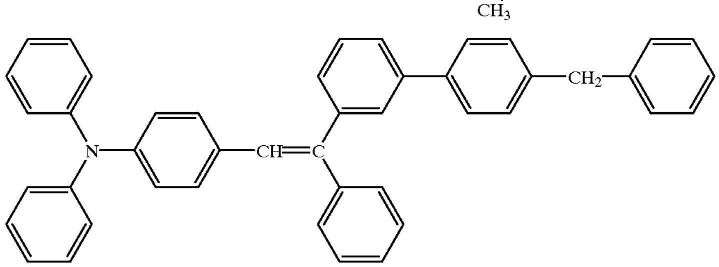

-continued
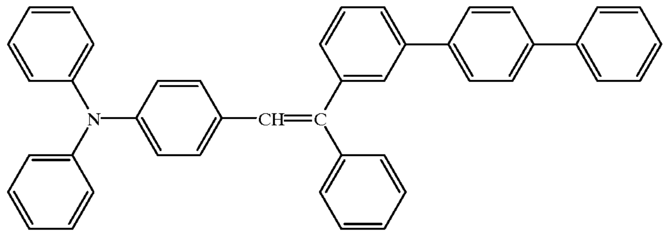
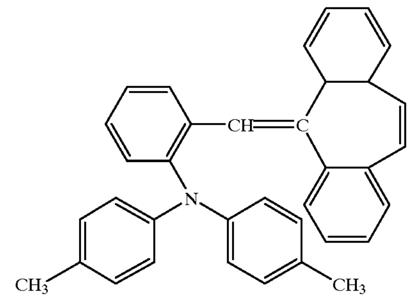
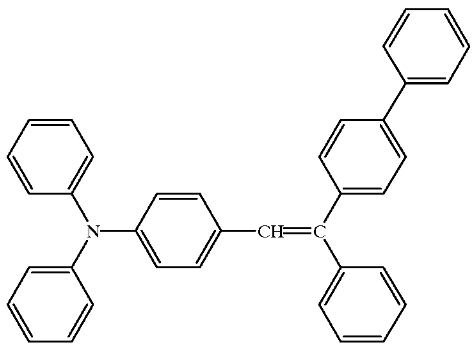
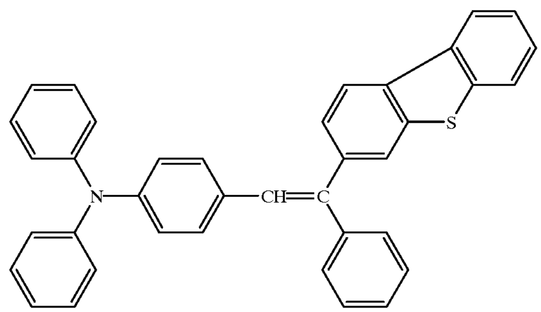
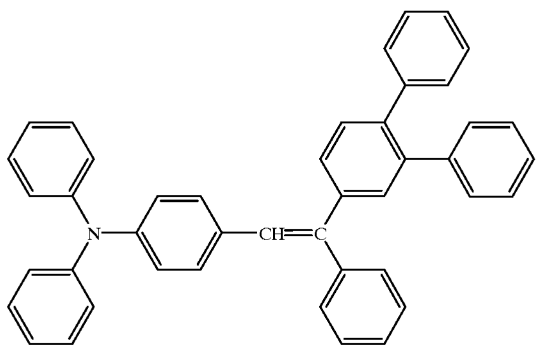
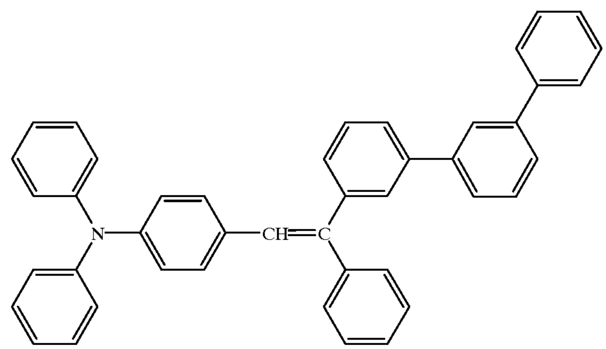
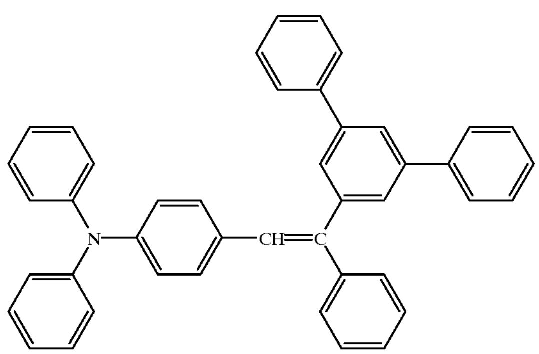
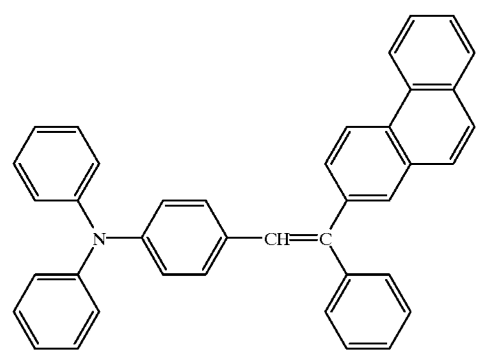
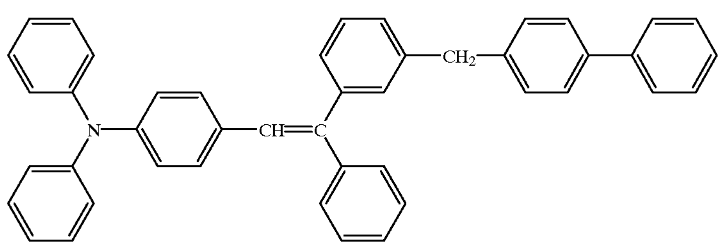

-continued
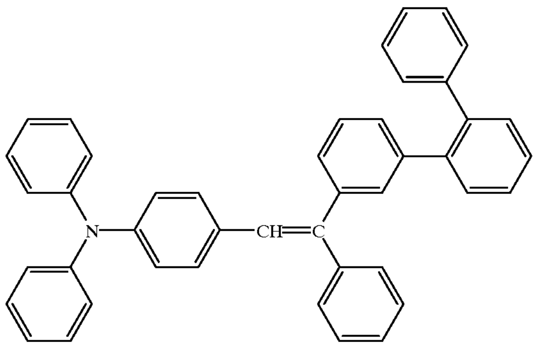
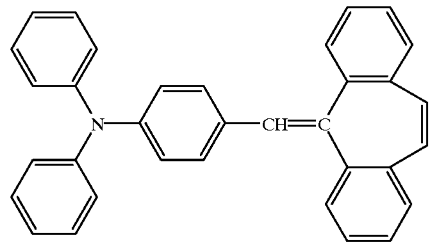
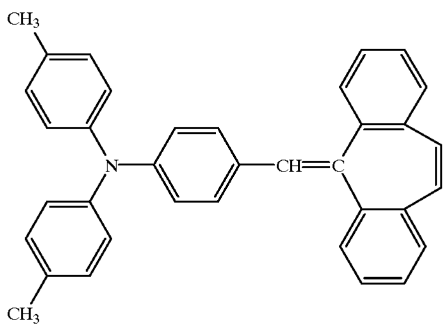
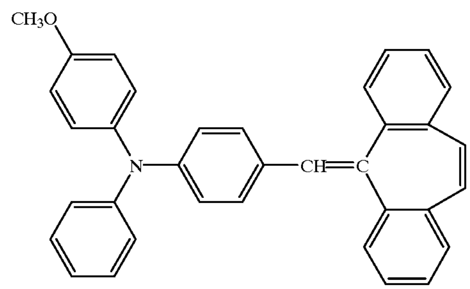
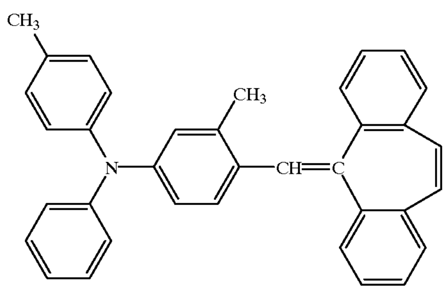
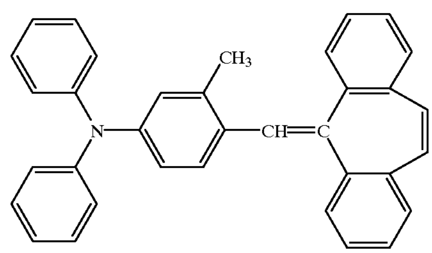
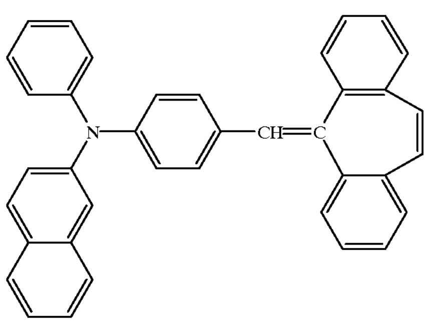
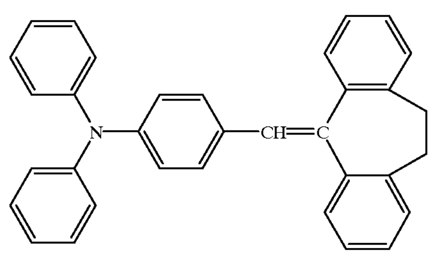
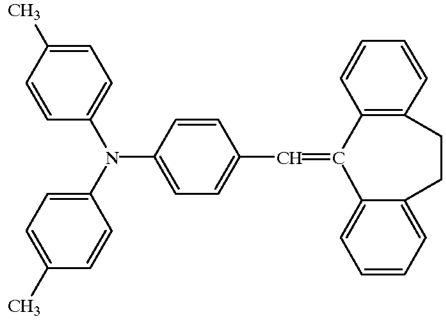
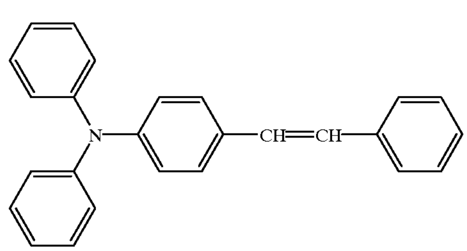

-continued
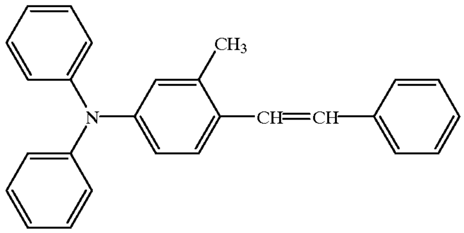
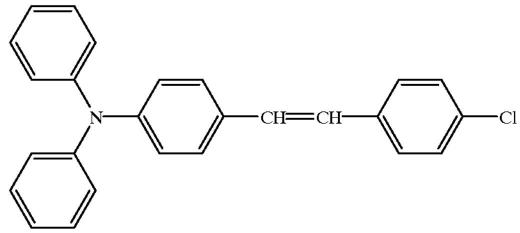
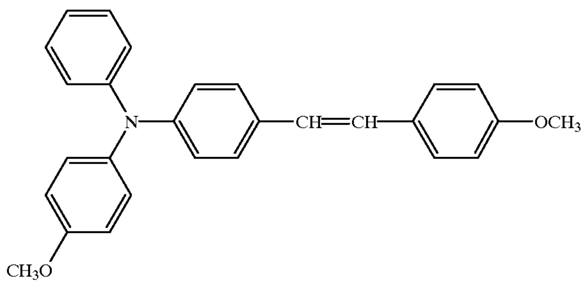
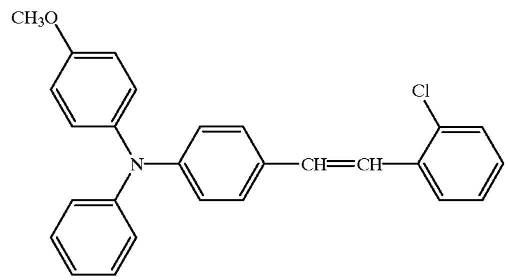
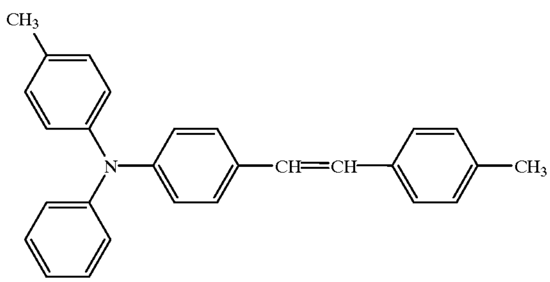
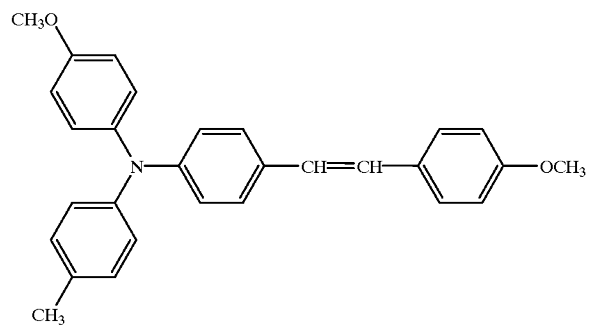
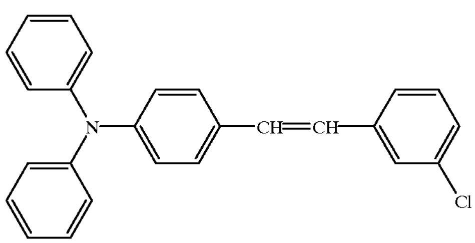
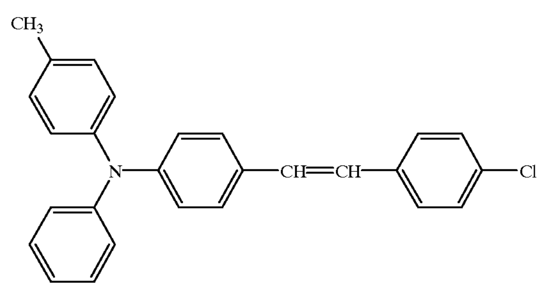
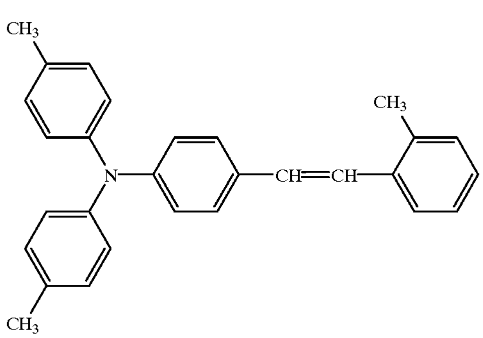
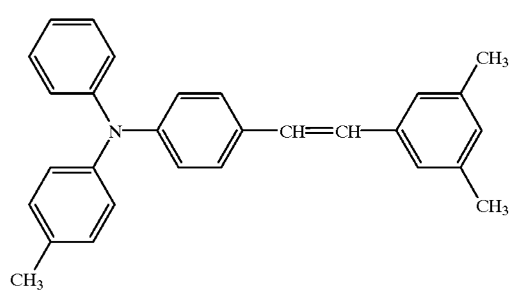

-continued
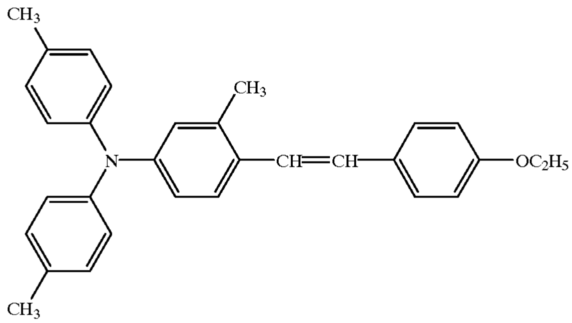
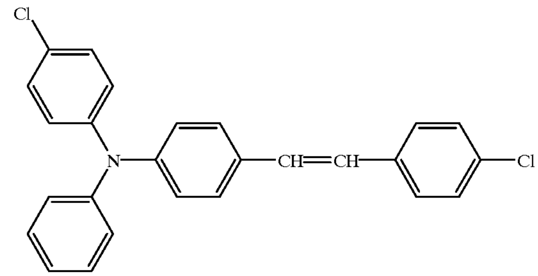
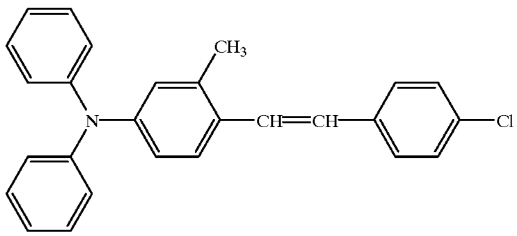
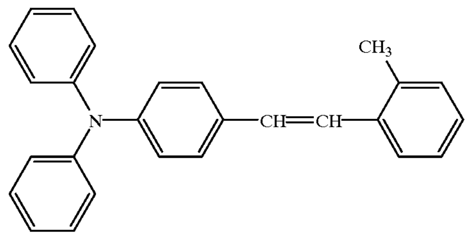
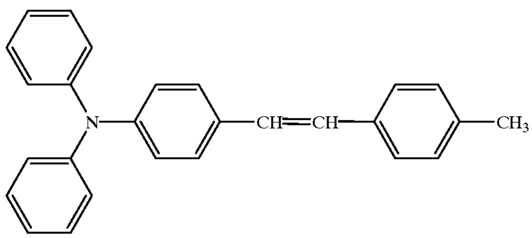
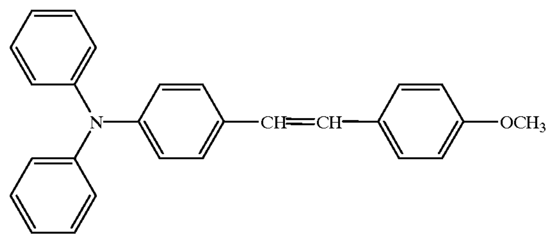
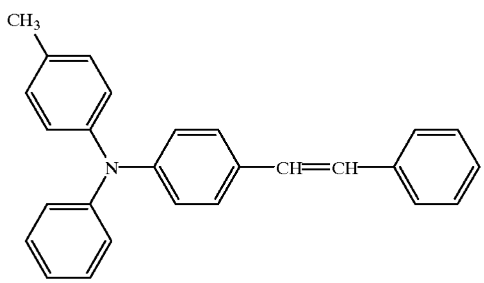
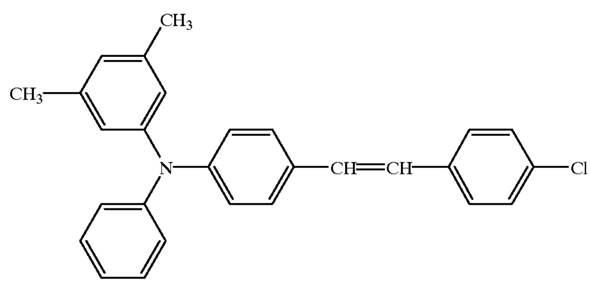
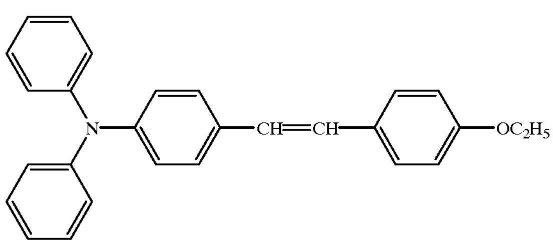
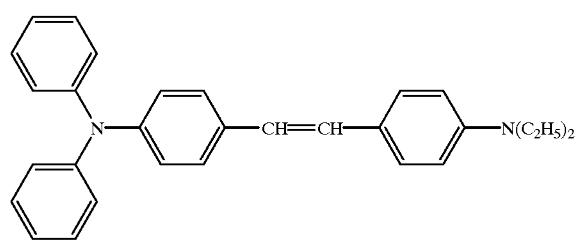
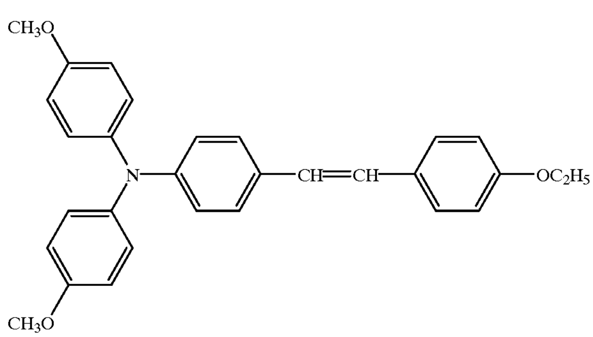
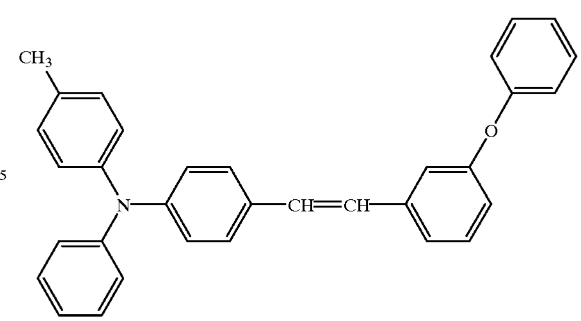

-continued
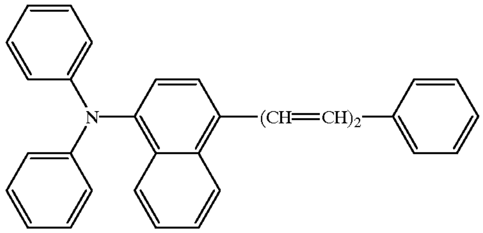
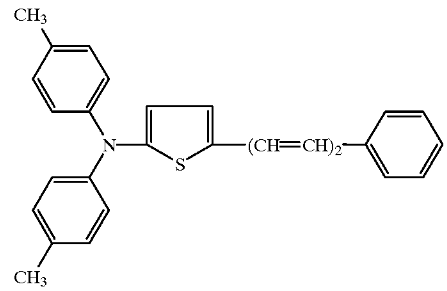
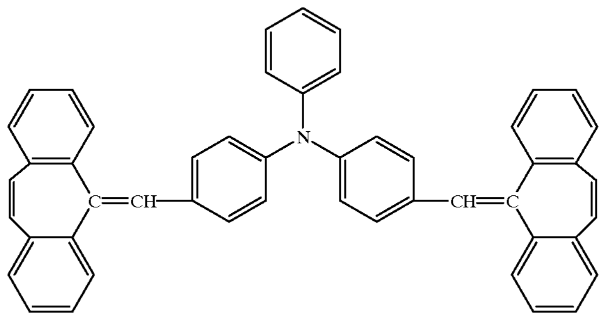
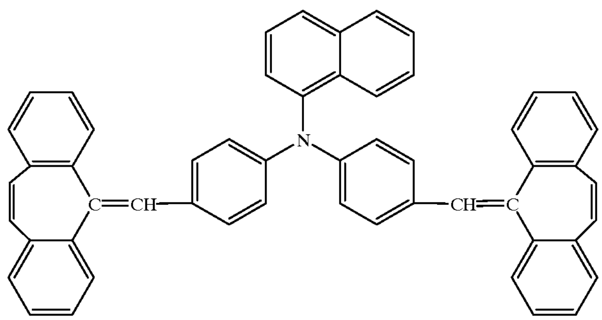
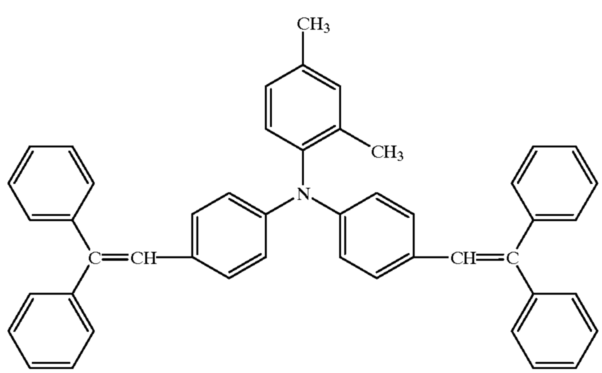
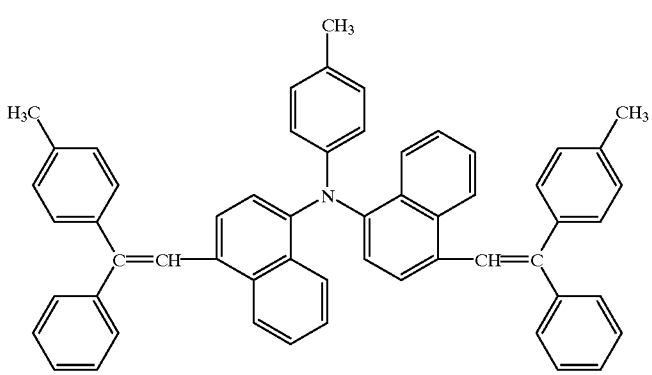

-continued
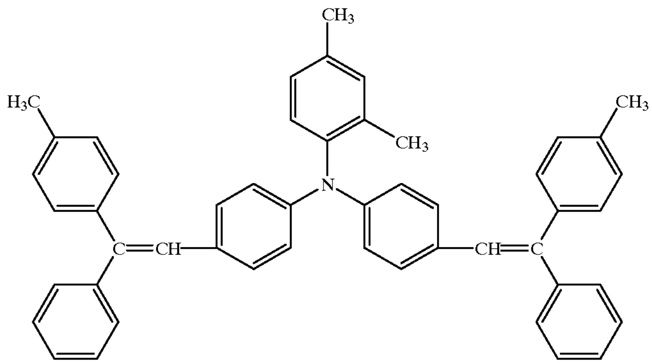
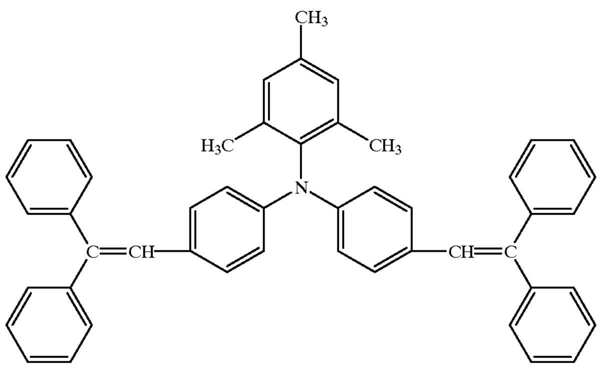
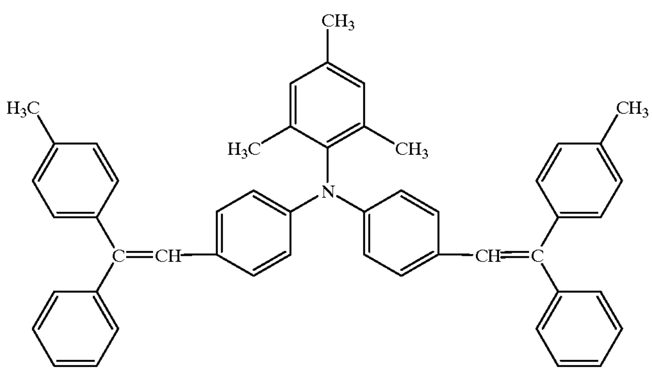
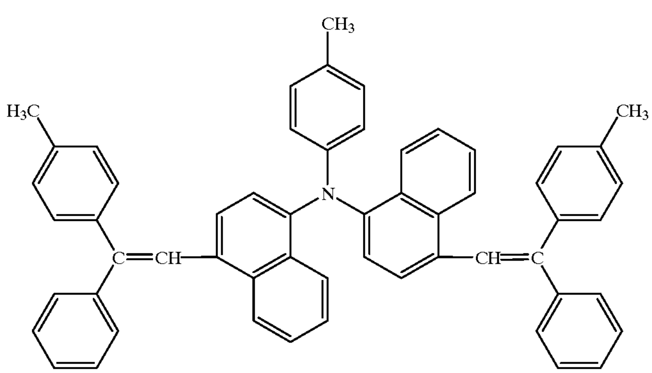

-continued
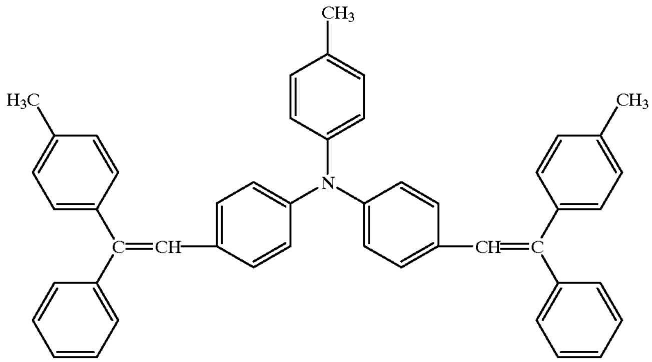
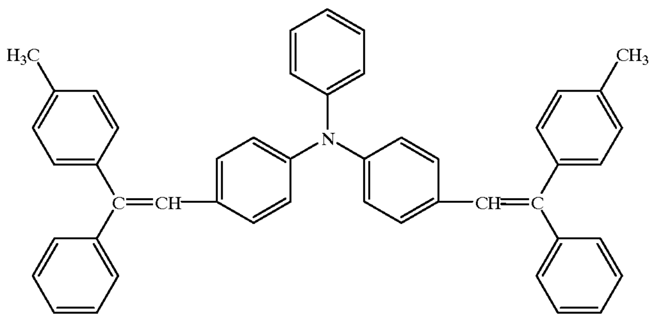
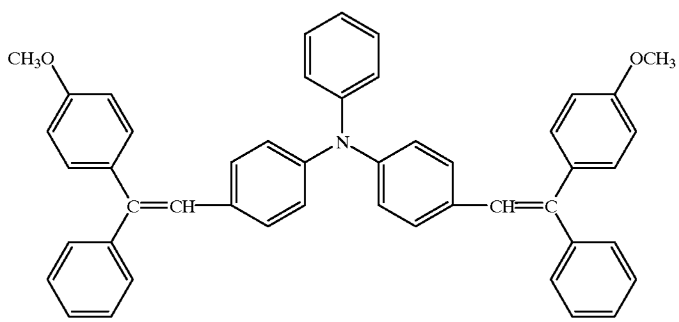
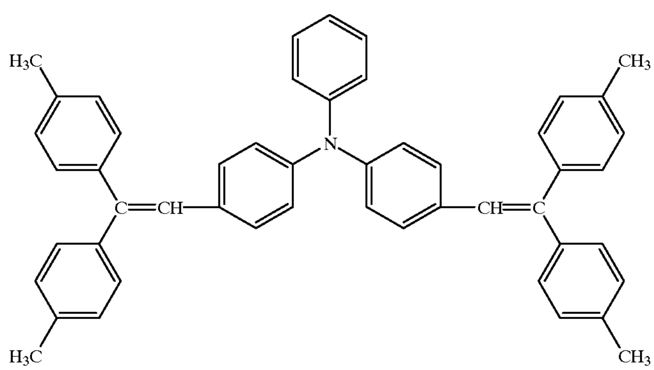

-continued
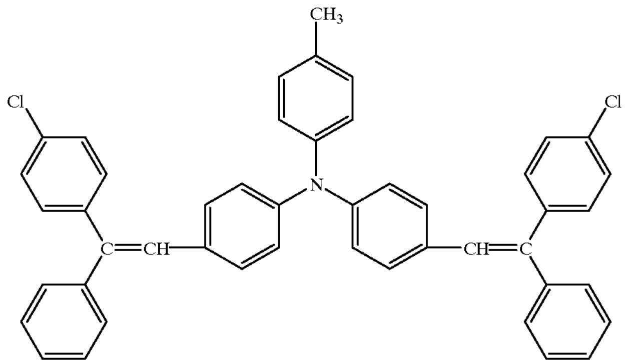
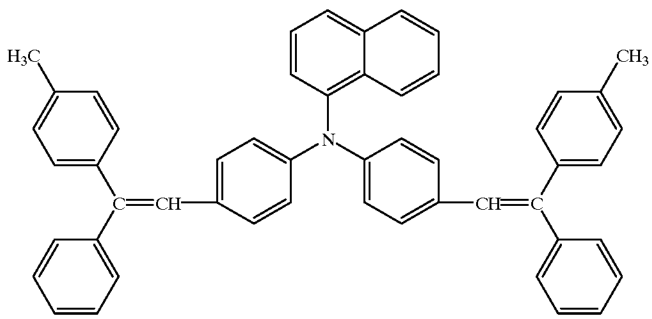
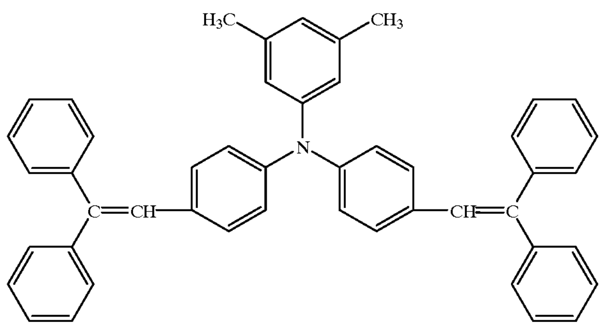
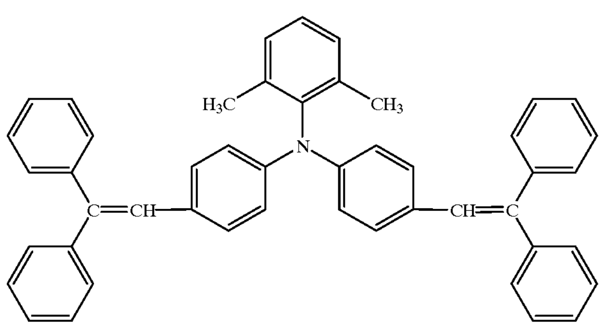
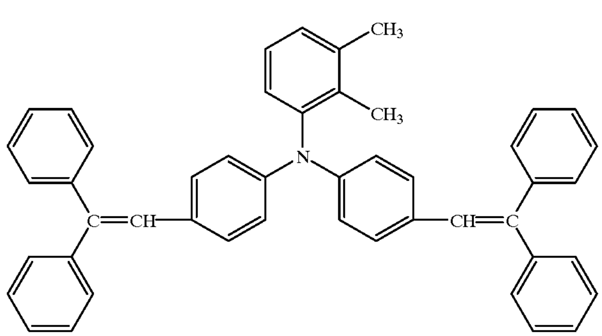

-continued
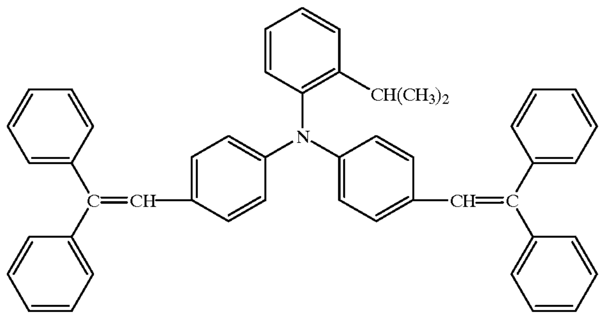
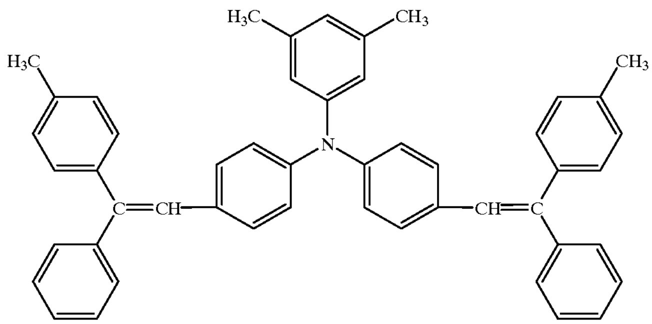
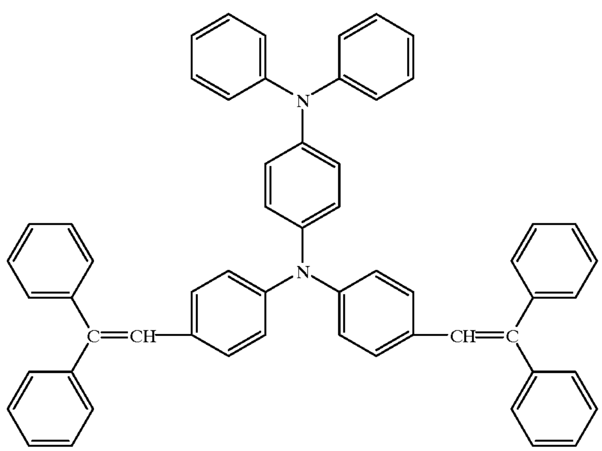
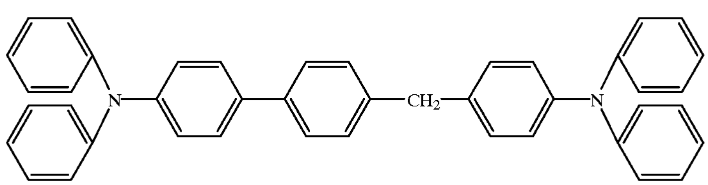
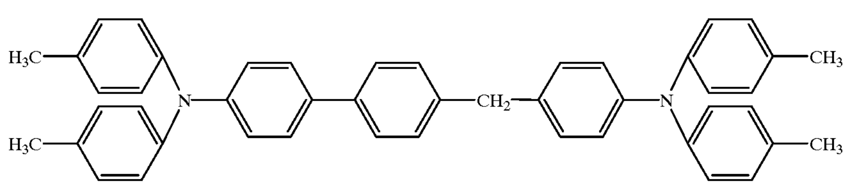
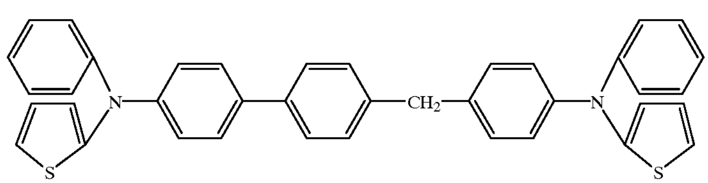

-continued
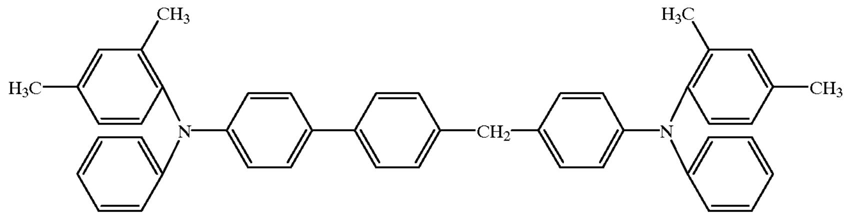
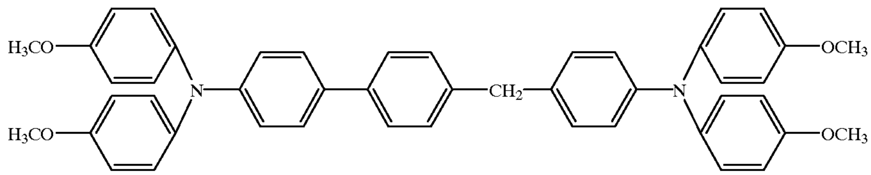
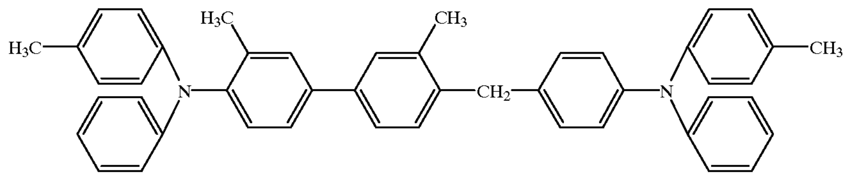
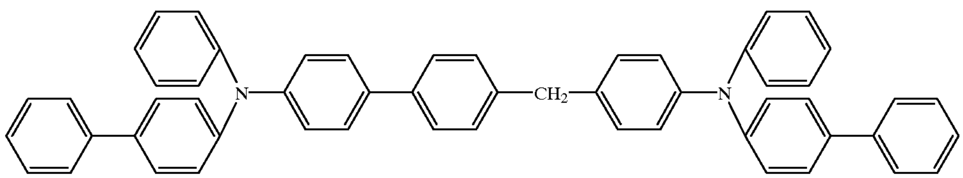
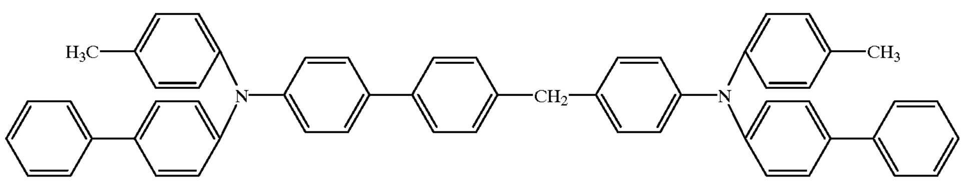
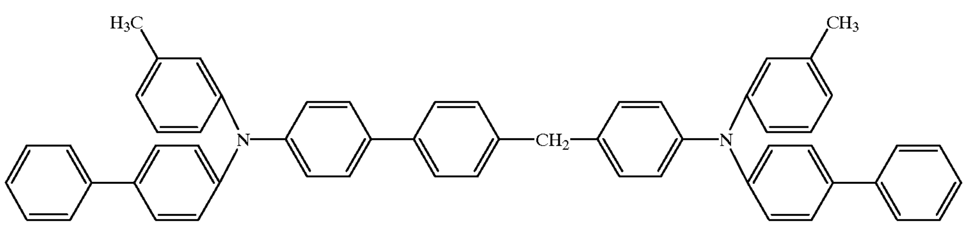
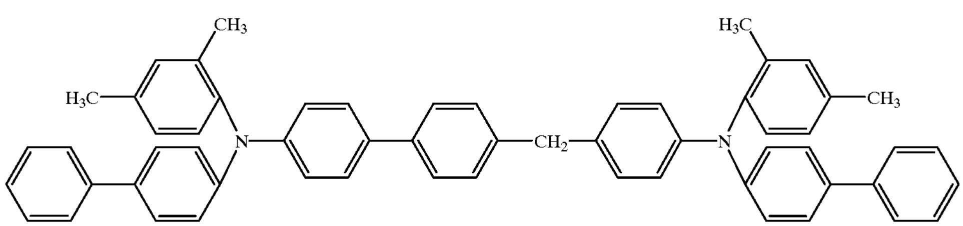
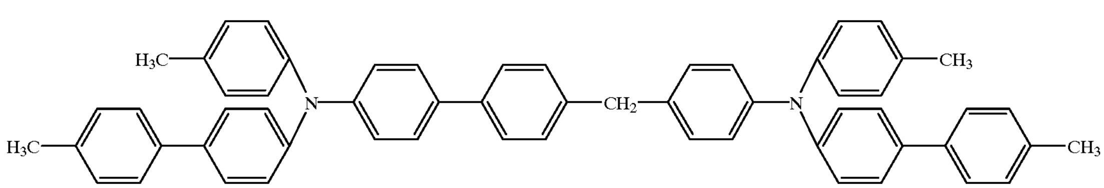

-continued
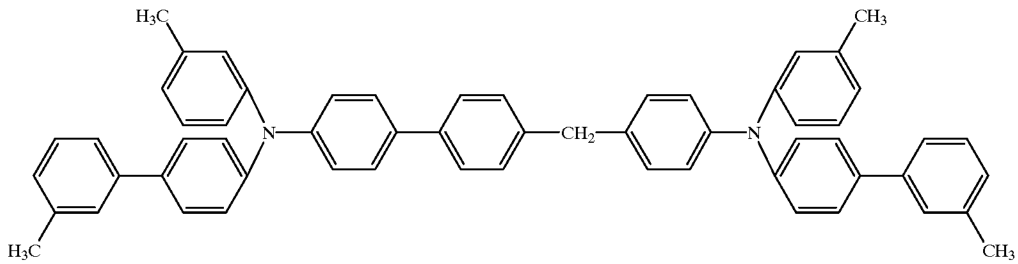
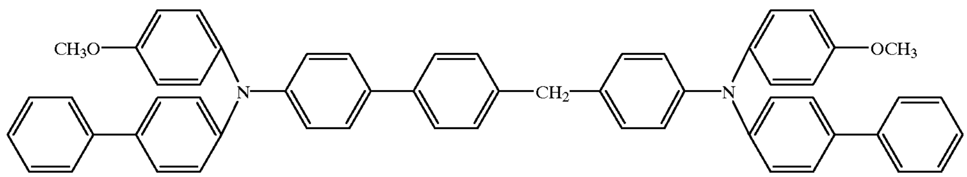
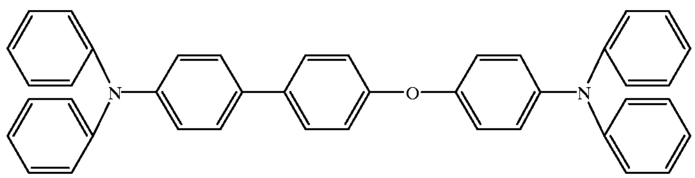
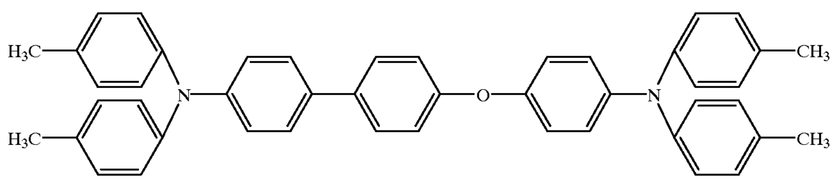
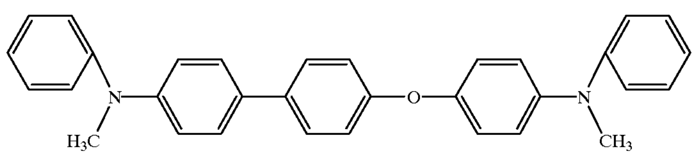
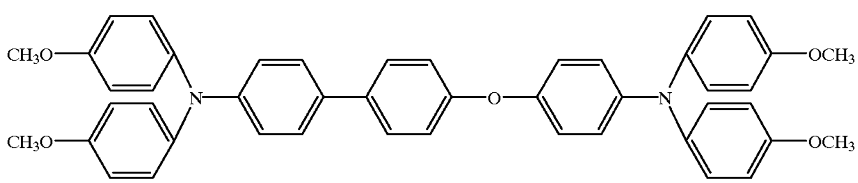
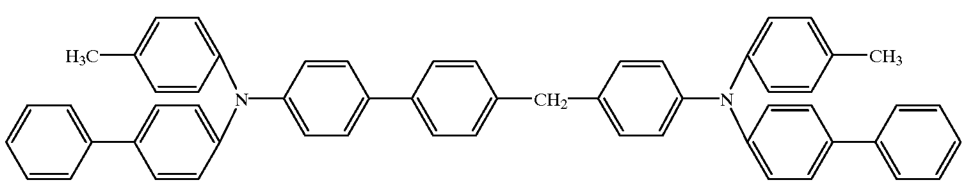
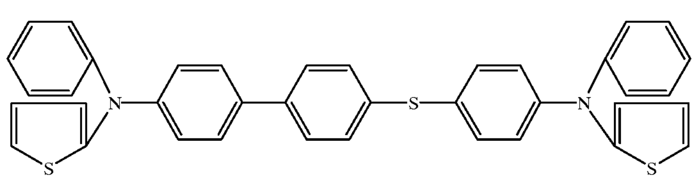
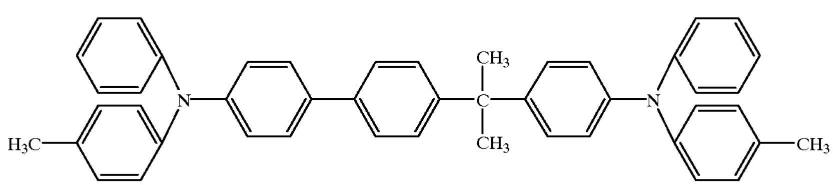

-continued
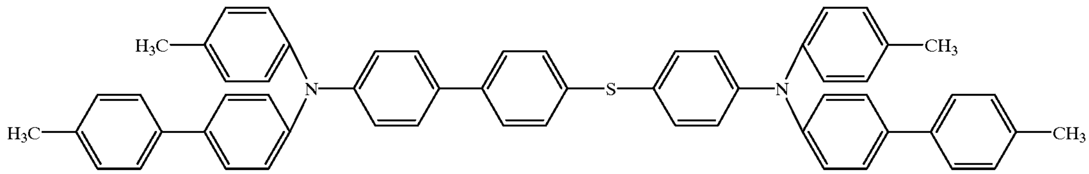
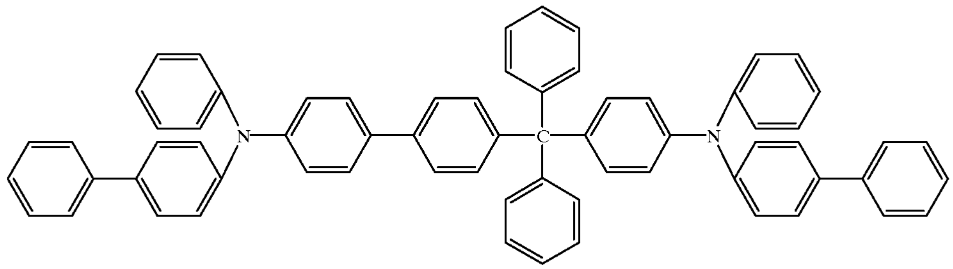
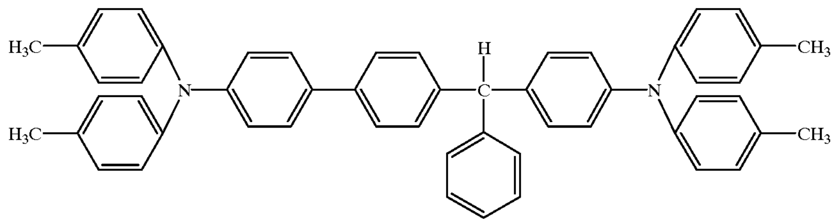
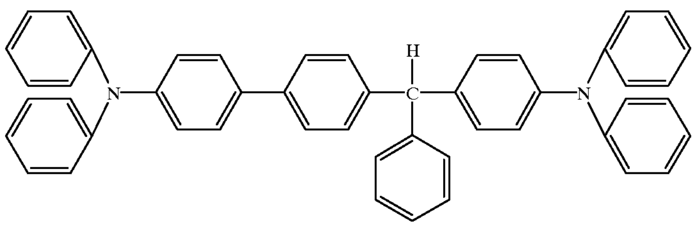
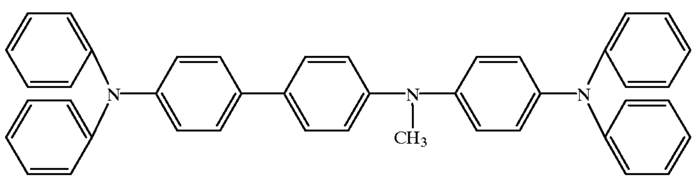
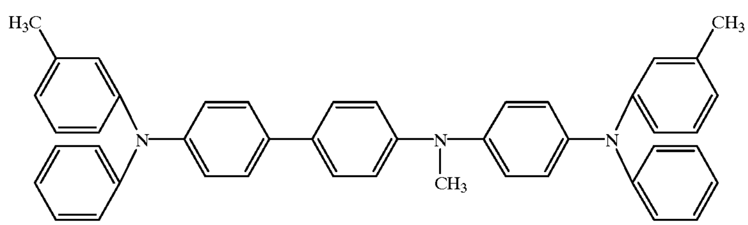
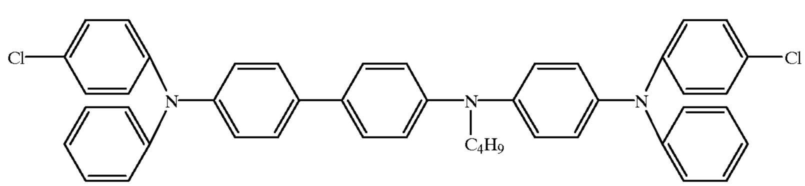
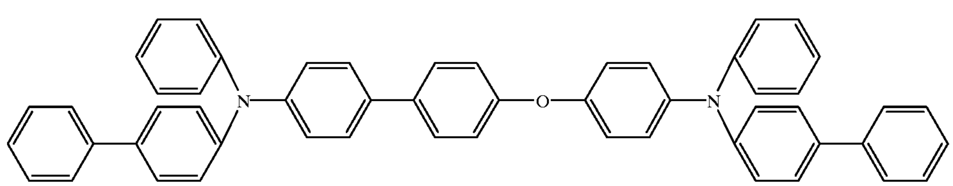

-continued
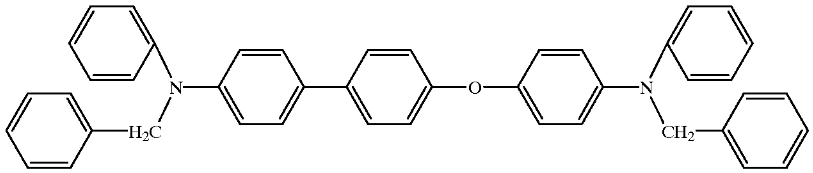
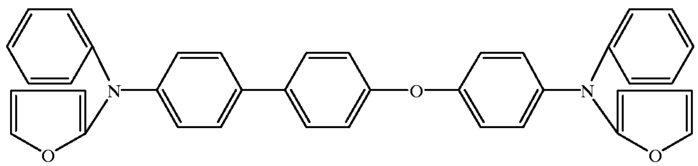
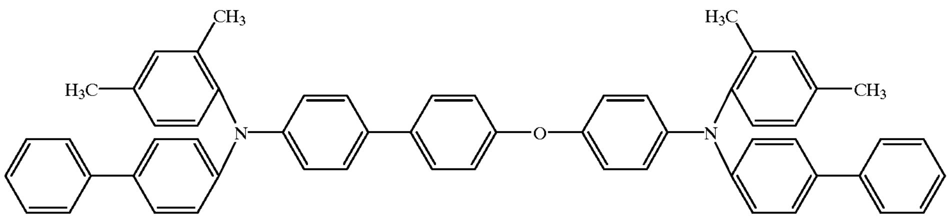
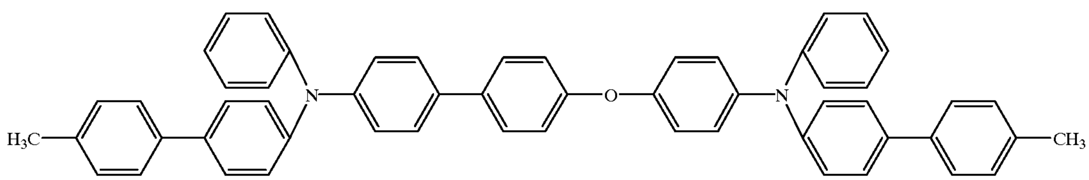
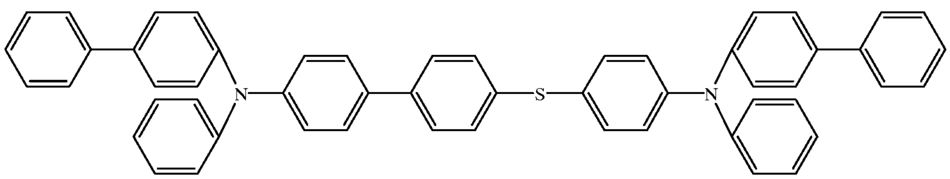
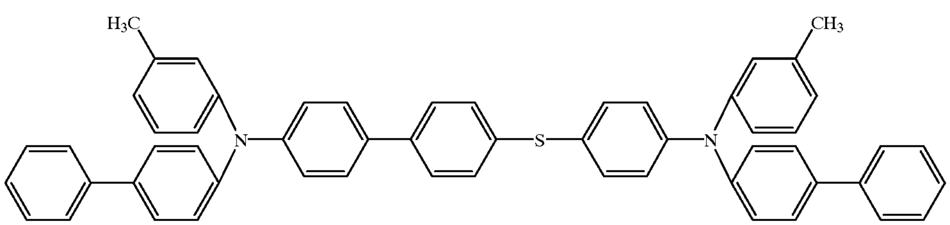
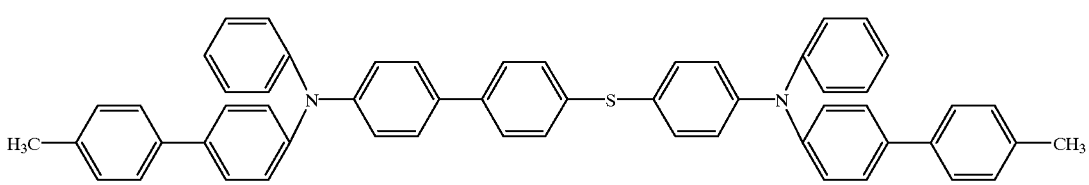
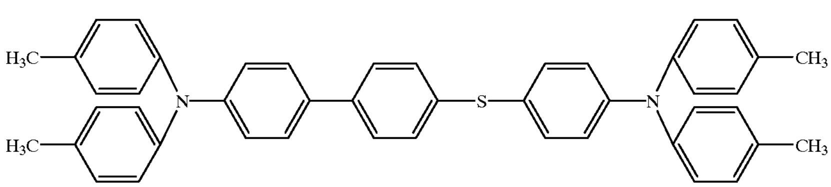

-continued
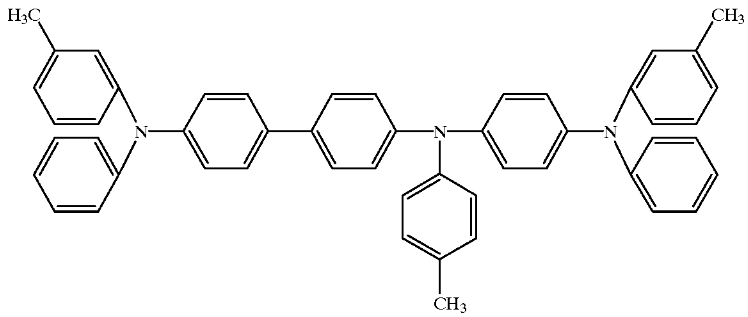
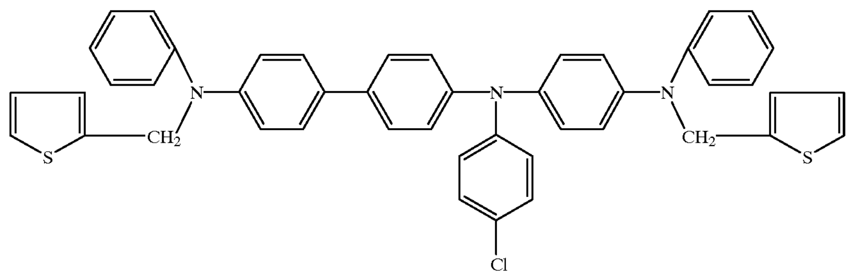
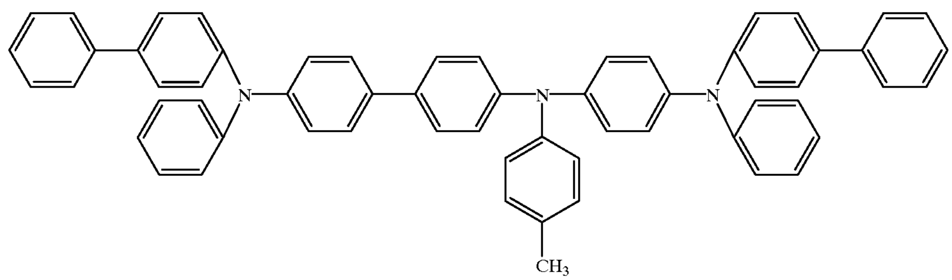
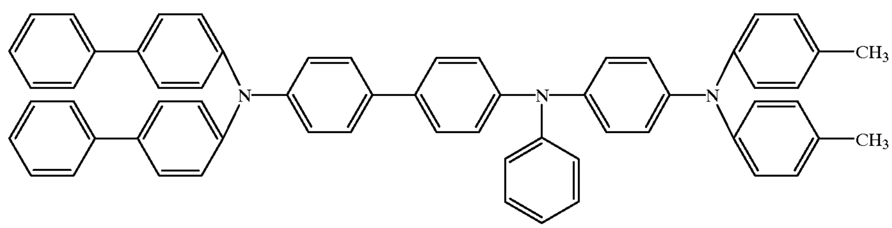
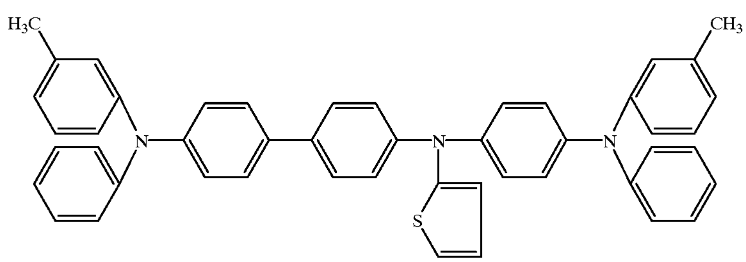
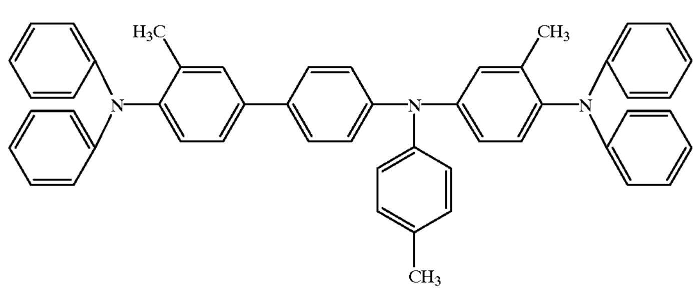

-continued
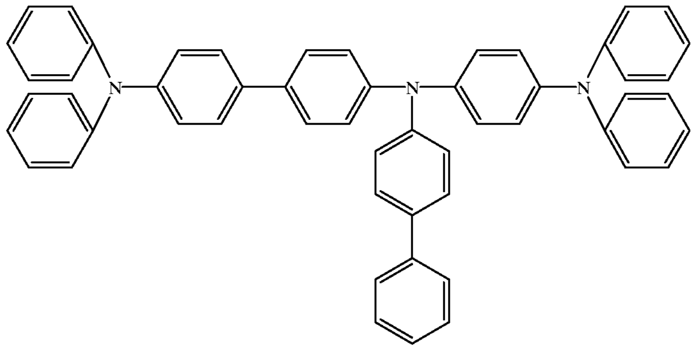
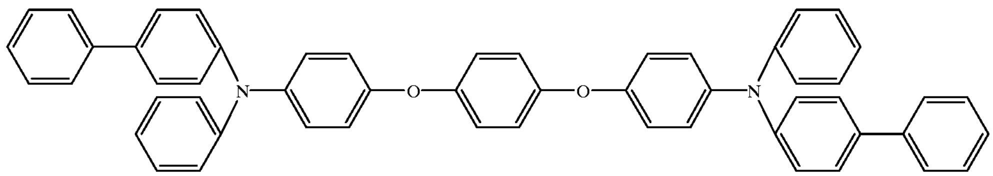
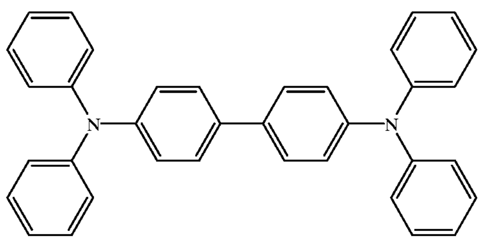
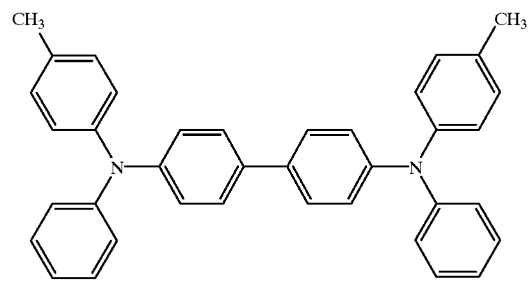
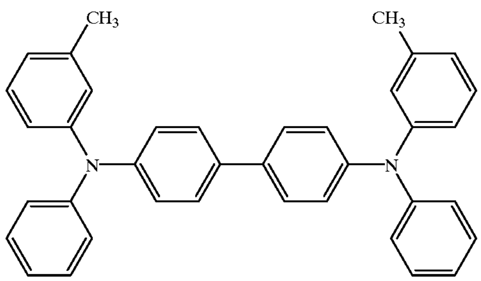
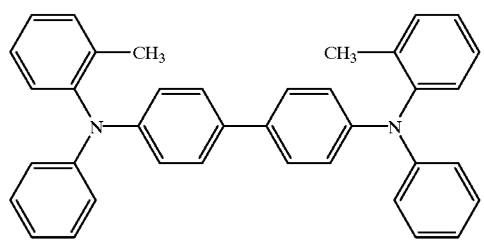
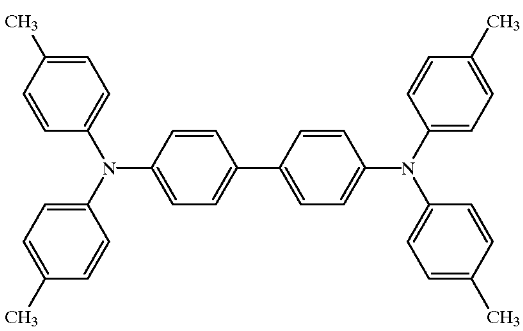
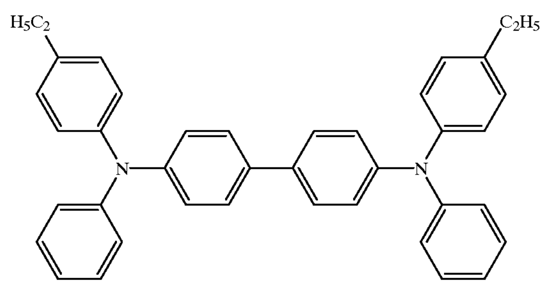
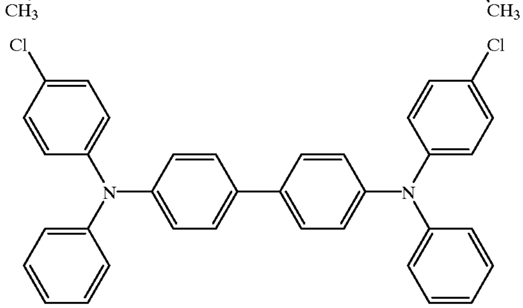
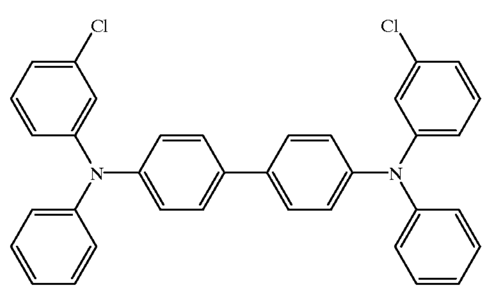

-continued
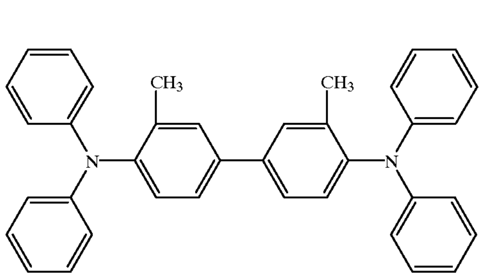
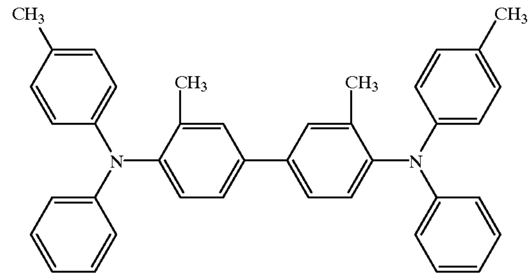
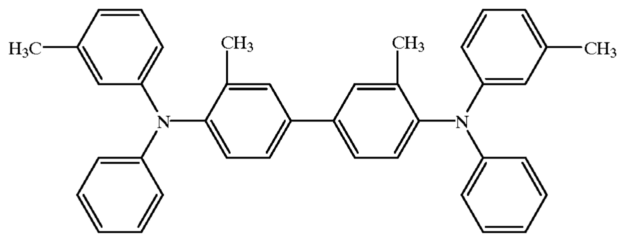
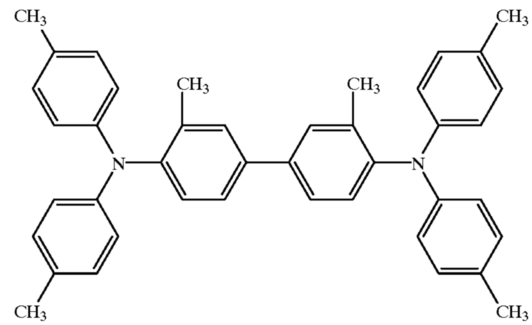
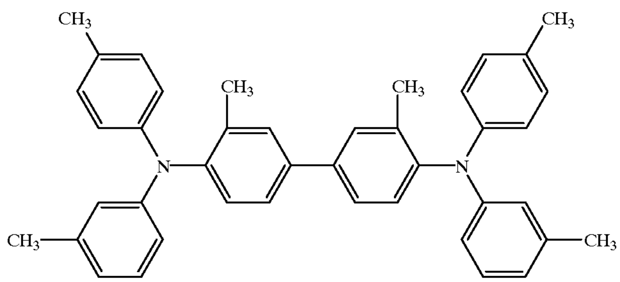
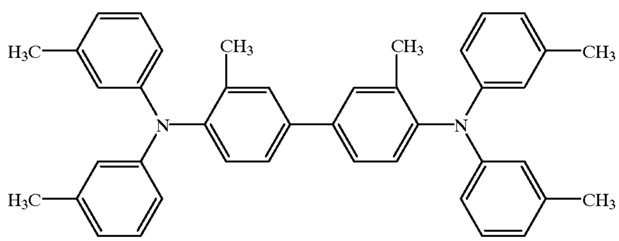
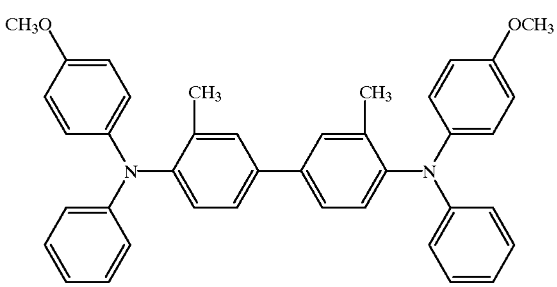
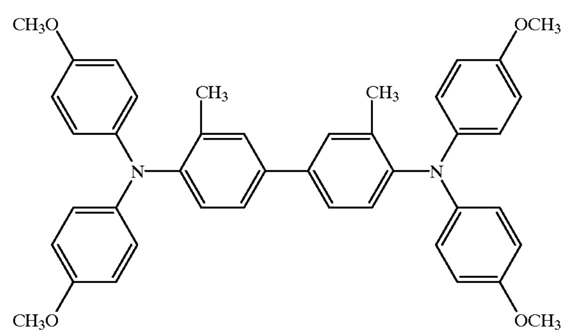

-continued
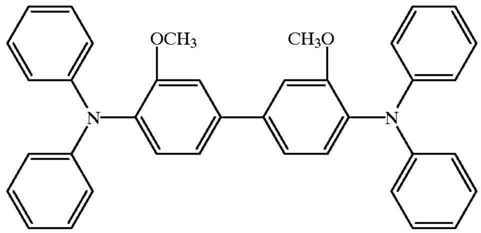
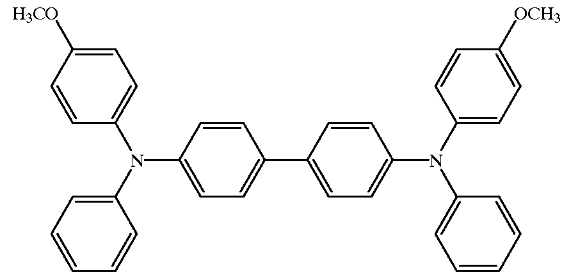
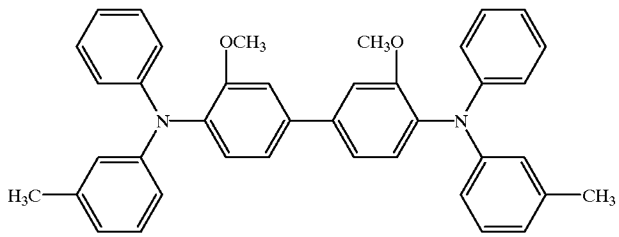
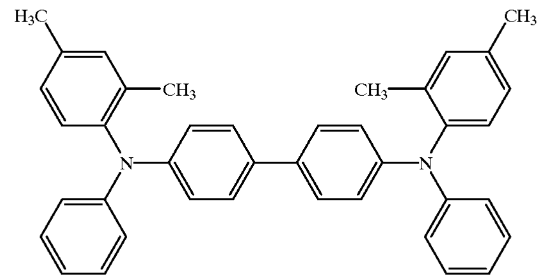
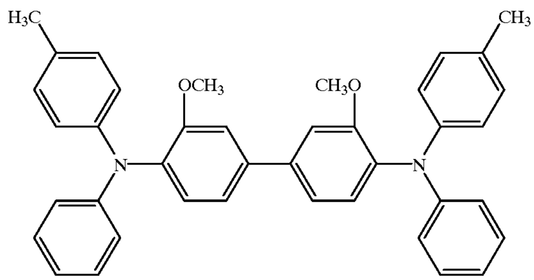
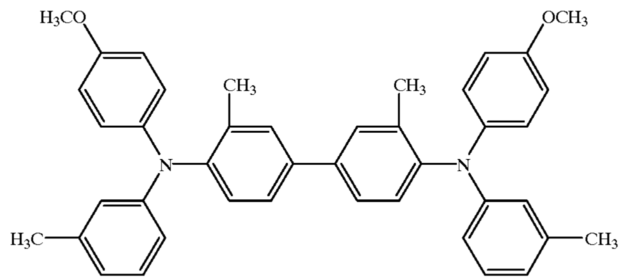
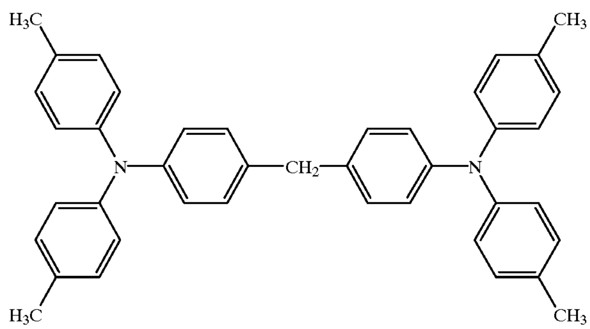
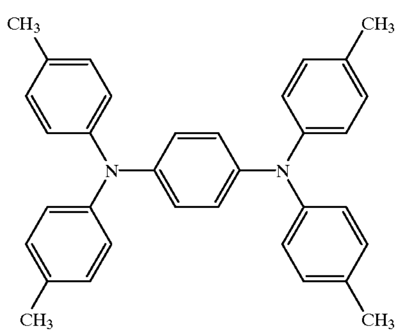
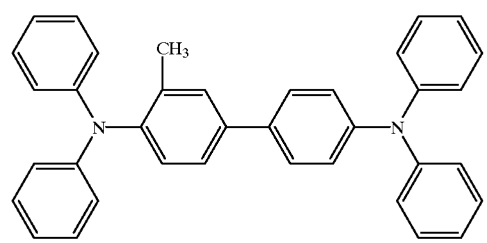

-continued
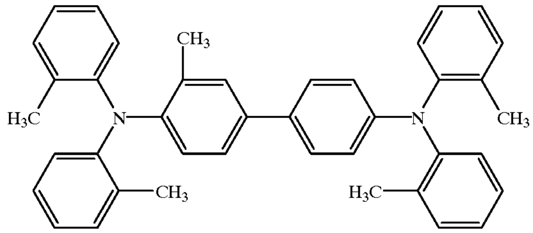
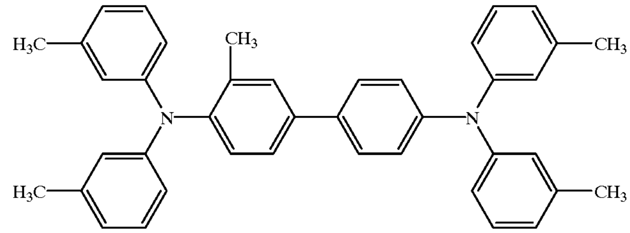
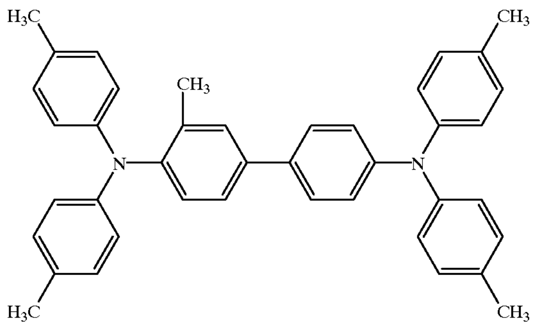
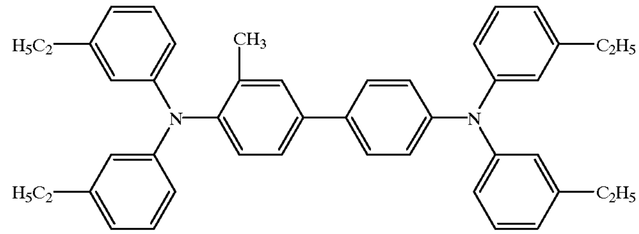
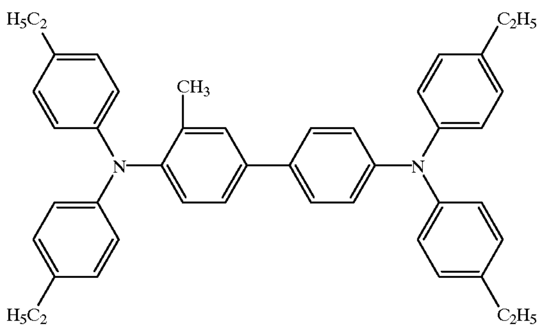
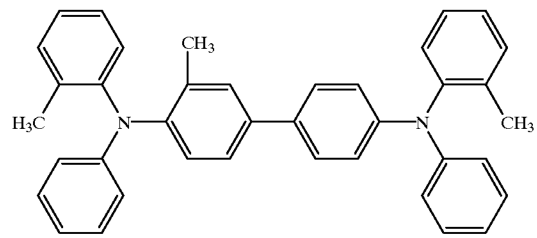
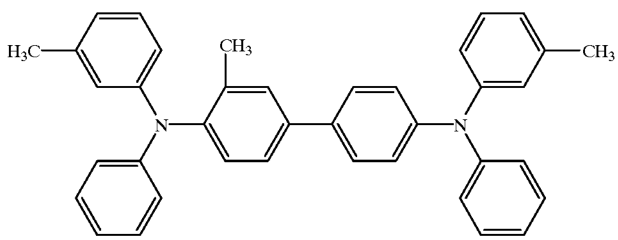
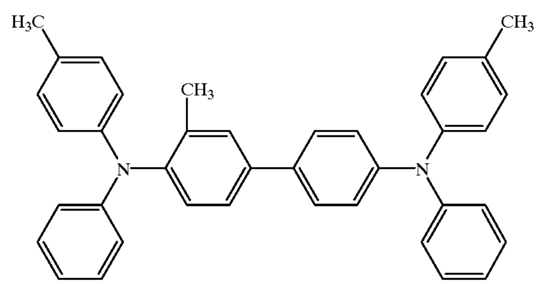
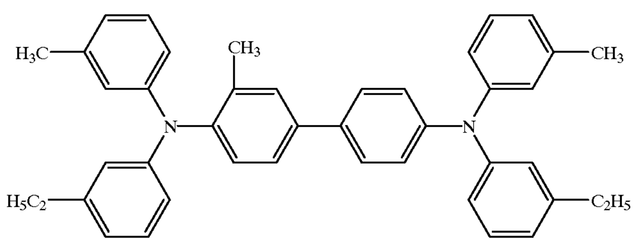

-continued
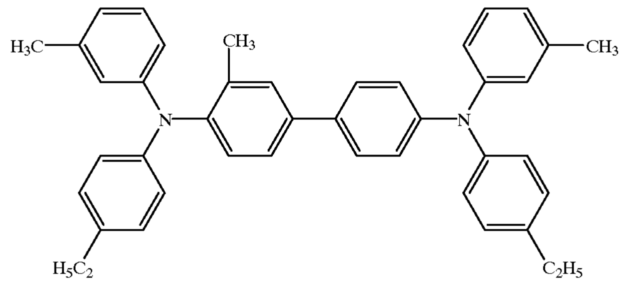
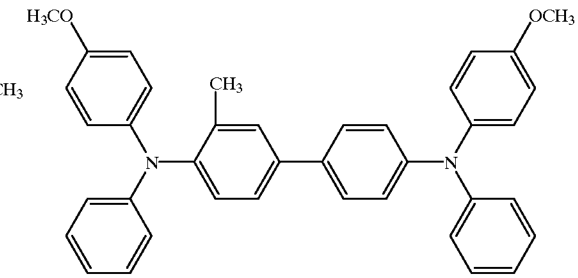
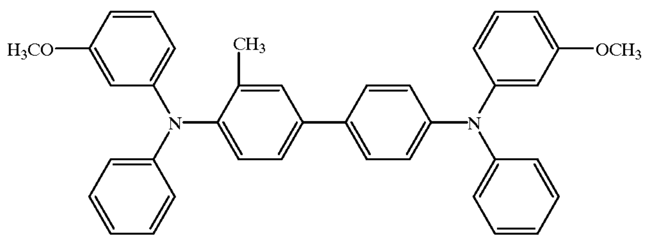
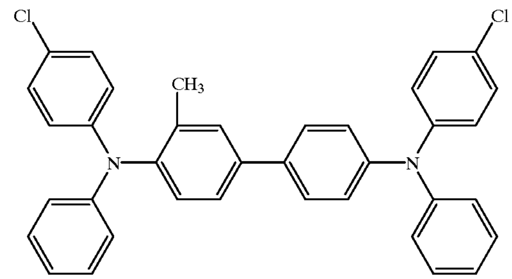
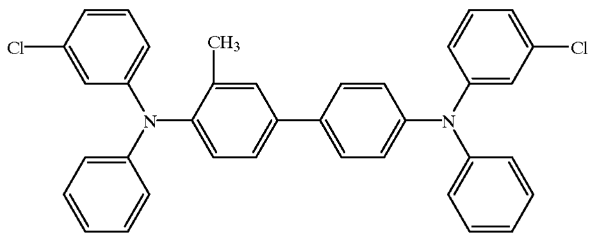
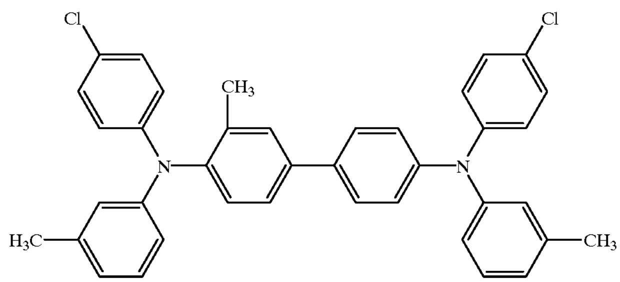
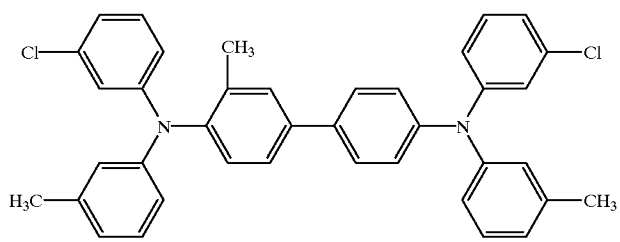
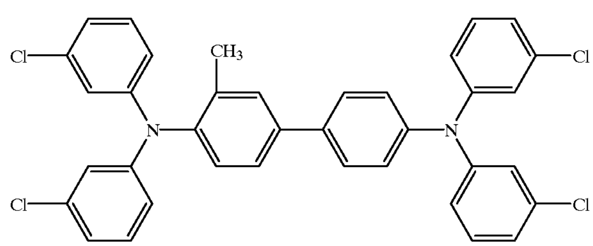

-continued
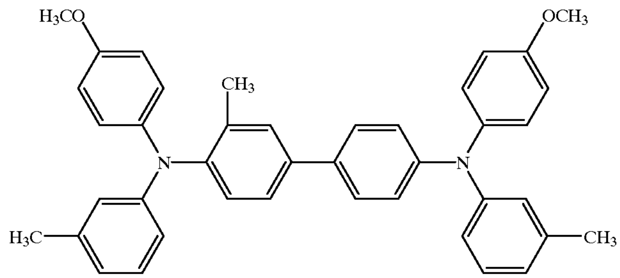
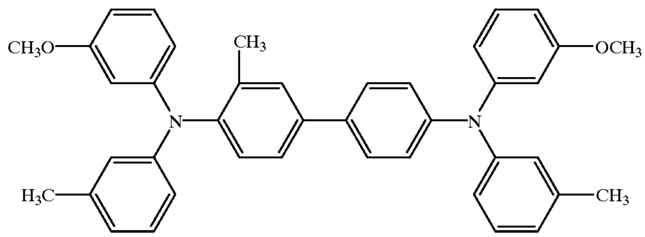
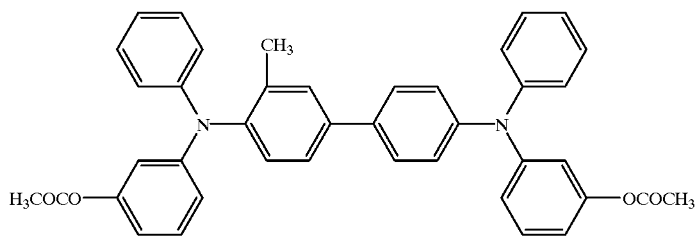
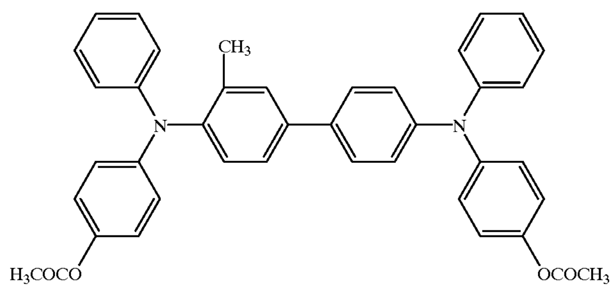
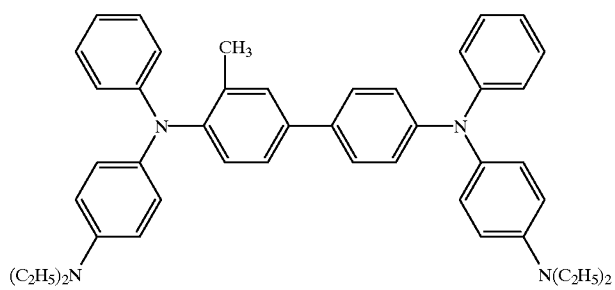
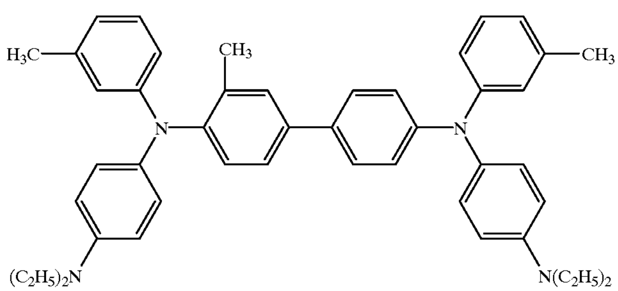

-continued
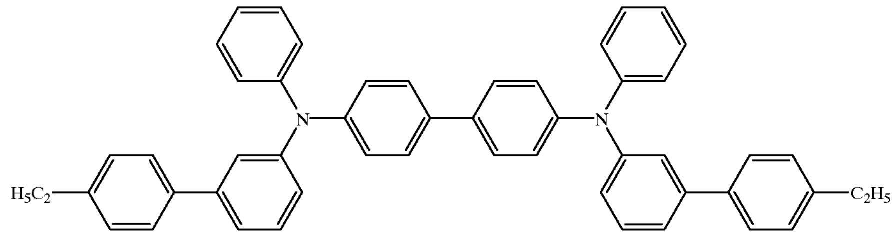
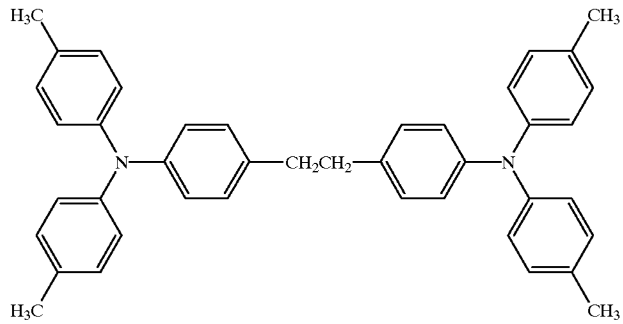
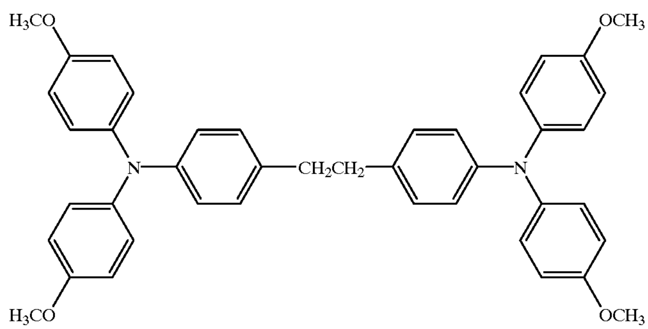
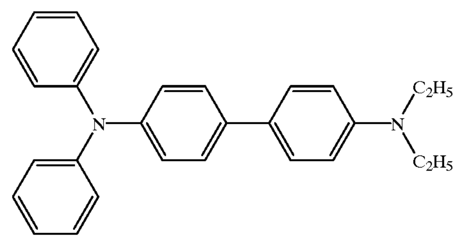
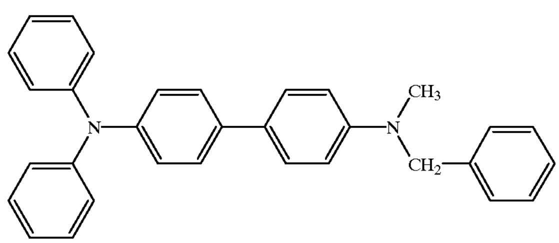
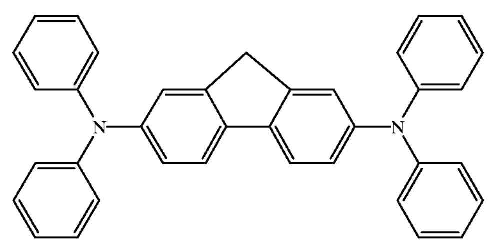
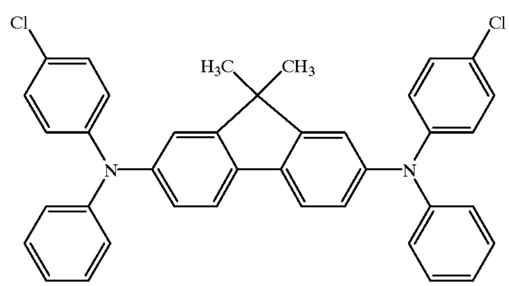
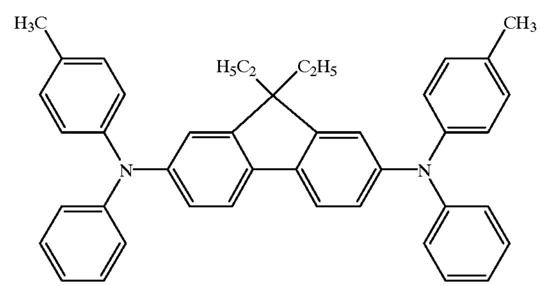
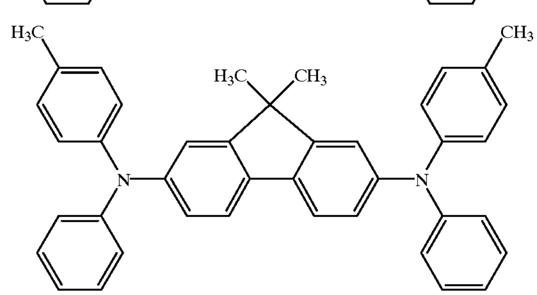
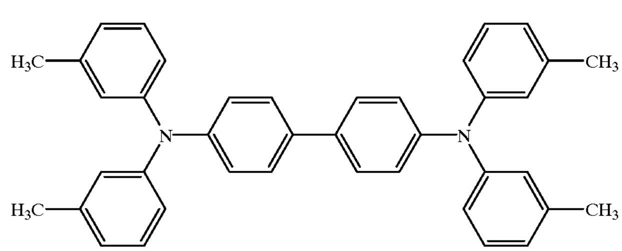

-continued
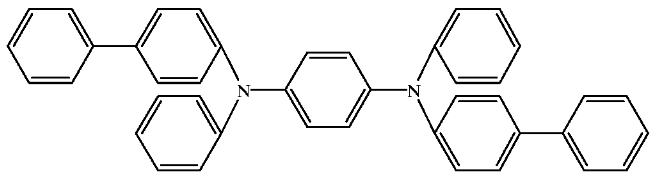
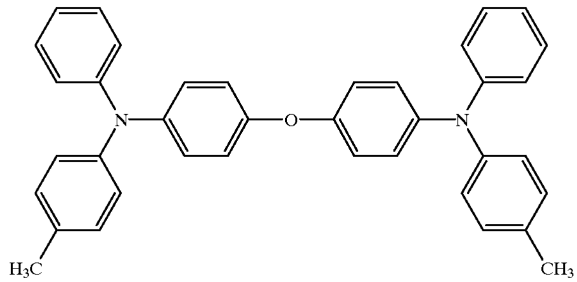
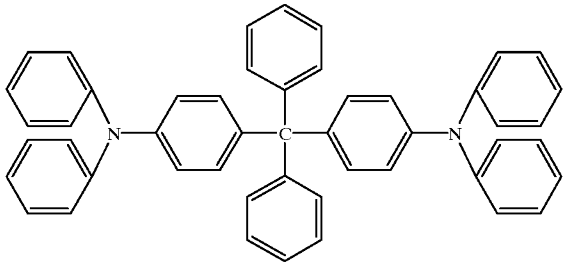
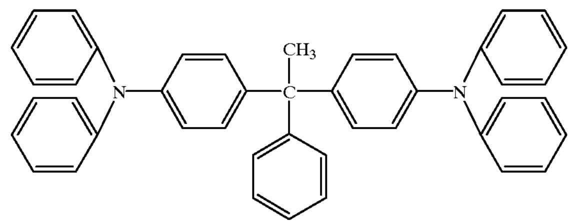
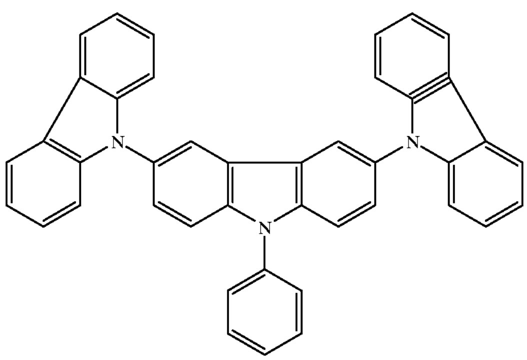
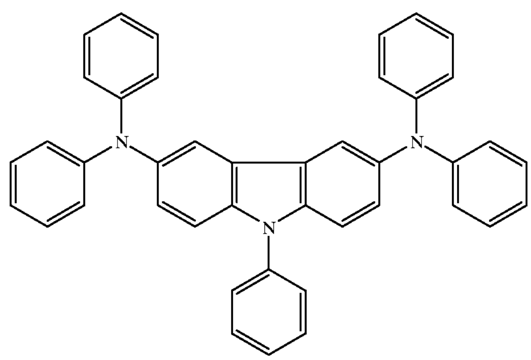
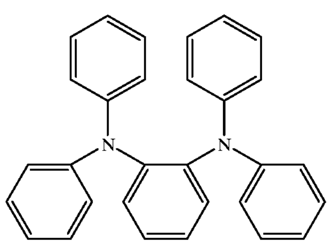
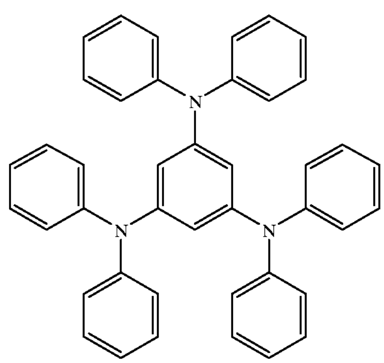
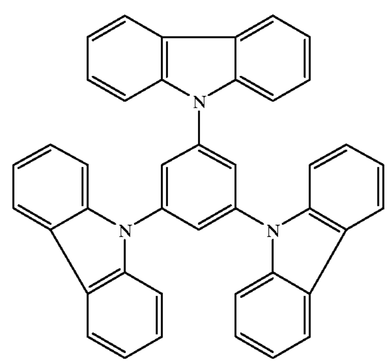

-continued
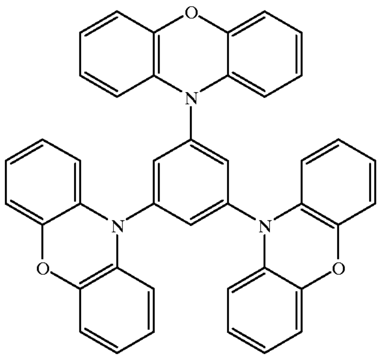
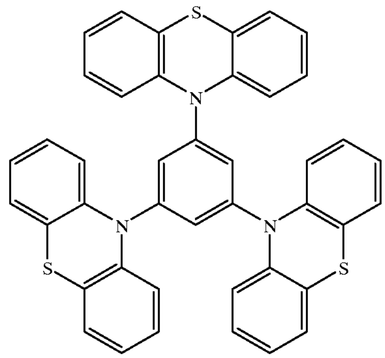
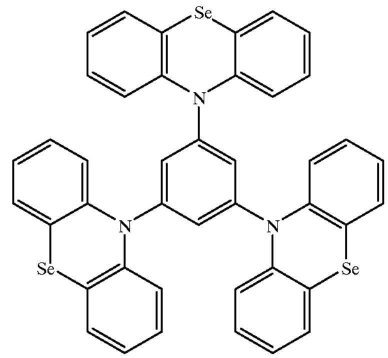
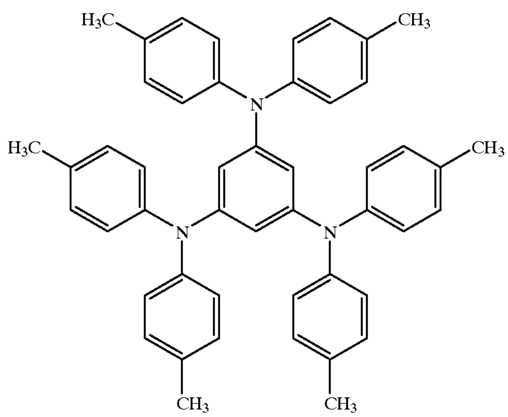
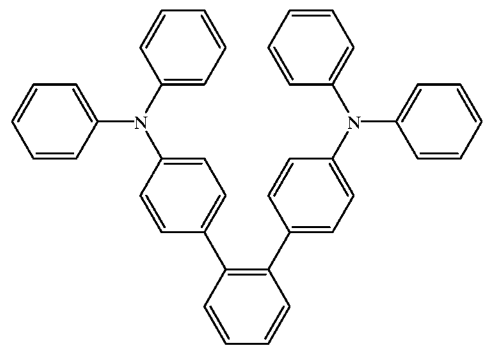
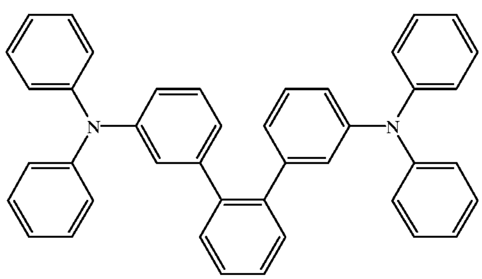
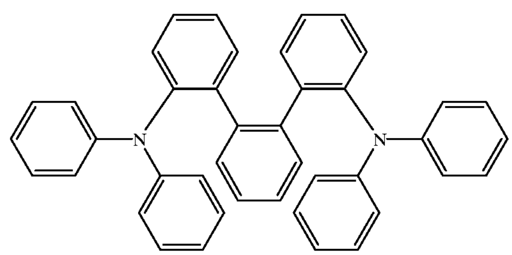
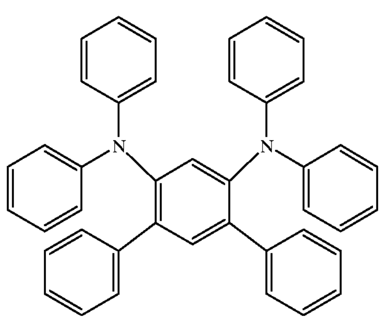
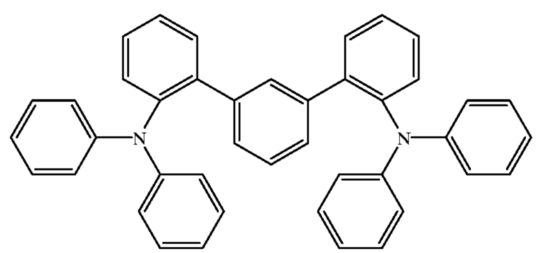
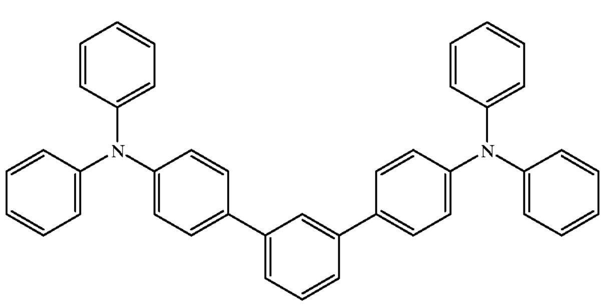

-continued
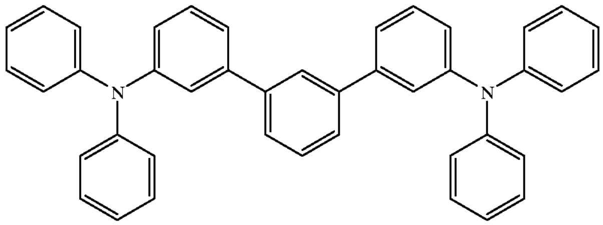
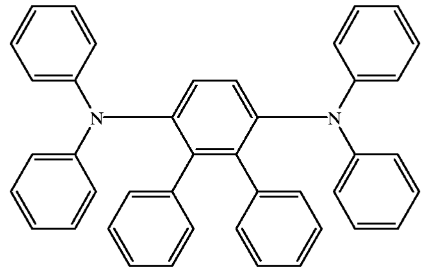
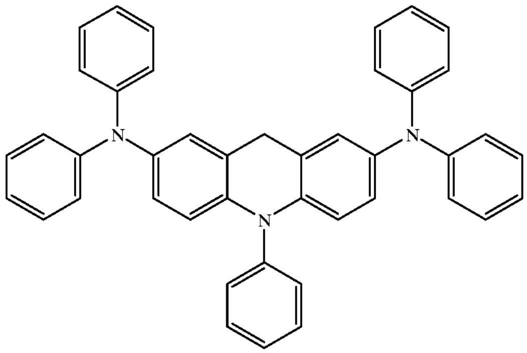
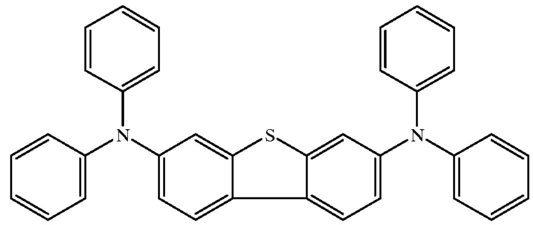
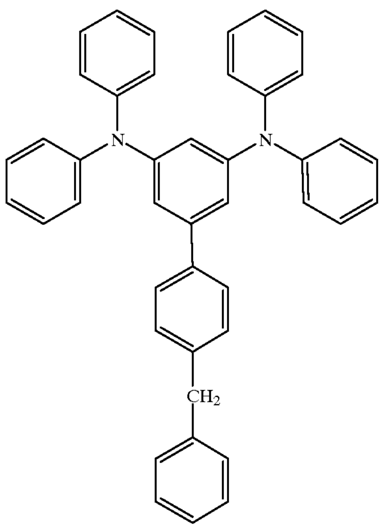
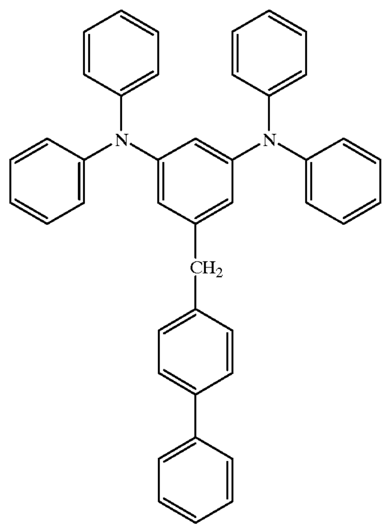
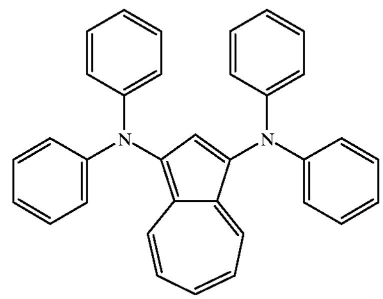
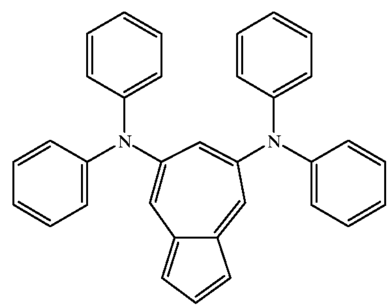
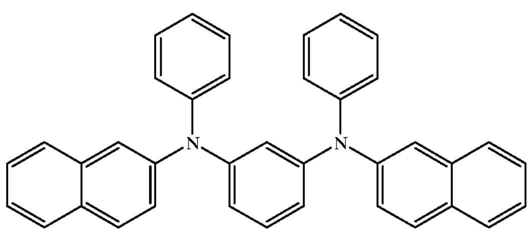
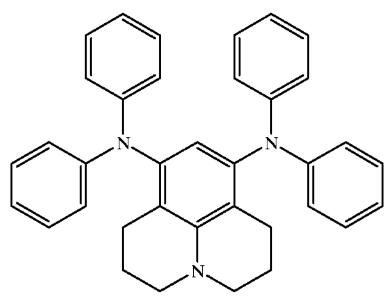

-continued
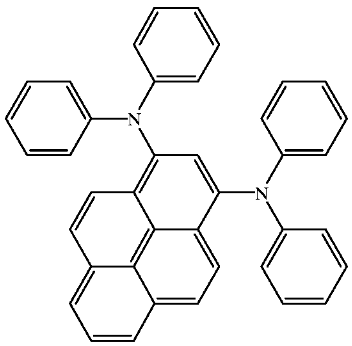
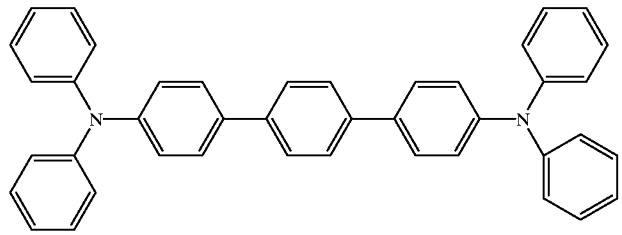
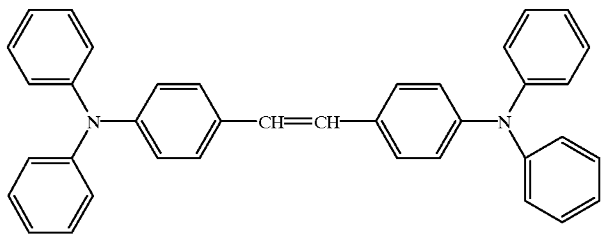
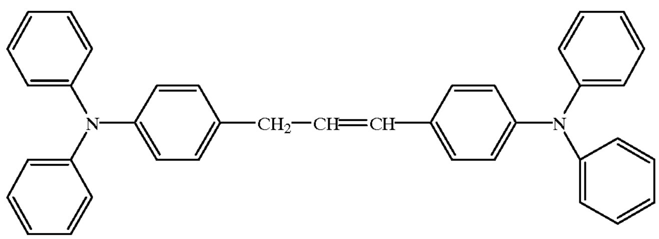
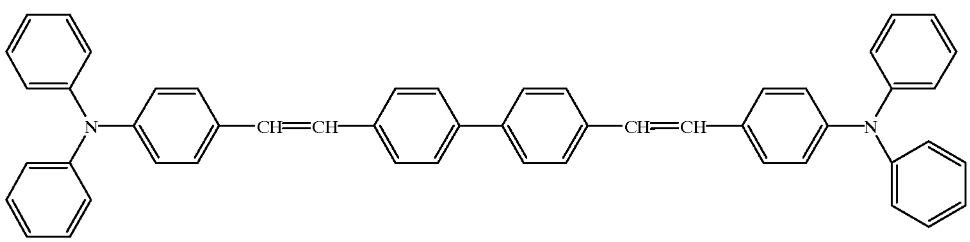
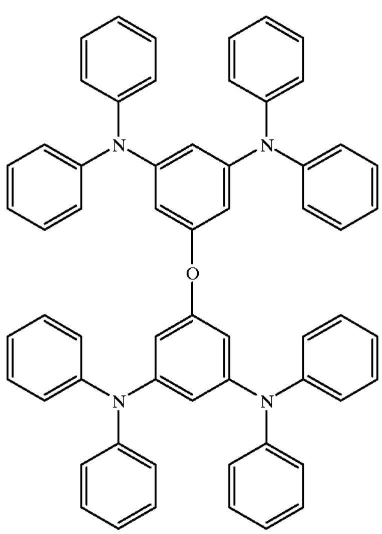
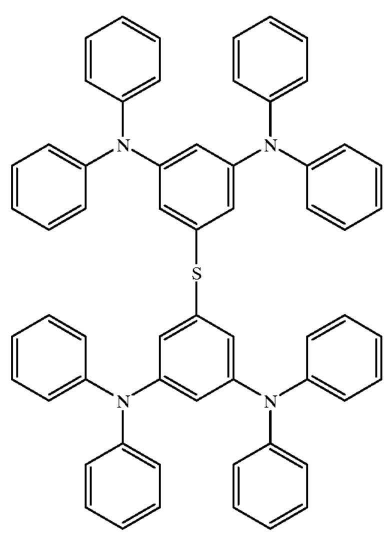

-continued
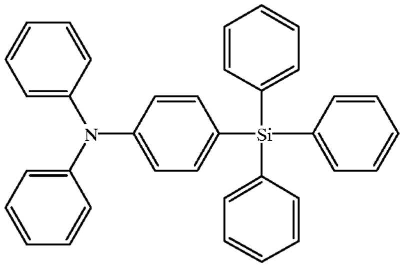
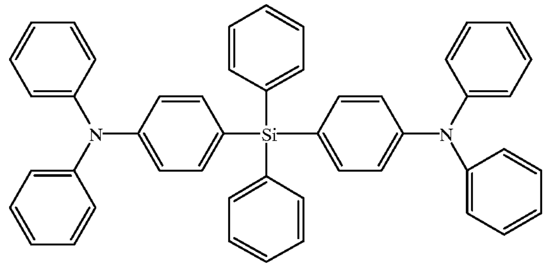
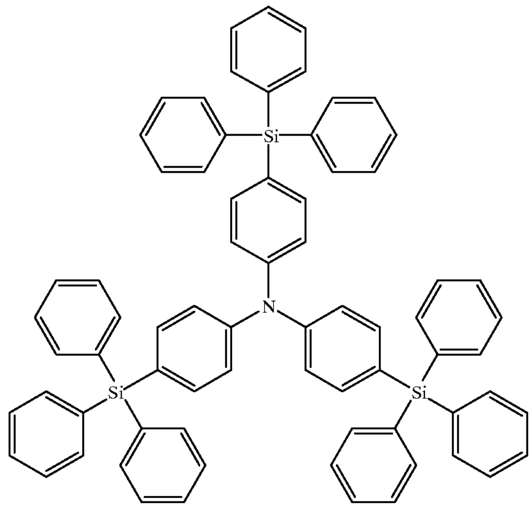
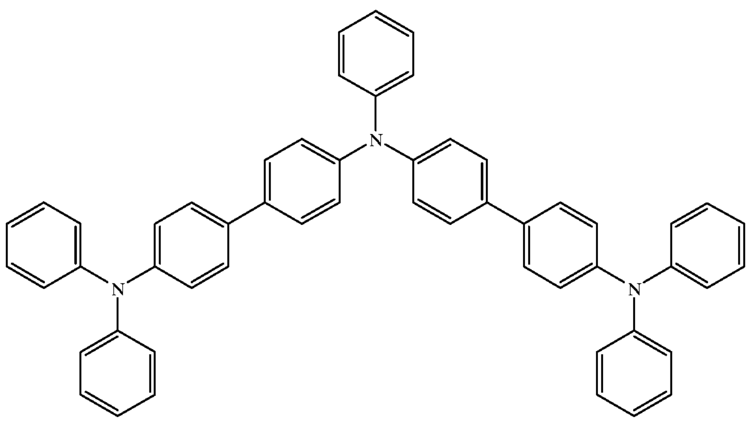
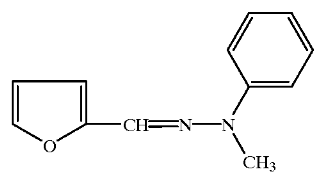
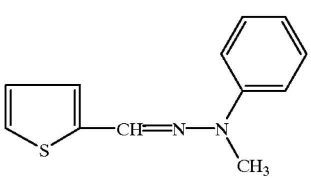
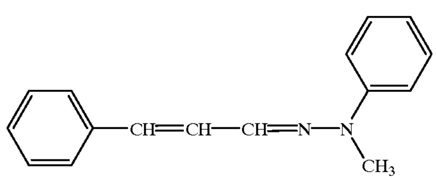
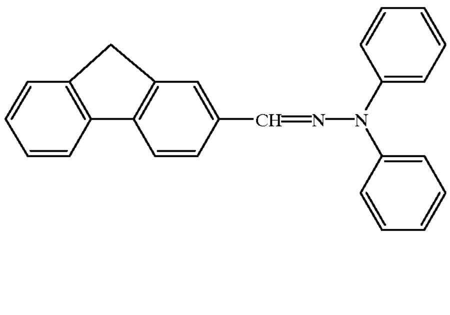
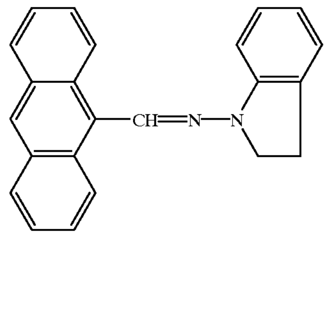

-continued
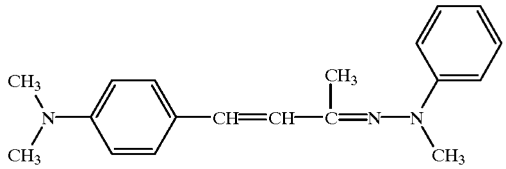
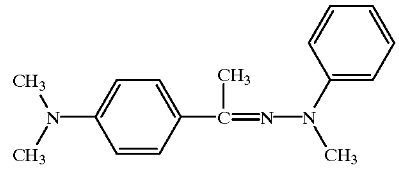
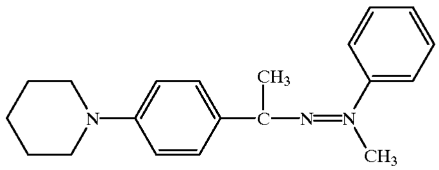
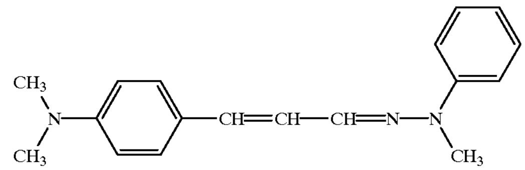
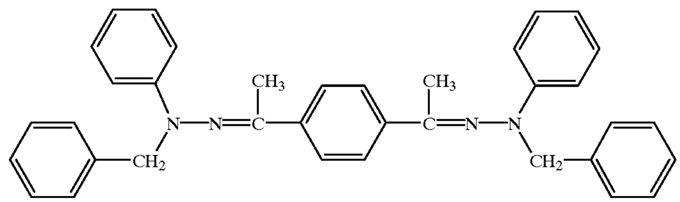
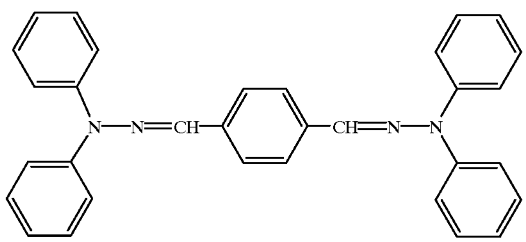
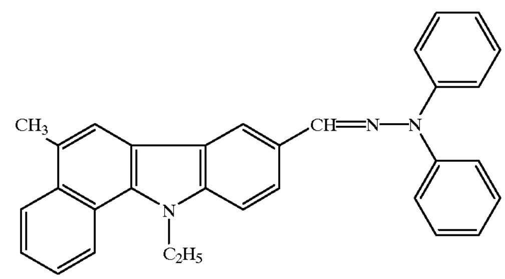
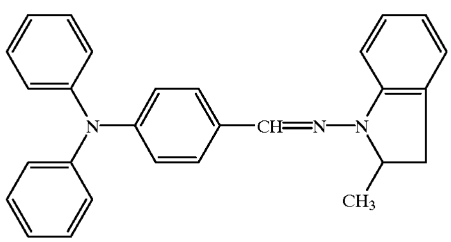
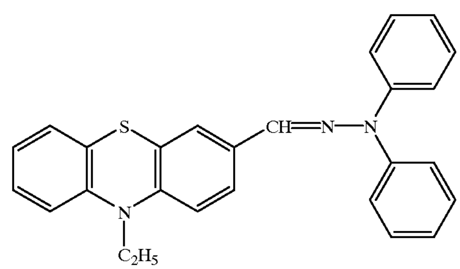
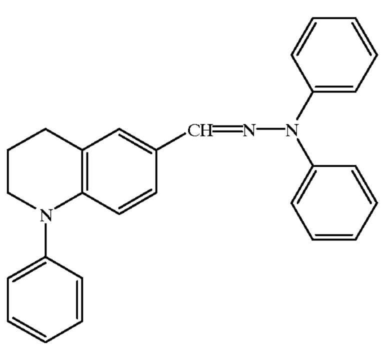
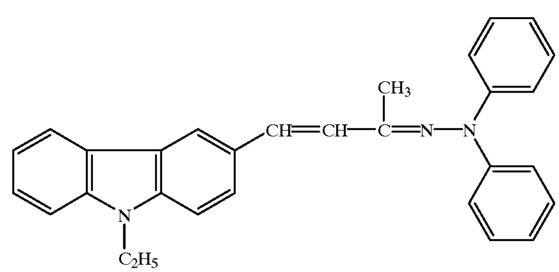
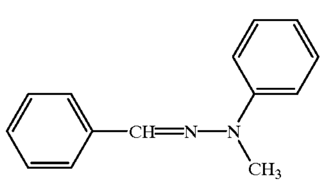
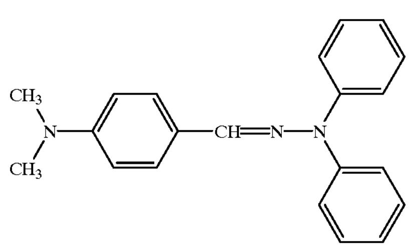
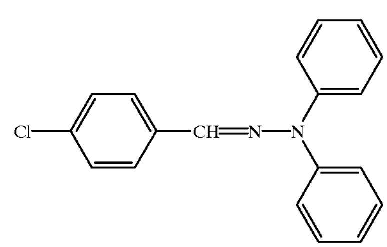

-continued
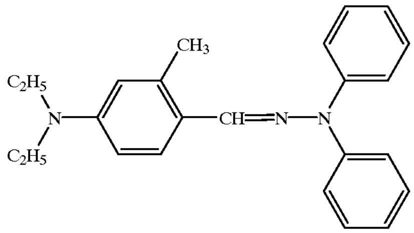
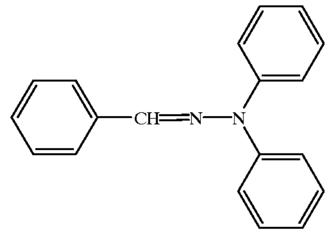
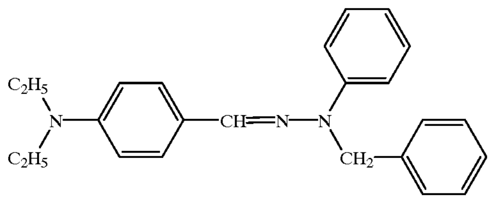
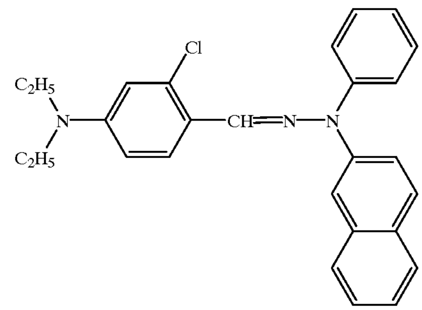
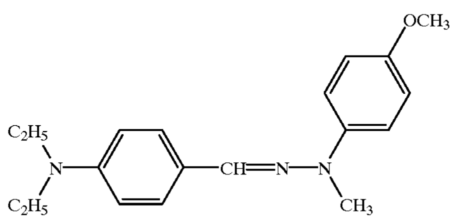
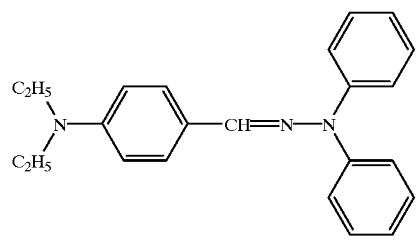
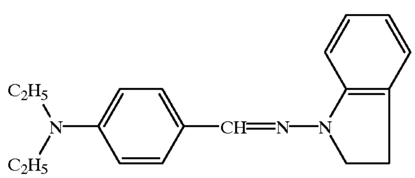
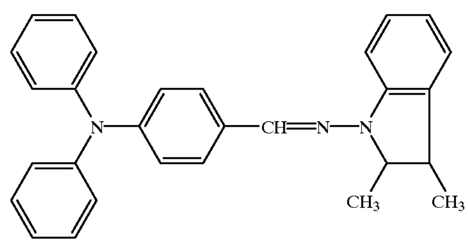
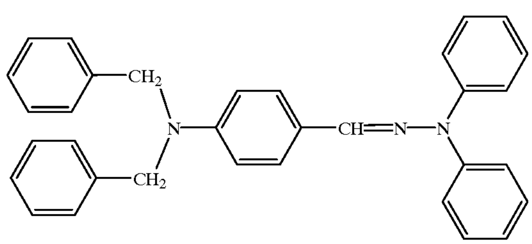
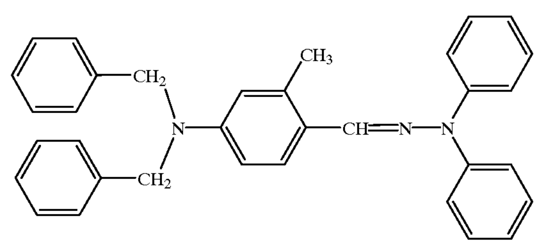
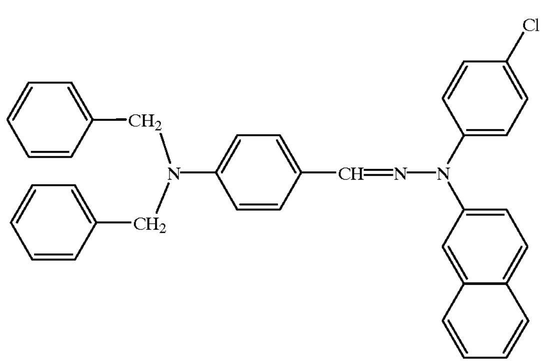
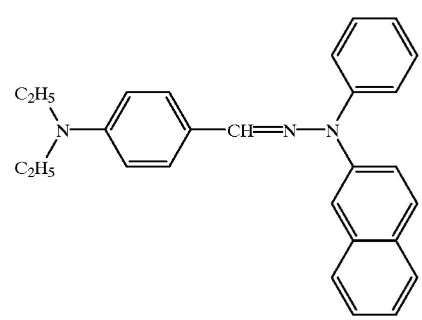

-continued
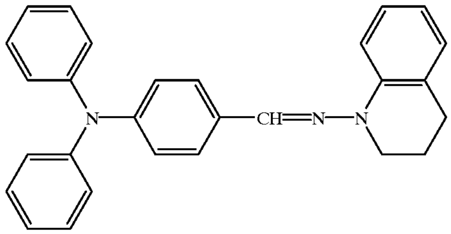
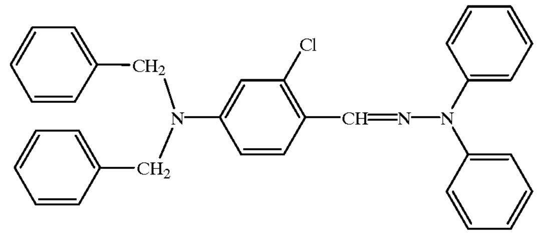
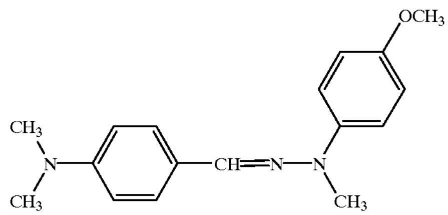
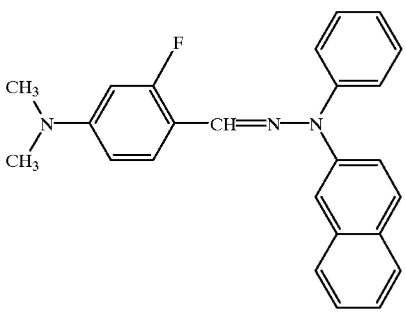
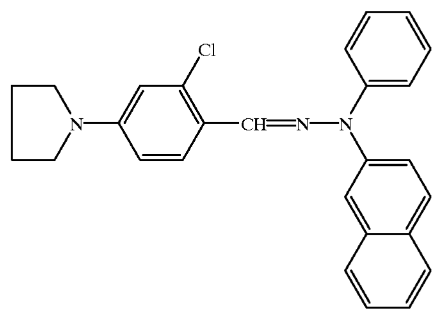
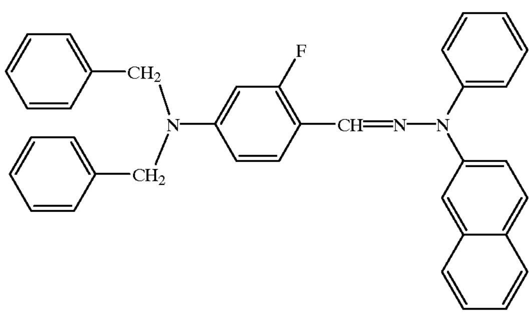
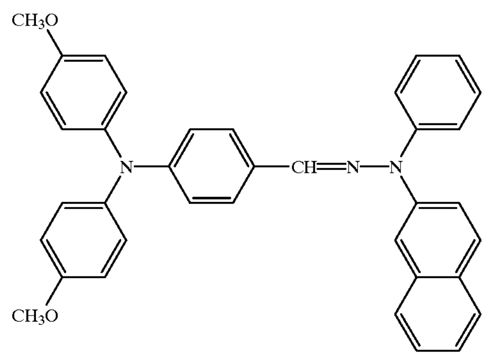
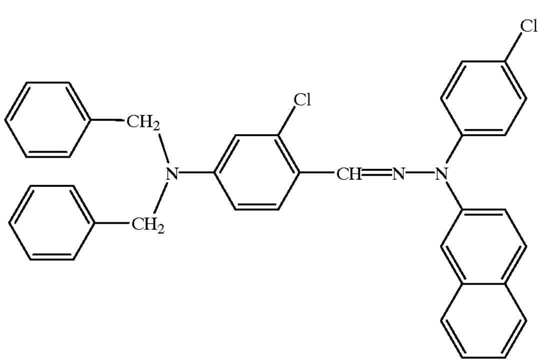
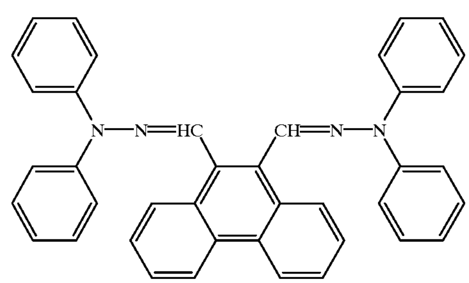

-continued
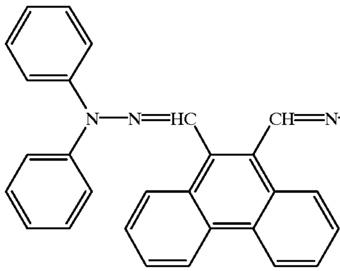
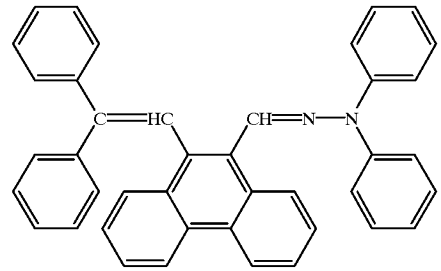
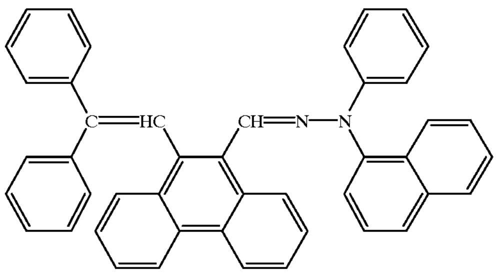
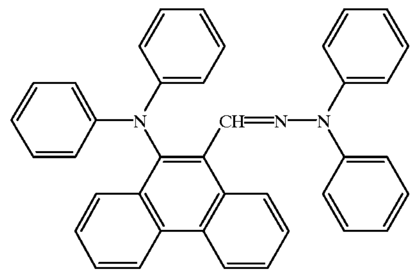
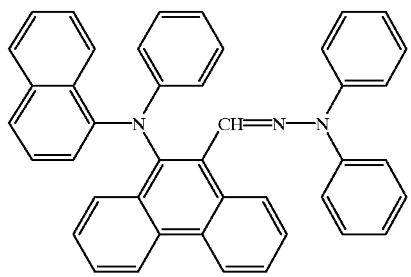
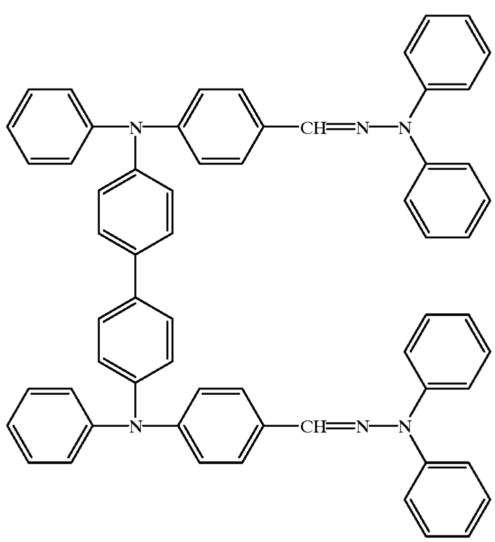
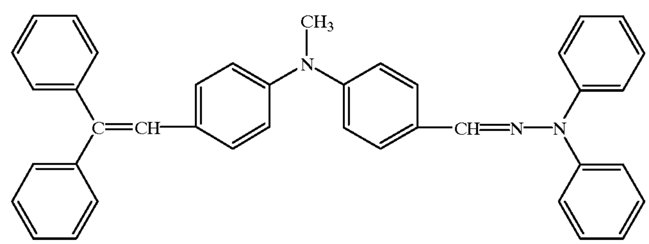
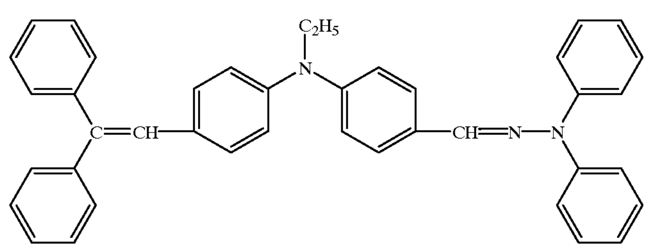

-continued
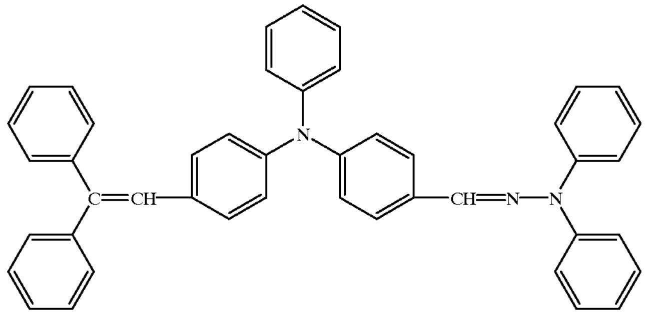
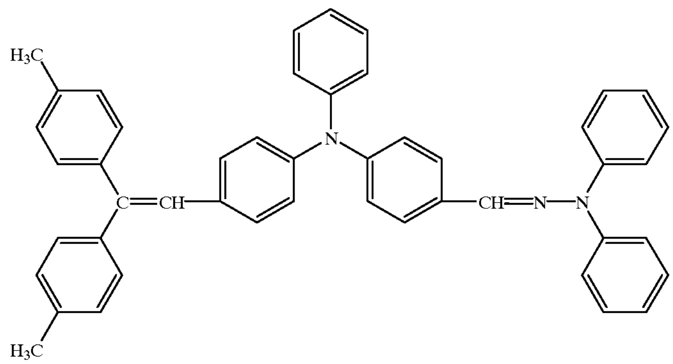
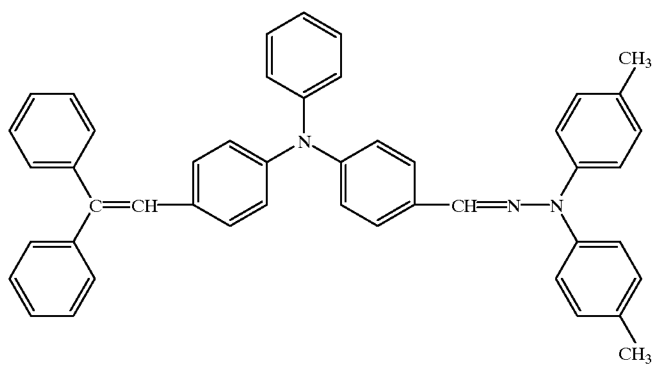
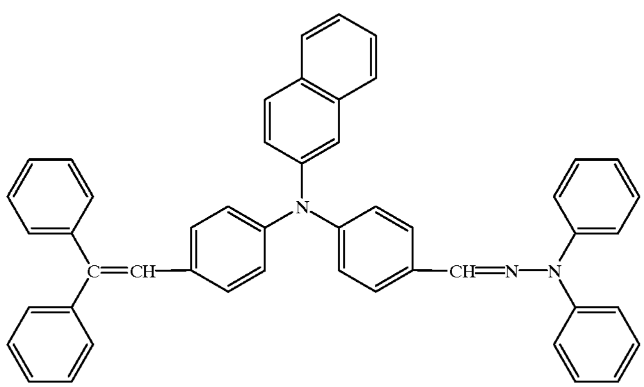

-continued
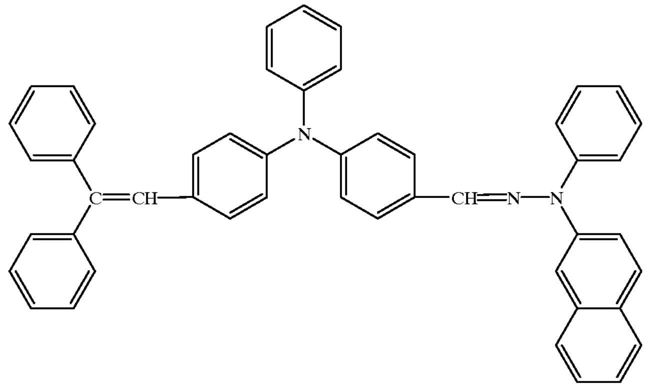
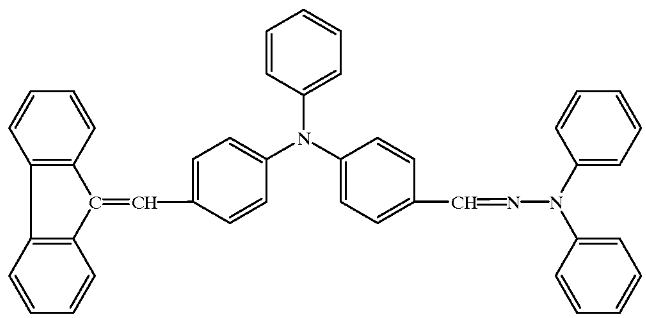
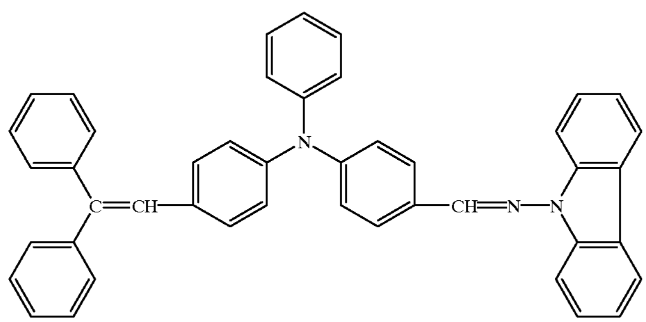
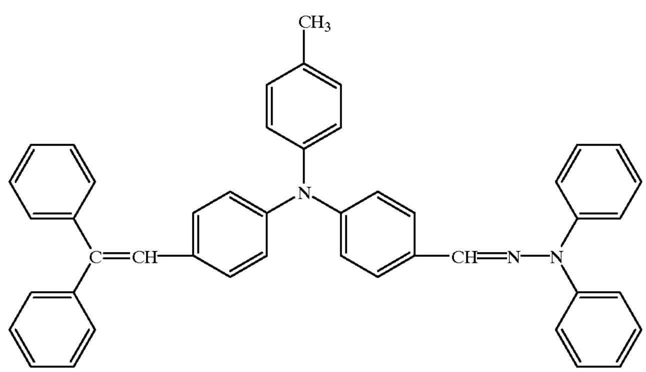
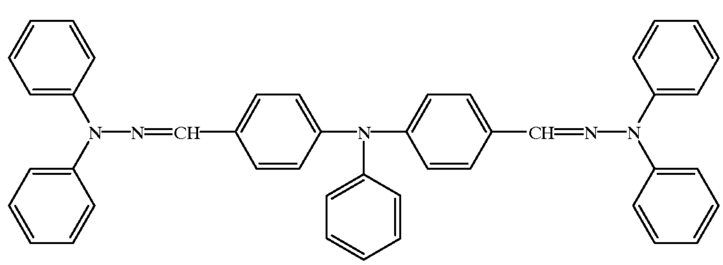

-continued
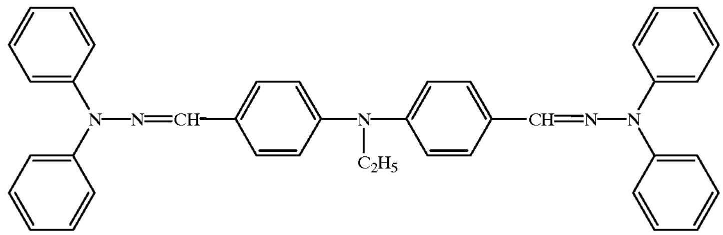
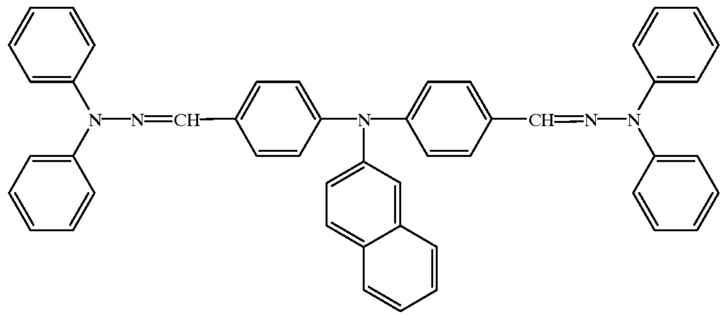
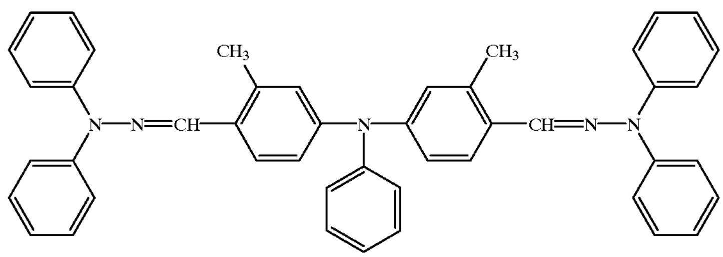
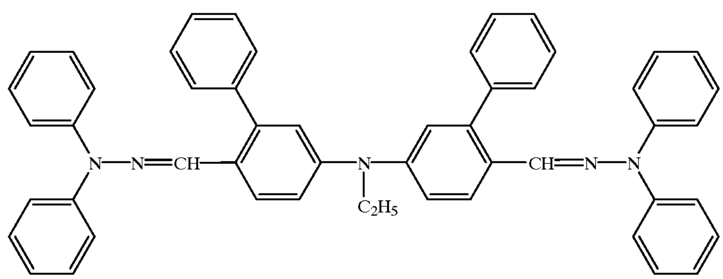
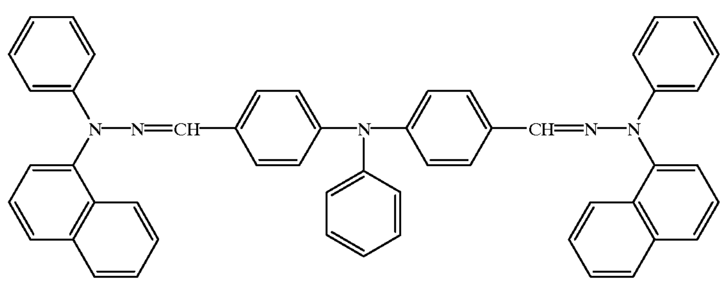
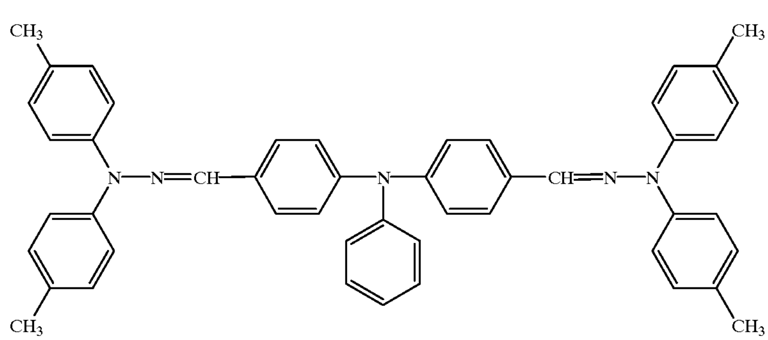

-continued
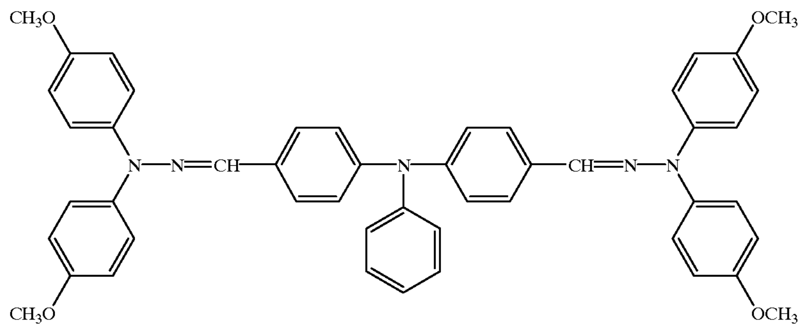
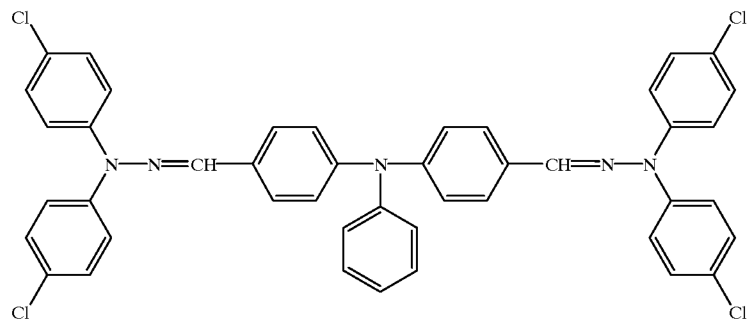
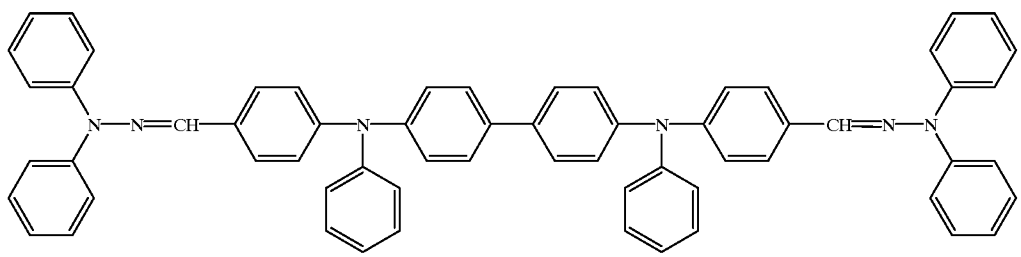
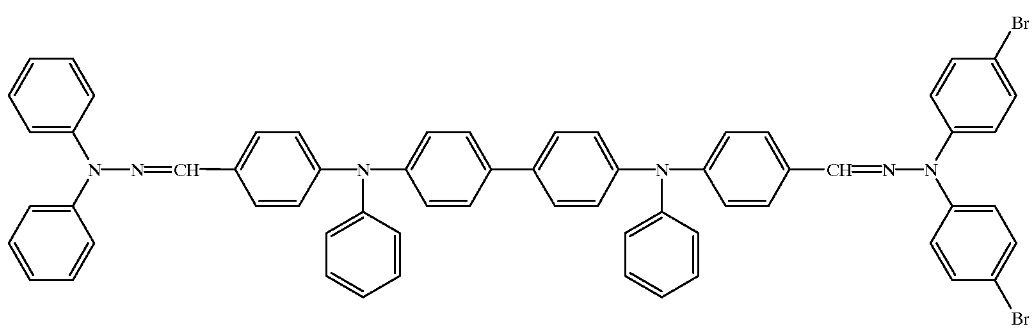
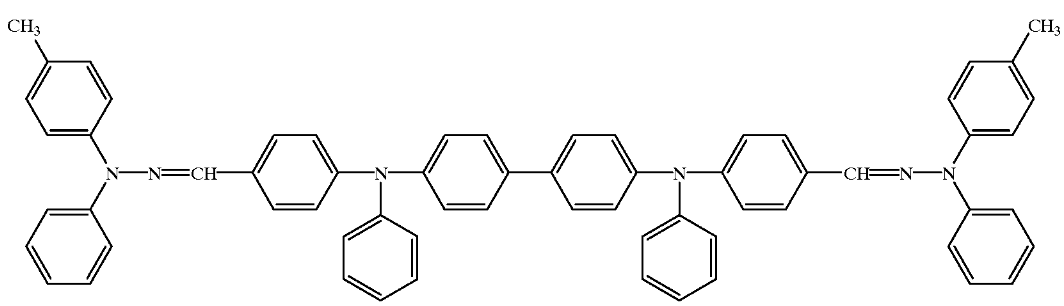

-continued
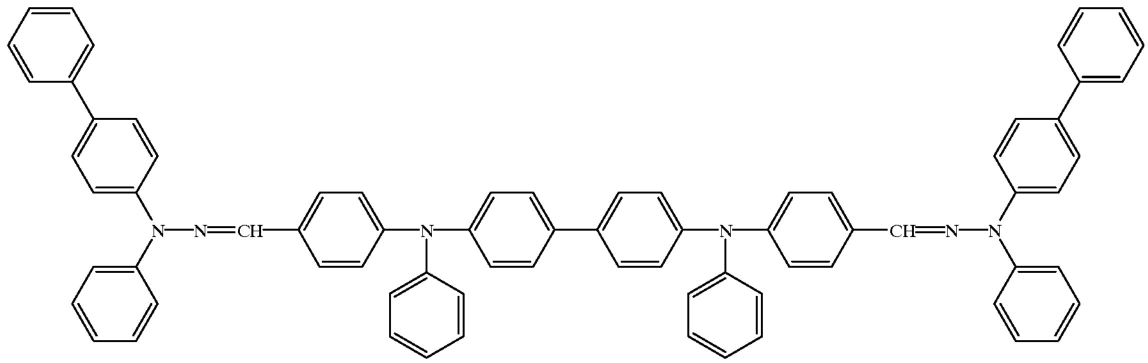
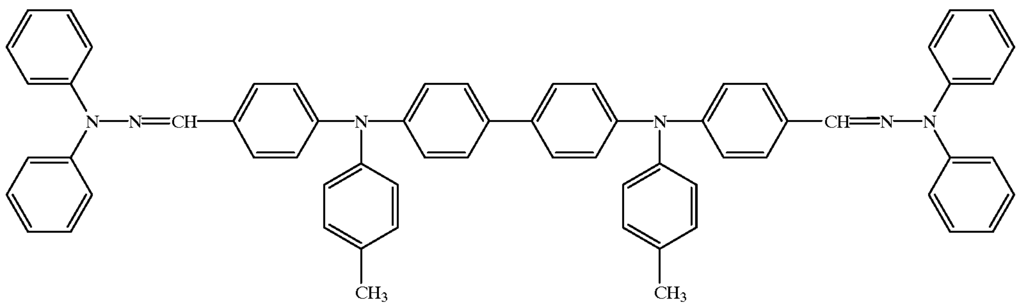
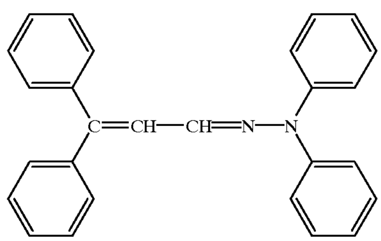
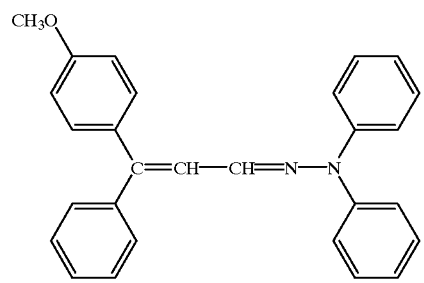
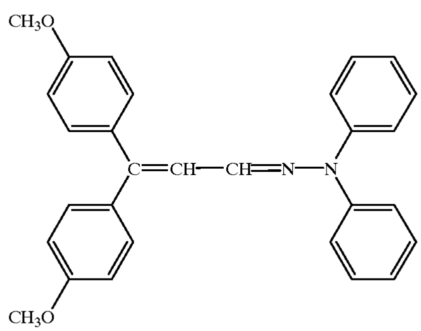
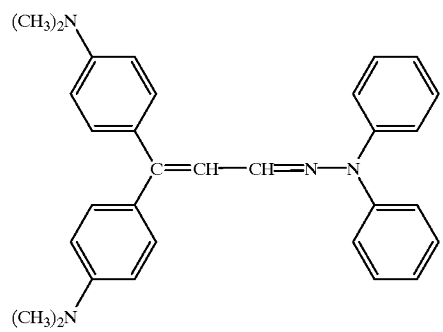
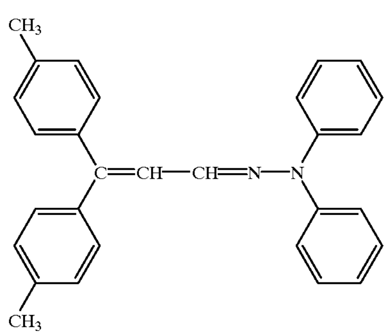
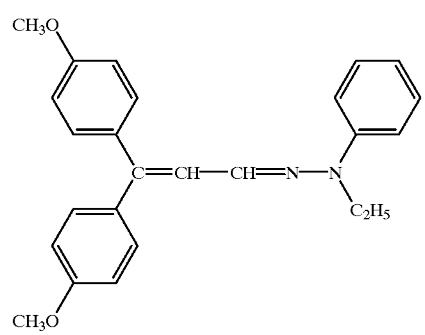

-continued
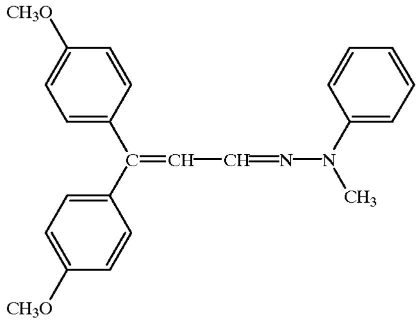
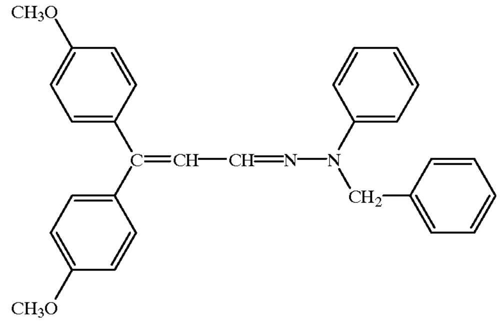
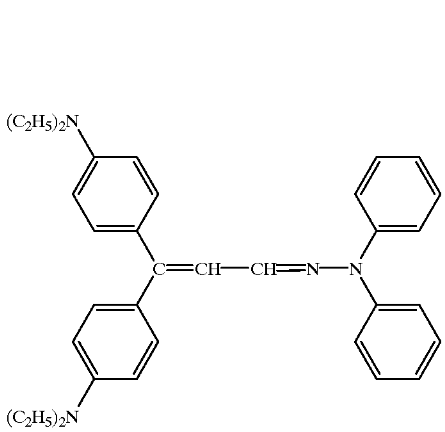
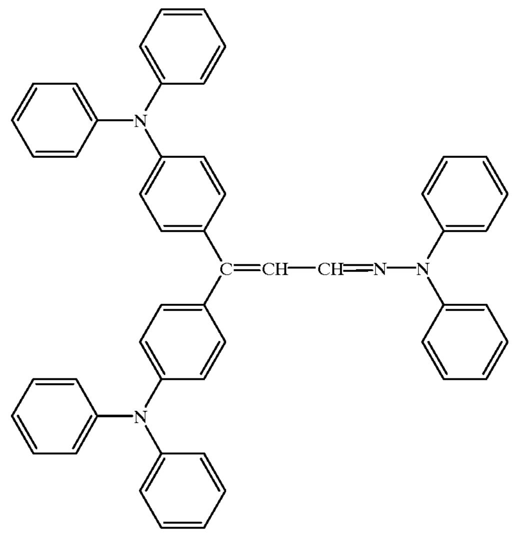
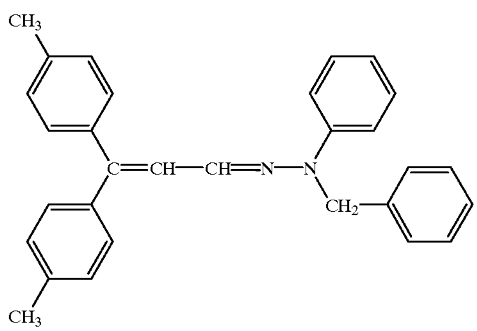
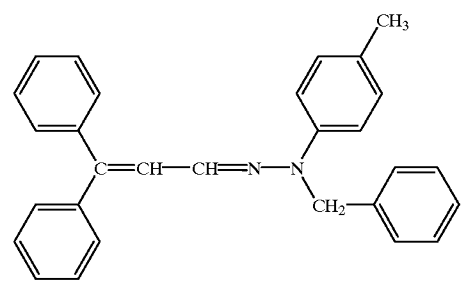
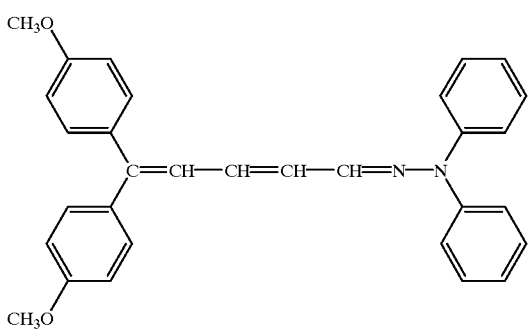
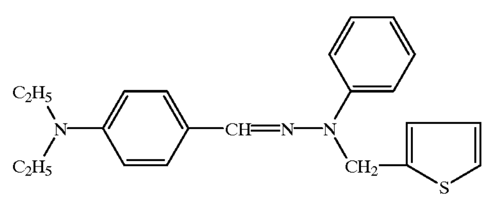

-continued
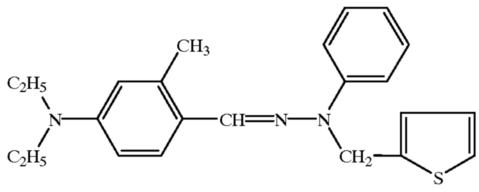
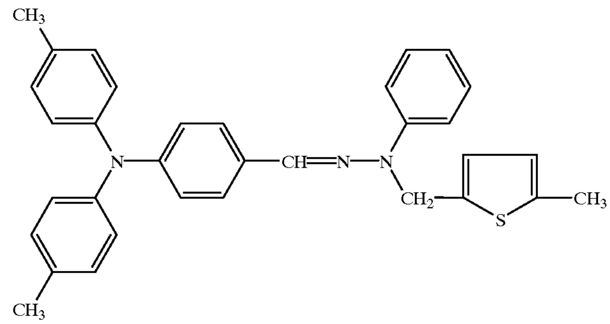
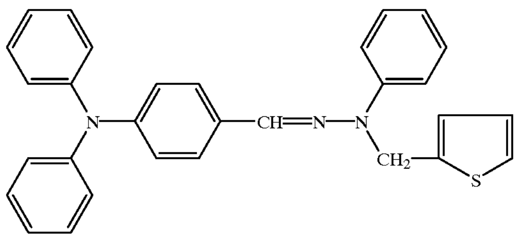
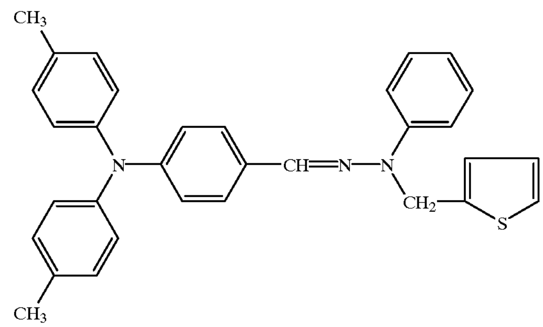
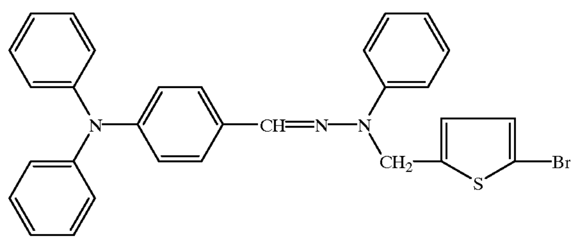
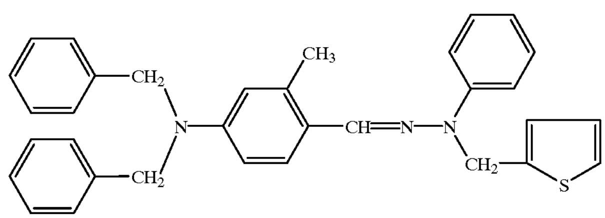
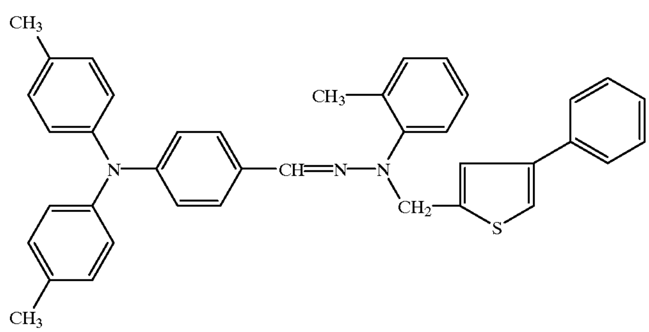

-continued
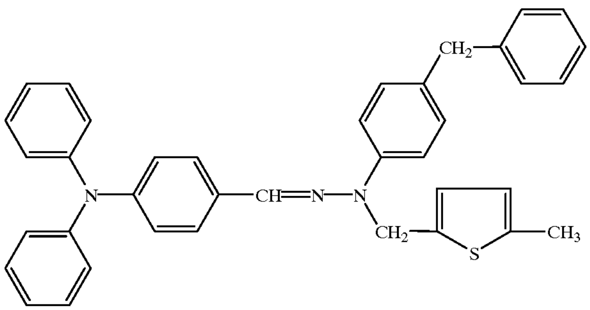
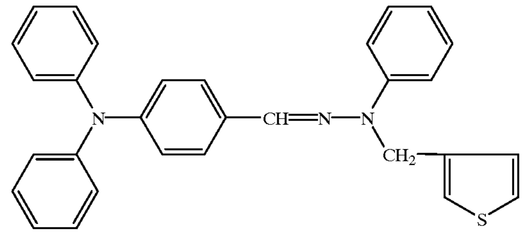
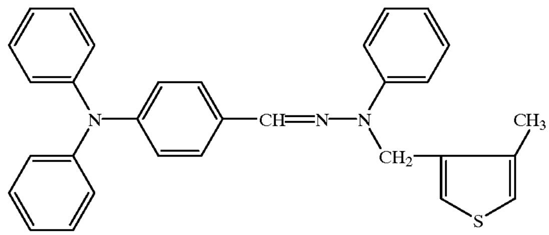
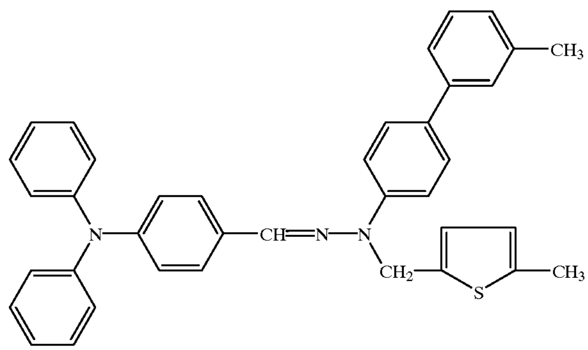
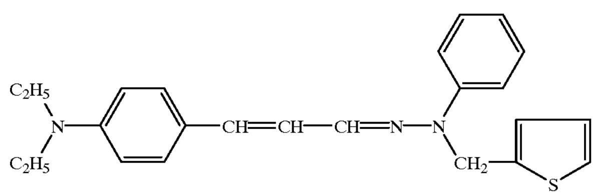
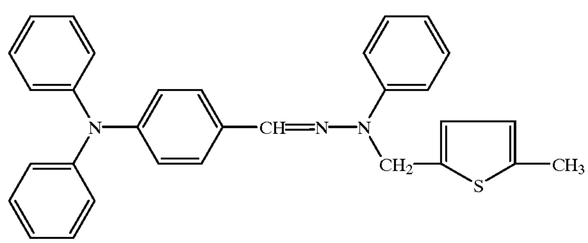
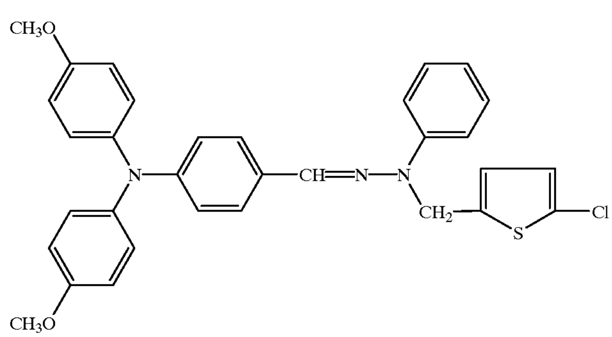

-continued
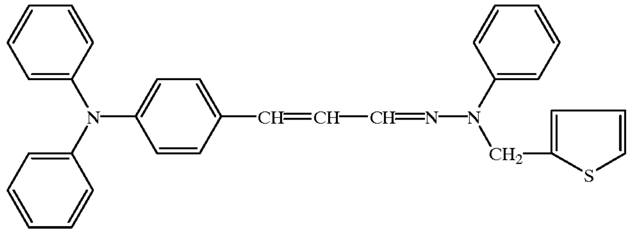
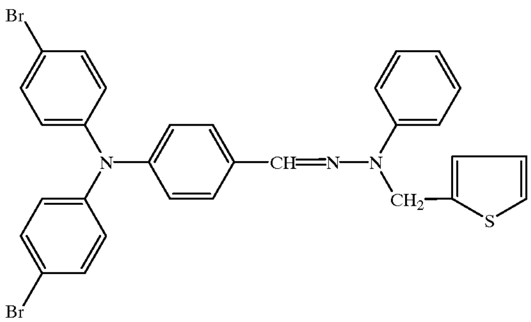
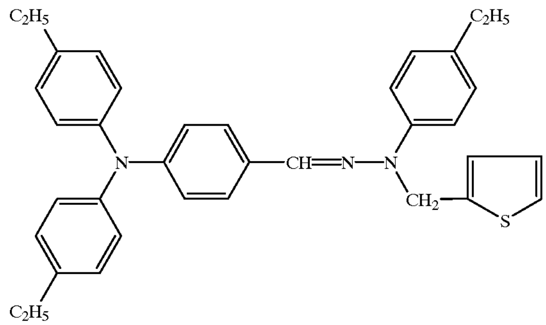
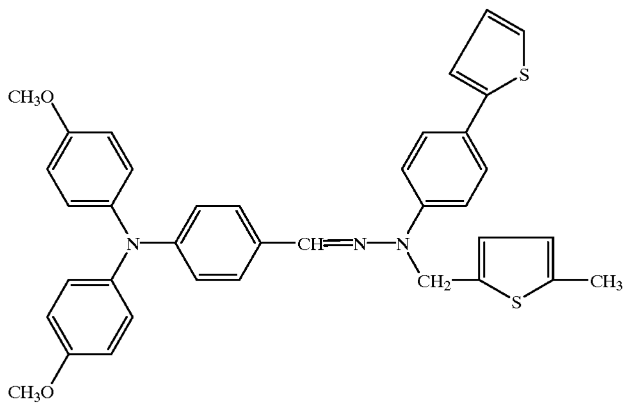
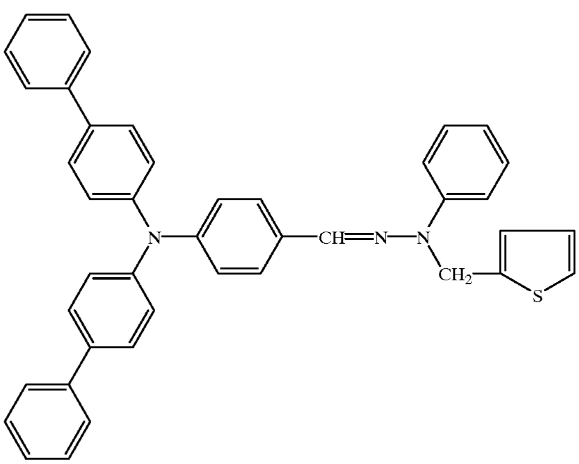
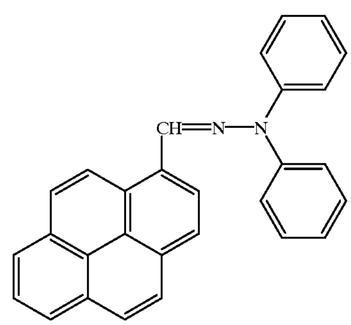

-continued
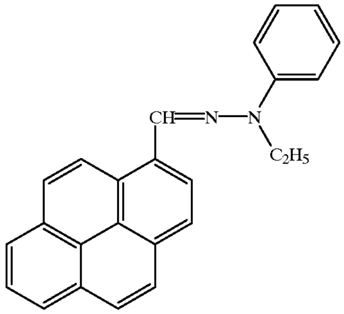
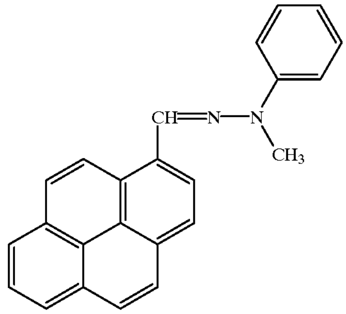
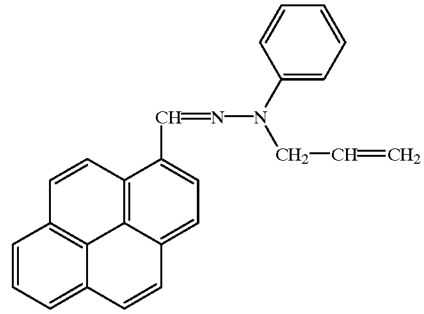
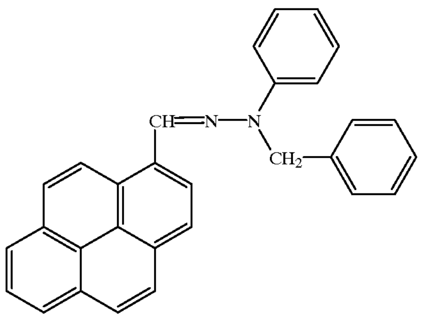
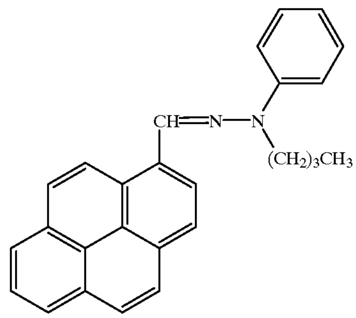
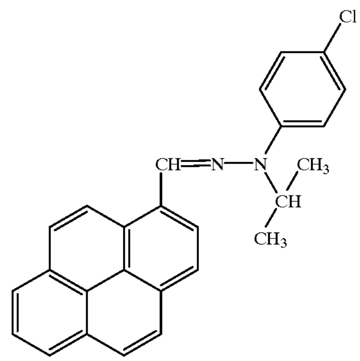
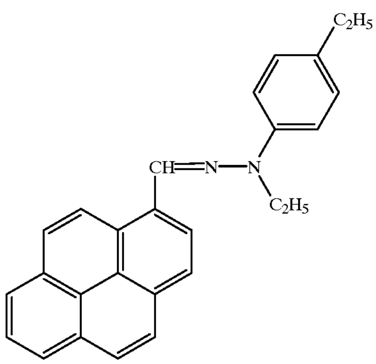
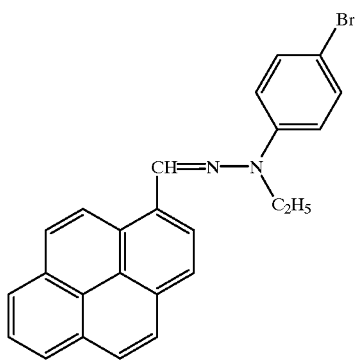
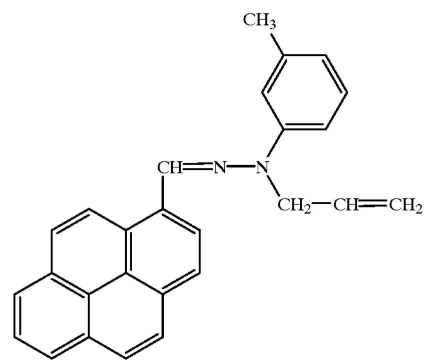
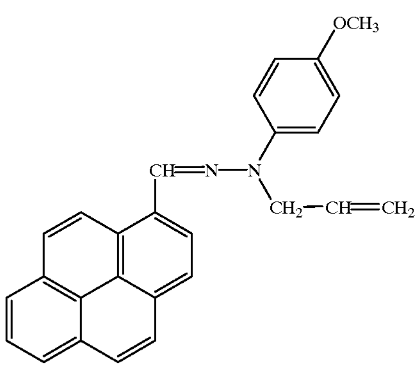
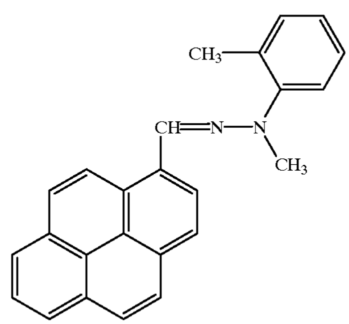
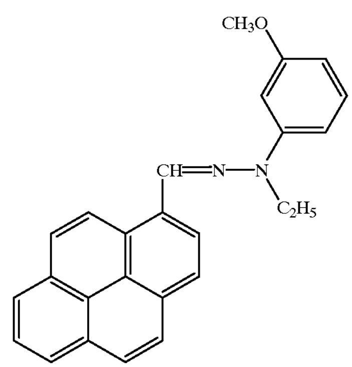
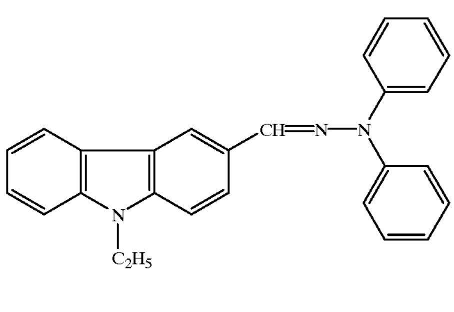
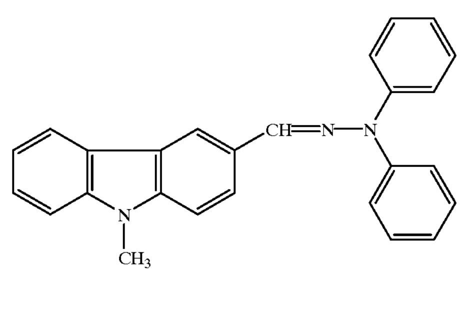

-continued
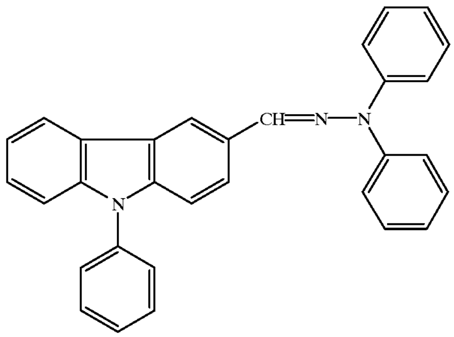
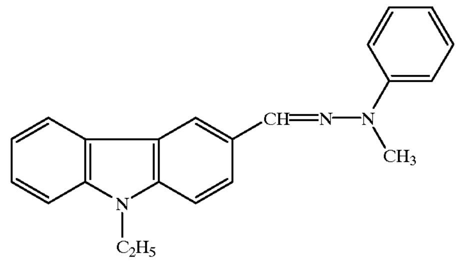
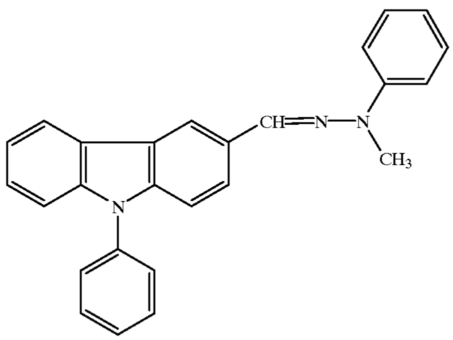
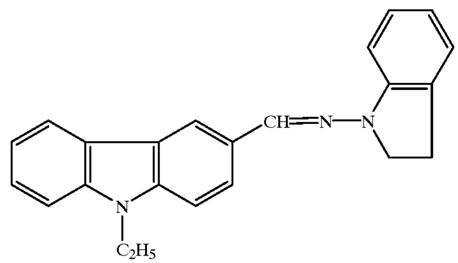
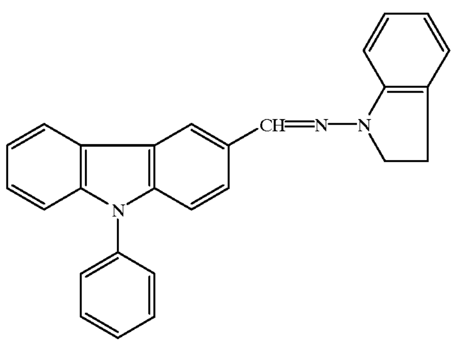
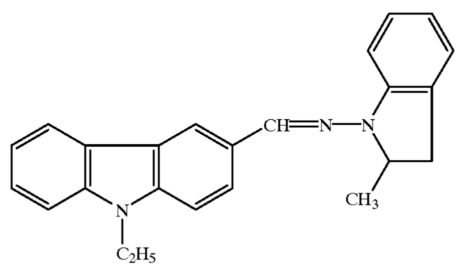
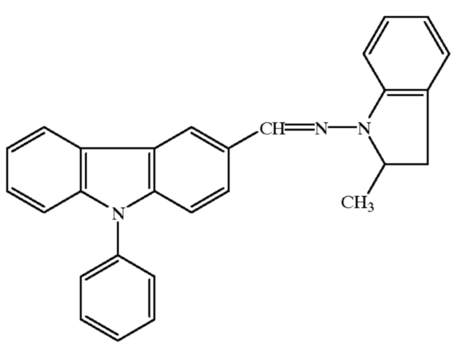
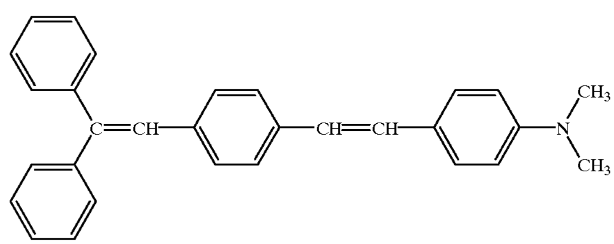
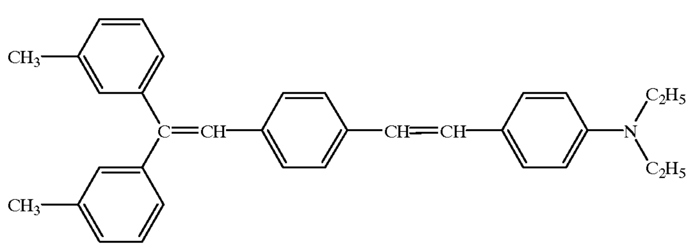

-continued
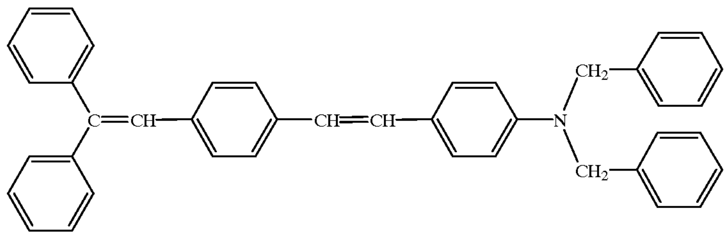
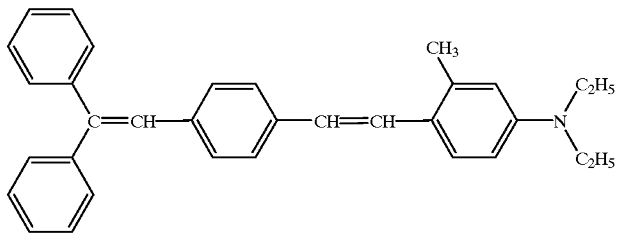
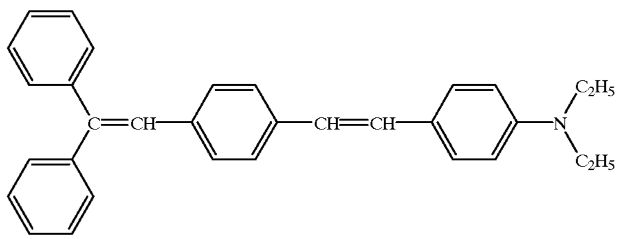
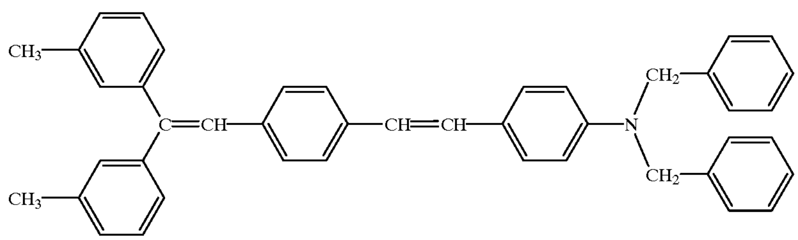
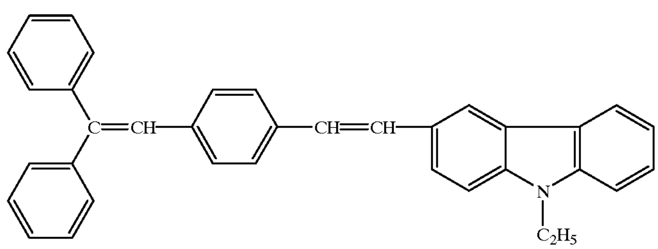
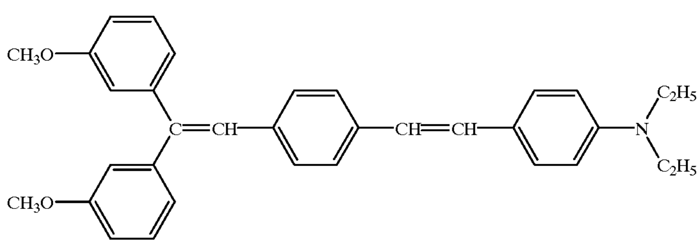
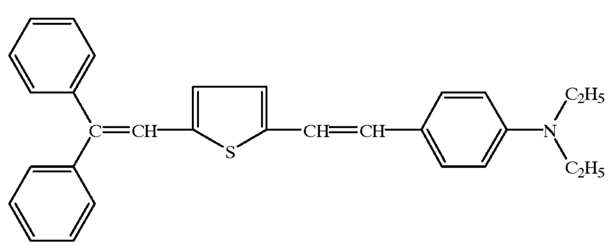

-continued
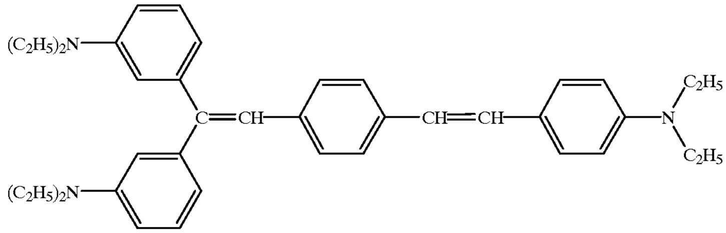
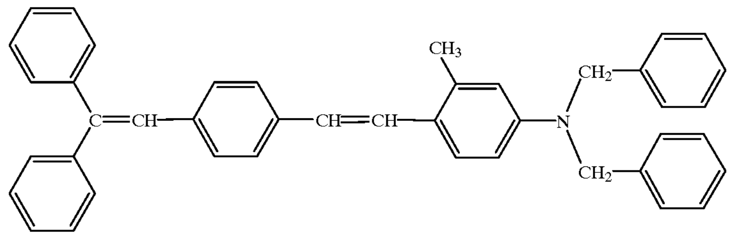
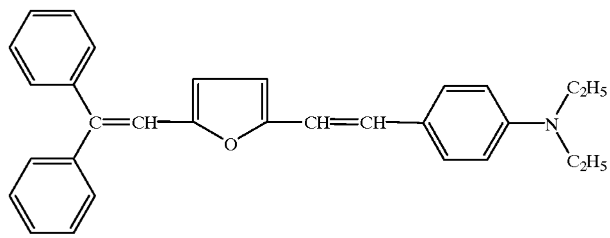
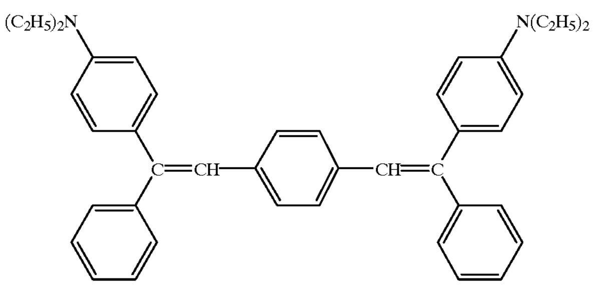
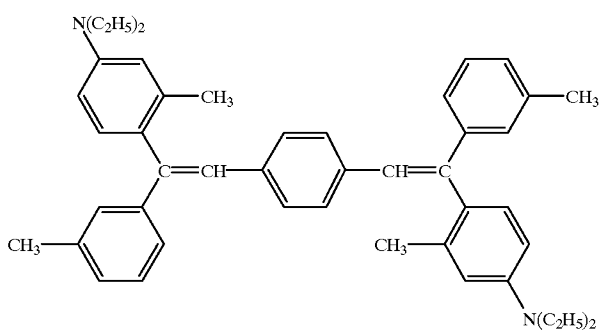
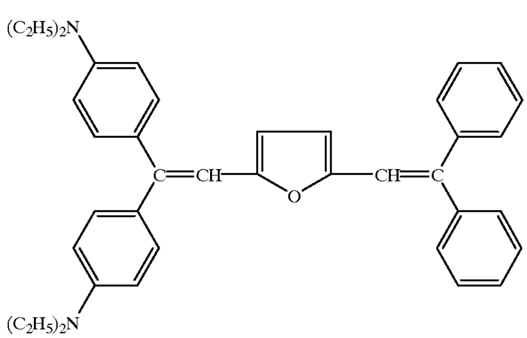
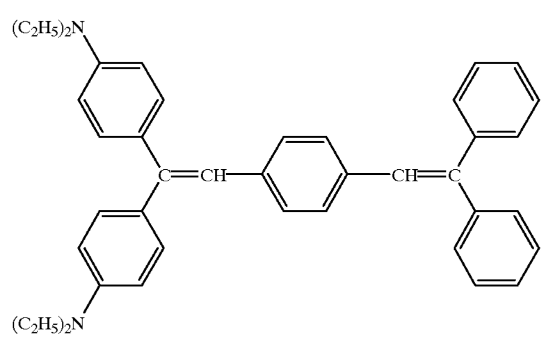

-continued
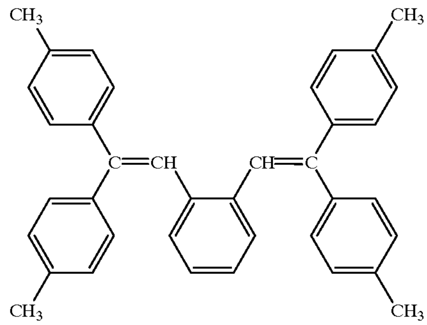
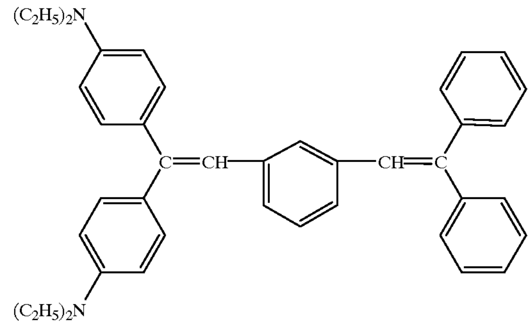
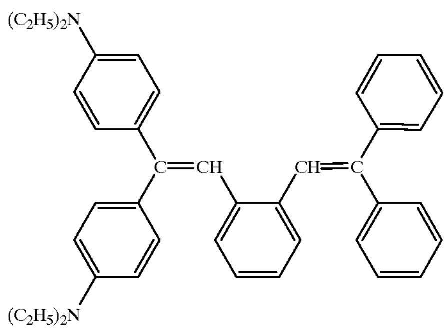
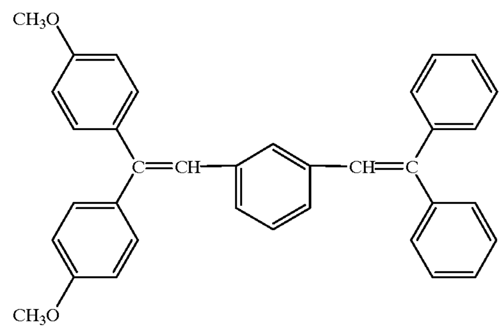
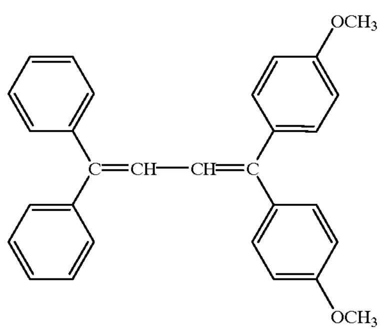
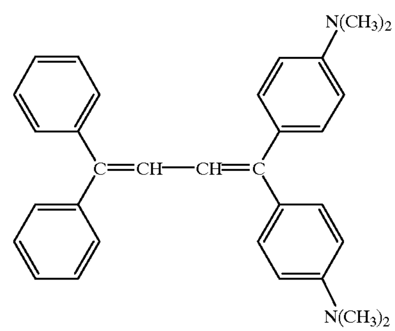
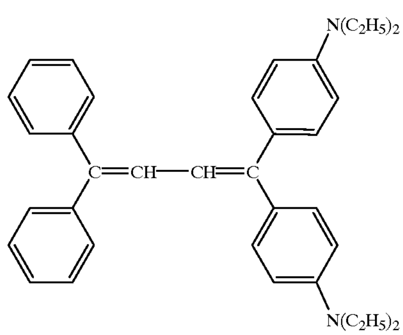
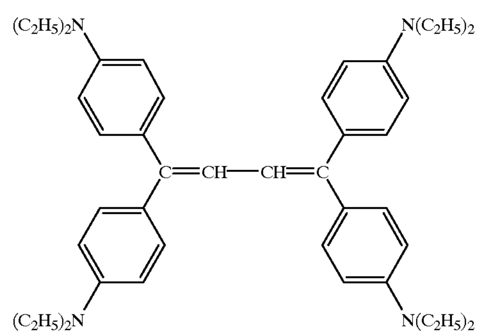
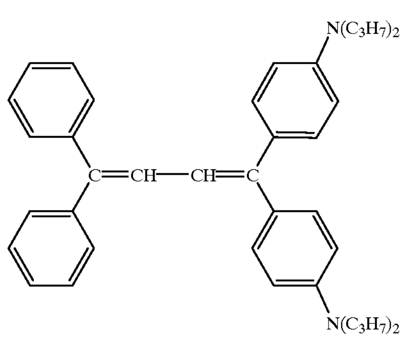
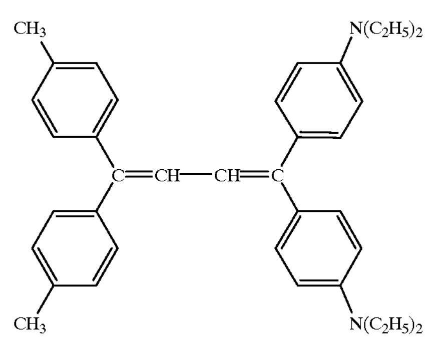

-continued
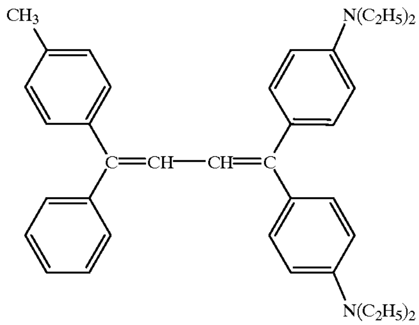
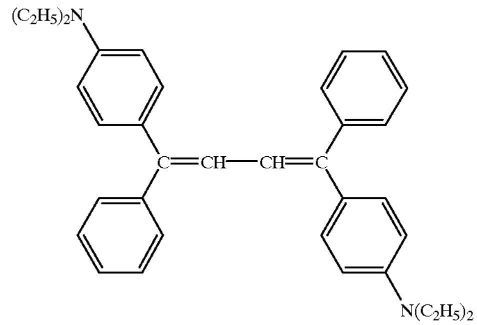
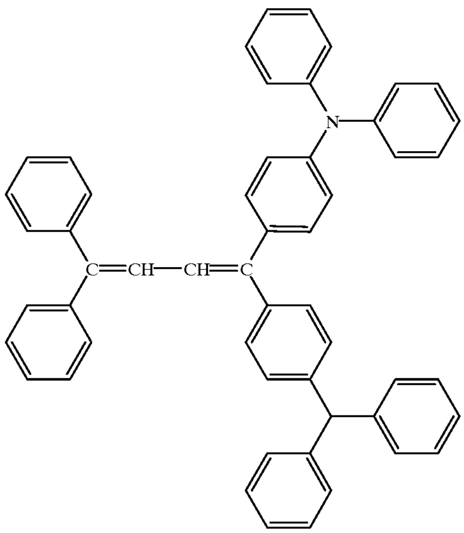
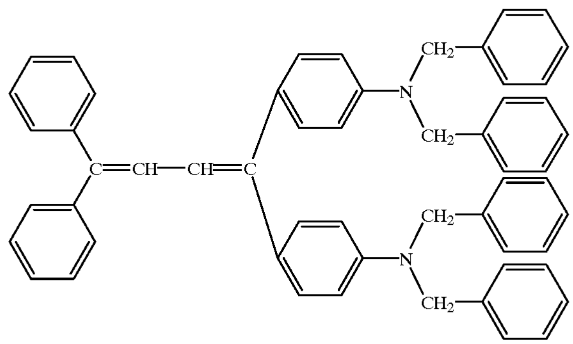
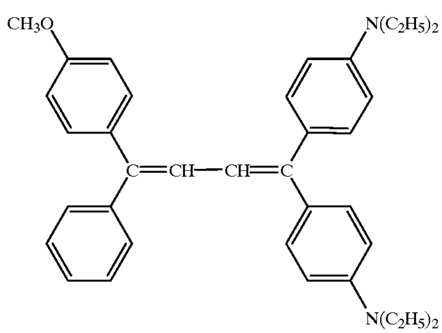
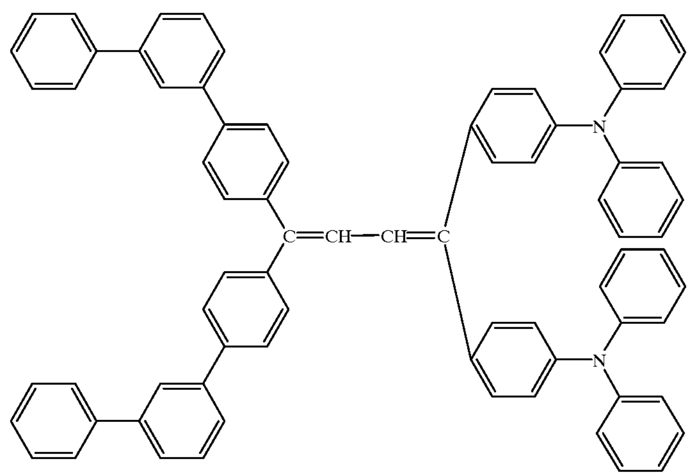
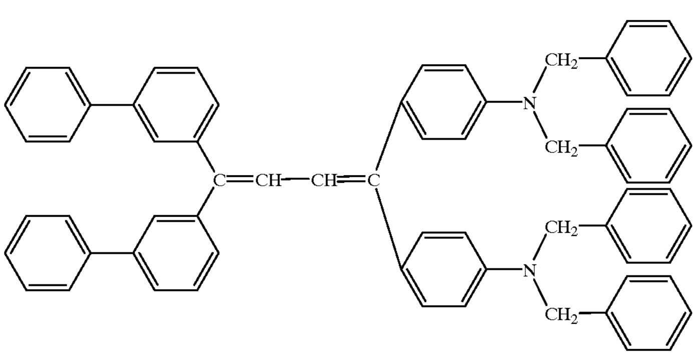

-continued
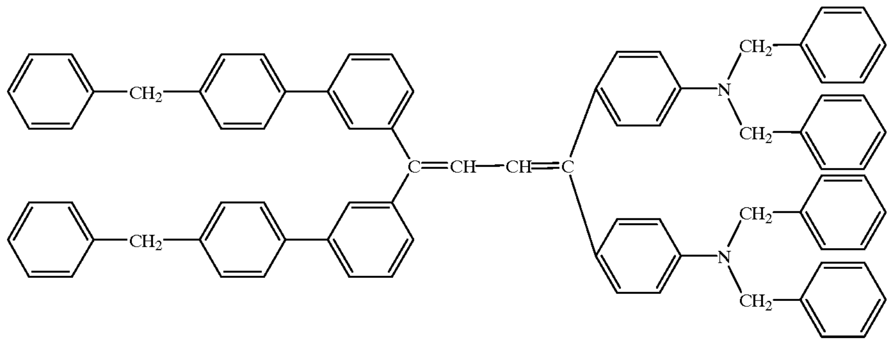
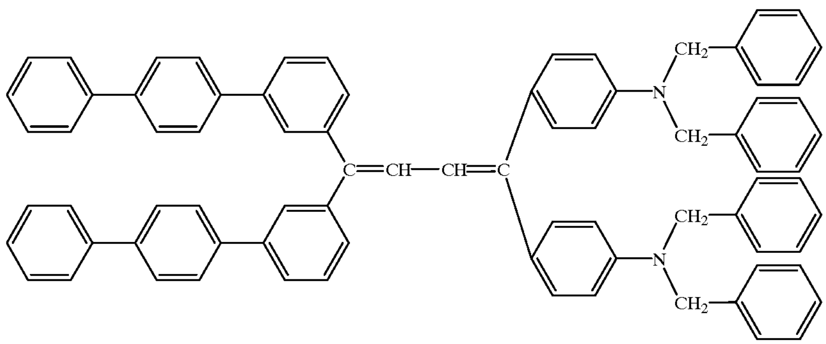
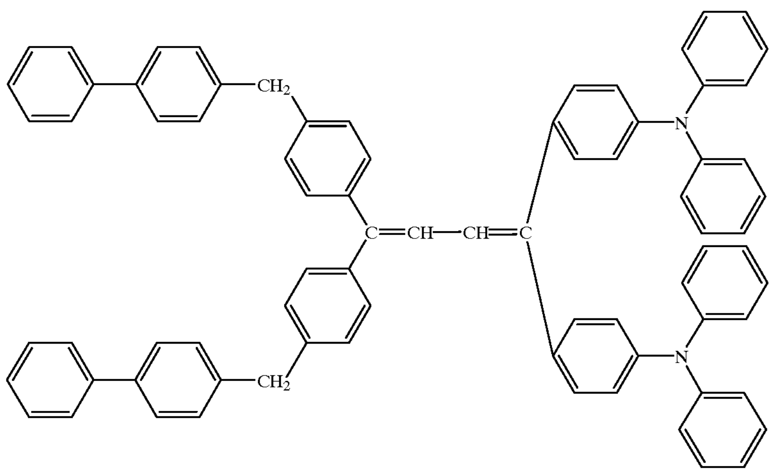
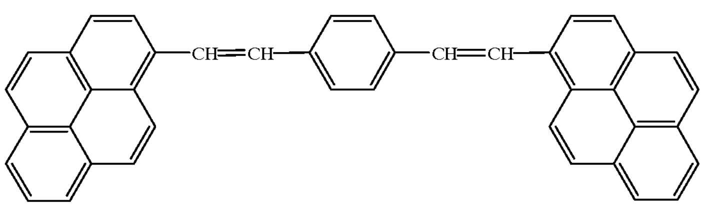
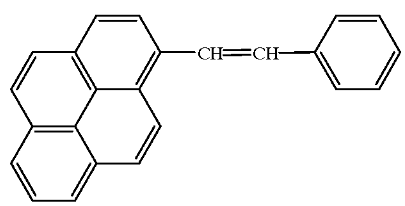
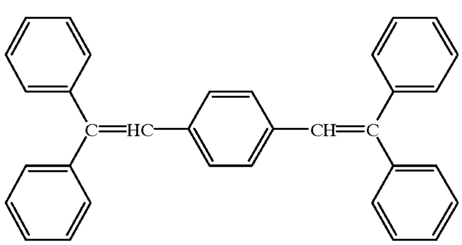
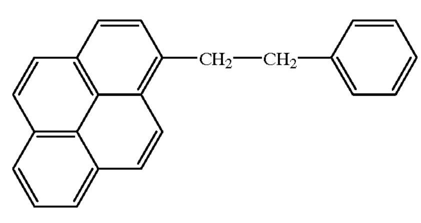

-continued
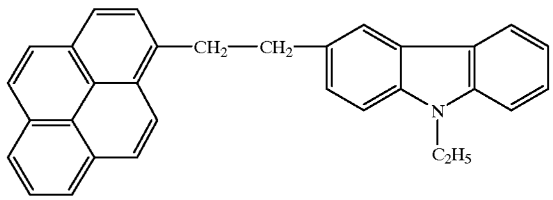
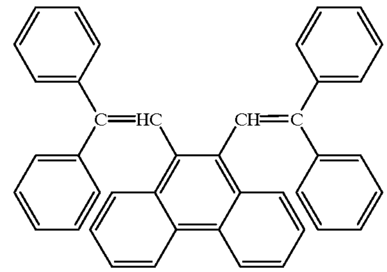
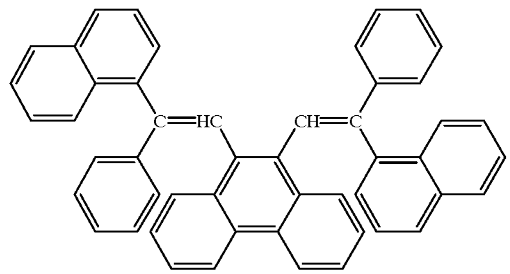
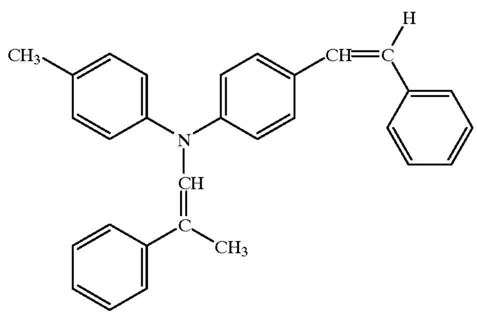
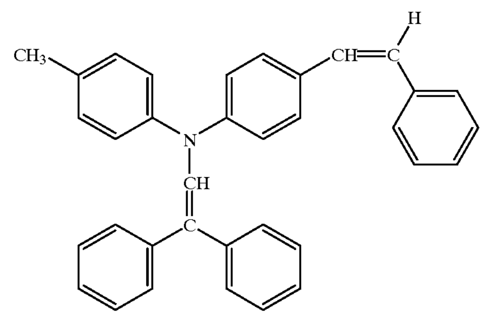
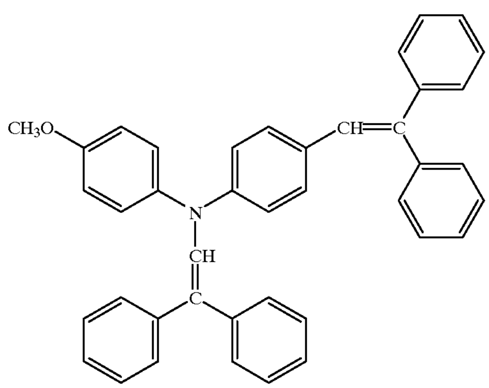
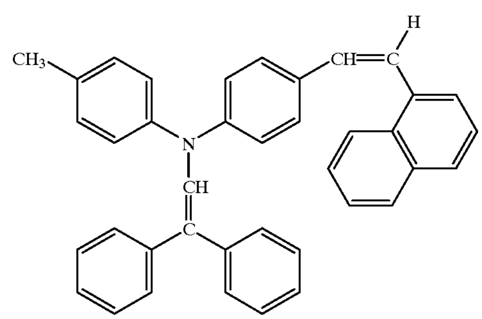
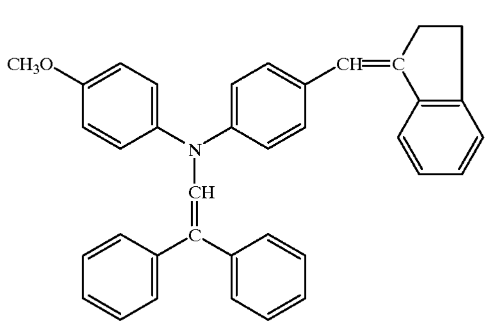
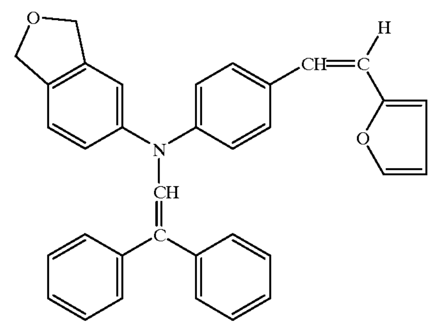

-continued
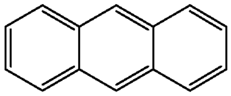
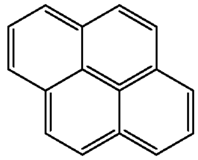
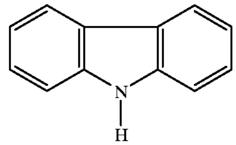
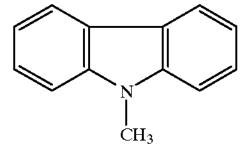
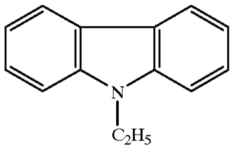
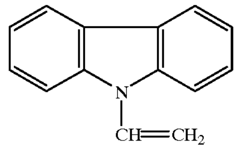
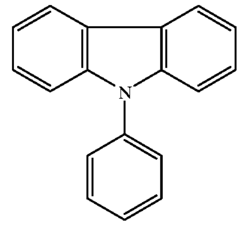
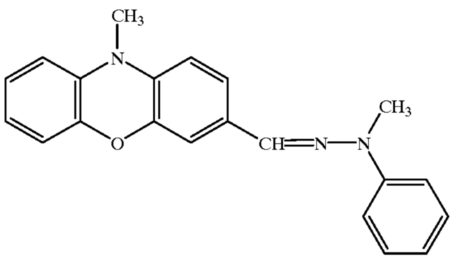
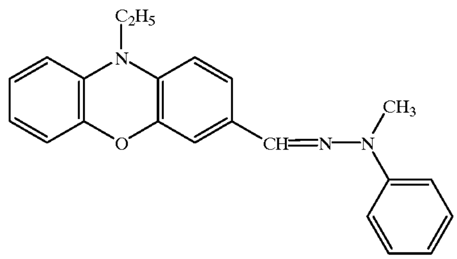
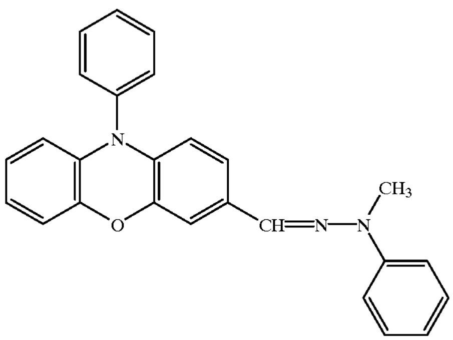
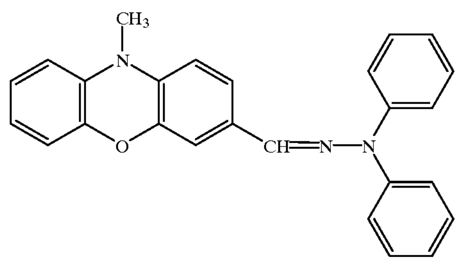
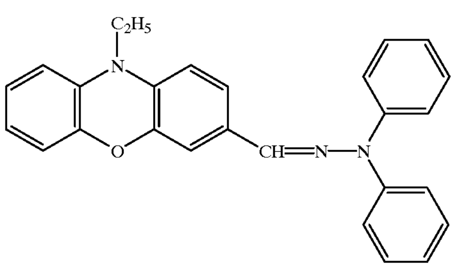
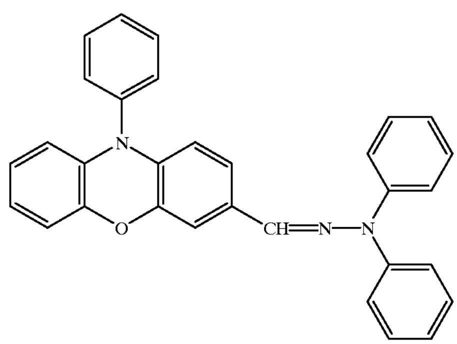
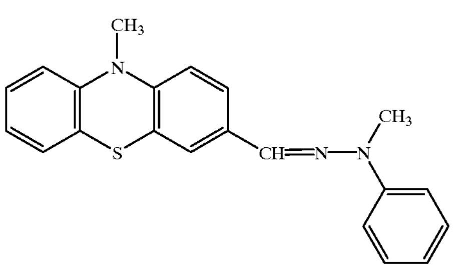
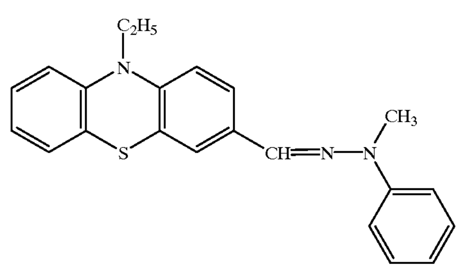

-continued
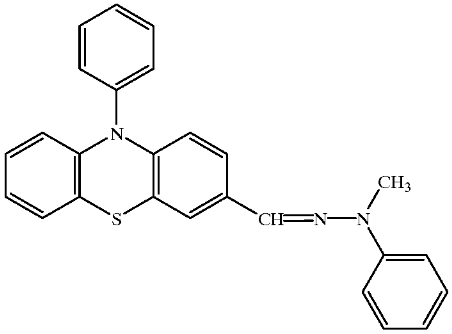
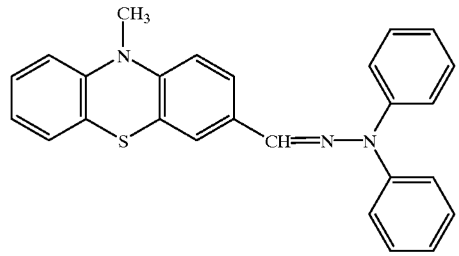
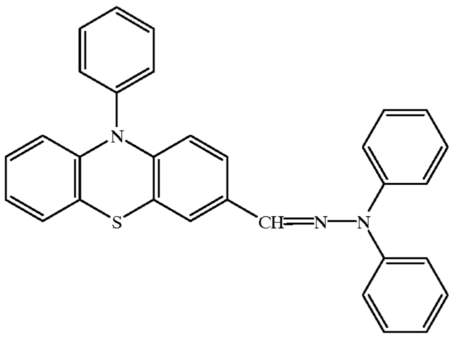
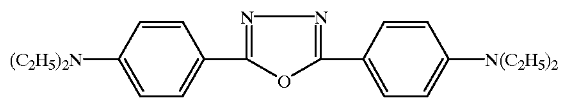
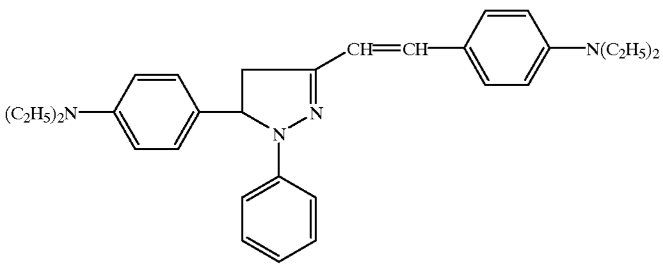
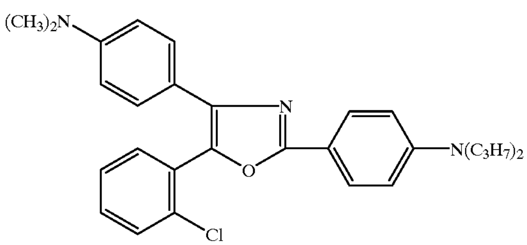
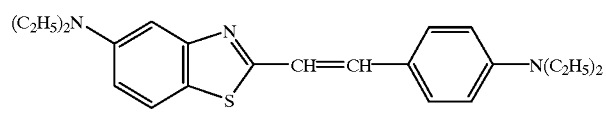
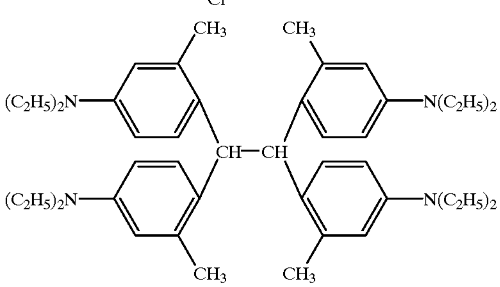
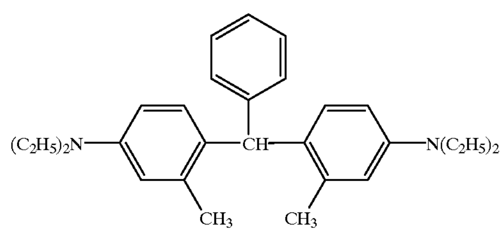
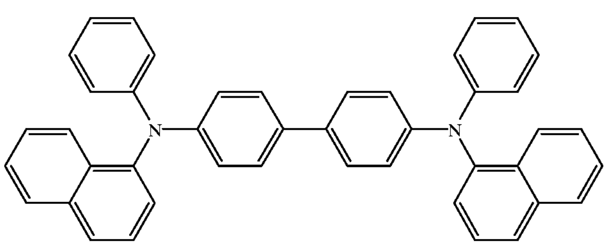
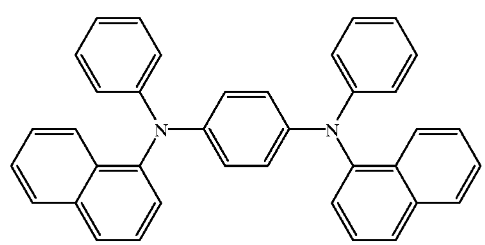

-continued
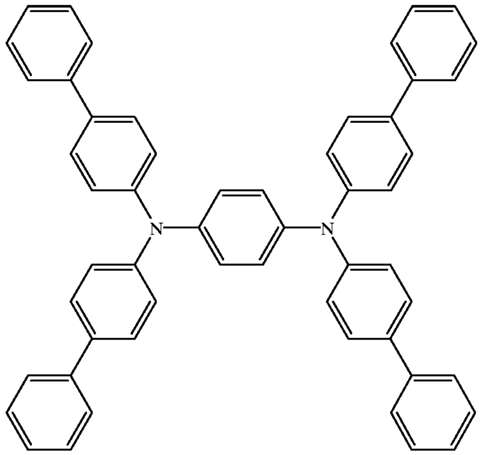
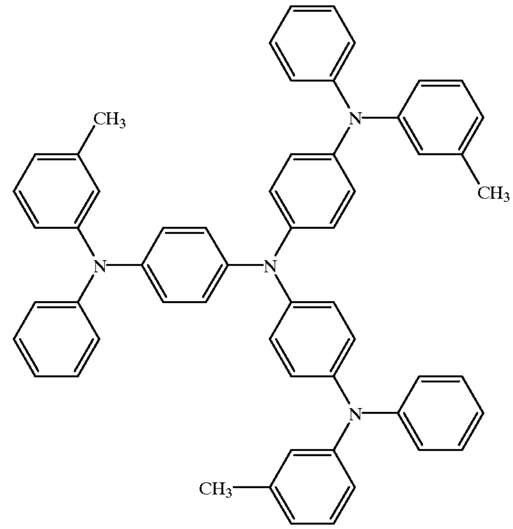
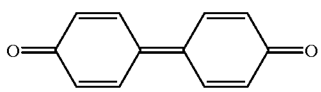
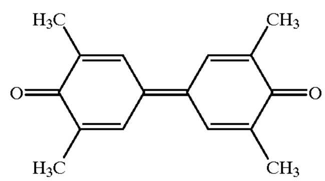
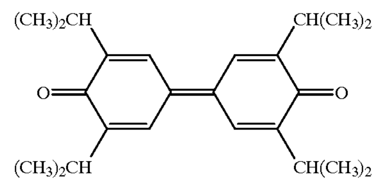
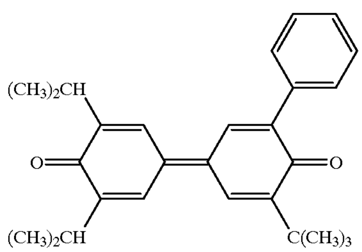
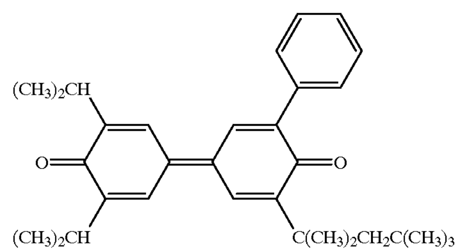
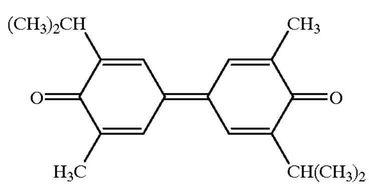
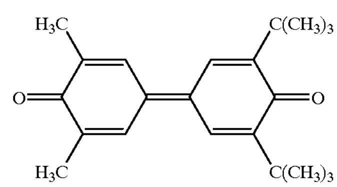
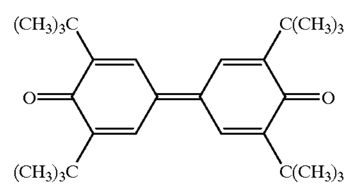
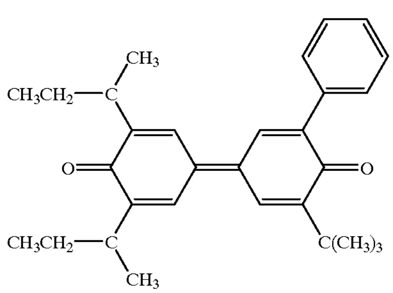
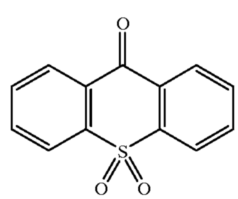
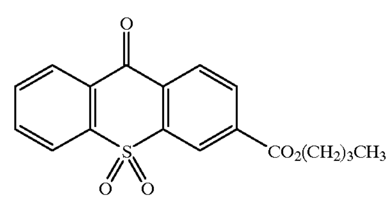
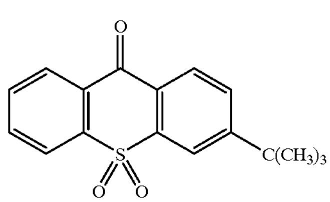
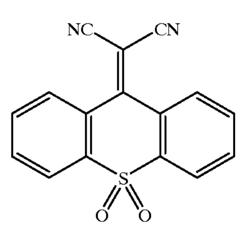
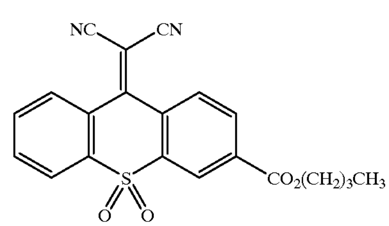

-continued
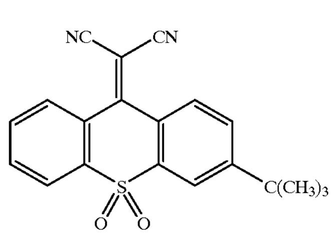
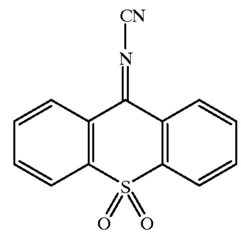
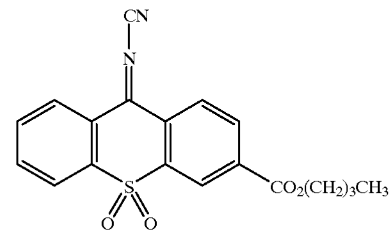
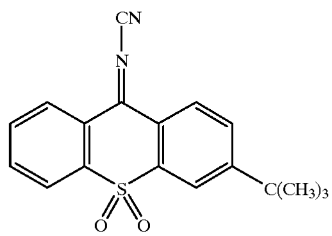
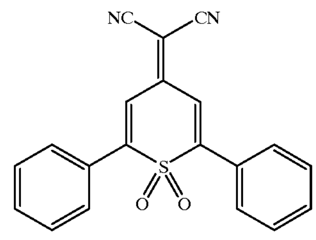
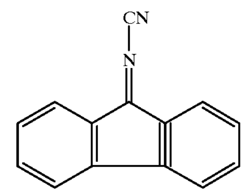
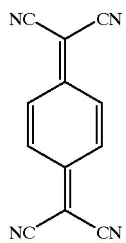
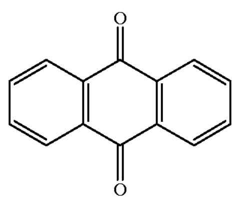
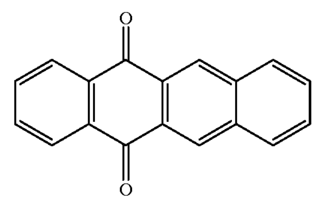
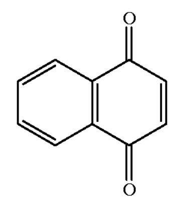
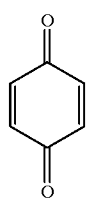
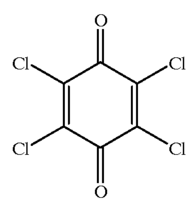
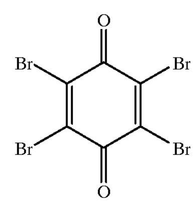
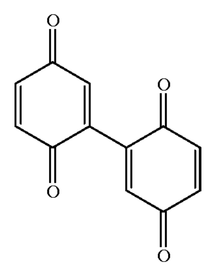
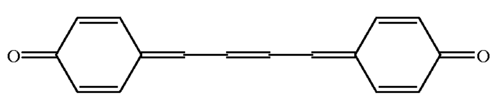
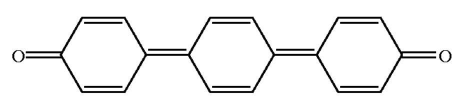
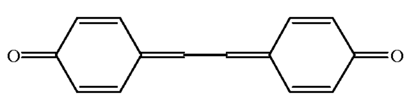
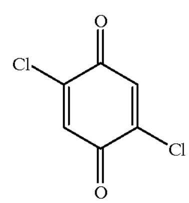
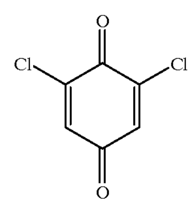
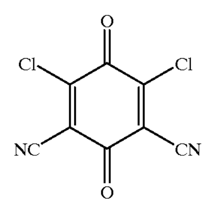
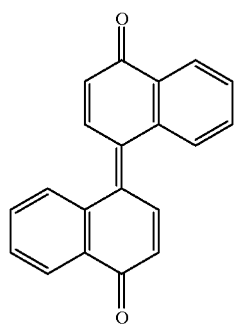
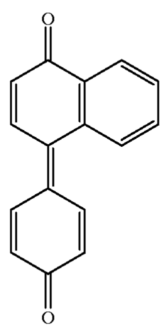
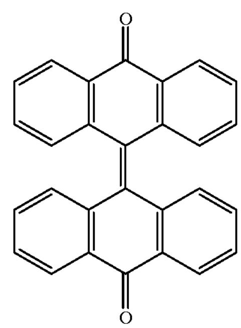
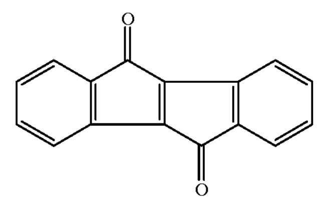

-continued

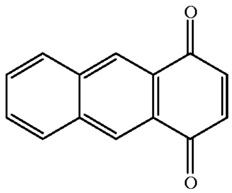

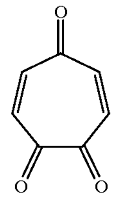

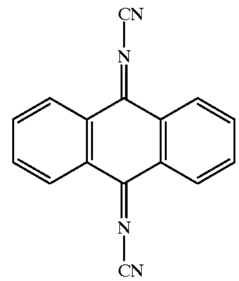

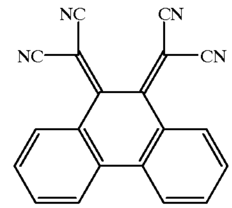

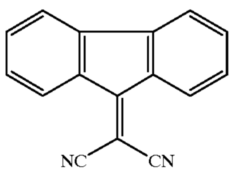

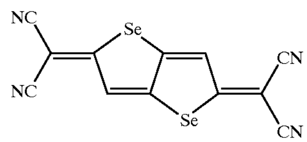

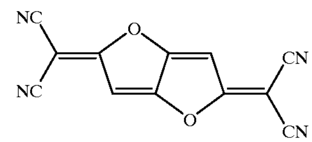

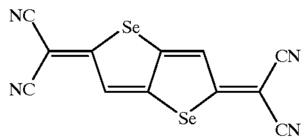

The charge-transfer substances may be used individually or as a mixture of two or more. The charge-transfer layer is preferably 5 to 100 μm, more preferably 10 to 30 μm, in thickness. If it is less than 5 μm, the initial surface potential may be low, and if it is more than 100 μm, the electrophotographic properties may be deteriorated.

Any conventional underlying layer may be interposed between the conductive substrate and the photosensitive layer. For example, the underlying layer may be composed of fine particles of titanium oxide, aluminum oxide, zirconia, titanic acid, zirconic acid, lanthanum lead, titanium black, silica, lead titanate, barium titanate, tin oxide, indium oxide or silicon oxide, polyamide resins, phenolic resins, casein, melamine resins, benzoguanamine resin, polyurethane resins, epoxy resins, cellulose, nitrocellulose, polyvinyl alcohol or polyvinyl butyral resin. These fine particles and resins may be used individually or as a mixture of two or more. It is desirable to use both the fine particles and the resins since the fine particles adsorb the resins to form uniform coating. The underlying layer may also contain the above-described binder resins. The polycarbonate resins or the crosslinked polycarbonate resins of the present invention may also be used.

The underlying layer is generally 0.01 to 10.0 μm, preferably 0.01 to 1.0 μm, in thickness. If it is less than 0.01 μm, it may be difficult to form an even underlying layer, and if it is more than 10.0 μm, the electrophotographic properties may be deteriorated.

Any conventional blocking layer may also be interposed between the conductive substrate and the photosensitive layer. The blocking layer may be a layer of the above-described binder resins. The blocking layer is generally 0.01 to 20.0 μm, preferably 0.1 to 10.0 μm, in thickness. If it is less than 0.01 μm, it may be difficult to form an even locking layer, and if it is more than 20.0 μm, the electrophotographic properties may be deteriorated.

The electrophotographic photoreceptor of the present invention may have a protecting layer on the photosensitive layer. The protecting layer may be 0.01 to 20 μm, preferably 0.1 to 10 μm, in thickness. The protecting layer may be a layer of the above-described binder resins, particularly the polycarbonate resins or the crosslinked polycarbonate resins of the present invention. The protecting layer may contain conductive substances, such as the above-described charge-generating substances and charge-transfer substances, additives, metals, oxides, nitrides, salts and alloys thereof, and carbon.

To improve the properties of the electrophotographic photoreceptor of the present invention, the charge-generating layer and the charge-transfer layer may contain additives, such as binders, plasticizers, curing catalysts, fluidizing agents, anti-pinhole agents, spectral sensitizers (sensitizing dyes) for improving the electrophotographic sensitivity, other various chemical substances for preventing the increase of residual potential and the decreases of charging potential and sensitivity during repeated uses, antioxidants, surfactants, anti-curling agents and leveling agents.

Examples of the binders are silicone resins, polyamide resins, polyurethane resins, polyester resins, epoxy resins, polyketone resins, polycarbonate resins, polystyrene resins, polymethacrylate resins, polyacrylamide resins, polybutadiene resins, polyisoprene resin, melamine resin, benzoguanamine resin, polychloroprene resin, polyacrylonitrile resin, ethyl cellulose resin, nitrocellulose resin, urea resins, phenolic resins, phenoxy resins, polyvinyl butyral resins, formal resins, vinyl acetate resins, vinyl acetate/vinyl chloride copolymer and polyestercarbonate resins. Thermo- or photosetting resins may also be used. That is, it is possible to use any resin which is an insulator and can form coating in ordinary conditions.

The binders are preferably 5 to 200% by weight, more preferably 10 to 100% by weight, based on the charge-transfer substance used. Photosensitive layers containing less than 5% by weight of binders may be so uneven as to deteriorate the image quality. Those containing more than 200% by weight of binders may have poor sensitivity so as to increase the residual potential.

Examples of the plasticizers are biphenyl, biphenyl chloride, o-terphenyl, paraffin halides, dimethylnaphthalene, dimethyl phthalate, dibutyl phthalate, dioctyl phthalate, diethyleneglycol phthalate, triphenyl phosphate, diisobutyl adipate, dimethyl sebacate, dibutyl sebacate, butyl laurate, methylphthalyl ethyl glycolate, dimethylglycol phthalate, methylnaphthalene, benzophenone, polypropylene, polystyrene and various fluorohydrocarbons.

Examples of the curing catalysts are methanesulfonic acid, dodecylbenzenesulfonic acid and dinonylnaphthalenesulfonic acid.

Examples of the fluidizing agents are Modaflow and Acronal 4F.

Examples of the anti-pinhole agents are benzoin and dimethyl phthalate.

The total amount of the plasticizers, curing catalysts, the fluidizing agents and the anti-pinhole agents is preferably 5% by weight or less, based on the charge-transfer substance.

Examples of the sensitizing dyes are triphenylmethane dyes, such as Methyl Violet, Crystal Violet, Night Blue and Victoria Blue, acridine dyes, such as Erythrosin, Rhodamine B, Rhodamine 3R, Acridine Orange and Flapeosin, thiazine dyes, such as Methylene Blue and Methylene Green, oxazine dyes, such as Capri Blue and Meldora Blue, cyanine dyes, merocyanine dyes, styryl dyes, pyrylium salt dyes and thiopyrylium salt dyes.

Electron acceptors may be added to the photosensitive layer to improve the sensitivity and to reduce the residual potential and fatigue during repeated uses.

Examples of the electron acceptors are compounds having high electron affinity, such as succinic anhydride, maleic anhydride, dibromomaleic anhydride, phthalic anhydride, tetrachlorophthalic anhydride, tetrabromophthalic anhydride, 3-nitrophthalic anhydride, 4-nitropyhthalic anhydride, pyromellitic anhydride, mellitic anhydride, tetracyanoethylene, tetracyanoquinodimethane, o-dinitrobenzene, m-dinitrobenzene, 1,3,5-trinitrobenzene, paranitrobenzonitrile, picryl chloride, quinonechloroimide, chloranyl, bromanyl, benzoquinone, 2,3-dichlorobenzoquinone, dichlorodicyanoparabenzoquinone, naphthoquinone, diphenoquinone, tropoquinone, anthraquinone, 1-chloroanthraquinone, dinitroanthraquinone, 4-nitrobenzophenone, 4,4-nitrobenzophenone, 4-nitrobenzalmalonodinitrile, ethyl α-cyano-β-(p-cyanophenyl)acrylate, 9-anthracenylmethylmalondinitrile, 1-cyano-(p-nitrophenyl)-2-(p-chlorophenyl)ethylene, 2,7-dinitrofluorenone, 2,4,7-trinitrofluorenone, 2,4,5,7-tetranitrofluorenone, 9-fluorenylidene [dicyanomethylenemalononitrile], polynitro-9-fluorenylidene[dicyanomethylenemalonodinitrile], picric acid, o-nitrobenzoic acid, p-nitrobenzoic acid, 3,5-dinitrobenzoic acid, pentafluorobenzoic acid, 5-nitrosalicylic acid, 3,5-dinitrosalicylic acid, phthalic acid and mellitic acid.

The electron acceptors may be added to either the charge-transfer layer or the charge-generating layer, and is generally 0.01 to 200% by weight, preferably 0.1 to 50% by weight, based on the charge-transfer substances or the charge-generating acceptors.

To improve the surface quality, tetrafluoroethylene resin, trifluoroethylene chloride resin, tetrafluoroethylene-hexafluoropropylene resin, fluorovinyl resins, fluorovinylidene resins, difluorodichloroethylene resin, copolymers thereof and fluorinated graft copolymers may also be used.

The amount of these surface modifiers is generally 0.1 to 60% by weight, preferably 5 to 40% by weight, based on the binder resin. If it is less than 0.1% by weight, surface modification will be insufficient for improving the abrasion resistance and surface durability and for decreasing the surface energy, and if it is more than 60% by weight, the electrophotographic properties may be deteriorated.

Examples of usable antioxidants are hindered phenol antioxidants, aromatic amine antioxidants, hindered amine antioxidants, sulfide antioxidants and organic phosphoric acid antioxidants.

These antioxidants are generally 0.01 to 10% by weight, preferably 0.1 to 2% by weight, based on the charge-transfer substances.

Examples of the hindered phenol antioxidants are given below.

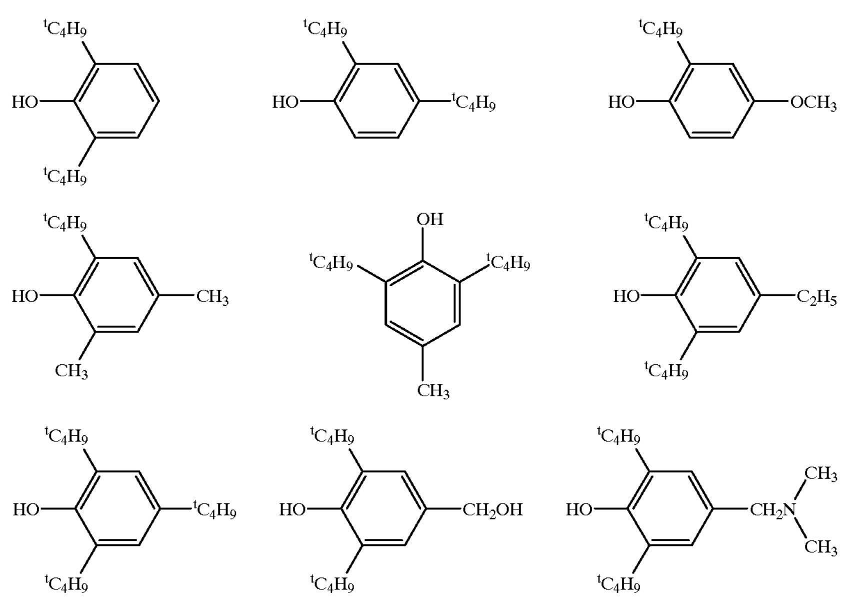

-continued
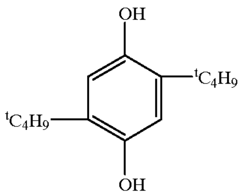
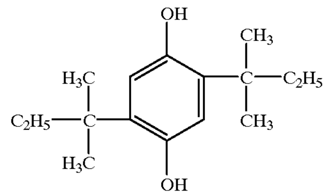
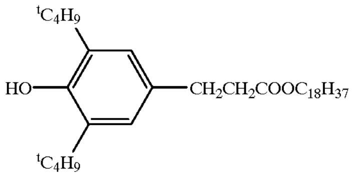
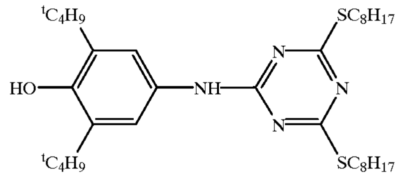
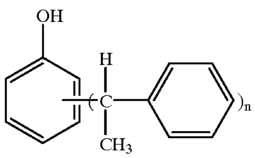
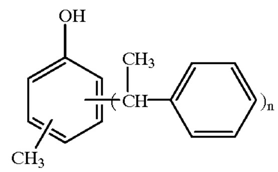
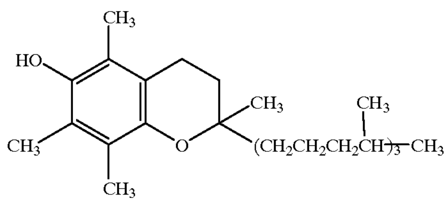
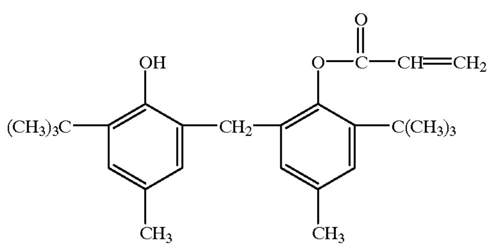
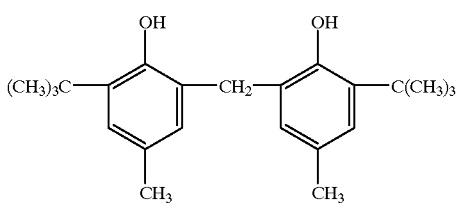
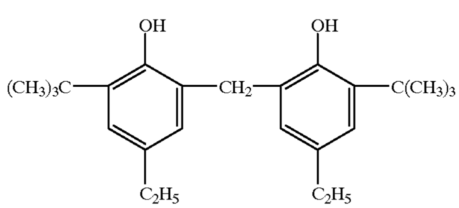
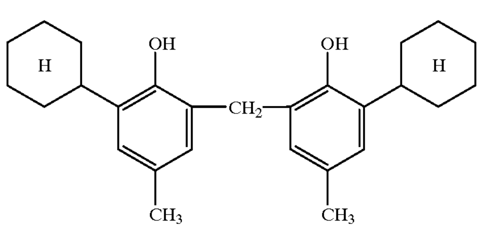

-continued
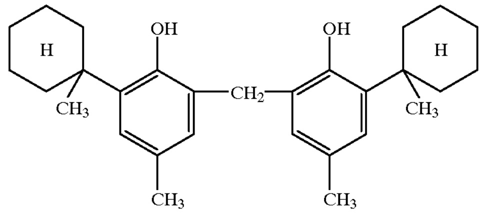
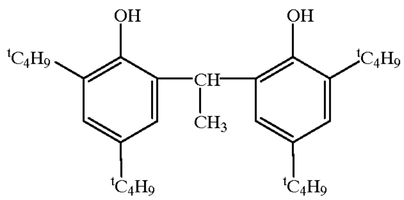
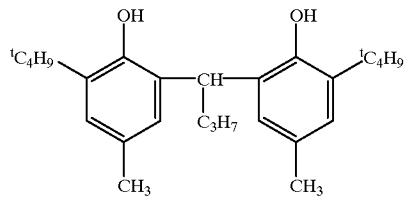
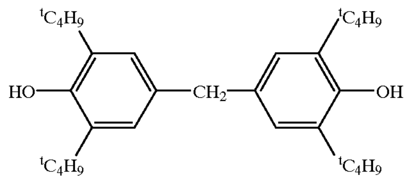
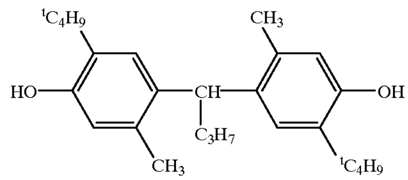
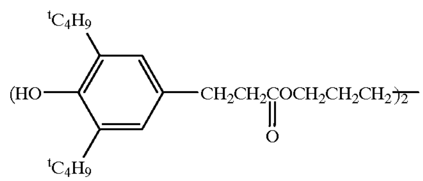
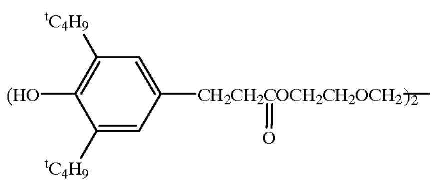
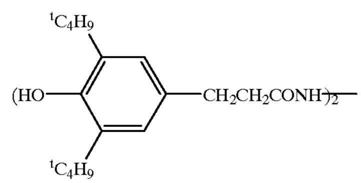
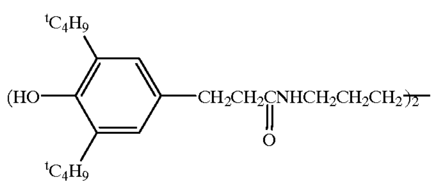
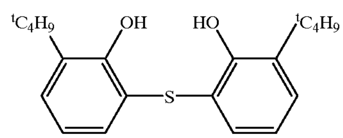
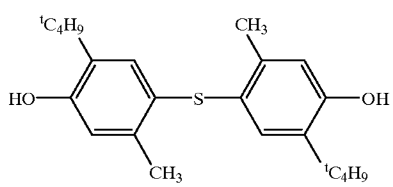
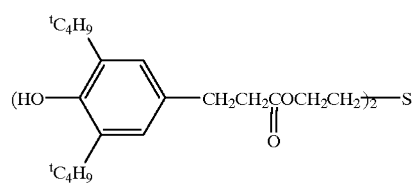
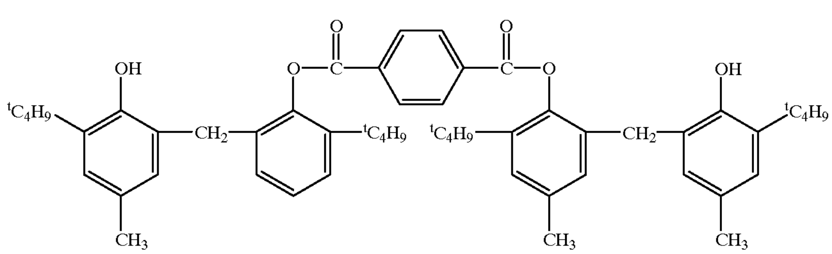

-continued
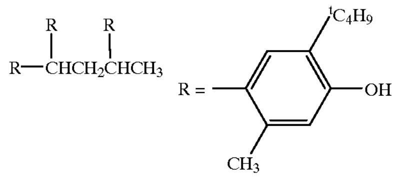
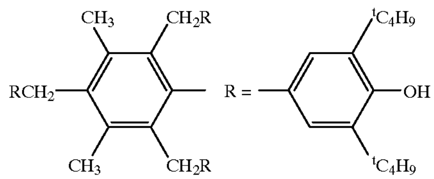
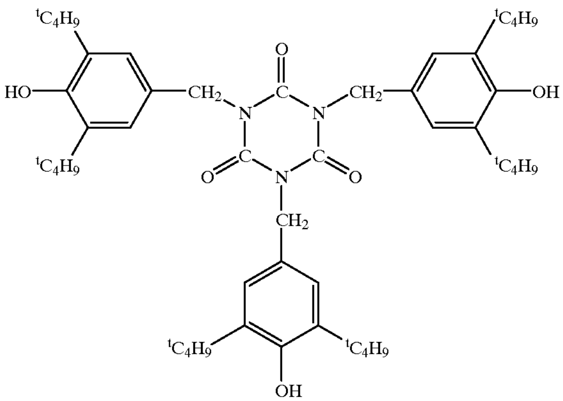
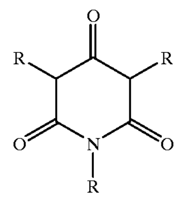
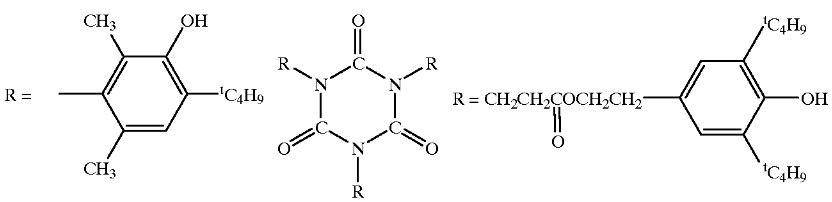
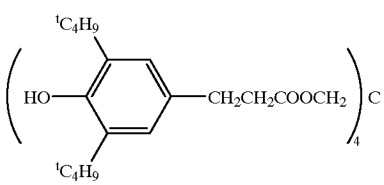
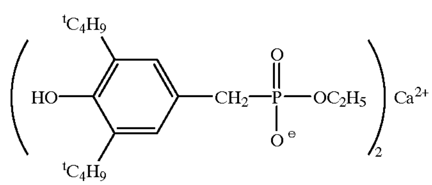
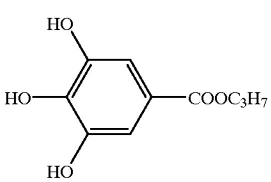
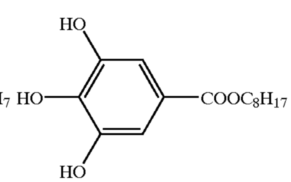
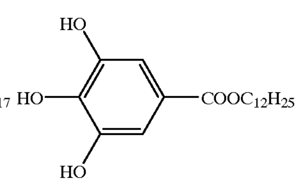
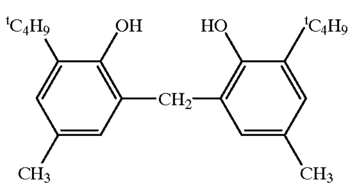
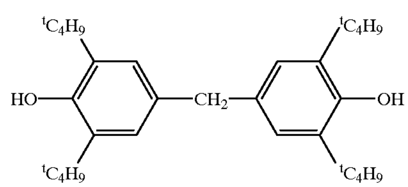
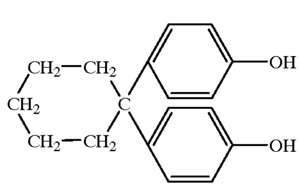
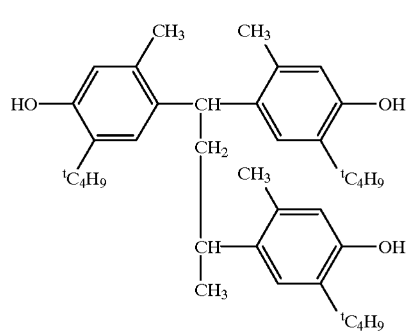

-continued
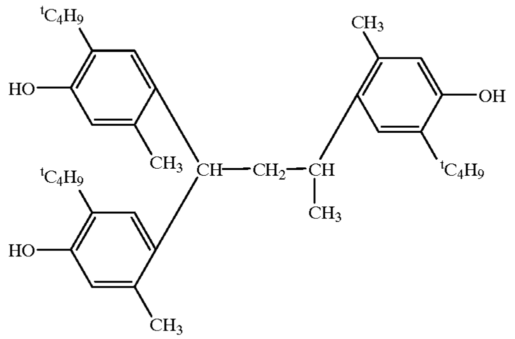
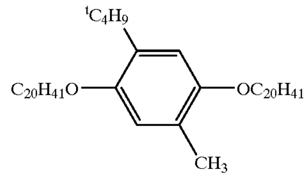
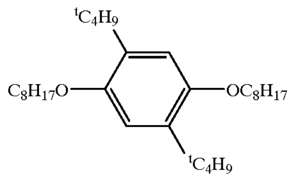
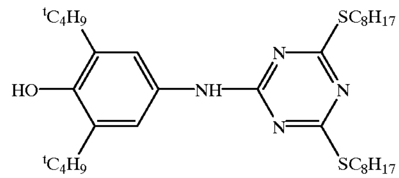
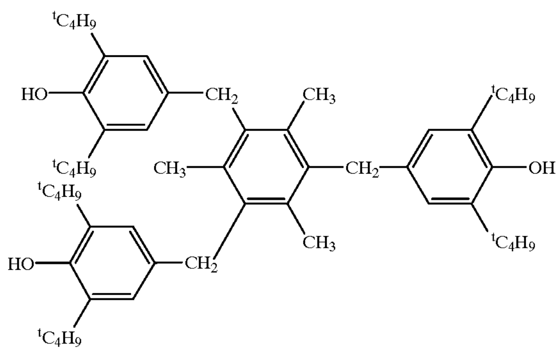
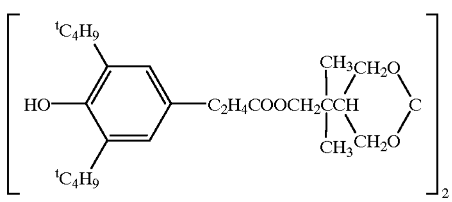
Examples of the aromatic amine antioxidants are given below.
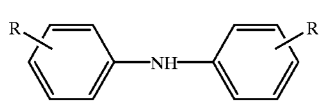
R: an alkyl, such as methyl or ethyl
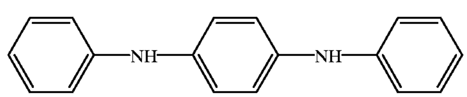
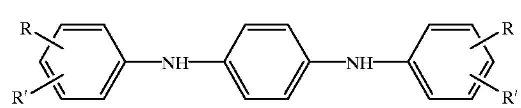
R: an alkyl, such as methyl or ethyl
-continued
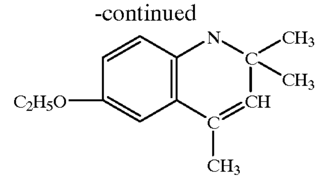
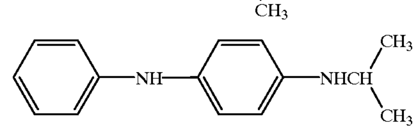
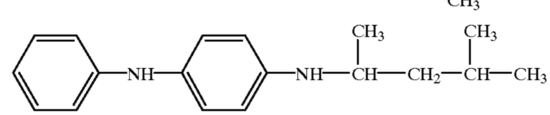
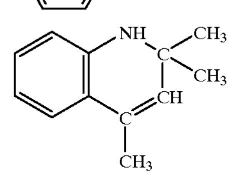

-continued
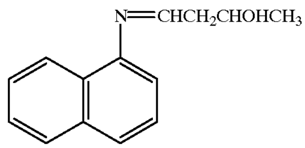
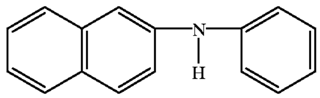
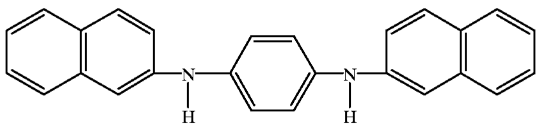
-continued
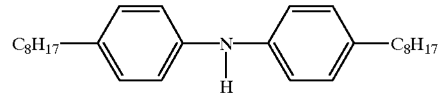
Examples of the hindered amine antioxidants are given below.
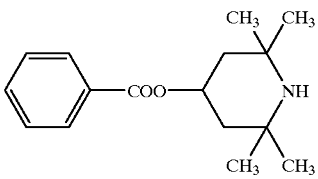
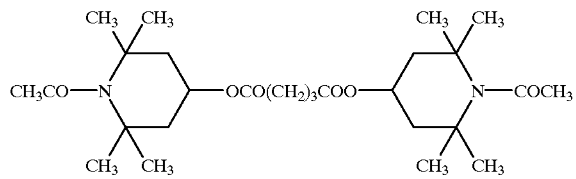
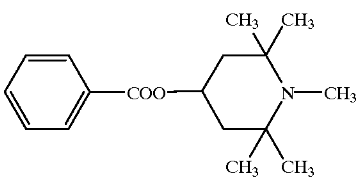
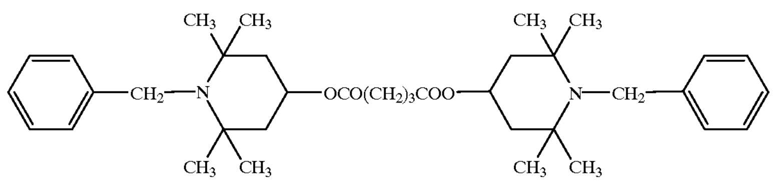
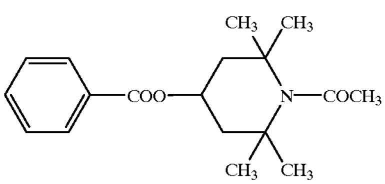
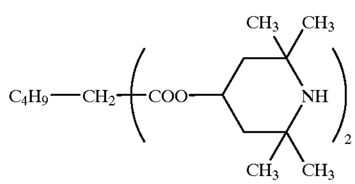
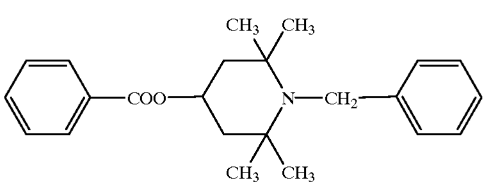
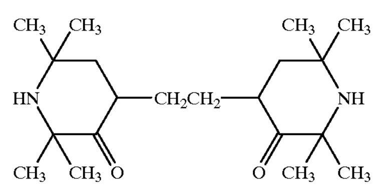
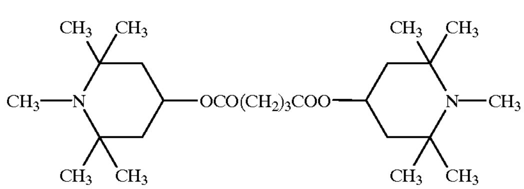

-continued
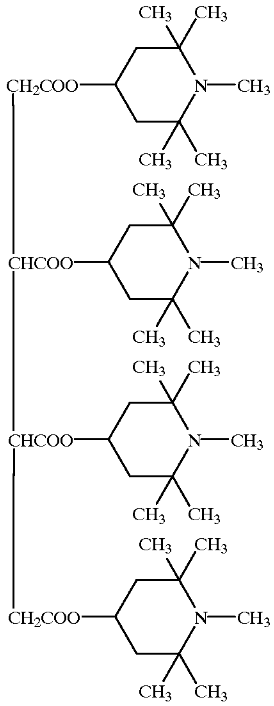
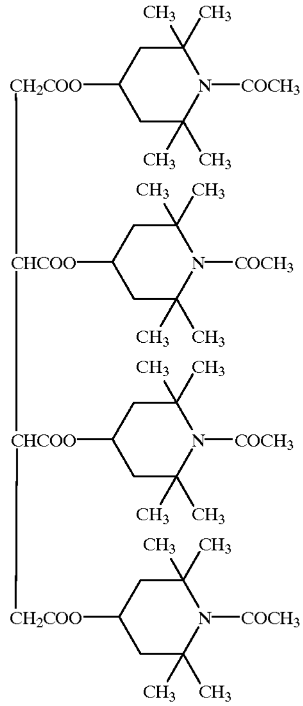
Examples of the sulfide antioxidants are given below.
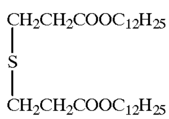
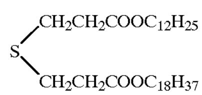
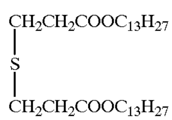
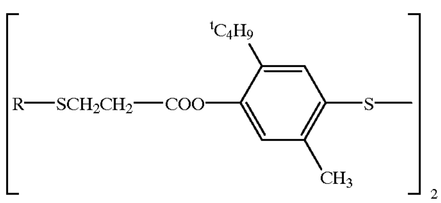
(R: $C_{12}$~$C_{14}$ Alkyl)
-continued
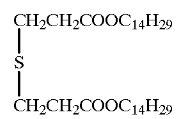
$(C_{12}H_{25}SCH_2CH_2COOCH_2)_4C$
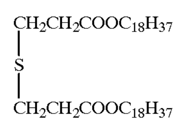
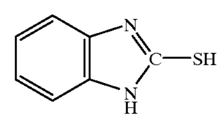
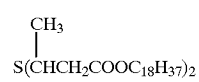
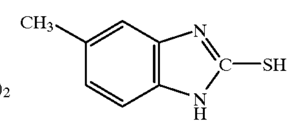
Examples of the organic phosphoric acid antioxidants are given below.
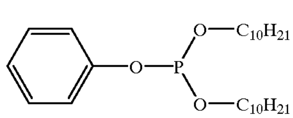
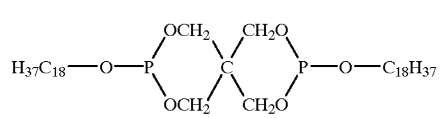
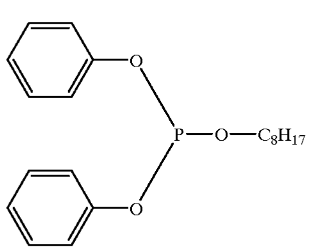
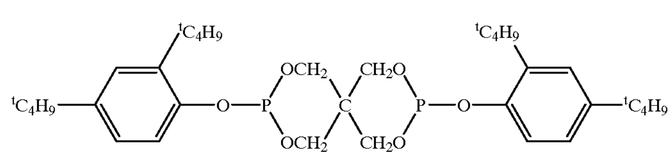

-continued
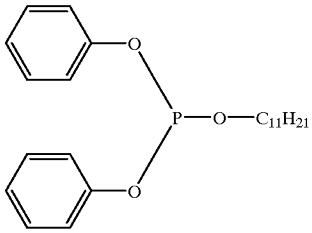
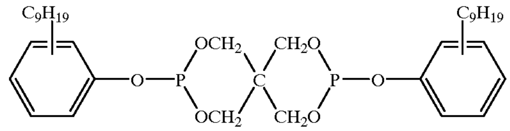
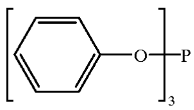
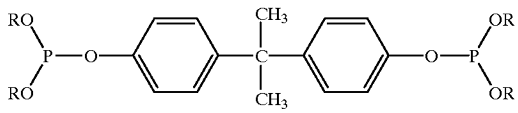
(R: $C_{12}$~$C_{15}$ alkyl)
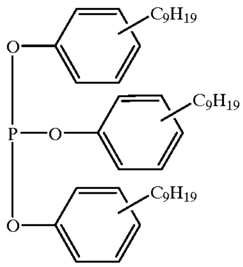
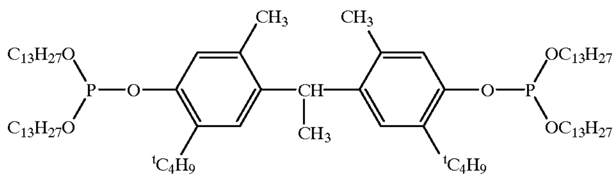
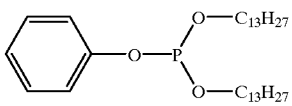
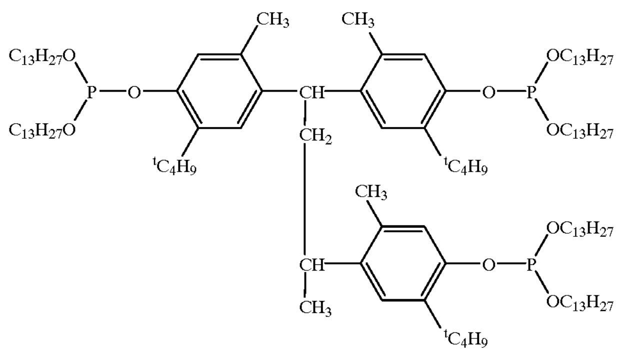
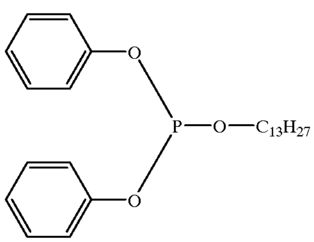
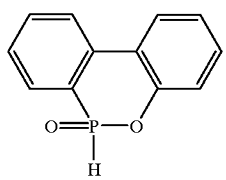
$P{-}(S{-}C_{12}H_{25})_3$
$P{-}(S{-}C_{10}H_{21})_3$
$P{-}(O{-}C_{13}H_{27})_3$
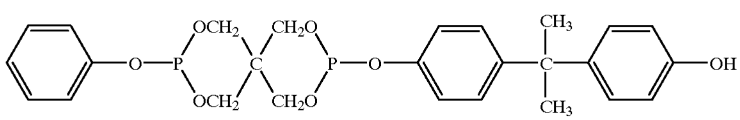
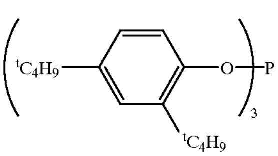
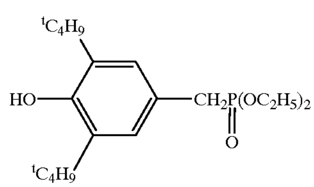

-continued
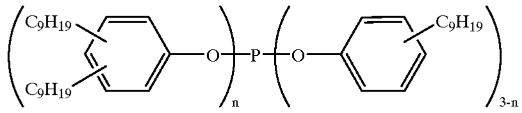
(*n* = 1 or 2)
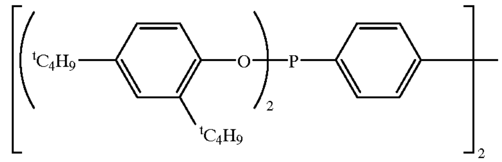
Examples of the antioxidants containing in molecules both hindered phenol structure units and hindered amine structure units are given below.
These additives may be used individually or in a combination thereof, for example, as a mixture of two or more.
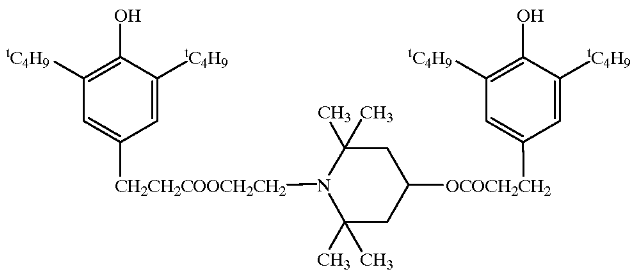
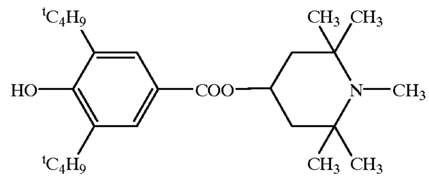
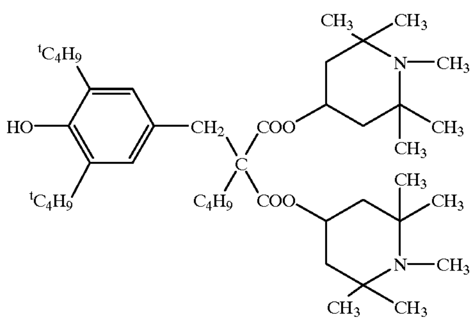
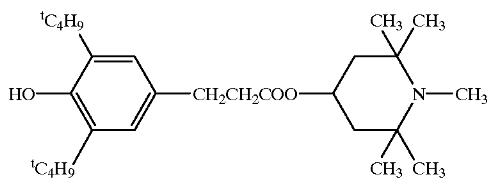
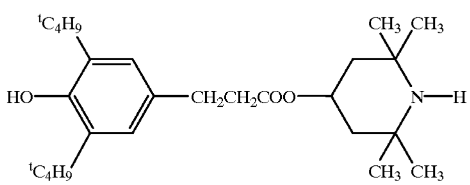
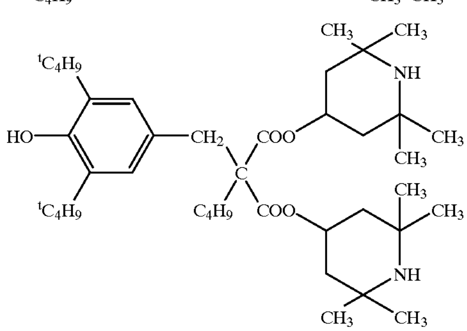
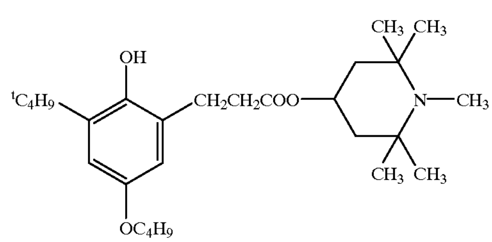
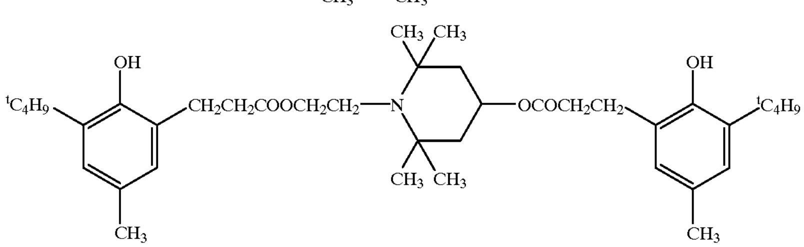

These additives may also be added to the protection layer, underlying layer and blocking layer.

Examples of the solvents, which may be used for the production of the charge-generating layer and charge-transfer layer are, aromatic solvents, such as benzene, toluene, xylene and chlorobenzene, ketones, such as acetone, methyl ethyl ketone and cyclohexanone, alcohols, such as methanol, ethanol and isopropanol, esters, such as ethyl acetate and ethyl cellosolve, hydrocarbon halides, such as carbon tetrachloride, chloroform, dichloromethane and tetrachloroethane, ethers, such as tetrahydrofuran and dioxane, dimethylformamide, dimethyl sulfoxide and diethylformamide.

These solvents may be used individually or as a solvent mixture of two or more.

The charge-transfer layer may be produced by coating an underlying substrate or layer with a solution wherein the above-described charge-transfer substance, additives, binder resin material and, optionally, a thermal polymerization initiator and a photo-initiator are dispersed or dissolved in a solvent, by dipping, statistic coating, powder coating, spraying, roll coating, applicator coating, spray-coater coating, bar-coater coating, roll-coater coating, dip-coater coating, doctor-blade coating, wire-bar coating, knife-coater coating, attritor coating, spinner coating, bead coating, blade coating or curtain coating, followed by drying and crosslinking the crosslinking polycarbonate resin.

The dispersing or dissolving may be performed by using, for example, a ball mill, ultrasound, a paint shaker, a red devil, a sand mill, a mixer or an attritor.

Crosslinking can be performed under various pressure ranging from reduced pressure to applied pressure, preferably under reduced pressure or atmospheric pressure.

After coating a coating fluid, the polycarbonate resin can be crosslinked according to the method described above in the production of crosslinked polycarbonate resins, by common radical polymerization induced by heating or the like, or by irradiation with UV light, IR light, electron rays or micro wave.

The photosensitive layer of single-layer type electrophotographic photoreceptors may be produced by coating the underlying substrate with a solution wherein the above-described charge-generating substance, charge-transfer substance, additives and binder resin material and, optionally, a thermal polymerization initiator, a photo-initiator and a monomer having ethylene double bonds are dispersed or dissolved in a solvent, followed by drying and crosslinking the crosslinking polycarbonate resin. The methods of coating and crosslinking and the additives are the same as those described above. As described above, a protecting layer, underlying layer and blocking layer may also be formed.

Single-layer type photoreceptors are preferably 5 to 100 $\mu$m, more preferably 8 to 50 $\mu$m thick. If the thickness is less than 5 $\mu$m, the initial surface potential may be low, and if it is more than 100 $\mu$m, the electrophotographic properties may be deteriorated.

In single-layer type electrophotographic photoreceptors, the weight ratio of [charge-generating substance]:[crosslinked polycarbonate resin] is preferably from 1:99 to 30:70, more preferably from 3:97 to 15:85. The weight ratio of [charge-transfer substance]:[crosslinked polycarbonate resin] is preferably from 10:90 to 80:20, more preferably from 30:70 to 70:30.

Other resins may be used along with the polycarbonate resins of the present invention so far as the attainment of the objects of the present invention is not hindered.

The electrophotographic photoreceptor of the present invention preferably has a layer structure wherein the photosensitive layer has a surface layer containing the polycarbonate resin or crosslinked polycarbonate resin of the present invention. Such an electrophotographic photoreceptor of the present invention has high surface hardness and maintains excellent printing life, and is applicable in various electrophotographic fields, such as duplicators, (monochrome duplicators, multicolor duplicators, full-color duplicators; analog duplicators, digital duplicators), printers (laser printers, LED printers, liquid crystal shutter printers), FAX and plate making machines.

The electrophotographic photoreceptor of the present invention can be electrified by, for example, corona discharge (corotron or scotron), or contact electrification (electrification rollers, electrification brushes). Exposure is performed by, for example, a halogen lamp, a fluorescent lamp, laser (semiconductor, He—Ne), LED or an intra-photoreceptor exposure system. Development is performed by, for example, a dry development, such as cascade development, two-component magnetic brush development, one-component insulating toner development or one-component conductive toner development, or wet development. Image transfer is performed by, for example, electrostatic transfer, such as corona transfer, roller transfer or belt transfer, pressure transfer or adhesion transfer. Fixing is performed by, for example, hot-roller fixing, radiant-flash fixing, oven fixing or pressure fixing. Cleaning and discharging is performed by using, for example, a brush cleaner, a magnetic brush cleaner, a electrostatic brush cleaner, a magnetic roller cleaner or a blade cleaner.

The present invention will be described in detail referring to Examples of the present invention and Comparative Examples, which, however, should not be construed to limit the scope of the present invention.

In the following Examples and Comparative Examples, the structures of synthesized products were confirmed by measuring $^1$H-NMR spectrum with EX-90 produced by Nippon Denshi Co., Ltd.

EXAMPLE 1

Into a mixture of a solution of 2,2-bis(4-hydroxyphenyl) propane (74 g) in a 6 wt % Conc. of aqueous sodium hydroxide solution (550 ml) and methylene chloride (250 ml), phosgene gas was blown at a rate of 950 ml/sec for 15 minutes with stirring and cooling. The reaction fluid was then allowed to stand to separate the organic layer, which was a methylene chloride solution of an bisphenol A (2,2-bis(4-hydroxyphenyl)propane) polycarbonate oligomer of a polymerization degree of 2 to 4 having chloroformate groups at the polymer ends. The structure, polymerization degree and end groups of the oligomer were determined by $^1$H-NMR, MS and GPC.

450 ml of a solution containing the methylene chloride solution of the oligomer (200 ml) and balance of methylene chloride was mixed with a solution of the following BP-1 (28.8 g) in a 8 wt % Conc. of aqueous sodium hydroxide solution (150 ml), and p-tert-butylphenol (2.0 g) was added as an agent for controlling molecular weight. While the mixture was stirred vigorously, a 7 wt % Conc. of aqueous triethylamine solution (2 ml) was added as a catalyst, and reaction was carried out at 28° C. for 1.5 hours with vigorous stirring. After the completion of the reaction, the reaction product was diluted with methylene chloride (1 liter), washed twice with pure water (1.5 liter), once with 0.01N-hydrochloric acid (1 liter), and twice with pure water (1 liter). The organic phase was poured into methanol, to collect a polymer.

The polymer had a reduced viscosity (reduced viscosity: measured at a concentration of 0.5 g/dl at 20° C. in methylene chloride using an Ubbelohde's improved viscometer (Model-RM); the same will be applied hereinafter) of 1.3 dl/g. FIG. 1 shows a chart of the $^1$H-NMR spectrum the polymer. From the $^1$H-NMR spectrum, the polymer was determined to contain BP-1 and bisphenol A structures in a molar ratio of 18:82 from the ratio of the integral value of the peaks near 5.0 ppm and 3.3 ppm due to allyl to that of the peak near 1.5 ppm due to the methyl of bisphenol A.

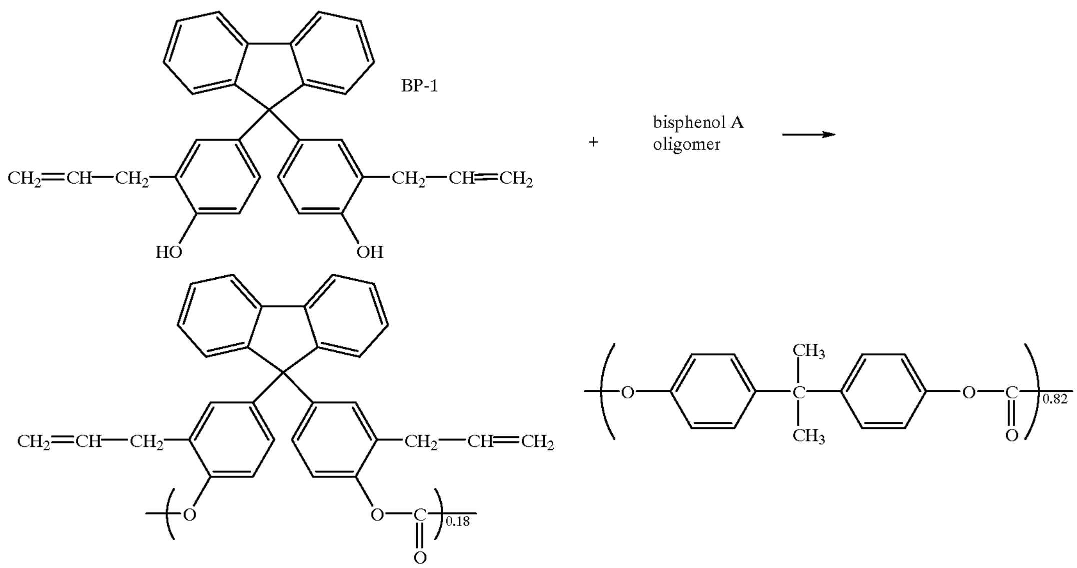

0.5 Parts (part by weight; the same will be applied hereinafter) of oxotitanium phthalocyanine and 0.5 parts of butyral resin were dispersed in 19 parts of methylene chloride with a ball mill, and the dispersion was applied to a conductive substrate, which was a PET film coated with aluminum by evaporation, with a bar coater, and dried to form a charge-generating layer (thickness: 0.5 μm). A coating fluid was prepared by using 1 part of a compound (C-1), which is a charge-transfer substance having the following structure, 1 part of the polycarbonate, 0.05 parts of azobisisobutyronitrile and 8 parts of methylene chloride.

(C-1)

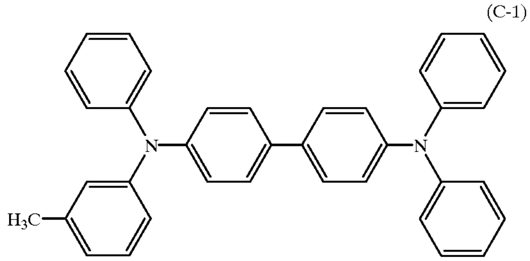

The coating fluid was applied on the above charge-generating layer using an applicator. On heating at 140° C. for 10 minutes, a crosslinked-type organic electrophotographic photoreceptor containing a methylene chloride-insoluble fraction (crosslinked polycarbonate) was obtained.

EXAMPLE 2

A polycarbonate was produced in the same manner as in Example 1 except that BP-1 was replaced by the following BP-2 (22.5 g). The polycarbonate had a reduced viscosity of 1.5 dl/g.

BP-2

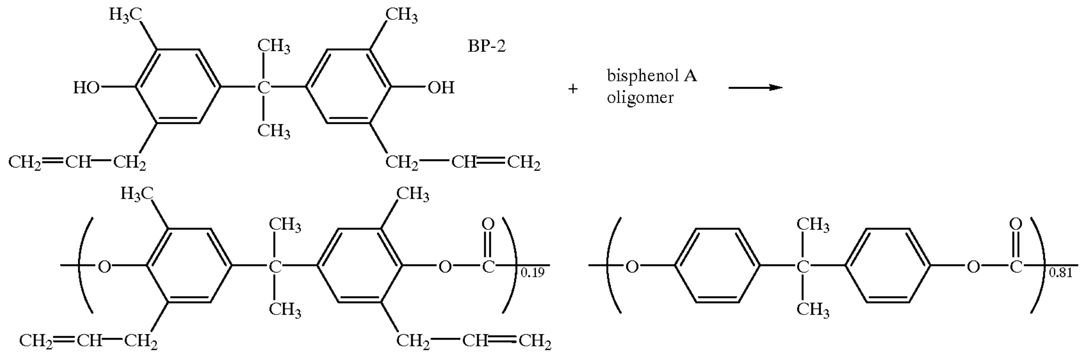

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 3

A polycarbonate was produced in the same manner as in Example 1 except that BP-1 was replaced by the following BP-3 (17.8 g). The polycarbonate had a reduced viscosity of 1.3 dl/g.

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 4

A polycarbonate was produced in the same manner as in Example 1 except that BP-1 was replaced by the following BP-4 (20.2 g). The polycarbonate had a reduced viscosity of 1.1 dl/g.

BP-3

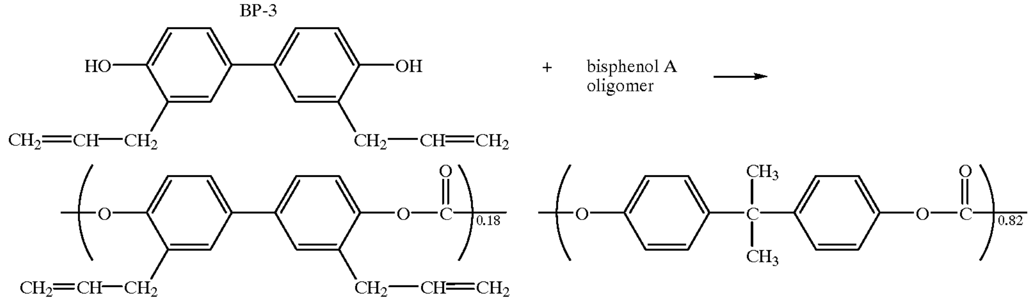

BP-4

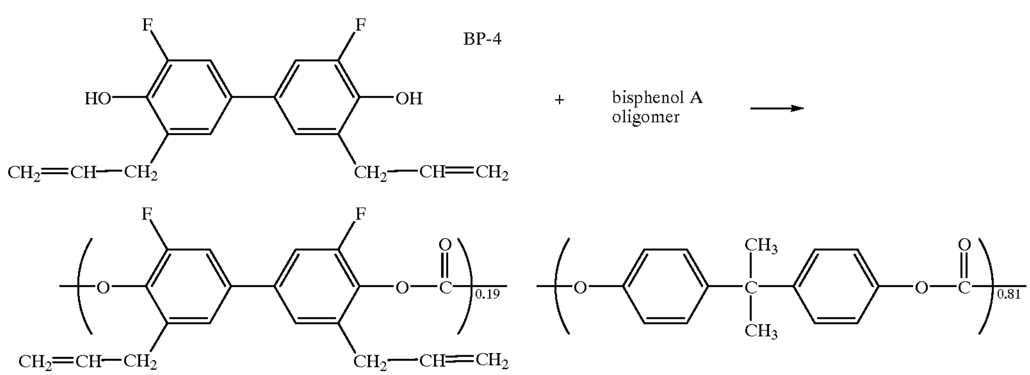

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

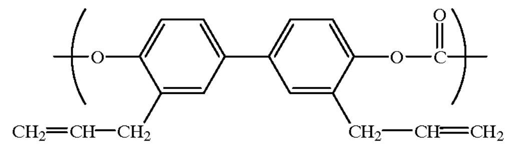

EXAMPLE 5

A polycarbonate was produced in the same manner as in Example 1 except that BP-1 was replaced by the following BP-5 (20.8 g). The polycarbonate had a reduced viscosity of 1.2 dl/g.

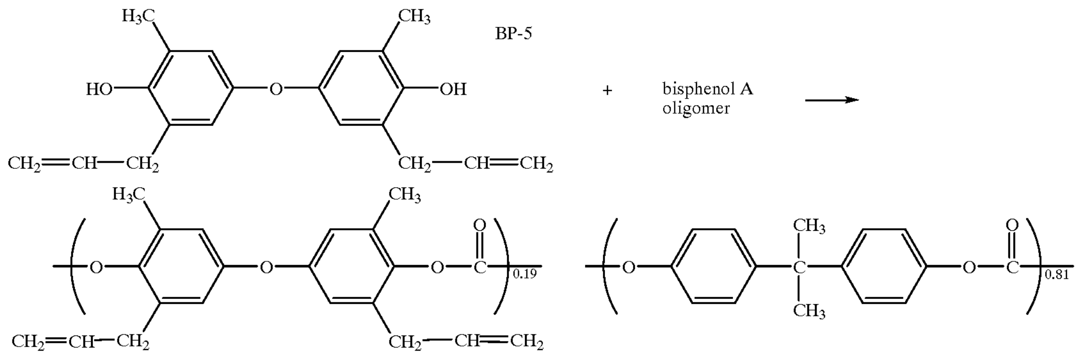

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 6

A polycarbonate was produced in the same manner as in Example 1 except that the bisphenol A (74 g) was replaced by BP-3 (86 g), and BP-1 by BP-3 (17.8 g). The polycarbonate had a reduced viscosity of 1.5 dl/g.

EXAMPLE 7

A polycarbonate was produced in the same manner as in Example 1 except that BP-1 was replaced by the following BP-6 (21.6 g). The polycarbonate had a reduced viscosity of 1.1 dl/g.

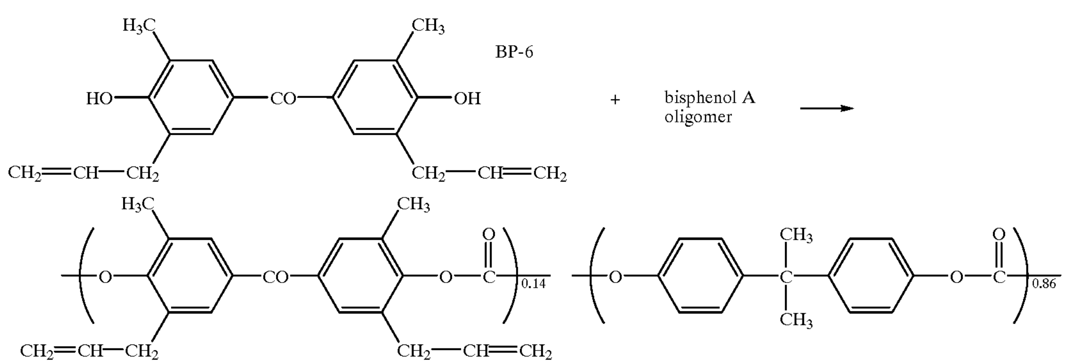

After a charge-generating layer was formed on a substrate in the same manner as in Example 1, a coating fluid was prepared in the same manner as in Example 1 by using the polycarbonate obtained above, and was applied as in Example 1. On heating at 140C for 10 minutes, a crosslinked-type organic electrophotographic photoreceptor containing a methylene chloride-insoluble fraction was obtained.

EXAMPLE 8

A polycarbonate was produced in the same manner as in Example 1 except that BP-1 was replaced by the following BP-7 (15.1 g). The polycarbonate had a reduced viscosity of 1.0 dl/g.

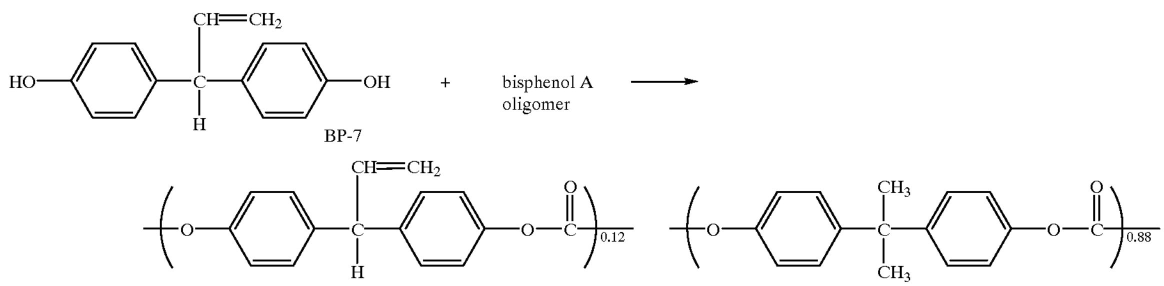

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 9

A polycarbonate was produced in the same manner as in Example 1 except that BP-1 was replaced by the following BP-8 (20.6 g). The polycarbonate had a reduced viscosity of 0.9 dl/g.

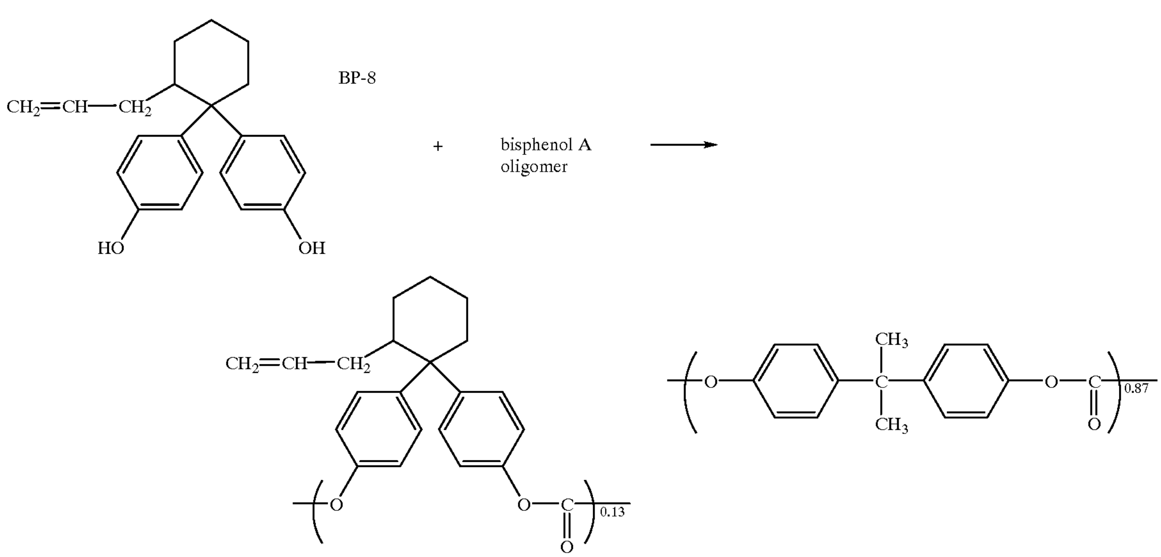

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 10

A polycarbonate was produced in the same manner as in Example 1 except that the 2,2-bis(4-hydroxyphenyl)propane (74 g) was replaced by 1,1-bis(4-hydroxyphenyl) cyclohexane:bisphenol Z (87.1 g), the 6 wt % Conc. of aqueous sodium hydroxide solution (550 ml) by a 8.4 wt % Conc. of aqueous potassium hydroxide solution (550 ml), BP-1 (28.8 g) by the following BP-9 (30.7 g) and BP-10 (5 g), and the 8 wt % Conc. of aqueous sodium hydroxide solution (150 ml) by a 11.2 wt % Conc. of aqueous potassium hydroxide solution (150 ml). The polycarbonate had a reduced viscosity of 1.2 dl/g.

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 11

A polycarbonate was produced in the same manner as in Example 10 except that BP-9 (30.7 g) was replaced by the following BP-11 (27.3 g), and BP-10 (5 g) by the following BP-12 (10 g). The polycarbonate had a reduced viscosity of 1.1 dl/g.

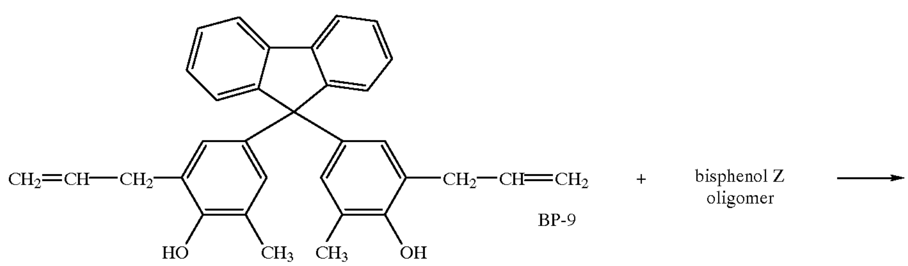

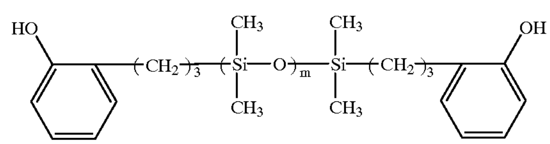

BP-10 (hydroxyl equivalent = 1800)

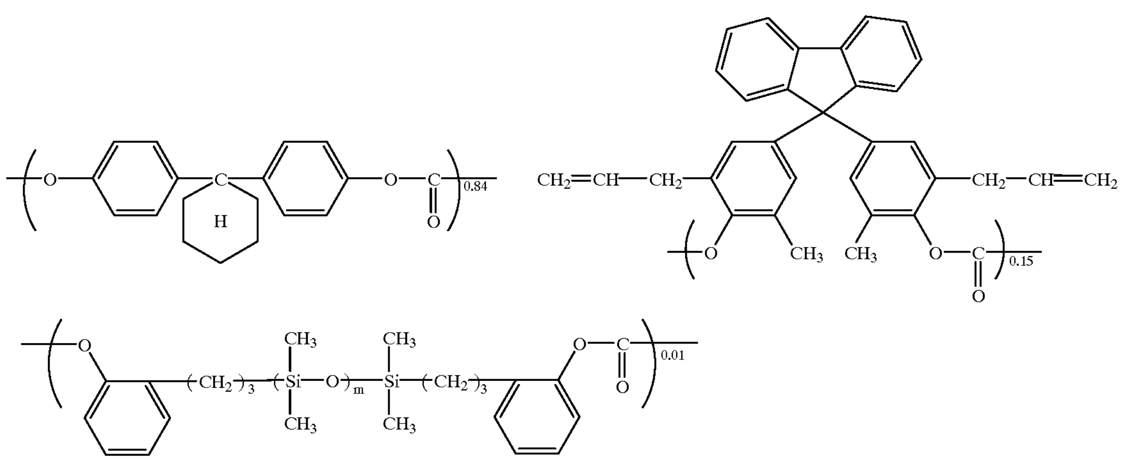

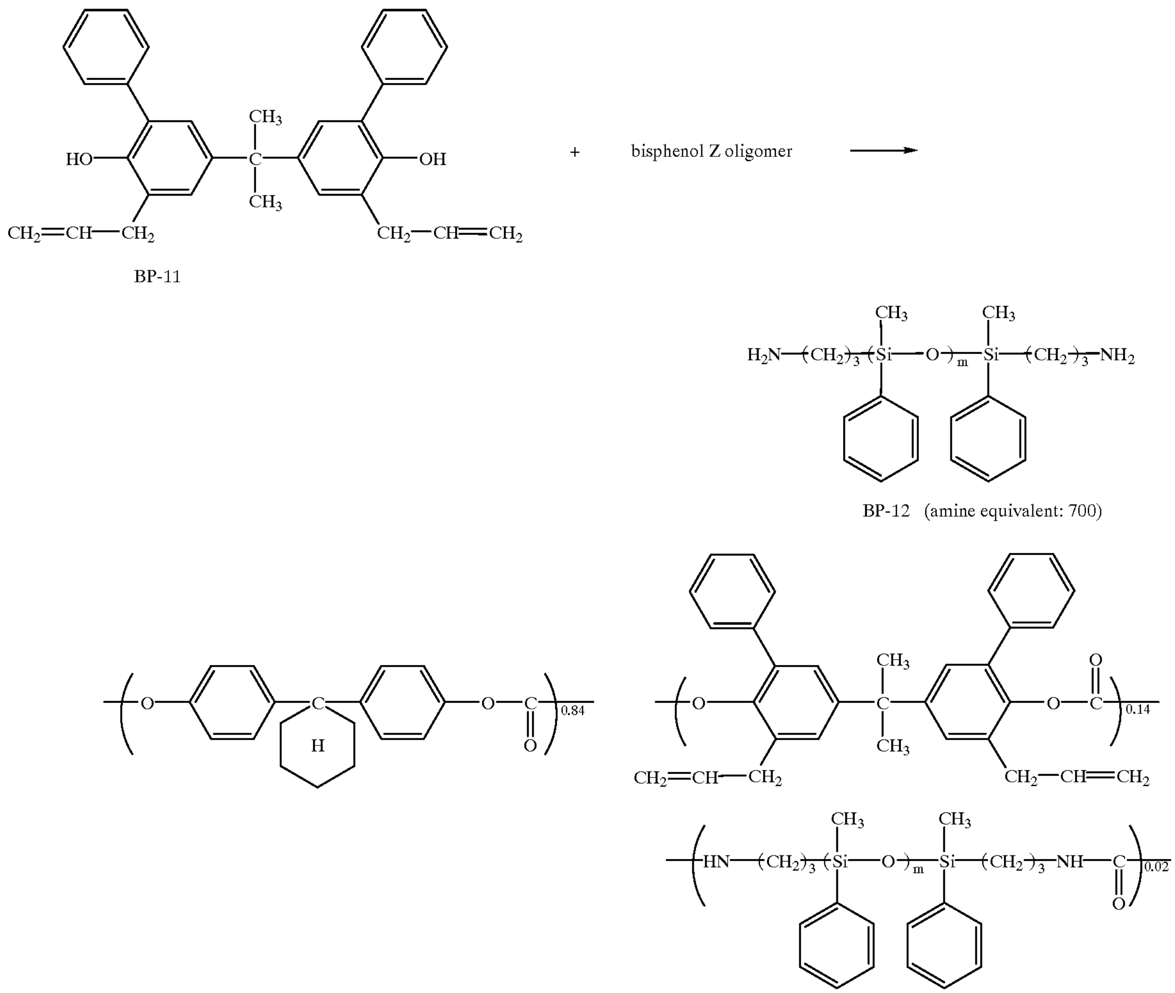

BP-11

BP-12 (amine equivalent: 700)

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 12

A polycarbonate was produced in the same manner as in Example 10 except that BP-9 (30.7 g) was replaced by the following BP-13 (30.0 g), and BP-10 (5 g) by BP-10 (1 g). The polycarbonate had a reduced viscosity of 1.3 dl/g.

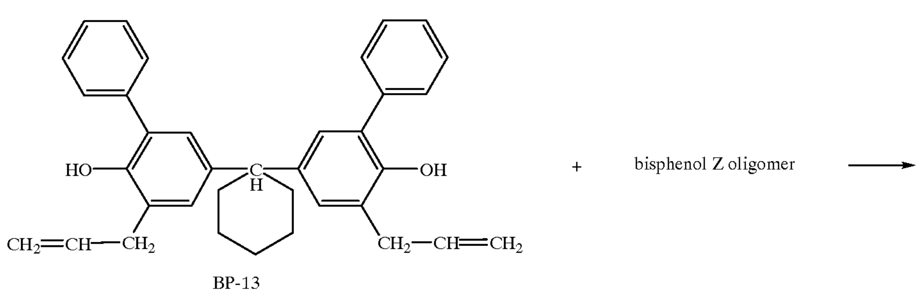

BP-13

-continued

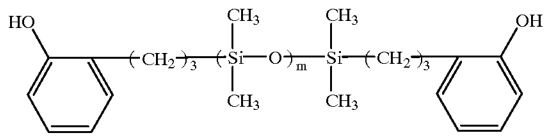

BP-10 (hydroxyl equivalent = 1800)

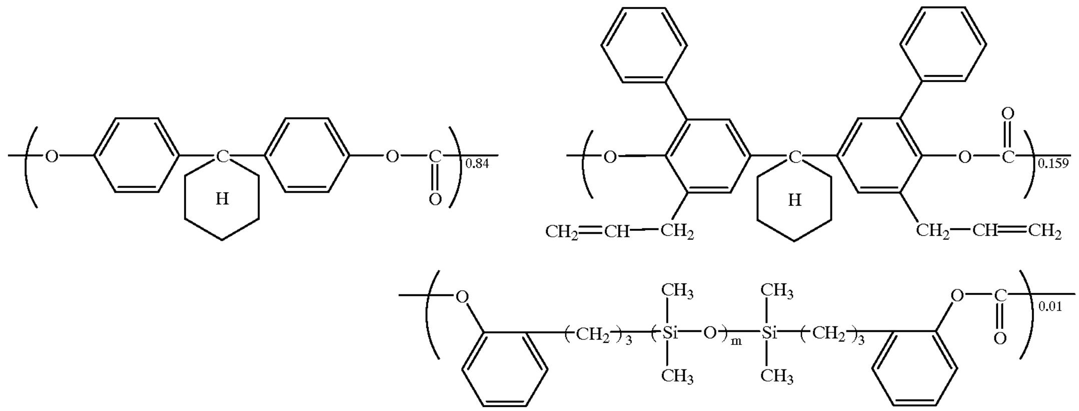

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

EXAMPLE 13

A polycarbonate was produced in the same manner as in Example 10 except that BP-9 (30.7 g) was replaced by the following BP-14 (15.0 g), and 9P-10 (5 g) by BP-12 (20 g). The polycarbonate had a reduced viscosity of 1.1 dl/g.

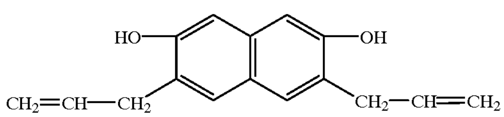

BP-14

+ bisphenol Z oligomer →

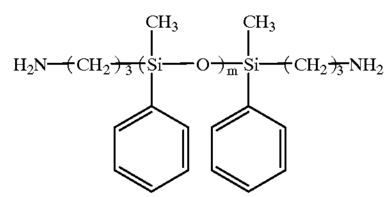

BP-12 (amine equivalent = 700)

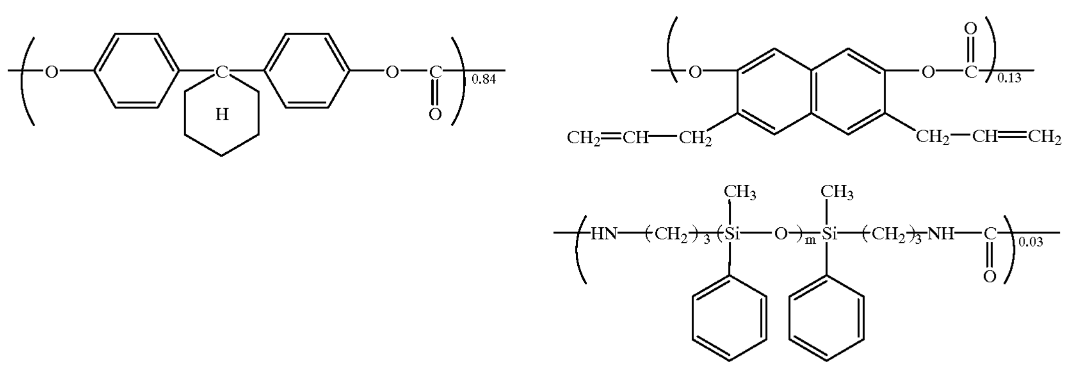

After a charge-generating layer was formed on a substrate in the same manner as in Example 1, a coating fluid was prepared in the same manner as in Example 1 by using the polycarbonate obtained above, and was applied as in Example 1. On heating at 140° C. for 10 minutes, a crosslinked-type organic electrophotographic photoreceptor containing a methylene chloride-insoluble fraction was obtained.

Comparative Example 1

A polycarbonate was produced as follows in accordance with the method disclosed in Japanese Patent Application Unexamined Publication No. 4-291348.

Into a three-necked round-bottom flask equipped with a stirrer, a thermometer, a gas inlet and a reflux condenser were put 53.7 parts of a 48.5 wt % Conc. of aqueous sodium hydroxide solution, 230.8 parts of water, 31.4 parts of 3,3'-diallylbisphenol A and 27.3 parts of bisphenol Z and dissolved while dry nitrogen gas was blown through the flask. The solution was cooled to 20° C. in an ice bath, and 26.2 parts of phosgene gas was introduced therein slowly over a 1 hour interval with stirring. After addition of 8.4 parts of a 48.5 wt % Conc. of aqueous sodium hydroxide solution followed by 0.61 parts of p-tert-butylphenol as a terminator, polymerization was carried at 30° C. for 1 hour. After the completion of the reaction, the methylene chloride layer was separated and made acid with hydrochloric acid, and then washed with water repeatedly to remove dissolved salts. Methylene chloride was then evaporated to obtain a solid. The solid comprised the following repeating units in the following copolymerization ratios.

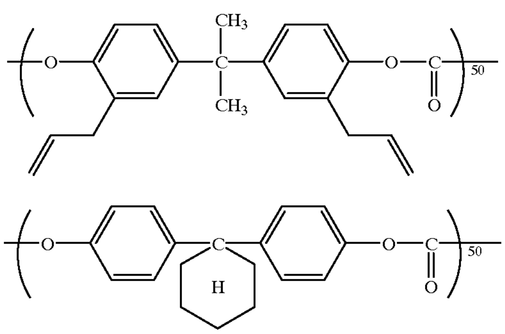

The polymer had a reduced viscosity of 1.2 dl/g.

After a charge-generating layer was formed on a substrate in the same manner as in Example 1, a coating fluid was prepared by dissolving 1 part of the polycarbonate, 0.05 part of azobisisobutylonitrile and 8 parts of methylene chloride. The coating fluid was applied on the charge-generating layer with an applicator. On crosslinking by heating at 140° C. for 10 minutes, a crosslinked-type organic electrophotographic photoreceptor was obtained, which contained a methylene chloride-insoluble fraction.

Comparative Example 2

An organic electrophotographic photoreceptor was produced in the same manner as in Comparative Example 1 except that a polycarbonate (reduced viscosity: 0.77 dl/g) comprising the following repeating units was used as a binder resin.

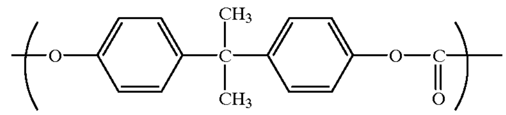

Comparative Example 3

An organic electrophotographic photoreceptor was produced in the same manner as in Comparative Example 1 except that a polycarbonate (reduced viscosity: 0.73 dl/g) comprising the following repeating units was used as a binder resin.

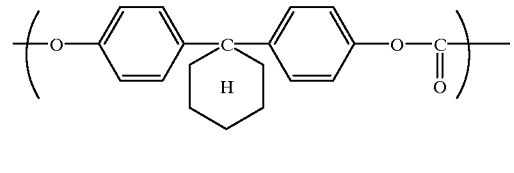

Abrasion Resistant Test

The charge-transfer layers formed in the above Examples and Comparative Examples were tested for abrasion resistance using a Suga abrasion tester NUS-ISO-3 (produced by Suga Shikenki Co., Ltd.). The abrasion resistances were evaluated by measuring the reductions in weight caused by putting samples into 2000-times reciprocating motion on an abrasive paper (abrasive paper: $Al_2O_3$, 3 $\mu$m, produced by Suga Shikenki Co., Ltd.), applying a load of 500 g. The results are listed in Table 1.

TABLE 1

| | Abrasion (mg) |
|---|---|
| Example 1 | 1.2 |
| Example 2 | 1.3 |
| Example 3 | 1.2 |
| Example 4 | 1.4 |
| Example 5 | 1.6 |
| Example 6 | 1.5 |
| Example 7 | 1.4 |
| Example 8 | 1.6 |
| Example 9 | 1.5 |
| Example 10 | 1.1 |
| Example 11 | 1.2 |
| Example 12 | 0.9 |
| Example 13 | 1.2 |
| Comparative Example 1 | 2.7 |
| Comparative Example 2 | 3.5 |
| Comparative Example 3 | 3.0 |

In the following Examples 14–17 and Comparative Example 4, the percentages of the methylene chloride-insoluble fraction in the crosslinked polycarbonate resins used in the electrophotographic photoreceptors were determined as follows.

The photosensitive layer of an electrophotographic photoreceptor was washed at 25° C. with methylene chloride to remove the charge-generating substance (oxotitanium phthalocyanine) and binder resin (butyral resin) contained in the charge-generating layer, and the charge-transfer substance, the methylene chloride-soluble fraction of the binder resin (crosslinked polycarbonate resins and other methylene chloride-soluble ingredients contained in the charge-transfer layer, and then the portion remaining insoluble in methylene chloride was dried and weighed. From the weight of the coating fluid coated on the charge-generating layer to form the charge-transfer layer and the ratios of the compositions of the coating fluid, the total weight of the components to be included in the structure of the crosslinked polycarbonate resin, such as crosslinking polycarbonates, monomers having ethylene double bonds and curing agents, were calculated. The content of the methylene chloride-insoluble fraction is the percentage of the weight of the fraction remaining insoluble in methylene chloride based on the above total weight.

EXAMPLE 14

Into a mixture of a solution of 2,2-bis(4-hydroxyphenyl) propane (45 g) in a 5% sodium hydroxide aqueous solution (550 ml) and methylene chloride (250 ml), phosgene gas was blown at a rate of 950 ml/sec for 15 minutes with stirring and cooling. The reaction fluid was then allowed to stand to separate a methylene chloride solution of an oligomer of a polymerization degree of 2 to 4 having chloroformate groups at the polymer ends.

450 ml of a solution containing the methylene chloride solution (200 ml) of the oligomer and balance of methylene chloride was mixed with a solution of 3,3'-diallyl-4,4'-dihydroxybiphenyl (BP-1) (12.5 g) in 8 wt % Conc. of aqueous sodium hydroxide solution (150 ml), and 2-allylphenol (1.6 g) was added. While the mixture was stirred vigorously, a 7 wt % Conc. of aqueous triethylamine solution (2 ml) was added as a catalyst, and reaction was carried out at 28° C. for 1.5 hours with vigorous stirring. After the completion of the reaction, the reaction product was diluted with methylene chloride (1 liter), washed twice with pure water (1.5 liter), once with 0.01 N-hydrochloric acid (1 liter), and twice with pure water (1 liter). The organic phase was poured into methanol, to collect a polymer.

The polymer had a reduced viscosity (reduced viscosity: measured at 20° C. at a concentration of 0.5 g/dl in methylene chloride; the same will be applied hereinafter) of 0.9 dl/g. From a $^{1}$H-NMR spectrum, the polymer was determined to be a polycarbonate containing the following repeating units in the following copolymerization ratios, which contained the structures of 3,3'-diallyl-4,4'-dihydroxybiphenyl (BP-1), bisphenol A and 2-allylphenol in a molar ratio of 80:17:3 from the ratios of the integral value of the peak near 7.3 ppm due to aromatics, that of the peak near 5–6 ppm due to allyl and that of the peak near 1.7 ppm due to the methyl of bisphenol A.

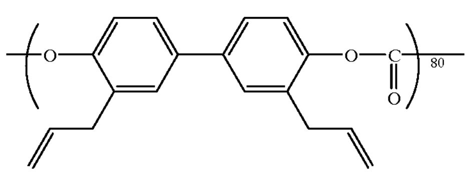

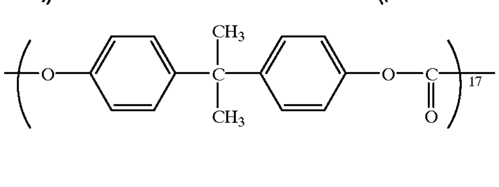

-continued

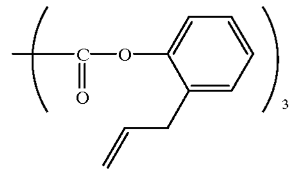

0.5 Parts (part by weight; the same will be applied hereinafter) of oxotitaniumphthalocyanine and 0.5 parts of butyral resin were dispersed in 19 parts of methylene chloride with a ball mill, and the dispersion was applied to a conductive substrate, which was a PET film coated with aluminum by evaporation, with a bar coater, and dried to form a charge-generating layer (thickness: about 0.5 μm). A coating fluid was prepared by using 1 part of the polycarbonate, 1 part of a compound (C-1), which is a charge transfer substance having the following structure, 0.3 parts of diallyl isophthalate, 0.05 parts of azobisisobutyronitrile and 8 parts of methylene chloride.

(C-1)

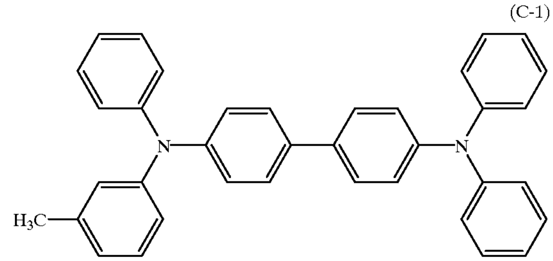

The coating fluid was applied on the above charge-generating layer using an applicator. On heating at 120° C. for 10 minutes, a crosslinked-type organic electrophotographic photoreceptor containing a methylene chloride-insoluble fraction was obtained.

The content of the methylene chloride-insoluble fraction in the crosslinked polycarbonate resin, which was a binder resin in the crosslinked-type organic electrophotographic photoreceptor was determined to be 12% by weight.

EXAMPLE 15

A polymer comprising the following repeating units was produced in the same manner as in Example 14 except that the following BP-3 (52.5 g)

BP-3

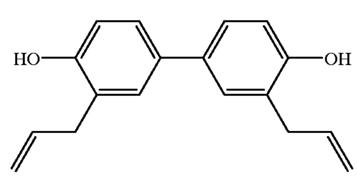

was used in place of the bisphenol A (45 g) for the production of an oligomer and that 2-allylphenol was not used. The polymer had a reduced viscosity of 1.1 dl/g.

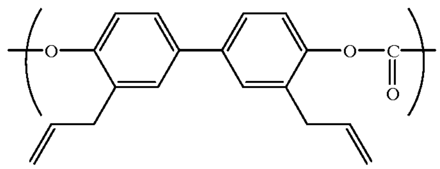

100 Parts of the polycarbonate and 200 parts of metachloroperbenzoic acid were reacted in 500 parts of methylene chloride for 24 hours at room temperature, and the resulting polymer was precipitated in methanol, to obtain a 95% yield of a polycarbonate comprising the following repeating units with allyl groups almost epoxidized. The structure was confirmed from the peaks in $^1$H-NMR due to aromatics (7–8 ppm) and epoxy groups (near 4 ppm). The polymer had a reduced viscosity of 1.2 dl/g.

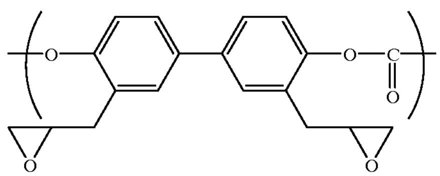

A charge-generating layer was formed on a substrate in the same manner as in Example 14, and a coating fluid prepared by using 1 part of the polycarbonate, 1 part of (C-1), 0.3 parts of phthalic anhydride and 8 parts of methylene chloride was applied on the charge-generating layer in the same manner as in Example 14. On heating at 160° C. for 1 hour, a crosslinked-type organic electrophotographic photoreceptor insoluble in methylene chloride was obtained. The crosslinked-type electrophotographic photoreceptor was -washed with methylene chloride to remove the charge-generating substance, the charge-transfer substance, butyral resin and other methylene chloride-soluble ingredients, and dried.

The content of the methylene chloride-insoluble fraction in the crosslinked polycarbonate, which was contained in the crosslinked-type electrophotographic photoreceptor as a binder resin, was determined to be 72% by weight.

EXAMPLE 16

A polymer was produced in the same manner as in Example 15 except that an oligomer was produced by using the following BP-15 (60.8 g) in place of BP-3 (52.5 g) and that the additionally added BP-3 (12.5 g) was replaced by BP-15 (14.5 g). The polymer had a reduced viscosity of 0.9 dl/g.

BP-15

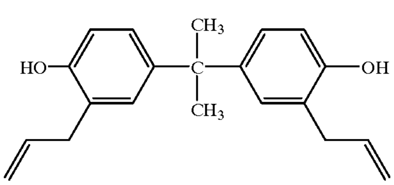

100 Parts of the polycarbonate and 200 parts of metachloroperbenzoic acid were reacted in the same manner as in Example 15, and the resulting polymer was precipitated in methanol, to obtain a 90% yield of a polycarbonate comprising the following repeating units with allyl groups almost epoxidized. The polymer had a reduced viscosity of 1.0 dl/g.

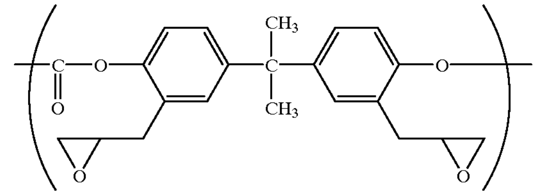

A charge-generating layer was formed on a substrate in the same manner as in Example 14, and a coating fluid prepared by using 1 part of the polycarbonate, 1 part of (C-1), 0.3 parts of phthalic anhydride and 8 parts of methylene chloride was applied on the charge-generating layer in the same manner as in Example 14. On heating at 160° C. for 1 hour, a crosslinked-type organic electrophotographic photoreceptor insoluble in methylene chloride was obtained.

The content of the methylene chloride-insoluble fraction in the crosslinked polycarbonate, which was contained in the crosslinked-type electrophotographic photoreceptor as a binder resin, was determined to be 60% by weight.

EXAMPLE 17

A polymer was produced in the same manner as in Example 15 except that an oligomer was produced by using the following BP-1 (84.9 g) in place of BP-3 (52.5 g) and that the additionally added BP-3 (12.5 g) was replaced by BP-1 (20.2 g). The polymer had a reduced viscosity of 1.2 dl/g.

BP-1

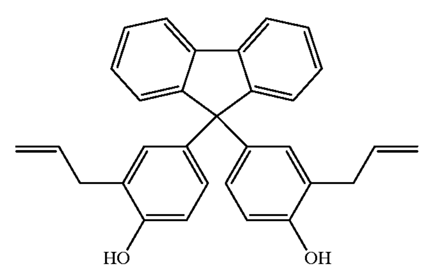

100 Parts of the polycarbonate and 200 parts of metachloroperbenzoic acid were reacted, and the resulting polymer was precipitated in methanol, to obtain a 93% yield of a polycarbonate comprising the following repeating units with allyl groups almost epoxidized. The polymer had a reduced viscosity of 1.3 dl/g.

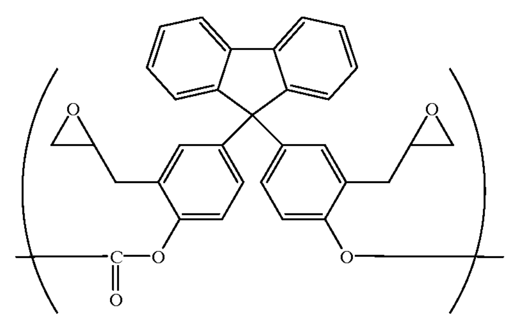

A charge-generating layer was formed on a substrate in the same manner as in Example 14, and a coating fluid prepared by using 1 part of the polycarbonate, 1 part of (C-1), 0.3 parts of phthalic anhydride and 8 parts of methylene chloride was applied on the charge-generating layer in the same manner as in Example 14. On heating at 160° C. for 1 hour, a crosslinked-type organic electrophotographic photoreceptor insoluble in methylene chloride was obtained.

The content of the methylene chloride-insoluble fraction in the crosslinked polycarbonate contained in the crosslinked-type electrophotographic photoreceptor as a binder resin was determined to be 52% by weight.

Comparative Example 4

A crosslinking polycarbonate was produced as follows in accordance with the method of producing a non-crosslinked polycarbonate disclosed in Japanese Patent Application Unexamined Publication No. 4-291348.

Into a three-necked round-bottom flask equipped with a stirrer, a thermometer, a gas inlet and a reflux condenser were put 53.7 parts of a 48.5 wt % Conc. of aqueous sodium hydroxide solution, 230.8 parts of water, 31.4 parts of 3,3'-diallylbisphenol A and 27.3 parts of bisphenol Z and dissolved while dry nitrogen gas was blown through the flask. The solution was cooled to 20° C. in an ice bath, and 26.2 parts of phosgene gas was introduced therein slowly over a 1 hour interval with stirring. After addition of 8.4 parts of a 48.5 wt % Conc. of aqueous sodium hydroxide solution followed by 0.61 parts of p-tert-butylphenol as a terminator, polymerization was carried at 30° C. for 1 hour. After the completion of the reaction, the methylene chloride layer was separated and made acid with hydrochloric acid, and then washed with water repeatedly to remove dissolved salts. Methylene chloride was then evaporated to obtain a solid. The solid comprises the following repeating units in the following copolymerization ratios.

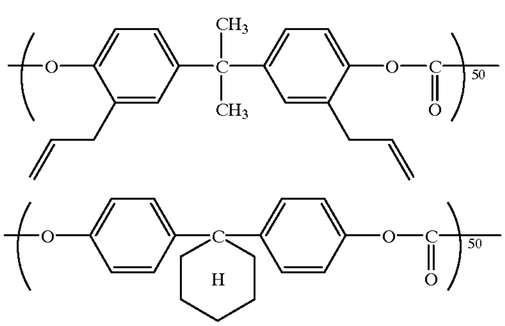

The polymer had a reduced viscosity of 1.5 dl/g.

After a charge-generating layer was formed on a substrate in the same manner as in Example 14, a coating fluid was prepared in the same manner as In Example 14 except that the polycarbonate obtained above was used in place of the polycarbonate used in Example 1, and the coating fluid was then coated on the charge-generating layer in the same manner as in Example 14. On crosslinking by heating at 140° C. for 10 minutes, a crosslinked-type organic electrophotographic photoreceptor containing a methylene chloride-insoluble fraction was obtained.

The content of the methylene chloride-insoluble fraction in the crosslinked polycarbonate contained in the crosslinked-type electrophotographic photoreceptor as a binder resin was determined to be 90% by weight.

The crosslinked-type electrophotographic photoreceptor was tested for abrasion resistance, and the result is shown in Table 2.

TABLE 2

| | Abrasion (mg) |
|---|---|
| Example 14 | 0.8 |
| Example 15 | 1.0 |
| Example 16 | 1.1 |
| Example 17 | 1.3 |
| Comparative Example 4 | 2.7 |

EXAMPLE 18

Into a mixture of a solution of 2,2-bis(4-hydroxyphenyl) propane (74 g) in a 6 wt % Conc. of aqueous sodium hydroxide solution (550 ml) and methylene chloride (250 ml), phosgene gas was blown at a rate of 950 ml/sec for 15 minutes with stirring and cooling. The reaction fluid was then allowed to stand to separate the organic layer that was a methylene chloride solution of a bisphenol A (2,2-bis(4-hydroxyphenyl)propane) polycarbonate oligomer of a polymerization degree of 2 to 4 having chloroformate groups at the polymer ends. The structure, polymerization degree and end groups of the oligomer were determined by $^{1}$H-NMR, MS and GPC.

450 ml of a solution containing the methylene chloride solution (200 ml) of the oligomer and balance of methylene chloride was mixed with a solution of the 4,4'-biphenol (12.5 g) in a 8 wt % Conc. of aqueous sodium hydroxide solution (150 ml), and eugenol (2.0 g) was added. A 7 wt % Conc. of aqueous triethylamine solution (2 ml) as a catalyst was added to the mixed solution with vigorous stirring, and reaction was carried out at 28° C. for 1.5 hours with stirring. After the completion of the reaction, the reaction product was diluted with methylene chloride (1 liter), washed twice with pure water (1.5 liter), once with 0.01N-hydrochloric acid (1 liter), and twice with pure water (1 liter). The organic phase was poured into methanol, to collect a polymer.

The polymer had a reduced viscosity (reduced viscosity: measured at 20° C. at a concentration of 0.5 g/dl in methylene chloride; the same will be applied hereinafter) of 1.2 dl/g. From an $^{1}$H-NMR spectrum of the polymer, the polymer was determined to contain bisphenol A, 4,4'-biphenol and eugenol structures in a molar ratio of 80:17:3 from the ratios of the integral value of the peak near 7.3 ppm due to aromatics, that of the peak near 3.7 ppm due the methoxy of eugenol and that of the peak near 1.7 ppm due to the methyl of bisphenol A.

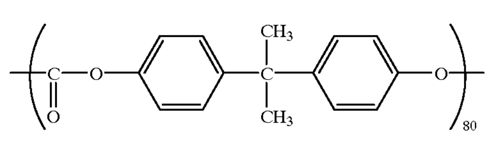

-continued

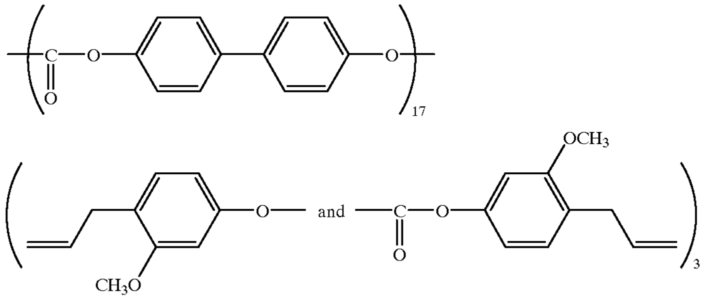

0.5 Parts (part by weight; the same will be applied hereinafter) of oxotitaniumphthalocyanine and 0.5 parts of butyral resin were dispersed in 19 parts of methylene chloride with a ball mill, and the dispersion was applied to a conductive substrate, which was a PET film coated with aluminum by evaporation, with a bar coater, and dried to form a charge-generating layer (thickness: 0.5 μm). A coating fluid was prepared by using 1 part of a compound (C-1), which is a charge-transfer substance having the following structure, 1 part of the polycarbonate, 0.3 parts of diallyl isophthalate, 0.05 parts of azobisisobutyronitrile and 8 parts of methylene chloride.

(C-1)

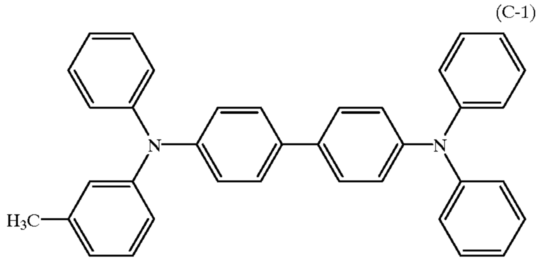

The coating fluid was applied on the above charge-generating layer using an applicator. On heating at 140° C. for 10 minutes, a crosslinked-type organic electrophotographic photoreceptor containing a methylene chloride-insoluble fraction was obtained.

EXAMPLE 19

Polymerization was carried out in the same manner as in Example 18 except that 4,4'-biphenol and eugenol were replaced by the following bisphenol (BP-16) (21.9 g)

BP-16

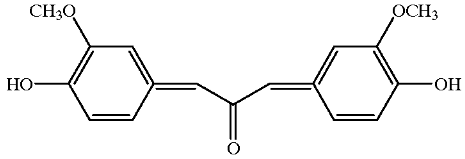

and 4-allylphenol (1.6 g), to obtain a polycarbonate comprising the following repeating units and end groups in the following copolymerization ratios wherein bisphenol A, BP-16 and 4-allylphenol structures were present in a molar ratio of 82:15:3.

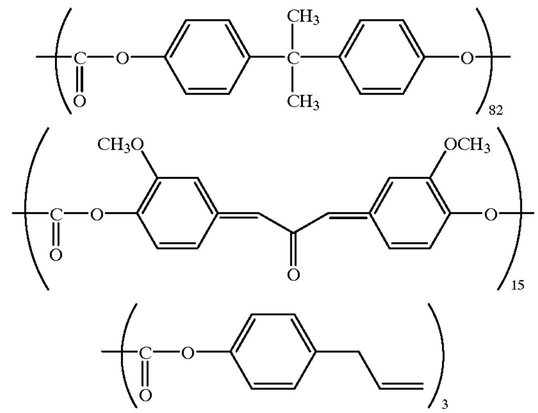

The polymer had a reduced viscosity of 1.0 dl/g.

A charge-generating layer was formed on a substrate in the same manner as in Example 18, which was then coated in the same manner as in Example 18 with a coating fluid prepared by using 1 part of the polycarbonate, 1 part of (C-1), 0.3 parts of diallyl isophthalate, 0.05 parts of azobisisobutyronitrile and 8 parts of methylene chloride. On heating at 140° C. for 10 minutes, a crosslinked-type electrophotographic photoreceptor containing a methylene chloride-insoluble fraction was obtained.

EXAMPLE 20

Polymerization was carried out in the same manner as in Example 18 except that 4,4'-biphenol and eugenol were replaced by the following bisphenol (BP-17) (16.1 g),

BP-17

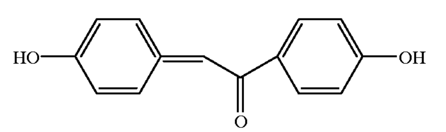

to obtain a polycarbonate comprising the following repeating units in the following copolymerization ratios wherein bisphenol A and BP-17 structures were present in a molar ratio of 83:17.

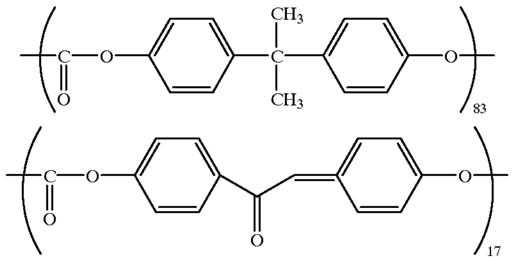

The polymer had a reduced viscosity of 1.3 dl/g.

A charge-generating layer was formed on a substrate in the same manner as in Example 18, which was then coated in the same manner as in Example 18 with a coating fluid prepared by using 1 part of the polycarbonate, 1 part of (C-1), 0.5 parts of diallyl isophthalate, 0.10 parts of azobisisobutyronitrile and 8 parts of methylene chloride. On heating at 140° C. for 10 minutes, a crosslinked-type electrophotographic photoreceptor containing a methylene chloride-insoluble fraction was obtained.

EXAMPLE 21

Polymerization was carried out in the same manner as in Example 20 except that BP-17 was replaced by (BP-18) (22.4 g),

BP-18

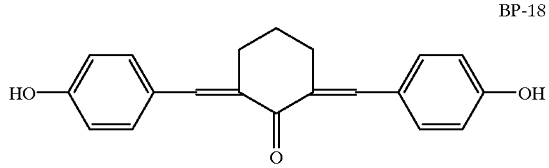

to obtain a polycarbonate comprising the following repeating units in the following copolymerization ratios wherein bisphenol A and BP-18 structures were present in a molar ratio of 85:15.

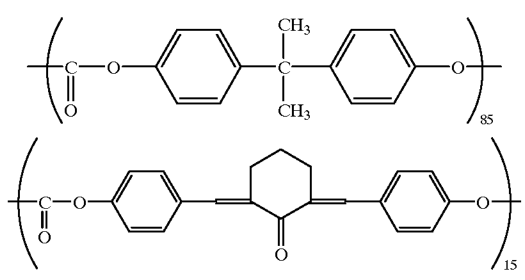

The polymer had a reduced viscosity of 1.1 dl/g.

A charge-generating layer was formed on a substrate in the same manner as in Example 18, which was then coated in the same manner as in Example 18 with a coating fluid prepared by using 1 part of the polycarbonate, 1 part of (C-1), 0.5 parts of diallyl isophthalate, 0.10 part of azobisisobutyronitrile and 8 parts of methylene chloride. On heating at 140° C. for 10 minutes, a crosslinked-type electrophotographic photoreceptor containing a methylene chloride-insoluble fraction was obtained.

EXAMPLE 22

Polymerization was carried out in the same manner as in Example 18 except that the eugenol was replaced by methacrylic chloride (1.3 g), and 4,4'-biphenol by BP-17 (16.1 g) to obtain a polycarbonate comprising the following repeating units and end groups in the following copolymerization ratios wherein bisphenol A and BP-17 structures and endcapping methacryloyl were present in a molar ratio of 78:19:3.

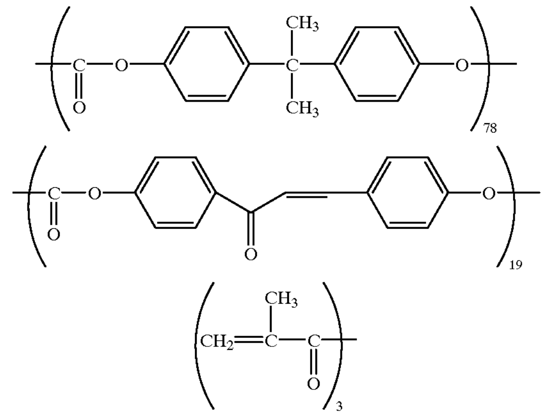

The polymer had a reduced viscosity of 0.9 dl/g.

A charge-generating layer was formed on a substrate in the same manner as in Example 18, which was then coated in the same manner as in Example 18 with a coating fluid prepared by using 1 part of the polycarbonate, 1 part of (C-1), 0.5 parts of diallyl isophthalate, 0.10 part of azobisisobutyronitrile and 8 parts of methylene chloride. On heating at 140° C. for 10 minutes, a crosslinked-type electrophotographic photoreceptor containing a methylene chloride-insoluble fraction was obtained.

EXAMPLE 23

Polymerization was carried out in the same manner as in Example 18 except that the eugenol was replaced by N-(4-hydroxyphenyl)maleimide (2.3 g), and 4,4'-biphenol by BP-17 (16.1 g), to obtain a polycarbonate comprising the following repeating units and end groups in the following copolymerization ratios wherein bisphenol A, BP-17 and endcapping maleimide structures are present in a molar ratio of 77:19:4.

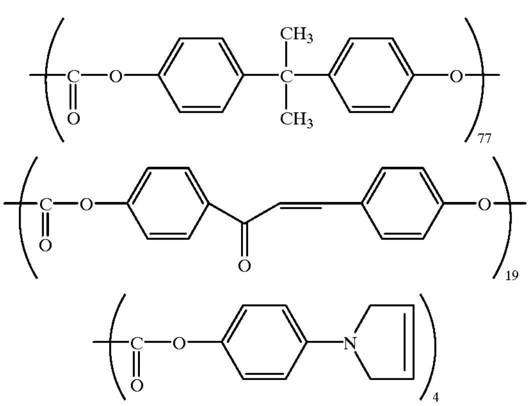

The polymer had a reduced viscosity of 1.1 dl/g.

A charge-generating layer was formed on a substrate in the same manner as in Example 18, which was then coated in the same manner as in Example 18 with a coating fluid prepared by using 1 part of the polycarbonate, 1 part of (C-1), 0.5 parts of diallyl isophthalate, 0.10 part of azobisisobutyronitrile and 8 parts of methylene chloride. On heating at 140° C. for 10 minutes, a crosslinked-type electrophotographic photoreceptor containing a methylene chloride-insoluble fraction was obtained.

Comparative Example 5

A crosslinking polycarbonate having the following structure was produced in the same manner as in Comparative Example 4 according to the method disclosed in Japanese Patent Application Unexamined Publication No. 4-291348.

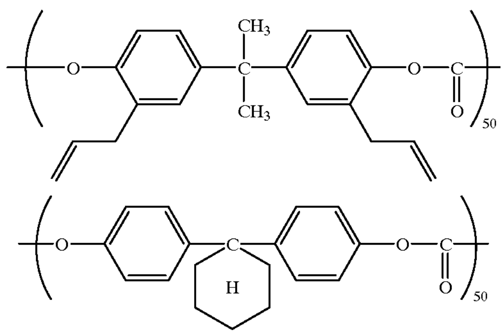

The polymer had a reduced pressure of 1.5 dl/g.

A crosslinked-type electrophotographic photoreceptor containing a methylene chloride-insoluble fraction was produced in the same manner as in Example 18 except that the above polymer was used in place of the polycarbonate used in Example 18.

The crosslinked-type electrophotographic photoreceptor was tested for abrasion resistance in the same manner as in Example 1, and the results are shown in Table 3.

TABLE 3

| | Abrasion (mg) |
|---|---|
| Example 18 | 1.3 |
| Example 19 | 1.2 |
| Example 20 | 1.2 |
| Example 21 | 1.4 |
| Example 22 | 1.2 |
| Example 23 | 1.3 |
| Gomparative Example 5 | 2.7 |

SYNTHESIS 1

(Synthesis of a biphenyl-type crosslinking polycarbonate (PC-1))

To 1 liter of water were added 5% Pd/C (100 g), followed by water (1 liter) containing NaOH (200 g) dissolved therein. 1 Liter of methanol containing 4-Bromo-2-phenylphenol (456 g, 1.83 mol) dissolved therein was added thereto, and reflux was carried out for 3 hours. After removal of the methanol by distillation, filtration of the catalyst and neutralization with hydrochloric acid, extraction with methylene chloride was carried out. The organic layer was washed with water, concentrated and distilled at 330° C. in a metal bath. The distillate was recrystallized from a mixture of toluene:cyclohexane-1:3 (weight ratio), to obtain a precursor (66 g, yield: 21%) of the compound of the following formula A.

The precursor was dissolved in a methanol solution (500 ml) of NaOH (30 g), allyl bromide (50.4 g) was added thereto slowly, and then reflux was carried out for 5 hours. The resulting solution was evaporated to dryness in vacuum, dissolved again in methylene chloride, washed with 0.1N-hydrochloric acid, and then washed twice with water. The organic layer was collected, dried over magnesium sulfate, and after the solvent was distilled out, heated as it is at 200° C. for 5 hours in a stream of nitrogen, to give a compound (BP-19) (65 g) of the formula A.

Formula A: BP-19

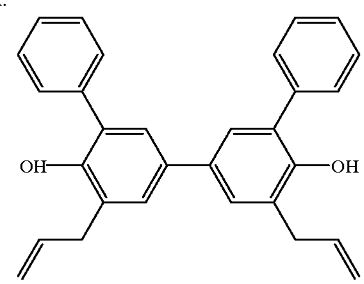

A solution of 74 g of 2,2-bis(4-hydroxyphenyl)propane in 550 ml of a 6 wt % Conc. of aqueous sodium hydroxide solution was mixed with 250 ml of methylene chloride. While the solution mixture was stirred and cooled, phosgene gas was blown therein at 950 ml/min for 15 minutes. The reaction liquid was allowed to stand to separate the organic layer, which was a methylene chloride solution of a bisphenol A (2,2-bis(4-hydroxyphenyl)propane) polycarbonate oligomer endcapped by chloroformate groups.

To 450 ml of a mixture of the methylene chloride solution of the oligomer and balance of methylene chloride was added 150 ml of a 8 wt % Conc. of aqueous sodium hydroxide solution, and then 32.1 g of the compound (BP-19) of the formula A and 3.0 g of p-tert-butylphenol as an agent for controlling molecular weight were added thereto. While the mixture was stirred vigorously, 2 ml of a 7 wt % Conc. of aqueous triethylamine solution was added, and reaction was carried out at 28° C. for 1.5 hours with stirring. After the completion of the reaction, the reaction product was diluted with 1 liter of methylene chloride, and washed twice with 1.5 liter of water. The obtained solution was cooled in an ice bath, and 51.6 g of metachloroperbenzoic acid was added slowly by portions. After the addition was completed, the mixture was warmed to room temperature and stirred for 24 hours. It was then washed with a 0.01N-NaOH aqueous solution, once with 1 liter of 0.01N-hydrochloric acid and twice with 1 liter of water sequentially, and the organic layer was poured into methanol to precipitate a polymer, which was then filtered and dried to give 103 g of a polycarbonate (PC-1).

The polycarbonate had a reduced viscosity [$\eta_{sp}$/c] of 0.75 dl/g as measured at 20° C. at a concentration of 0.5 g/dl in methylene chloride. Measurements of reduced viscosities were carried out by using an automatic viscosity measuring instrument VMR-042 produced by Rigosha Co., Ltd. using an automatic Ubbelohde's improved viscometer (Model-RM).

The IR spectrum of the polycarbonate (PC-1) was characterized by absorptions at 3030 $cm^{-1}$, 1590 $cm^{-1}$ and 830 $cm^{-1}$ due to benzene rings, an absorption at 1730 $cm^{-1}$ due to carbonate groups and an absorption at 1130 $cm^{-1}$ due to epoxy groups, indicating the presence of carbonate bonds and epoxy groups. The copolymerization ratios of the polycarbonate (PC-1) were determined by an $^1$H-NMR analysis. From these results, the polycarbonate (PC-1) was determined to comprise the following repeating units in the following ratios.

(PC-1)

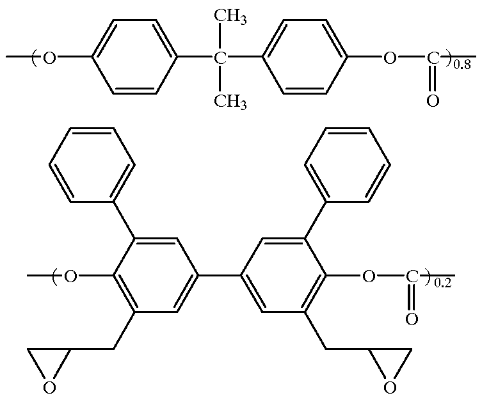

SYNTHESIS 2

(Synthesis of a naphthalene-type crosslinking polycarbonate (PC-2))

The procedures of Synthesis 1 were repeated except that the compound (BP-19) of the formula A was replaced by 25.2 g of a compound (BP-14) of the formula (B), Formula B:

BP-14

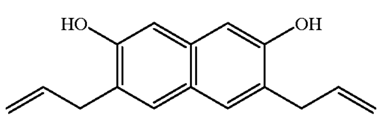

and that the reaction using metachloroperbenzoic acid and the washing with the NaOH aqueous solution were not carried out, to obtain 102 g of a polycarbonate (PC-2) ($[\eta_{sp}/c]$=0.77 dl/g) having the following structure.

The synthesis of the compound (BP-14) was the same as the synthesis of the compound (BP-19) except that 2,7-naphthalenediol (produced by Sugai Kagaku Kogyo Co., Ltd.) was used in place of the precursor produced in the first step.

The IR spectrum of the polycarbonate (PC-2) was characterized by absorptions at 3030 $cm^{-1}$, 1590 $cm^{-1}$ and 830 $cm^{-1}$ due to benzene rings, an absorption at 1730 $cm^{-1}$ due to carbonate groups and absorptions at 910 $cm^{-1}$ and 990 $cm^{-1}$ due to vinyl groups, indicating the presence of carbonate bonds and vinyl groups. The copolymerization ratios of the polycarbonate (PC-2) was determined by an $^1$H-NMR analysis. From these results, the polycarbonate (PC-2) was determined to comprise the following repeating units in the following ratios.

(PC-2)

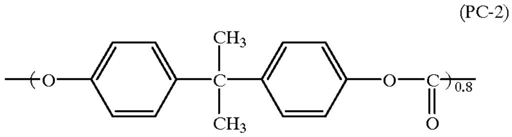

-continued

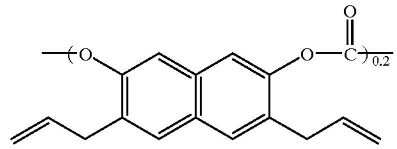

SYNTHESIS 3

(Synthesis of a biphenyl-type crosslinking polycarbonate (PC-3))

The procedures of Synthesis 1 were repeated except that the compound (BP-19) of the formula A was replaced by 22.7 g of 3,3'-dihydroxy-4,4'-diaminobiphenyl (BP-20) and that the reaction using metachloroperbenzoic acid and the washing with the NaOH aqueous solution were not carried out, to obtain 102 g of a polycarbonate (PC-3) ($[\eta_{sp}/c]$=0.77 dl/g]). The IR spectrum of the polycarbonate (PC-3) was characterized by absorptions at 3030 $cm^{-1}$, 1590 $cm^{-1}$ and 830 $cm^{-1}$ due to benzene rings, an absorption at 1730 $cm^{-1}$ due to carbonate groups and an absorption at 3300 $cm^{-1}$ due to amino groups, indicating the presence of carbonate bonds and amino groups. The copolymerization ratios of the polycarbonate (PC-3) were determined by an $^1$H-NMR analysis. From these results, the polycarbonate (PC-3) was determined to comprise the following repeating units in the following ratios.

(PC-3)

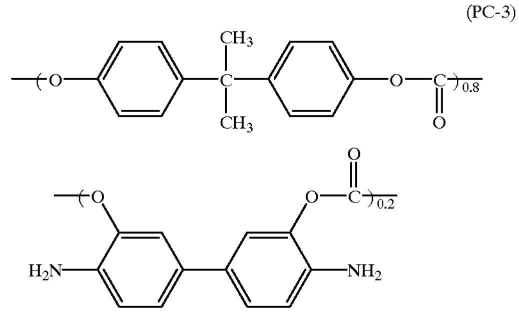

SYNTHESIS 4

(Synthesis of a naphthalene-type crosslinking polycarbonate (PC-4))

The procedures of Synthesis 1 were repeated except that the compound (BP-19) of the formula A was replaced by 25.2 g of the compound (BP-14) of the formula B, to obtain 105 g of a polycarbonate (PC-4) ($[\eta_{sp}/c]$=0.79 dl/g]). The IR spectrum of the polycarbonate (PC-4) was characterized by absorptions at 3030 $cm^{-1}$, 1590 $cm^{-1}$ and 830 $cm^{-1}$ due to benzene rings, an absorption at 1730 $cm^{-1}$ due to carbonate groups and an absorption at 1130 $cm^{-1}$ due to epoxy groups, indicating the presence of carbonate bonds and epoxy groups. The copolymerization ratios of the polycarbonate (PC-4) were determined by an $^1$H-NMR analysis. From these results, the polycarbonate (PC-4) was determined to comprise the following repeating units in the following ratios.

(PC-4)

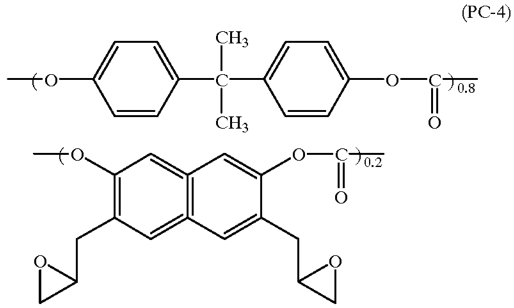

EXAMPLE 24

(Biphenyl type-ionic crosslinking type)

By using 1-phenyl-1,2,3,4-tetrahydroquinoline-6-carboxyaldehyde-1',1'-diphenylhydrazone (C-2) as a charge-transfer substance, (PC-1) as a binder resin material and xylylenediamine (MXDA) as a crosslinking agent, a solution of (C-2):(PC-1):MXDA:methylene chloride=1:1:0.2:8 (weight ratio) was produced to use it as a coating fluid. On standing for one month, the coating fluid did not whiten nor set to gel.

Two aluminum conductive substrates (a flat plate of 50 mm×50 m and a cylinder of ϕ168 mm×360 mm) were each coated with a dispersion of oxotitanium phthalocyanine:butyral resin:methylene chlroride=1:1:38 (weight ratio) by dip coating to form charge-generating layers (about 0.5 $\mu$m) of oxotitanium phthalocyanine. The above-described coating fluid was applied on the charge-generating layers by dip coating, dried and then crosslinked at 150° C. for 10 hours, to produce laminate-type organic electrophotographic photoreceptors each having a charge-transfer layer of about 20 $\mu$m thick. The charge-transfer layers did not crystallize from coating to crosslinking.

The flat-plate organic electrophotographic photoreceptor was subjected to a deterioration test to evaluate the center-line average roughness Ra value and the electrophotographic properties. The measurements of the center-line average roughness Ra value was carried out according to JIS B 0601.

The deterioration test was carried using a Suga abrasion testing machine NUS-ISO-3 (produced by Suga Shikenki Co., Ltd.) by reciprocating a sample of the electrophotographic photoreceptor 2000 times on an abrasion test paper (produced by Suga Shikenki Co., Ltd. $Al_2O_3$, 3 $\mu$m abrasive paper) applied with a load of 500 g and then measuring the weight loss and center-line average roughness Ra value of the surface (according to JIS-B-0601, using a surface roughness measuring instrument SURFCOM 575A produced by Tokyo Seimitsu Co., Ltd.). Before and after the deterioration test, the electrophotographic properties were evaluated by discharging corona (−6 kV) using an electrostatic charge testing instrument EPA-8100 (produced by Kawaguchi Denki Seisakusho Co., Ltd.), and measuring the initial surface potential ($V_0$), the residual potential ($V_R$) 5 seconds after the Irradiation of light (10 Lux), and the half-value exposure ($E_{1/2}$). The results are shown in Tables 4 and 5.

The cylindrical organic electrophotographic photoreceptor was examined for the deterioration in resistance to toner filming caused by repeated uses in a working machine.

The evaluations were carried out by making copies of a test pattern on 30,000 sheets of A4-size paper fed in their longitudinal direction at 22–27° C. at a humidity of 10–30% by using a testing set produced by mounting the organic electrophotographic photoreceptor in a commercial copying machine (a Carlson system using an organic electrophotographic photoreceptor, a cylindrical drum (ϕ168 mm×360 mm, aluminum), corona charging system (voltage-800V), blade cleaning (urethane blade, blade pressure: 1 kg/cm$^2$), two-components developer (styrene-acrylic toner, ferrite carrier), and then observing the organic electrophotographic photoreceptor for the number of visible black dots (the toner adhered to the organic electrophotographic photoreceptor by toner filming) present in an area of 10 mm×10 mm. The results are shown in Table 6.

EXAMPLE 25

(Naphthalene type-radical crosslinking type)

A laminate-type organic electrophotographic photoreceptor was produced in the same manner and in the same ratios of starting materials as in Example 24 except that (PC-1) was replaced by (PC-2), MXDA by azobisisobutylonitrile (AIBN), and the conditions of the reaction after the drying were changed to 120° C., 1 hour.

The organic electrophotographic photoreceptor was examined in the same manner as in Example 24 for deterioration, electrophotographic properties before and after the deterioration test and resistance to toner-filming. The results are shown in table 6.

The coating fluid prepared in this example did not whiten nor set to gel on standing for one month.

EXAMPLE 26

(biphenyl type-ionic crosslinking type)

A laminate-type organic electrophotographic photoreceptor was produced in the same manner and in the same ratios of starting materials as in Example 24 except that (PC-1) was replaced by (PC-3), MXDA by bisphenol A epoxy resin (epoxy equivalent: 1300).

The organic electrophotographic photoreceptor was examined in the same manner as in Example 24 for deterioration, electrophotographic properties before and after the deterioration test and resistance to toner-filming. The results are shown in table 6.

The coating fluid prepared in this example did not whiten nor set to gel on standing for one month.

EXAMPLE 27

(Naphthalene type-ionic crosslinking type)

A laminate-type organic electrophotographic photoreceptor was produced in the same manner and ratios of starting materials as in Example 24 except that (PC-1) was replaced by (PC-4).

The organic electrophotographic photoreceptor was examined in the same manner as in Example 24 for deterioration, electrophotographic properties before and after the deterioration test and resistance to toner-filming. The results are shown in table 6.

The coating fluid prepared in this example did not whiten nor set to gel on standing for one month.

Comparative Example 6

A polycarbonate (PC-5) was produced in the same manner as in Comparative Example 4 according to the method disclosed in Japanese Patent Application Unexamined Publication No. 4-291348. The solid thus obtained comprised the following repeating units in the following copolymerization ratios.

(PC-5)

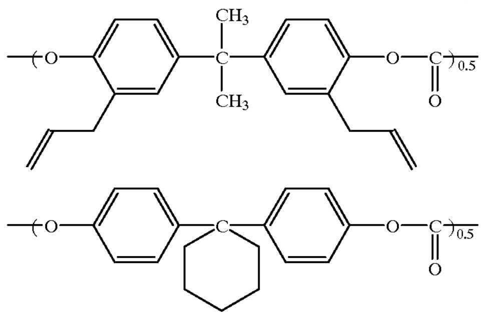

A solution of (PC-5):(C-2):pentaerythritol tetrakis(3-mercaptopropionate)(crosslinking agent):IRGACURE 907 (radical initiator, produced by Ciba-Geigy AG):methylene chloride=1:1:0.1:0.01:8 (weight ratio) was prepared to use it as a coating fluid for forming charge-transfer layers. By using the coating fluid, the procedures in Example 24 from coating to drying were repeated. After the drying, irradiation of an irradiation energy of 80 W/cm$^2$ was carried out for 5 seconds using a high pressure mercury lamp, to give a crosslinked laminate-type organic electrophotographic photoreceptor.

The organic electrophotographic photoreceptor was examined in the same manner as in Example 24 for deterioration, electrophotographic properties before and after the deterioration test and resistance to toner-filming. The results are shown in table 6.

TABLE 4

| | Initial surface potential $V_0$ (V) | | Residual potential $V_R$ (V) | | Half-value exposure $E_{1/2}$ (lux · sec) | |
|---|---|---|---|---|---|---|
| | A | B | A | B | A | B |
| Example 24 | −742 | −739 | −4 | −4 | 0.75 | 0.77 |
| Example 25 | −749 | −745 | −4 | −5 | 0.74 | 0.75 |
| Example 26 | −751 | −747 | −5 | −5 | 0.77 | 0.79 |
| Example 27 | −745 | −740 | −5 | −5 | 0.73 | 0.74 |
| Comparative Example 6 | −732 | −620 | −45 | −49 | 1.14 | 1.22 |

A: before the deterioration test
B: after the deterioration test

TABLE 5

| | | Surface roughness Ra value ($\mu$m) | |
|---|---|---|---|
| | Abrasion (mg) | Before deterioration test | After deterioration test |
| Example 24 | 1.21 | 0.02 | 0.13 |
| Example 25 | 1.26 | 0.02 | 0.12 |
| Example 26 | 1.19 | 0.02 | 0.12 |
| Example 27 | 1.24 | 0.02 | o.15 |
| Comparative Example 6 | 2.65 | 0.02 | 0.72 |

TABLE 6

| | After 5,000 copies (dots/cm$^2$) | After 30,000 copies (dots/cm$^2$) |
|---|---|---|
| Example 24 | 0, 0, 0 | 2, 0, 0 |
| Example 25 | 0, 0, 0 | 0, 1, 1 |
| Example 26 | 0, 0, 0 | 2, 1, 4 |
| Example 27 | 0, 0, 0 | 2, 0, 3 |
| Comparative Example 6 | 3, 14, 11 | 53, 42, 73 |

In each evaluation, three separate areas were observed.

SYNTHESIS 5

(synthesis of (PC-6))

Into a mixture of a solution of 74 g of 2,2-bis(4-hydroxyphenyl)propane in 550 ml of a 6 wt % Conc. of aqueous sodium hydroxide solution and 250 ml of methylene chloride, phosgene gas was blown at a rate of 950 ml/sec for 15 minutes with stirring and cooling. The reaction fluid was then allowed to stand to separate the organic layer, which was a methylene chloride solution of an bisphenol A (2,2-bis(4-hydroxyphenyl)propane) polycarbonate oligomer endcapped by chloroformate groups.

450 ml of a solution containing the methylene chloride solution of the oligomer and balance of methylene chloride was mixed with 150 ml of a 8 wt % Conc. of aqueous sodium hydroxide solution, and 27.9 g of a compound (BP-3) of the formula A (3,3'-bis(2-propenyl)-4,4'-biphenol):

A(BP-3)

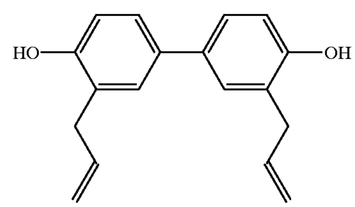

and 3.0 g of p-tert-butylphenol as an agent for controlling molecular weight were added thereto. To the mixture was added 2 ml of a 7 wt % Conc. of aqueous triethylamine solution as a catalyst with vigorous stirring, and reaction was carried out at 28° C. for 1.5 hours with stirring. After the completion of the reaction, the reaction product was diluted with 1 liter of methylene chloride, and then washed twice with 1.5 liter of water. The resulting solution was cooled in an ice bath, and 51.6 g of metachloroperbenzoic acid (MCPBA) was added slowly by portions. The resulting mixture was warmed to room temperature, and then stirred for 24 hours. Then it was washed successively once with a 0.01N-NaOH aqueous solution, once with 0.01N-hydrochloric acid, and twice with 1 liter of water, and the organic layer was poured into methanol, and the precipitated polymer was filtered and dried to give 93 g of a polycarbonate (PC-6).

The polycarbonate had a reduced viscosity [$\eta_{sp}$/c] of 0.75 dl/g as measured at 20° C. at a concentration of 0.5 g/dl in methylene chloride. Measurements of reduced viscosity was carried out by using an automatic viscosity measuring instrument VMR-042 produced by Rigosha Co., Ltd. using an automatic Ubbelohde's improved viscometer (Model-RM).

From an IR spectrum analysis, the polycarbonate (PC-6) was determined to contain carbonate bonds and epoxy bonds from absorptions at 3030cm$^{-1}$, 1590 cm$^{-1}$ and 830 cm$^{-1}$ due to benzene rings, an absorption at 1730 cm$^{-1}$ due to carbonate groups and an absorption at 1130 cm$^{-1}$ due to epoxy groups. The copolymerization ratios of the polycarbonate (PC-6) were determined by $^{1}$H-NMR spectrum analysis. From the results of these analysis, the polycarbonate (PC-6) was determined to comprise the following repeating units in the following copolymerization ratios.

(PC-6)

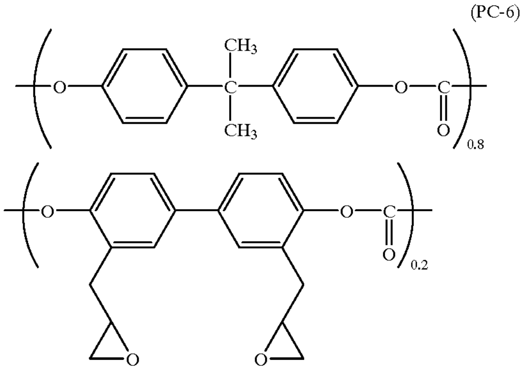

SYNTHESIS 6

(Synthesis of (PC-7))

The procedures of Synthesis 5 were repeated except that 27.9 g of the compound (BP-3) of the formula A was replaced by 32.3 g of the compound (BP-2) (2,2-bis(3-(2-propenyl)-4-hydroxyphenyl)propane) of the formula B:

B(BP-2)

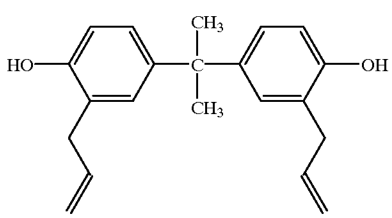

to obtain 102 g of a polycarbonate (PC-7)([$\eta_{sp}$/c]=0.77 dl/g).

From an IR spectrum analysis, the polycarbonate (PC-7) was determined to contain carbonate bonds and epoxy bonds from absorptions at 3030cm$^{-1}$, 1590 cm$^{-1}$ and 830 cm$^{-1}$ due to benzene rings, an absorption at 1730 cm$^{-1}$ due to carbonate groups and an absorption at 1130 cm$^{-1}$ due to epoxy groups. The copolymerization ratios of the polycarbonate (PC-7) were determined by $^{1}$H-NMR spectrum analysis. From the results of these analysis, the polycarbonate (PC-7) was determined to comprise the following repeating units in the following copolymerization ratios.

(PC-7)

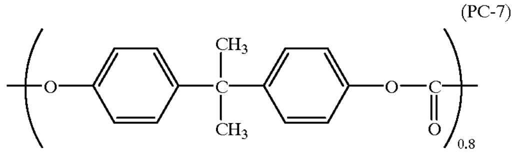

-continued

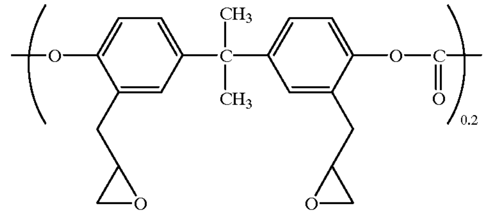

SYNTHESIS 7

(Synthesis of (PC-8))

The procedures of Synthesis 5 were repeated except that 27.9 g of the compound (BP-3) of the formula A was replaced by 48.1 g of a compound (BP-21) of the formula C:

C(BP-21)

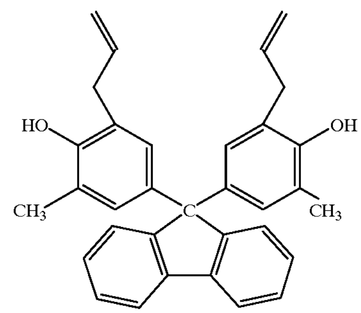

to obtain 95 g of a polycarbonate (PC-8) ([$\eta_{sp}$/c]=0.75 dl/g).

From an IR spectrum analysis, the polycarbonate (PC-8) was determined to contain carbonate bonds and epoxy bonds from absorptions at 3030cm$^{-1}$, 1590 cm$^{-1}$ and 830 cm$^{-1}$ due to benzene rings, an absorption at 1730 cm$^{-1}$ due to carbonate groups and an absorption at 1130 cm$^{-1}$ due to epoxy groups. The copolymerization ratios of the polycarbonate (PC-8) were determined by $^{1}$H-NMR spectrum analysis. From the results of these analysis, the polycarbonate (PC-8) was determined to comprise the following repeating units in the following copolymerization ratios.

(PC-8)

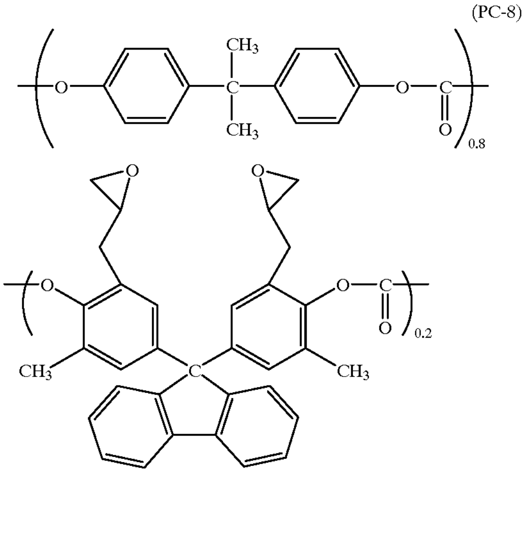

SYNTHESIS 8

(Synthesis of (PC-9))

The procedures of Synthesis 5 were repeated except that 27.9 g of the compound (BP-3) of the formula A was replaced by 19.5 g of 4,4'-biphenol and 2.2 g of 3-aminophenol, and that the reaction with MCPBA and the following washing with the NaOH aqueous solution were not carried out, to obtain 87 g of a polycarbonate (PC-9) ([$\eta_{sp}$/c]=0.46 dl/g).

From an IR spectrum analysis, the polycarbonate (PC-9) was determined to contain carbonate bonds and amino groups from absorptions at 3030cm$^{-1}$, 1590 cm$^{-1}$ and 830 cm$^{-1}$ due to benzene rings, an absorption at 1730 cm$^{-1}$ due to carbonate groups and a wide absorption near 3300 cm$^{-1}$ due to amino groups. The copolymerization ratios of the polycarbonate (PC-9) were determined by $^{1}$H-NMR spectrum analysis. From the results of these analysis, the polycarbonate (PC-9) was determined to comprise the following repeating units in the following copolymerization ratios.

(PC-9)

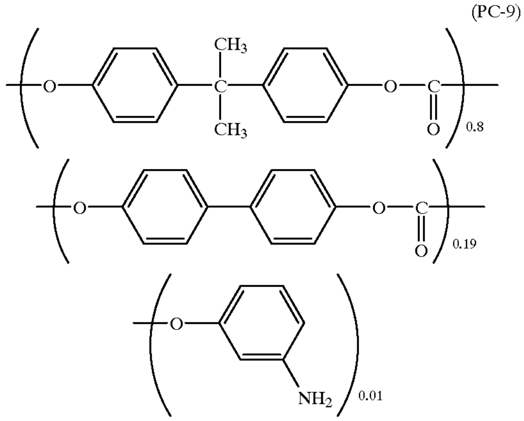

SYNTHESIS 9

(Synthesis of (PC-10))

The procedures of Synthesis 5 were repeated except that 27.9 g of the compound (BP-3) of the formula A was replaced by 19.5 g of 4,4'-biphenol and 3.3 g of 3-hydroxyphthalic anhydride, and that the reaction with MCPBA and the following washing with the NaOH aqueous solution were not carried out, to obtain 91 g of a polycarbonate (PC-10) ([$\eta_{sp}$/c]=0.43 dl/g).

From an IR spectrum analysis, the polycarbonate (PC-10) was determined to contain carbonate bonds and acid anhydride units from absorptions at 3030cm$^{-1}$, 1590 cm$^{-1}$ and 830 cm$^{-1}$ due to benzene rings, an absorption at 1730 cm$^{-1}$ due to carbonate groups and an absorption at 1820 cm$^{-1}$ due to acid anhydride. The copolymerization ratios of the polycarbonate (PC-10) were determined by $^{1}$H-NMR spectrum analysis. From the results of these analysis, the polycarbonate (PC-10) was determined to comprise the following repeating units in the following copolymerization ratios.

(PC-10)

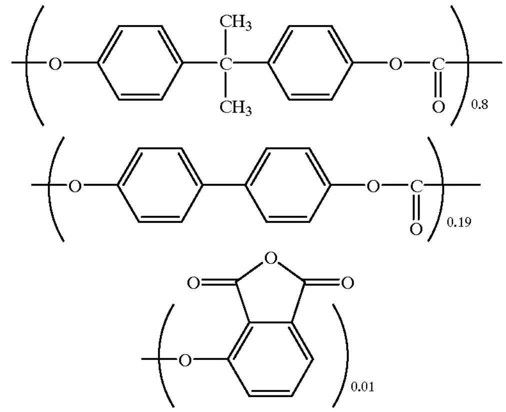

SYNTHESIS 10

(Synthesis of (PC-11))

The procedures of Synthesis 5 were repeated except that 27.9 g of the compound (BP-3) of the formula A was replaced by 23.5 g of 4,4'-dihydroxychalcone, to obtain 93 g of a polycarbonate (PC-11) ([$\Lambda_{sp}$/c]=0.74 dl/g).

From an IR spectrum analysis, the polycarbonate (PC-11) was determined to contain carbonate bonds and epoxy bonds from absorptions at 3030cm$^{-1}$, 1590 cm$^{-1}$ and 830 cm$^{-1}$ due to benzene rings, an absorption at 1730 cm$^{-1}$ due to carbonate groups and an absorption at 1130 cm$^{-1}$ due to epoxy groups. The copolymerization ratios of the polycarbonate (PC-11) were determined by $^{1}$H-NMR spectrum analysis. From the results of these analysis, the polycarbonate (PC-11) was determined to comprise the following repeating units in the following copolymerization ratios.

(PC-11)

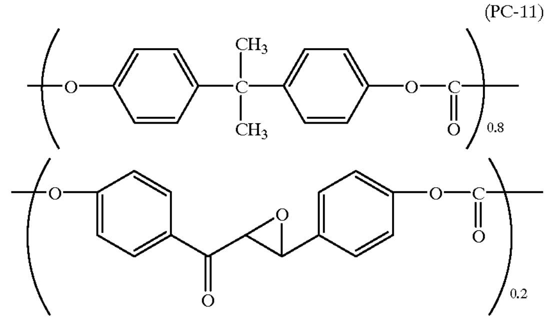

SYNTHESIS 11

(Synthesis of (PC-12))

The procedures of Synthesis 5 were repeated except that 27.9 g of the compound (BP-3) of the formula A was replaced by 30.0 g of 4,4-bis(4-hydroxyphenyl)pentanoic acid (BP-23), and that the reaction with MCPBA and the following washing with the NaOH aqueous solution were not carried out, to obtain 93 g of a polycarbonate (PC-12) ([$\eta_{sp}$/c]=0.75 dl/g).

From an IR spectrum analysis, the polycarbonate (PC-12) was determined to contain carbonate bonds and carboxylic acid units from absorptions at 3030cm$^{-1}$, 1590 cm$^{-1}$ and 830 cm$^{-1}$ due to benzene rings, an absorption at 1730 cm$^{-1}$ due to carbonate groups and an absorption at 3300 $cm^{-1}$ due to carboxylic acid. The copolymerization ratios of the polycarbonate (PC-12) were determined by $^{1}H$-NMR spectrum analysis. From the results of these analysis, the polycarbonate (PC-12) was determined to comprise the following repeating units in the following copolymerization ratios.

(PC-12)

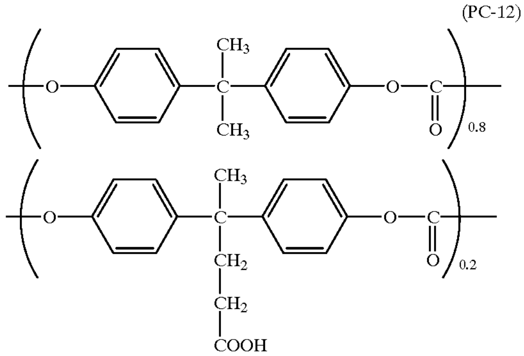

SYNTHESIS 12

(Synthesis of (PC-13))

The procedures of Synthesis 5 were repeated except that 27.9 g of the compound (BP-3) of the formula A was replaced by 21.1 g of bis(4-hydroxyphenyl)amine (BP-24), and that the reaction with MCPBA and the following washing with the NaOH aqueous solution were not carried out, to obtain 83 g of a polycarbonate (PC-13) ($[\eta_{sp}/c]$=0.75 dl/g).

From an IR spectrum analysis, the polycarbonate (PC-13) was determined to contain carbonate bonds and amino groups from absorptions at 3030$cm^{-1}$, 1590 $cm^{-1}$ and 830 $cm^{-1}$ due to benzene rings, an absorption at 1730 $cm^{-1}$ due to carbonate groups and an absorption at 3300 $cm^{-1}$ due to amine. The copolymerization ratios of the polycarbonate (PC-13) were determined by $^{1}H$-NMR spectrum analysis. From the results of these analysis, the polycarbonate (PC-13) was determined to comprise the following repeating units in the following copolymerization ratios.

(PC-13)

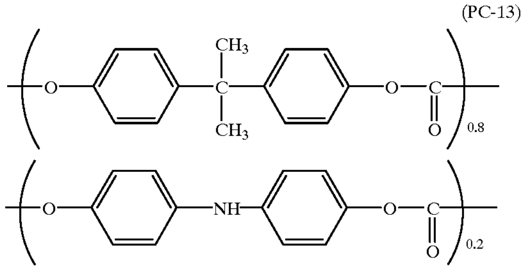

SYNTHESIS 13

(Synthesis of (PC-14))

The procedures of Synthesis 5 were repeated except that 27.9 g of the compound (BP-3) of the formula A was replaced by 39.8 g of 2,2-bis(3-phenyl-4-hydroxyphenyl) propane and 2.8 g of 2-(4-hydroxyphenyl)ethanol, and that the reaction with MCPBA and the following washing with the NaOH aqueous solution were not carried out, to obtain 103 g of a polycarbonate (PC-14) ($[\eta_{sp}/c]$=0.46 dl/g).

From an IR spectrum analysis, the polycarbonate (PC-14) was determined to contain carbonate bonds and hydroxyl groups from absorptions at 3030$cm^{-1}$, 1590 $cm^{-1}$ and 830 $cm^{-1}$ due to benzene rings, an absorption at 1730 $cm^{-1}$ due to carbonate groups and a wide absorption near 3300 $cm^{-1}$ due to hydroxyl groups. The copolymerization ratios of the polycarbonate (PC-14) were determined by $^{1}H$-NMR spectrum analysis. From the results of these analysis, the polycarbonate (PC-14) was determined to comprise the following repeating units in the following copolymerization ratios.

(PC-14)

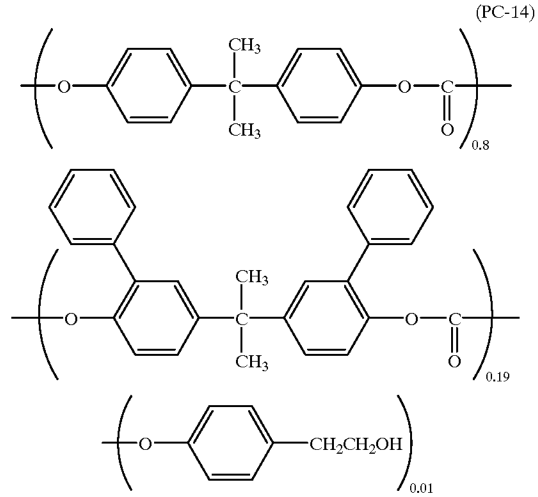

SYNTHESIS 14

(Synthesis of (PC-15))

The procedures of Synthesis 5 were repeated except that 27.9 g of the compound (BP-3) of the formula A was replaced by 39.8 g of a compound of the formula D:

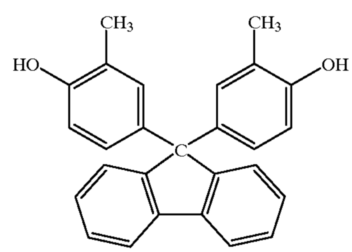

and 2.5 g of 4-hydroxythiophenol, and that the reaction with MCPBA and the following washing with the NaOH aqueous solution were not carried out, to obtain 100 g of a polycarbonate (PC-15) ($[\eta_{sp}/c]$=0.46 dl/g).

From an IR spectrum analysis, the polycarbonate (PC-15) was determined to contain carbonate bonds and thiol units from absorptions at 3030$cm^{-1}$, 1590 $cm^{-1}$ and 830 $cm^{-1}$ due to benzene rings, an absorption at 1730 $cm^{-1}$ due to carbonate groups and a wide absorption near 3300 $cm^{-1}$ due to thiol. The copolymerization ratios of the polycarbonate (PC-15) were determined by $^{1}H$-NMR spectrum analysis. From the results of these analysis, the polycarbonate (PC-15) was determined to comprise the following repeating units in the following copolymerization ratios.

(PC-15)

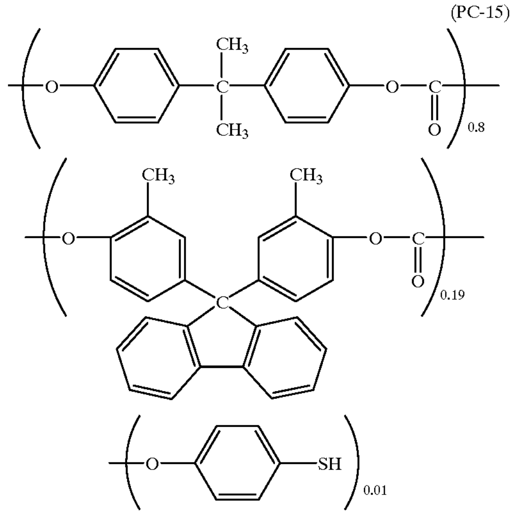

SYNTHESIS 15

(Synthesis of (PC-16))

The procedures of Synthesis 5 were repeated except that 27.9 g of the compound (BP-3) of the formula A was replaced by 22.7 g of 3,3'-diamino-4,4'-dihydroxybiphenyl (BP-25), and that the reaction with MCPBA and the following washing with the NaOH aqueous solution were not carried out, to obtain 83 g of a polycarbonate (PC-16) ($[\eta_{sp}/c]$=0.75 dl/g).

From an IR spectrum analysis, the polycarbonate (PC-16) was determined to contain carbonate bonds and amino groups from absorptions at 3030cm$^{-1}$, 1590 cm$^{-1}$ and 830 cm$^{-1}$ due to benzene rings, an absorption at 1730 cm$^{-1}$ due to carbonate groups and a wide absorption near 3300 cm$^{-1}$ due to amino groups. The copolymerization ratios of the polycarbonate (PC-16) were determined by $^1$H-NMR spectrum analysis. From the results of these analysis, the polycarbonate (PC-16) was determined to comprise the following repeating units in the following copolymerization ratios.

(PC-16)

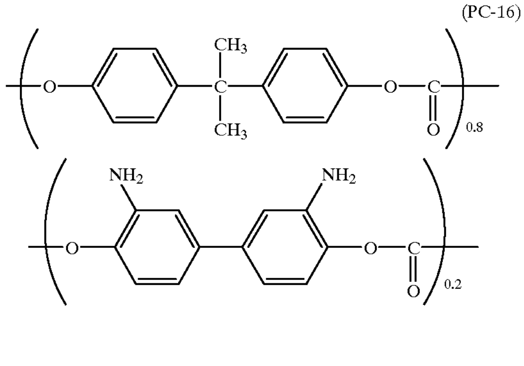

EXAMPLE 28

(crosslinking of an electrophilic polycarbonate with a nucleophilic crosslinking agent)

(C-2)

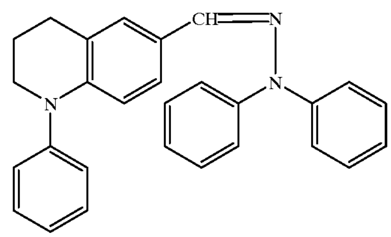

By using (C-2) as a charge-transfer substance, (PC-6) as a binder resin material and xylylenediamine (MXDA) as a crosslinking agent, a solution of (C-2):(PC-6):MXDA:methylene chloride=1:1:0.2:8 (weight ratio) was produced to use it as a coating fluid. On standing for one month, the coating fluid did not whiten nor set to gel. An aluminum conductive substrates was coated with a dispersion of oxotitanium phthalocyanine:butyral resin:methylene chlroride=1:1:38 (weight ratio) by dip coating to form a charge-generating layer (about 0.5 μm) of oxotitanium phthalocyanine, which was then coated with the above-described coating fluid by dip coating, dried and then heated at 150° C. for 10 hours to carry out crosslinking, to produce a laminate-type organic electrophotographic photoreceptor having a charge-transfer layers of about 20 μm thick. The charge-transfer layer did not crystallize from coating to crosslinking.

The electrophotographic photoreceptor was examined for electrophotographic properties by discharging −6 kV corona using an electrostatic charge testing instrument EPA-8100 (produced by Kawaguchi Denki Seisakusho Co., Ltd.), and measuring the initial surface potential ($V_0$), the residual potential ($V_R$) 5 seconds after the irradiation of light (10 Lux) and the half-value exposure ($E_{1/2}$). The results are shown in Table 7.

The abrasion resistance of the charge-transfer layer was evaluated by using a Suga abrasion testing machine NUS-ISO-3 (produced by Suga Shikenki Co., Ltd.) by reciprocating a sample of the laminate-type electrophotographic photoreceptor 1200 times on an abrasion test paper (produced by Suga Shikenki Co., Ltd., 3 μm abrasive paper) applied with a load of 200 g and measuring weight loss. The result is shown in Table 8.

EXAMPLE 29

(crosslinking of a nucleophilic polycarbonate (—OH occurring by the ring-opening of epoxy groups) with an electrophilic crosslinking agent)

A laminate-type electrophotographic photoreceptor was produced in the same manner as in Example 28 except that (PC-6) was replaced by (PC-7), and MXDA by chlorendic anhydride, and measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 30

(crosslinking of an electrophilic polycarbonate with a nucleophilic crosslinking agent)

A laminate-type electrophotographic photoreceptor was produced in the same manner as in Example 28 except that (PC- 6) was replaced by (PC-8), and measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 31

(crosslinking of a nucleophilic polycarbonate with an electrophilic crosslinking agent)

A laminate-type electrophotographic photoreceptor was produced in the same manner as in Example 28 except that (PC-6) was replaced by (PC-9), and MXDA by bisphenol A epoxy resin (epoxy equivalent: 1300), and measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 32

(crosslinking (non-epoxy crosslinking) of an electrophilic polycarbonate with a nucleophilic crosslinking agent)

A laminate-type electrophotographic photoreceptor was produced in the same manner as in Example 28 except that (PC-6) was replaced by (PC-10) and that the crosslinking following the drying was carried out at 200° C. for 20 hours, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 33

(crosslinking of an epoxy-polycarbonate with a Lewis acid)

A laminate-type electrophotographic photoreceptor was produced in the same manner as in Example 28 except that (PC-6) was replaced by (PC-11), and MXDA by boron trifluoride-piperizine complex, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 34

(crosslinking of a nucleophilic polycarbonate with an electrophilic crosslinking agent)

A laminate-type electrophotographic photoreceptor was produced in the same manner as in Example 28 except that (PC-6) was replaced by (PC-12), and MXDA by bisphenol A epoxy resin, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 35

(crosslinking of a nucleophilic polycarbonate with an electrophilic crosslinking agent)

A laminate-type electrophotographic photoreceptor was produced in the same manner as in Example 28 except that (PC-6) was replaced by (PC-13), and MXDA by bisphenol A epoxy resin, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 36

(crosslinking of a nucleophilic polycarbonate with an electrophilic crosslinking agent)

A laminate-type electrophotographic photoreceptor was produced in the same manner as in Example 28 except that (PC-6) was replaced by (PC-14), and MXDA by bisphenol A epoxy resin, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 37

(crosslinking of a nucleophilic polycarbonate with an electrophilic crosslinking agent)

A laminate-type electrophotographic photoreceptor was produced in the same manner as in Example 28 except that (PC-6) was replaced by (PC-15), and MXDA by bisphenol A epoxy resin, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

EXAMPLE 38

(crosslinking of a nucleophilic polycarbonate with an electrophilic crosslinking agent)

A laminate-type electrophotographic photoreceptor was produced in the same manner as in Example 28 except that (PC-6) was replaced by (PC-16), and MXDA by bisphenol A epoxy resin, and then measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner. The results are shown in Tables 7 and 8.

On standing for one month, the coating fluid for forming charge-transfer layers did not whiten nor set to gel. The charge-transfer layer did not crystallize from coating to crosslinking.

Comparative Example 7

(radical crosslinking of a polycarbonate having vinyl groups)

A polycarbonate (PC-17) of the following structure was produced in the same manner as in Comparative Example 4 according to the production of a crosslinking polycarbonate disclosed in Japanese Patent Application Unexamined Publication No. 4-291384.

(PC-17)

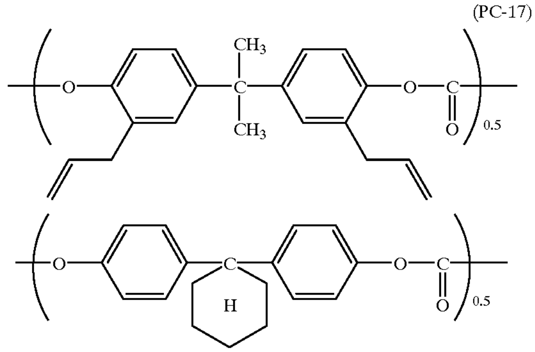

A solution of (PC-17):(C-2):pentaerythritol tetrakis(3-mercaptopropionate)(crosslinking agent):IRGACURE 907 (radical initiator, produced by Ciba-Geigy AG):methylene chloride=1:1:0.1:0.01:8 (weight ratio) was prepared to use it as a coating fluid for forming charge-transfer layers. Then, in the same manner as in Example 28, a charge-generating layer was formed and the coating fluid was applied on the charge-generating layer and dried. After the drying, an irradiation energy of 80 W/cm$^2$ was irradiated for 5 seconds using a high pressure mercury lamp, to give a crosslinked laminate-type electrophotographic photoreceptor.

The laminate-type electrophotographic photoreceptor was then subjected to measurements of the initial surface potential ($V_0$), the residual potential ($V_R$) 5 seconds after the irradiation of light (10 Lux), the half-value exposure ($E_{1/2}$) and the weight loss of the charge-transfer layer caused by abrasion were carried out in the same manner as in Example 28. The results are shown in Tables 7 and 8.

On standing for one month, the coating fluid for forming charge-transfer layers did not whiten nor set to gel. The charge-transfer layer did not crystallize from coating to crosslinking.

TABLE 7

| | Initial surface potential $V_0$ (V) | Residual potential $V_R$ (V) | Half-value exposure $E_{1/2}$ (lux · sec) |
|---|---|---|---|
| Example 28 | −742 | −4 | 0.75 |
| Example 29 | −749 | −4 | 0.74 |
| Example 30 | −752 | −3 | 0.72 |
| Example 31 | −743 | −4 | 0.75 |
| Example 32 | −753 | −7 | 0.79 |
| Example 33 | −749 | −5 | 0.75 |
| Example 34 | −750 | −2 | 0.75 |
| Example 35 | −752 | −4 | 0.73 |
| Example 36 | −749 | −3 | 0.74 |
| Example 37 | −744 | −4 | 0.75 |
| Example 38 | −750 | −3 | 0.76 |
| Comparative Example 7 | −732 | −45 | 1.14 |

TABLE 8

| | Abrasion (mg) |
|---|---|
| Example 28 | 1.15 |
| Example 29 | 1.27 |
| Example 30 | 1.20 |
| Example 31 | 1.34 |
| Example 32 | 1.23 |
| Example 33 | 1.30 |
| Example 34 | 1.22 |
| Example 35 | 1.23 |
| Example 36 | 1.19 |
| Example 37 | 1.26 |
| Example 38 | 1.23 |
| Comparative Example 7 | 1.93 |

INDUSTRIAL APPLICABILITY

The polycarbonate resins of the present invention are novel polycarbonate resins having crosslinking functional groups and are useful for the production of crosslinked polycarbonate resins or graft polymers. When used as binder resin materials in the photosensitive layers of electrophotographic photoreceptors, the polycarbonate resins do not cause whitening nor gelation of solutions thereof in solvents and can give crosslinked products of high surface hardness, so the electrophotographic photoreceptors maintain high mechanical strength and excellent electrophotographic properties during a long-term repeated uses.

We claim:

1. A polycarbonate resin having crosslinking functional groups in side chains, which comprises repeating units (1) represented by the following general formula (1) and repeating units (2a) represented by the following general formula (2a) and/or repeating units (2b) represented by the following general formula (2b), in a molar ratio of the repeating units (1) to a total of the repeating units (1), repeating units (2a) and the repeating units (2b), (1)

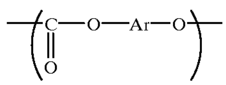

(2a)

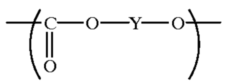

(2b)

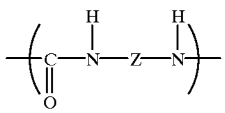

wherein, in the general formula (1), Ar is a divalent aromatic group represented by (1a)

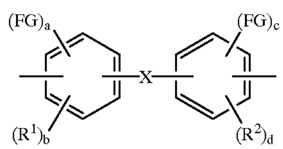

or (1b)

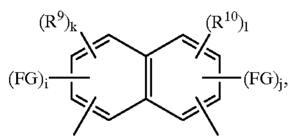

and in the formula (1a), X is a single bond, —CO—, —S—, —SO—, —$SO_2$—, —O—, —$CR^3R^4$— (wherein $R^3$ and $R^4$ are each an alkyl group of 1 to 10 carbon atoms, trifluoromethyl or an aryl group of 6 to 36 carbon atoms), a cycloalkylene group of 5 to 12 carbon atoms, a cycloalkylidene group of 5 to 12 carbon atoms, fluorenylidene, diphenylmethylidene consisting of two phenyl groups linked to each other via 1 to 4 methylene groups, an α,ω-alkylene group of 2 to 12 carbon atoms, —$CR^5R^6$— (wherein $R^5$ and $R^6$ are each hydrogen, an alkyl group of 1 to 10 carbon atoms, an aryl group of 6 to 36 carbon atoms, an aliphatic hydrocarbon group of 2 to 10 carbon atoms having one or more unsaturated bonds (except for a linear alkenyl group of 2 to 6 carbon atoms having one double bond only at an end thereof and a linear alkynyl group of 2 to 6 carbon atoms having one triple bond only at an end thereof) or FG, at least one of $R^5$ and $R^6$ being FG or the aliphatic hydrocarbon group of 2 to 10 carbon atoms having one or more unsaturated bonds, FG being

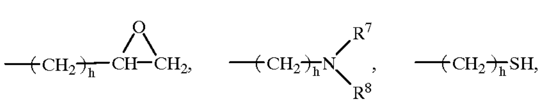

-continued $—(CH_2)_h—CH{=}CH_2$, $—(CH_2)_h—OH$, $—(CH_2)_h—CO_2H$ or $—(CH_2)_h—C{\equiv}CH$, h being an integer of 0 to 4, $R^7$ and $R^8$ being each hydrogen, an alkyl group of 1 to 6 carbon atoms or a substituted or non-substituted aryl group of 6 to 12 carbon atoms), a cycloalkylidene group of 5 to 12 carbon atoms which is substituted by an aliphatic hydrocarbon group of 2 to 12 carbon atoms having one or more unsaturated bonds, a cycloalkylidene group of 5 to 12 carbon atoms which is substituted by an alicyclic hydrocarbon group of 5 to 12 carbon atoms having one or more unsaturated bonds, or a fluorenylidene which is substituted by an aliphatic hydrocarbon group of 2 to 12 carbon atoms having one or more unsaturated bonds, $R^1$ and $R^2$ are each a halogeno, a saturated hydrocarbon group of 1 to 10 carbon atoms, an alkyloxy group of 1 to 10 carbon atoms, an alkylthio group of 1 to 10 carbon atoms, an aryl group of 6 to 18 carbon atoms, an aryloxy group of 6 to 12 carbon atoms, an arylthio group of 6 to 12 carbon atoms, or an aryl group of 6 to 18 carbon atoms which is substituted by an alkoxyl group of 1 to 10 carbon atoms, a, b, c and d are each an integer of 0 to 4, a+b being an integer of 0 to 4, c+d being an integer of 0 to 4; and when X is a single bond, fluorenylidene, a diphenylmethylidene consisting of two phenyl groups linked to each other via 1 to 4 methylene groups, —CO—, —S—, —SO—, —$SO_2$—, —O—, —$CR^3R^4$—, a cycloalkylene group of 5 to 12 carbon atoms, a cycloalkylidene group of 5 to 12 carbon atoms or an α,ω-alkylene group of 2 to 12 carbon atoms, a+c is not 0; and when X is —CO—, —S—, —SO—, —$SO_2$—, —O—, —$CR^3R^4$—, a cycloalkylene group of 5 to 12 carbon atoms, a cycloalkylidene group of 5 to 12 carbon atoms or an α,ω-alkylene group of 2 to 12 carbon atoms, and the FGs bonded to the phenylene groups of (1a) are $—(CH_2)_h—CH{=}CH_2$ and/or $—(CH_2)_h—C{\equiv}CH$ (wherein h is as defined above), a+c is not 0 and b+d is not 0; and when X is —$CR^5R^6$—, a cycloalkylidene group of 5 to 12 carbon atoms which is substituted by an aliphatic hydrocarbon group of 2 to 12 carbon atoms having one or more unsaturated bonds or a fluorenylidene which is substituted by an aliphatic hydrocarbon group of 2 to 12 carbon atoms having one or more unsaturated bonds, none of $R^1$ and $R^2$ are a halogeno;

and in the formula (1b), $R^9$ and $R^{10}$ are each a halogeno, an alkyl group of 1 to 6 carbon atoms, an alkyloxy group of 1 to 4 carbon atoms, a substituted or non-substituted aryl group of 6 to 12 carbon atoms or a substituted or non-substituted aryloxy group of 6 to 12 carbon atoms, FG is as defined above, two —COOH present in one repeating unit may form the following structure

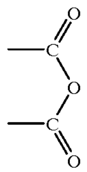

i, j, k and l are each an integer of 0 to 3, i+j=1 to 6, i+k=0 to 3, and j+l=0 to 3;

and in the general formula (2a), Y is a divalent group containing an arylene group and no crosslinking functional group;

and in the general formula (2b), Z is a group represented by the following formula

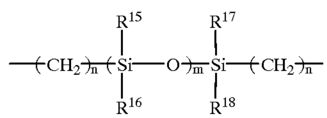

$R^{15}$, $R^{16}$, $R^{17}$ and $R^{18}$ are each an alkyl group of 1 to 4 carbon atoms or an aryl group of 6 to 36 carbon atoms, n is an integer of 1 to 6, and m is a number of 1 to 150.

2. The polycarbonate resin of claim 1, wherein Ar in the repeating units (1) are represented by the following formula.

(1a)

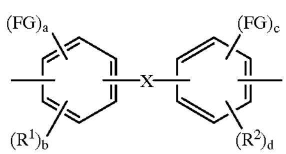

3. The polycarbonate resin of claim 1, wherein Ar in the repeating units (1) are represented by the following formula.

(1b)

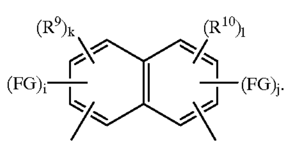

4. The polycarbonate resin of claim 1, wherein the repeating units (1) are represented by the following formula

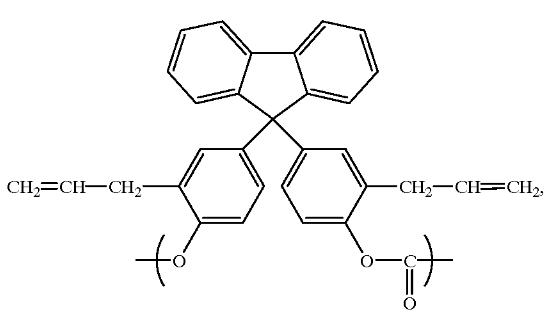

-continued

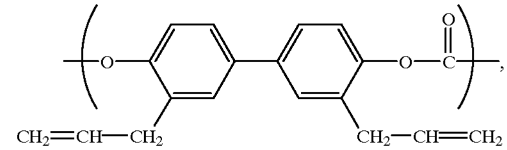

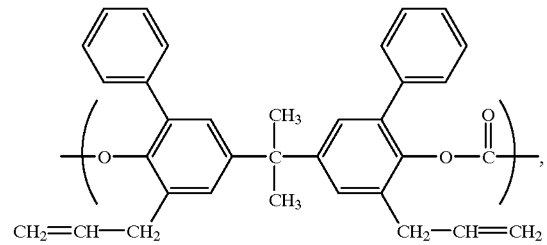

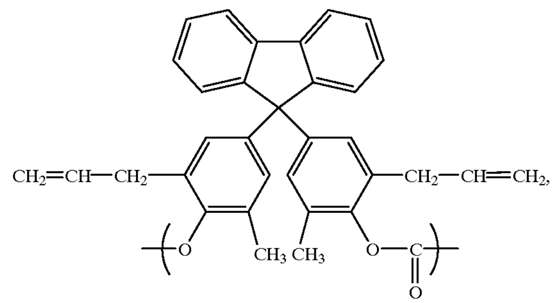

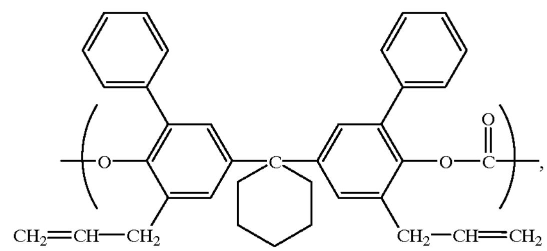

or

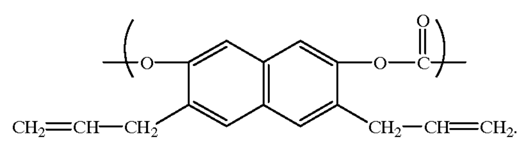

5. The polycarbonate resin of claim 1, wherein the repeating units (2a) are repeating units (3) represented by the following general formula (3)

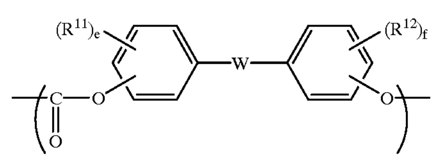

wherein $R^{11}$ and $R^{12}$ are each a halogeno, a saturated hydrocarbon group of 1 to 10 carbon atoms, an aromatic hydrocarbon group of 6 to 12 carbon atoms, an alkyloxy group of 1 to 10 carbon atoms, an alkylthio group of 1 to 10 carbon atoms, an aryloxy group of 6 to 12 carbon atoms or an arylthio group of 6 to 12 carbon atoms, e and f are each an integer of 0 to 4, W is a single bond, —O—, —CO—, —S—, —SO—, —$SO_2$—, —$CR^{13}R^{14}$—, a cycloalkylidene group of 5 to 12 carbon atoms or an α,ω-alkylene group of 2 to 12 carbon atoms ($R^{13}$ and $R^{14}$ are each hydrogen, trifluoromethyl, an alkyl group of 1 to 10 carbon atoms or an aromatic hydrocarbon group of 6 to 36 carbon atoms) or the following group

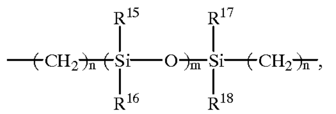

$R^{15}$, $R^{16}$, $R^{17}$ and $R^{18}$ being each an alkyl group of 1 to 4 carbon atoms or an aryl group of 6 to 36 carbon atoms, n being an integer of 1 to 6, and m being a number of 1 to 150.

6. The polycarbonate resin of claim 1, which further has end groups which have a crosslinking functional group and are represented by the following general formula (E1), (E2) or (E3):

(E1)

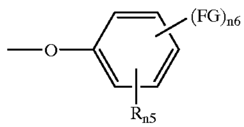

(E2)

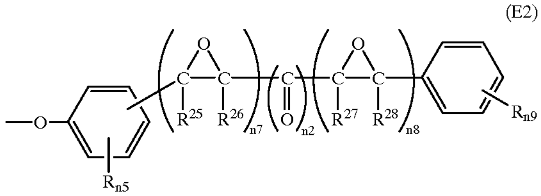

(E3)

—O—FG wherein each R is a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, n5 is an integer of 0 to 4, n6 is an integer of 1 to 5, n5+n6 is an integer of 1 to 5, n9 is an integer of 0 to 5, $R^{25}$, $R^{26}$, $R^{27}$ and $R^{28}$ are each hydrogen, a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, $R^{26}$ and $R^{27}$ may be linked to each other by a methylene chain of 1 to 4 carbon atoms, n7 and n8 are each 0 or 1, n7+n8 is 1 or 2, n2 is 0 or 1, FG is as defined above, and two —COOH present in one end group may form the following structure.

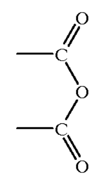

7. A polycarbonate resin having crosslinking functional groups in a main chain, which comprises repeating units (6), (7) or (8) represented by the following general formula (6), (7) or (8), and repeating units (2a) represented by the following general formula (2a) and/or repeating units (2b) represented by the following general formula (2b), in a molar ratio of the repeating units (6), (7) or (8) to a total of the repeating units (6), (7) or (8), the repeating units (2a) and the repeating units (2b), [(6), (7) or (8)]/{[(6), (7) or (8)]+(2a)+(2b)}, of 0.001 to 1;

(6)

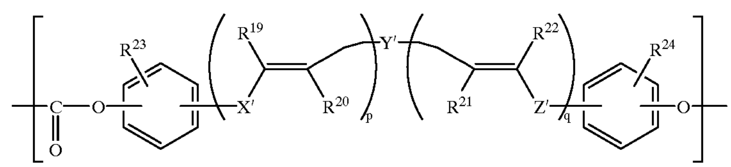

(7)

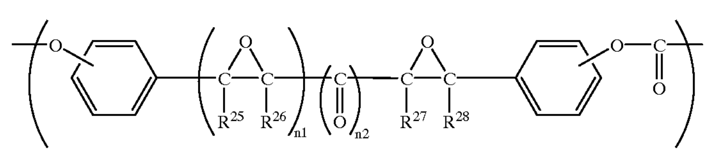

(8)

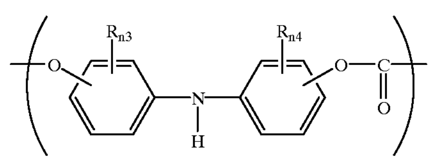

(2a)

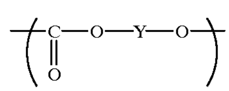

-continued (2b)

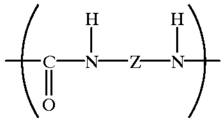

wherein, in the general formula (6), X', Y' and Z' are each a single bond, —O—, —CO—, —S—, —SO—, —$SO_2$— or an alkylene group of 1 to 40 carbon atoms, $R^{20}$ and $R^{21}$ are each hydrogen, an alkyl group of 1 to 40 carbon atoms, a cycloalkyl group of 5 to 40 carbon atoms or an aryl group of 6 to 36 carbon atoms, or $R^{20}$ and $R^{21}$ are linked to each other to form an alkylene group of 1 to 40 carbon atoms, $R^{19}$ and $R^{22}$ are each hydrogen, an alkyl group of 1 to 40 carbon atoms, a cycloalkyl group of 5 to 40 carbon atoms or an aryl group of 6 to 36 carbon atoms, $R^{23}$ and $R^{24}$ are each hydrogen, a halogeno, an alkyl group of 1 to 40 carbon atoms, a cycloalkyl group of 5 to 40 carbon atoms, an alkoxyl of 1 to 40 carbon atoms or an aryl group of 6 to 36 carbon atoms, and p+q is an integer of 1 or more;

in the general formula (7), $R^{25}$, $R^{26}$, $R^{27}$ and $R^{28}$ are each hydrogen, a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, $R^{26}$ and $R^{27}$ are optionally linked to each other by a methylene chain of 1 to 4 carbon atoms, n1 and n2 are each an integer of 0 or 1;

in the general formula (8), each R is a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group or 6 to 12 carbon atoms or an arylthio group of 6 to 12 carbon atoms, n3 and n4 are each an integer of 0 to 4;

in the general formula (2a), Y is a divalent group containing an arylene group and no crosslinking functional group;

in the general formula (2b), Z is represented by the following formula

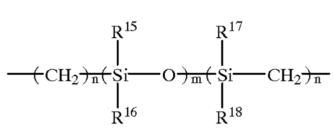

wherein $R^{15}$, $R^{16}$, $R^{17}$ and $R^{18}$ are each an alkyl group of 1 to 4 carbon atoms or an aryl group of 6 to 36 carbon atoms, n is an integer of 1 to 6, and m is a number of 1 to 150.

8. The polycarbonate resin of claim 7, wherein the repeating units (2a) are repeating units (3) represented by the following general formula (3)

(3)

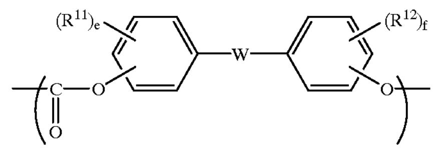

wherein $R^{11}$ and $R^{12}$ are each a halogeno, a saturated hydrocarbon group of 1 to 10 carbon atoms, an aromatic hydrocarbon group of 6 to 12 carbon atoms, an alkyloxy group of 1 to 10 carbon atoms, an alkylthio group of 1 to 10 carbon atoms, an aryloxy group of 6 to 12 carbon atoms or an arylthio group of 6 to 12 carbon atoms, e and f are each an integer of 0 to 4, W is a single bond, —O—, —CO—, —S—, —SO—, —$SO_2$—, —$CR^{13}R^{14}$—, a cycloalkylidene group of 5 to 12 carbon atoms or an α,ω-alkylene group of 2 to 12 carbon atoms ($R^{13}$ and $R^{14}$ are each hydrogen, trifluoromethyl, an alkyl group of 1 to 10 carbon atoms or an aromatic hydrocarbon groups of 6 to 36 carbon atoms) or a group represented by the following formula

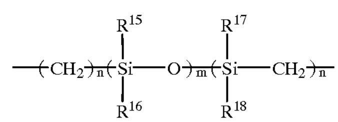

wherein $R^{15}$, $R^{16}$, $R^{17}$ and $R^{18}$ are each an alkyl group of 1 to 4 carbon atoms or an aryl group of 6 to 36 carbon atoms, n is an integer of 1 to 6, and m is a number of 1 to 150.

9. The polycarbonate resin of claim 7, which further has end groups which have a crosslinking functional group and are represented by the following general formula (E1), (E2) or (E3)

(E1)

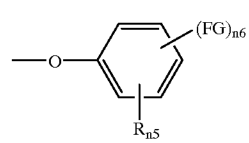

(E2)

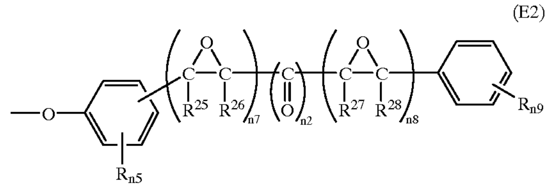

(E3)

—O—FG wherein each R is a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, n5 is an integer of 0 to 4, n6 is an integer of 1 to 5, n5+n6 is an integer of 1 to 5, n9 is an integer of 0 to 5, $R^{25}$, $R^{26}$, $R^{27}$ and $R^{28}$ are each hydrogen, a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, $R^{26}$ and $R^{27}$ may be linked to each other by a methylene chain of 1 to 4 carbon atoms, n7 and n8 are each 0 or 1, n7+n8 is 1 or 2, n2 is 0 or 1, FG is

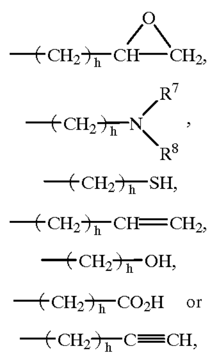

and two —COOH present in one end group may form the following structure,

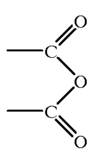

h is an integer of 0 to 4, $R^7$ and $R^8$ are each hydrogen, an alkyl group of 1 to 6 carbon atoms or a substituted or non-substituted aryl group of 6 to 12 carbon atoms.

10. A polycarbonate resin having crosslinking functional groups at ends, which comprises repeating units (2a) represented by the following general formula (2a) and/or repeating units (2b) represented by the following general formula (2b), and end groups represented by the following general formula (E1), (E2) or (E3)

(2a)

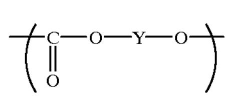

(2b)

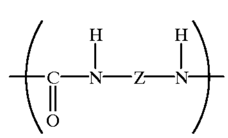

-continued (E1)

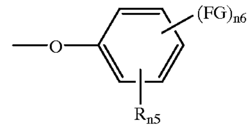

(E2)

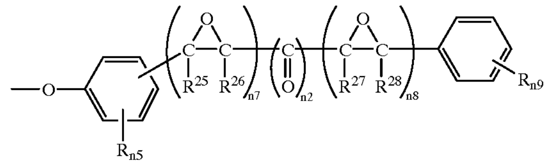

(E3)

wherein in the general formula (2a), Y is a divalent group containing an arylene group and no crosslinking functional group;

in the general formula (2b), Z is a group represented by the following formula

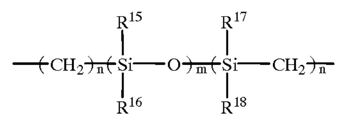

wherein $R^{15}$, $R^{16}$, $R^{17}$ and $R^{18}$ are each an alkyl group of 1 to 4 carbon atoms or an aryl group of 6 to 36 carbon atoms, n is an integer of 1 to 6, and m is a number of 1 to 150;

in the general formulae (E1), (E2) and (E3), each R is a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, n5 is an integer of 0 to 4, n6 is an integer of 1 to 5, n5+n6 is an integer of 1 to 5, n9 is an integer of 0 to 5, $R^{25}$, $R^{26}$, $R^{27}$ and $R^{28}$ are each hydrogen, a halogeno, a substituted or non-substituted alkyl group of 1 to 10 carbon atoms, a substituted or non-substituted alkyloxy group of 1 to 10 carbon atoms, an alkylthio group of 1 to 10 carbon atoms, a substituted or non-substituted cycloalkyl group of 5 to 7 carbon atoms, a substituted or non-substituted aryl group of 6 to 24 carbon atoms, a substituted or non-substituted aryloxy group of 6 to 12 carbon atoms or an arylthio group of 6 to 12 carbon atoms, $R^{26}$ and $R^{27}$ are optionally linked to each other by a methylene chain of 1 to 4 carbon atoms, n7 and n8 are each 0 or 1, n7+n8 is 1 or 2, n2 is 0 or 1, FG is

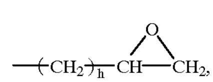

-continued

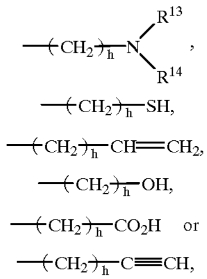

two —COOH present in one end group may have the following structure,

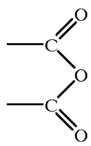

h is an integer of 0 to 4, $R^{13}$ and $R^{14}$ are each hydrogen, an alkyl group of 1 to 6 carbon atoms or a substituted or non-substituted aryl group of 6 to 12 carbon atoms.

11. The polycarbonate resin of claim 10, wherein the repeating units (2a) are repeating units (3) represented by the following general formula (3)

(3)

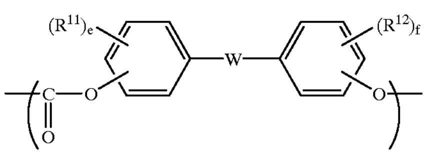

wherein $R^{11}$ and $R^{12}$ are each a halogeno, a saturated hydrocarbon group of 1 to 10 carbon atoms, an aromatic hydrocarbon group of 6 to 12 carbon atoms, an alkyloxy group of 1 to 10 carbon atoms, an alkylthio group of 1 to 10 carbon atoms, an aryloxy group of 6 to 12 carbon atoms or an arylthio group of 6 to 12 carbon atoms, e and f are each an integer of 0 to 4, W is a single bond, —O—, —CO—, —S—, —SO—, —$SO_2$—, —$CR^{13}R^{14}$—, a cycloalkylidene group of 5 to 12 carbon atoms or an α,ω-alkylene group of 2 to 12 carbon atoms ($R^{13}$ and $R^{14}$ being each hydrogen, trifluoromethyl, an alkyl group of 1 to 10 carbon atoms or an aromatic hydrocarbon groups of 6 to 36 carbon atoms) or a group represented by the following formula

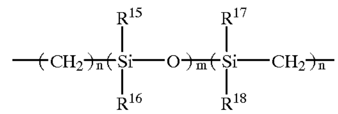

wherein $R^{15}$, $R^{16}$, $R^{17}$ and $R^{18}$ are each an alkyl group of 1 to 4 carbon atoms or an aryl group of 6 to 36 carbon atoms, n is an integer of 1 to 6, and m is a number of 1 to 150.

12. A crosslinked polycarbonate resin produced by crosslinking the polycarbonate resin of any one of claims 1 to 11.

13. An electrophotographic photoreceptor comprising a conductive substrate and a photosensitive layer that is disposed on the conductive substrate, the photosensitive layer containing the polycarbonate resin of any one of claims 1 to 11.

14. The electrophotographic photoreceptor of claim 13, wherein the photosensitive layer comprises a charge-generating layer containing a charge-generating substance and a charge-transfer layer containing a charge-transfer substance and a binder resin, the binder resin being the polycarbonate resin of any one of claims 1 to 11.

15. An electrophotographic photoreceptor comprising a conductive substrate and a photosensitive layer that is disposed on the conductive substrate, the photosensitive layer containing the crosslinked polycarbonate resin of claim 12.

16. The electrophotographic photoreceptor of claim 15, wherein the photosensitive layer comprises a charge-generating layer containing a charge-generating substance and a charge-transfer layer containing a charge-transfer substance and a binder resin, the binder resin being the crosslinked polycarbonate resin of claim 12.

* * * * *

UNITED STATES PATENT AND TRADEMARK OFFICE
CERTIFICATE OF CORRECTION

PATENT NO : 6,043,334

DATED : March 28, 2000

INVENTOR(S) : M. KANAMARU, et al.

It is certified that error appears in the above-identified patent and that said Letters Patent are hereby corrected as shown below:

On title page, item 87 PCT Pub. Date
replace "Dec. 12, 1997" with --June 12, 1997--.

Signed and Sealed this

Third Day of April, 2001

Attest:

Nicholas P. Godici

NICHOLAS P. GODICI

*Attesting Officer* *Acting Director of the United States Patent and Trademark Office*